US012144700B2

(12) United States Patent
Wratten, Jr. et al.

(10) Patent No.: US 12,144,700 B2
(45) Date of Patent: Nov. 19, 2024

(54) DENTAL APPLIANCES AND ASSOCIATED SYSTEMS AND METHODS

(71) Applicant: Brius Technologies, Inc., Carrollton, TX (US)

(72) Inventors: James Sylvester Wratten, Jr., Watersville, NY (US); Seyed Mehdi Roein Peikar, Addison, TX (US)

(73) Assignee: Brius Technologies, Inc., Carrollton, TX (US)

( * ) Notice: Subject to any disclaimer, the term of this patent is extended or adjusted under 35 U.S.C. 154(b) by 0 days.

(21) Appl. No.: 17/519,560

(22) Filed: Nov. 4, 2021

(65) Prior Publication Data

US 2022/0133438 A1 May 5, 2022

Related U.S. Application Data

(60) Provisional application No. 63/110,344, filed on Nov. 5, 2020.

(51) Int. Cl.
*A61C 7/00* (2006.01)
*A61C 7/14* (2006.01)
(Continued)

(52) U.S. Cl.
CPC .............. *A61C 7/002* (2013.01); *A61C 7/148* (2013.01); *A61C 7/20* (2013.01); *B29C 64/153* (2017.08);
(Continued)

(58) Field of Classification Search
CPC ........... A61C 7/002; A61C 7/148; A61C 7/20; A61C 7/10; A61C 7/146; A61C 7/30; A61C 7/02; A61C 7/145; A61C 7/22; A61C 7/28
See application file for complete search history.

(56) References Cited

U.S. PATENT DOCUMENTS

| | | | |
|---|---|---|---|
| 659,577 A | 10/1900 | Cederstrom |
| 1,292,702 A | 1/1919 | Canning |

(Continued)

FOREIGN PATENT DOCUMENTS

| | | |
|---|---|---|
| AU | 2016367144 B2 | 10/2021 |
| AU | 2021290322 A1 | 2/2022 |

(Continued)

OTHER PUBLICATIONS

International Preliminary Report on Patentability mailed Jun. 21, 2018, International Application No. PCT/US2016/065174, 10 pages.

(Continued)

*Primary Examiner* — Jason L Vaughan
*Assistant Examiner* — Amanda Kreiling
(74) *Attorney, Agent, or Firm* — Fortem IP LLP

(57) ABSTRACT

The present technology comprises methods of manufacturing an orthodontic appliance. For example, a method can include forming an orthodontic appliance in an intermediate configuration by a casting process. The method can further include securing the appliance to a shape forming fixture such that the appliance assumes a desired configuration. The shape forming fixture can comprise a gingiva portion including a surface having a shape corresponding at least in part to a gingiva of a patient and a securing portion carried by the gingiva portion and configured to releasably secure to a portion of the appliance. The method can further include setting a shape of the appliance while the appliance is secured to the shape forming fixture.

5 Claims, 109 Drawing Sheets

(51) Int. Cl.
*A61C 7/20* (2006.01)
*B29C 64/153* (2017.01)
*B29C 64/218* (2017.01)
*B29C 64/386* (2017.01)

(52) U.S. Cl.
CPC .......... *B29C 64/218* (2017.08); *B29C 64/386* (2017.08); *Y10T 29/49568* (2015.01)

(56) References Cited

U.S. PATENT DOCUMENTS

| | | | |
|---|---|---|---|
| 1,369,665 | A | 2/1921 | Johnson |
| 2,259,160 | A | 10/1941 | Glaser |
| 2,266,860 | A | 12/1941 | Griesinger |
| 2,305,916 | A | 12/1942 | Atkinson |
| 3,235,965 | A | 2/1966 | Muir |
| 3,256,602 | A | 6/1966 | Broussard et al. |
| 3,262,207 | A | 7/1966 | Kesling |
| 3,416,228 | A | 12/1968 | Grimmett |
| 3,421,221 | A | 1/1969 | Silverman et al. |
| 3,464,112 | A | 9/1969 | Silverman et al. |
| 3,464,113 | A | 9/1969 | Silverman et al. |
| 3,505,736 | A | 4/1970 | Brader et al. |
| 3,510,340 | A | 5/1970 | Blake et al. |
| 3,593,421 | A | 7/1971 | Brader |
| 3,618,214 | A | 11/1971 | Armstrong |
| 3,738,005 | A | 6/1973 | Cohen et al. |
| 3,762,050 | A | 10/1973 | Dal |
| 3,792,529 | A | 2/1974 | Goshgarian |
| 3,815,237 | A | 6/1974 | Wallshein |
| 3,936,938 | A | 2/1976 | Northcutt |
| 4,037,324 | A | 7/1977 | Andreasen |
| 4,197,643 | A | 4/1980 | Burstone et al. |
| 4,272,241 | A | 6/1981 | Crisalli |
| 4,354,834 | A | 10/1982 | Wilson |
| 4,360,342 | A | 11/1982 | Salvo |
| 4,433,960 | A | 2/1984 | Garito et al. |
| 4,468,196 | A | 8/1984 | Keller |
| 4,479,779 | A | 10/1984 | Wool |
| 4,516,938 | A | 5/1985 | Hall |
| 4,533,320 | A | 8/1985 | Piekarsky |
| 4,571,179 | A | 2/1986 | Balenseifen |
| 4,731,018 | A | 3/1988 | Adell |
| 4,815,968 | A | 3/1989 | Keller |
| 4,932,866 | A | 6/1990 | Guis |
| 4,976,614 | A | 12/1990 | Tepper |
| 5,022,855 | A | 6/1991 | Jeckel |
| 5,120,218 | A | 6/1992 | Hanson |
| 5,167,499 | A | 12/1992 | Arndt et al. |
| 5,255,352 | A | 10/1993 | Falk |
| 5,295,886 | A | 3/1994 | Wildman |
| 5,310,340 | A | 5/1994 | Zedda |
| 5,312,247 | A | 5/1994 | Sachdeva et al. |
| 5,380,197 | A | 1/1995 | Hanson |
| 5,429,501 | A | 7/1995 | Farzin-Nia et al. |
| 5,431,562 | A | 7/1995 | Andreiko et al. |
| 5,435,721 | A | 7/1995 | Vogt |
| 5,536,169 | A | 7/1996 | Yousefian |
| 5,580,243 | A | 12/1996 | Bloore |
| 5,624,258 | A | 4/1997 | Wool |
| 5,645,423 | A | 7/1997 | Collins |
| 5,791,897 | A | 8/1998 | Wildman |
| 5,829,980 | A | 11/1998 | Sheridan et al. |
| 5,975,893 | A | 11/1999 | Chishti et al. |
| 6,053,730 | A | 4/2000 | Cleary |
| 6,086,364 | A | 7/2000 | Brunson |
| 6,174,163 | B1 | 1/2001 | Hiro |
| 6,190,166 | B1 | 2/2001 | Sasakura |
| 6,220,856 | B1 | 4/2001 | Carano et al. |
| 6,254,384 | B1 | 7/2001 | Rosenberg |
| 6,302,688 | B1 | 10/2001 | Jordan et al. |
| 6,582,226 | B2 | 6/2003 | Jordan et al. |
| 6,732,558 | B2 | 5/2004 | Butscher et al. |
| 6,739,870 | B2 | 5/2004 | Lai et al. |
| 6,755,064 | B2 | 6/2004 | Butscher et al. |
| 6,860,132 | B2 | 3/2005 | Butscher et al. |
| 6,884,067 | B2 | 4/2005 | Tuneberg |
| 6,908,306 | B2 | 6/2005 | Bowman et al. |
| 6,928,733 | B2 | 8/2005 | Rubbert et al. |
| 6,935,858 | B2 | 8/2005 | Cleary |
| 6,984,127 | B2 | 1/2006 | Lai |
| 7,020,963 | B2 | 4/2006 | Cleary et al. |
| 7,056,115 | B2 | 6/2006 | Phan et al. |
| 7,063,531 | B2 | 6/2006 | Maijer et al. |
| 7,076,980 | B2 | 7/2006 | Butscher et al. |
| 7,131,836 | B1 | 11/2006 | Kesling |
| 7,210,929 | B2 | 5/2007 | Raby et al. |
| 7,234,934 | B2 | 6/2007 | Rosenberg |
| 7,240,528 | B2 | 7/2007 | Weise et al. |
| 7,283,891 | B2 | 10/2007 | Butscher et al. |
| 7,291,011 | B2 | 11/2007 | Stark et al. |
| 7,335,021 | B2 | 2/2008 | Nikodem |
| 7,347,688 | B2 | 3/2008 | Kopelman et al. |
| 7,354,268 | B2 | 4/2008 | Raby et al. |
| 7,357,634 | B2 | 4/2008 | Knopp |
| 7,416,407 | B2 | 8/2008 | Cronauer |
| 7,433,810 | B2 | 10/2008 | Pavloskaia et al. |
| 7,556,496 | B2 | 7/2009 | Cinader et al. |
| 7,578,673 | B2 | 8/2009 | Wen et al. |
| 7,580,846 | B2 | 8/2009 | Chishti et al. |
| 7,600,999 | B2 | 10/2009 | Knopp |
| 7,613,527 | B2 | 11/2009 | Raby et al. |
| 7,641,473 | B2 | 1/2010 | Sporbert et al. |
| 7,658,610 | B2 | 2/2010 | Knopp |
| 7,708,557 | B2 | 5/2010 | Rubbert |
| 7,726,968 | B2 | 6/2010 | Raby et al. |
| 7,785,102 | B2 | 8/2010 | Papadopoulos |
| 7,837,466 | B2 | 11/2010 | Griffith et al. |
| 7,869,983 | B2 | 1/2011 | Raby et al. |
| 7,940,258 | B2 | 5/2011 | Stark et al. |
| 7,993,133 | B2 | 8/2011 | Cinader et al. |
| RE42,815 | E | 10/2011 | Rubbert et al. |
| 8,192,196 | B2 | 6/2012 | Singh |
| 8,194,067 | B2 | 6/2012 | Raby et al. |
| 8,266,940 | B2 | 9/2012 | Riemeier et al. |
| 8,292,617 | B2 | 10/2012 | Brandt et al. |
| 8,308,478 | B2 | 11/2012 | Primus et al. |
| 8,326,647 | B2 | 12/2012 | Chishti et al. |
| 8,356,993 | B1 | 1/2013 | Marston |
| 8,382,917 | B2 | 2/2013 | Johnson |
| 8,401,686 | B2 | 3/2013 | Moss et al. |
| 8,417,366 | B2 | 4/2013 | Getto et al. |
| 8,496,473 | B2 | 7/2013 | Phan et al. |
| 8,517,726 | B2 | 8/2013 | Kakavand et al. |
| 8,517,727 | B2 | 8/2013 | Raby et al. |
| 8,529,253 | B2 | 9/2013 | Jasper |
| 8,550,814 | B1 | 10/2013 | Collins |
| RE44,668 | E | 12/2013 | Rubbert et al. |
| 8,606,598 | B2 | 12/2013 | Chishti et al. |
| 8,685,184 | B2 | 4/2014 | Johnson et al. |
| 8,734,149 | B2 | 5/2014 | Phan et al. |
| 8,801,633 | B2 | 8/2014 | Fox et al. |
| 8,827,697 | B2 | 9/2014 | Cinader et al. |
| 8,932,054 | B1 | 1/2015 | Rosenberg |
| 8,944,812 | B2 | 2/2015 | Kuo |
| 8,992,215 | B2 | 3/2015 | Chapoulaud et al. |
| 9,017,070 | B2 | 4/2015 | Parker |
| 9,061,124 | B2 | 6/2015 | Fox et al. |
| 9,127,338 | B2 | 9/2015 | Johnson |
| 9,149,344 | B2 | 10/2015 | Gautam |
| 9,168,113 | B2 | 10/2015 | Wu et al. |
| 9,204,942 | B2 | 12/2015 | Phan et al. |
| 9,220,580 | B2 | 12/2015 | Borovinskih et al. |
| 9,326,831 | B2 | 5/2016 | Cheang |
| 9,328,406 | B2 | 5/2016 | Johnson et al. |
| 9,375,300 | B2 | 6/2016 | Matov et al. |
| 9,427,291 | B2 | 8/2016 | Khoshnevis et al. |
| 9,433,479 | B2 | 9/2016 | Phan et al. |
| 9,498,302 | B1 | 11/2016 | Patel |
| 9,504,544 | B2 | 11/2016 | Conley et al. |
| 9,532,854 | B2 | 1/2017 | Cinader et al. |
| 9,554,875 | B2 | 1/2017 | Gualano |
| 9,566,133 | B2 | 2/2017 | Vu |
| 9,572,971 | B2 | 2/2017 | Su |

(56) References Cited

U.S. PATENT DOCUMENTS

| | | | |
|---|---|---|---|
| 9,610,628 | B2 | 4/2017 | Riemeier et al. |
| 9,757,211 | B2 | 9/2017 | Ward |
| 9,844,420 | B2 | 12/2017 | Cheang |
| 9,883,924 | B2 | 2/2018 | Rudman |
| 9,925,019 | B2 | 3/2018 | Cinader et al. |
| 9,925,025 | B2 | 3/2018 | Conley et al. |
| 9,937,018 | B2 | 4/2018 | Martz et al. |
| 10,022,204 | B2 | 7/2018 | Cheang |
| 10,052,174 | B2 | 8/2018 | Kitching et al. |
| 10,154,890 | B2 | 12/2018 | Johnson et al. |
| 10,226,312 | B2 | 3/2019 | Khoshnevis et al. |
| 10,278,791 | B2 | 5/2019 | Schumacher |
| 10,363,116 | B2 | 7/2019 | Boronkay |
| 10,383,707 | B2 | 8/2019 | Roein Peikar et al. |
| 10,413,386 | B2 | 9/2019 | Moon et al. |
| 10,478,271 | B2 | 11/2019 | Patel |
| 10,729,516 | B2 | 8/2020 | Hung |
| 10,905,527 | B2 | 2/2021 | Roein Peikar et al. |
| 10,980,614 | B2 | 4/2021 | Roein Peikar et al. |
| 10,993,785 | B2 | 5/2021 | Roein Peikar et al. |
| 11,058,518 | B2 | 7/2021 | Roein Peikar et al. |
| 11,058,520 | B2 | 7/2021 | Khoshnevis et al. |
| 11,317,994 | B2 | 5/2022 | Roein Peikar et al. |
| 11,317,995 | B2 | 5/2022 | Roein Peikar et al. |
| 11,324,572 | B2 | 5/2022 | Roein Peikar et al. |
| 11,529,216 | B2 | 12/2022 | Roein Peikar et al. |
| 11,864,974 | B2 | 1/2024 | Roein Peikar et al. |
| 2001/0002310 | A1 | 5/2001 | Chishti et al. |
| 2002/0064746 | A1 | 5/2002 | Muhammad et al. |
| 2003/0003416 | A1 | 1/2003 | Chishti et al. |
| 2003/0075186 | A1 | 4/2003 | Florman |
| 2003/0091952 | A1 | 5/2003 | Bowman et al. |
| 2003/0096210 | A1 | 5/2003 | Rubbert et al. |
| 2003/0118967 | A1 | 6/2003 | Tepper |
| 2003/0157455 | A1 | 8/2003 | Teramoto |
| 2004/0009449 | A1 | 1/2004 | Mah et al. |
| 2004/0048222 | A1 | 3/2004 | Forster et al. |
| 2004/0067463 | A1 | 4/2004 | Rosenberg |
| 2004/0072120 | A1 | 4/2004 | Lauren |
| 2004/0083611 | A1 | 5/2004 | Rubbert et al. |
| 2004/0131989 | A1 | 7/2004 | Dellinger |
| 2004/0214126 | A1 | 10/2004 | Forster et al. |
| 2005/0130094 | A1 | 6/2005 | Graham |
| 2005/0227196 | A1 | 10/2005 | Von |
| 2005/0239012 | A1 | 10/2005 | Bathen et al. |
| 2005/0244780 | A1 | 11/2005 | Abels et al. |
| 2006/0073436 | A1 | 4/2006 | Raby et al. |
| 2006/0093984 | A1 | 5/2006 | Rosenberg |
| 2006/0234179 | A1 | 10/2006 | Wen et al. |
| 2007/0134625 | A1 | 6/2007 | Leu et al. |
| 2007/0259301 | A1 | 11/2007 | Hagelganz et al. |
| 2007/0264605 | A1 | 11/2007 | Belfor et al. |
| 2008/0020339 | A1 | 1/2008 | Papadopoulos |
| 2008/0032258 | A1 | 2/2008 | Kyung et al. |
| 2008/0057460 | A1 | 3/2008 | Hicks |
| 2008/0254403 | A1 | 10/2008 | Hilliard |
| 2008/0311535 | A1 | 12/2008 | Andreiko |
| 2009/0098500 | A1 | 4/2009 | Diaz |
| 2010/0068671 | A1 | 3/2010 | Kakavand et al. |
| 2010/0075268 | A1 | 3/2010 | Duran |
| 2010/0173256 | A1 | 7/2010 | Rodriguez et al. |
| 2010/0279245 | A1 | 11/2010 | Navarro |
| 2011/0027743 | A1 | 2/2011 | Cinader et al. |
| 2011/0083767 | A1 | 4/2011 | Johnson |
| 2011/0269095 | A1 | 11/2011 | Singh |
| 2011/0270583 | A1 | 11/2011 | Getto et al. |
| 2012/0048432 | A1 | 3/2012 | Johnson et al. |
| 2012/0123577 | A1 | 5/2012 | Chapoulaud et al. |
| 2012/0225398 | A1 | 9/2012 | Fallah |
| 2012/0322019 | A1 | 12/2012 | Lewis |
| 2013/0252195 | A1 | 9/2013 | Popat |
| 2014/0120491 | A1 | 5/2014 | Khoshnevis et al. |
| 2014/0154637 | A1 | 6/2014 | Hansen et al. |
| 2014/0234794 | A1 | 8/2014 | Vu |
| 2014/0302448 | A1 | 10/2014 | Cassalia |
| 2014/0356799 | A1 | 12/2014 | Cinader et al. |
| 2015/0157421 | A1 | 6/2015 | Martz et al. |
| 2015/0245888 | A1 | 9/2015 | Hasegawa |
| 2015/0257856 | A1 | 9/2015 | Martz et al. |
| 2016/0058527 | A1 | 3/2016 | Schumacher |
| 2016/0095670 | A1 | 4/2016 | Witte et al. |
| 2016/0095672 | A1 | 4/2016 | Izadi |
| 2016/0106520 | A1 | 4/2016 | Borovinskih et al. |
| 2016/0135926 | A1 | 5/2016 | Djamchidi |
| 2016/0278882 | A1 | 9/2016 | Kitching et al. |
| 2016/0302890 | A1 | 10/2016 | Hamilton |
| 2016/0324601 | A1 | 11/2016 | Phan et al. |
| 2016/0346064 | A1 | 12/2016 | Schulhof et al. |
| 2016/0367340 | A1 | 12/2016 | Ward |
| 2017/0100215 | A1 | 4/2017 | Khouri |
| 2017/0156823 | A1* | 6/2017 | Roein Peikar ........... A61C 7/28 |
| 2017/0245963 | A1 | 8/2017 | Hirsch |
| 2017/0296304 | A1 | 10/2017 | Tong et al. |
| 2018/0014916 | A1 | 1/2018 | Cinader et al. |
| 2018/0021108 | A1 | 1/2018 | Cinader et al. |
| 2018/0049847 | A1 | 2/2018 | Oda et al. |
| 2018/0071057 | A1 | 3/2018 | Rudman |
| 2018/0116762 | A1 | 5/2018 | Kopelman |
| 2018/0142377 | A1 | 5/2018 | Gao et al. |
| 2018/0153651 | A1 | 6/2018 | Tong et al. |
| 2018/0185125 | A1 | 7/2018 | Salah et al. |
| 2018/0189434 | A1 | 7/2018 | Zhou et al. |
| 2018/0221113 | A1 | 8/2018 | Tong et al. |
| 2018/0303583 | A1 | 10/2018 | Tong et al. |
| 2018/0311014 | A1 | 11/2018 | Yousefian |
| 2018/0325629 | A1 | 11/2018 | Cursio |
| 2018/0338564 | A1 | 11/2018 | Oda et al. |
| 2018/0353265 | A1 | 12/2018 | Paehl et al. |
| 2019/0015178 | A1 | 1/2019 | Wiechmann |
| 2019/0069974 | A1 | 3/2019 | Schumacher |
| 2019/0090985 | A1 | 3/2019 | Jo |
| 2019/0090988 | A1 | 3/2019 | Schumacher et al. |
| 2019/0321136 | A1 | 10/2019 | Martz et al. |
| 2019/0321138 | A1 | 10/2019 | Roein Peikar et al. |
| 2020/0022785 | A1 | 1/2020 | Bear |
| 2020/0078140 | A1 | 3/2020 | Roein Peikar et al. |
| 2020/0085540 | A1 | 3/2020 | Roein Peikar et al. |
| 2020/0085541 | A1 | 3/2020 | Roein Peikar et al. |
| 2020/0107911 | A1 | 4/2020 | Roein Peikar |
| 2020/0129272 | A1 | 4/2020 | Roein Peikar et al. |
| 2020/0345455 | A1 | 11/2020 | Roein Peikar et al. |
| 2020/0345460 | A1 | 11/2020 | Roein Peikar et al. |
| 2020/0375699 | A1 | 12/2020 | Roein Peikar et al. |
| 2020/0390524 | A1 | 12/2020 | Roein Peikar et al. |
| 2021/0007830 | A1 | 1/2021 | Roein Peikar et al. |
| 2021/0007832 | A1 | 1/2021 | Roein Peikar et al. |
| 2021/0169616 | A1 | 6/2021 | Jo |
| 2021/0177551 | A1 | 6/2021 | Roein Peikar et al. |
| 2021/0186662 | A1 | 6/2021 | Roein Peikar et al. |
| 2022/0226076 | A1 | 7/2022 | Roein Peikar et al. |
| 2022/0226077 | A1 | 7/2022 | Roein Peikar et al. |
| 2022/0287804 | A1 | 9/2022 | Oda |
| 2023/0200938 | A1 | 6/2023 | Roein Peikar et al. |
| 2023/0414327 | A1 | 12/2023 | Roein Peikar et al. |

FOREIGN PATENT DOCUMENTS

| | | | |
|---|---|---|---|
| CA | 2511247 | C | 6/2009 |
| CN | 201079455 | Y | 7/2008 |
| CN | 101277658 | A | 10/2008 |
| CN | 104146786 | A | 11/2014 |
| CN | 104887332 | A | 9/2015 |
| CN | 105997273 | A | 10/2016 |
| CN | 106491221 | A | 3/2017 |
| CN | 207949917 | U | 10/2018 |
| CN | 109069229 | A | 12/2018 |
| DE | 102015009345 | A1 | 1/2016 |
| EP | 0400932 | A3 | 1/1991 |
| EP | 0551800 | A1 | 7/1993 |
| EP | 1379193 | B1 | 2/2007 |
| EP | 1301140 | B1 | 11/2010 |
| EP | 3383309 | A1 | 10/2018 |
| GB | 974100 | A | 11/1964 |
| GB | 2521046 | A | 6/2015 |

(56) References Cited

FOREIGN PATENT DOCUMENTS

| | | | |
|---|---|---|---|
| JP | H0634607 | U | 5/1994 |
| JP | H08280711 | A | 10/1996 |
| JP | 2002102256 | A | 4/2002 |
| JP | 2003204973 | A | 7/2003 |
| JP | 2003527131 | A | 9/2003 |
| JP | 3636660 | B2 | 1/2005 |
| JP | 2005110830 | A | 4/2005 |
| JP | 2005177161 | A | 7/2005 |
| JP | 2006000489 | A | 1/2006 |
| JP | 2006246978 | A | 9/2006 |
| JP | 2009504247 | A | 2/2009 |
| JP | 2011517603 | A | 6/2011 |
| JP | 2015527159 | A | 9/2015 |
| JP | 2018536527 | A | 12/2018 |
| KR | 1020150128917 | A | 11/2015 |
| KR | 20180107481 | A | 10/2018 |
| SU | 1502023 | A1 | 8/1989 |
| WO | 01/80761 | A2 | 11/2001 |
| WO | 2007021468 | A2 | 2/2007 |
| WO | 2009126433 | A2 | 10/2009 |
| WO | 2010146192 | A1 | 12/2010 |
| WO | 2011103669 | A1 | 9/2011 |
| WO | 2014088422 | A1 | 6/2014 |
| WO | 2014140013 | A1 | 9/2014 |
| WO | 2015032918 | A1 | 3/2015 |
| WO | 2016149007 | A1 | 9/2016 |
| WO | 2016149008 | A1 | 9/2016 |
| WO | 2017100198 | A1 | 6/2017 |
| WO | 2018215863 | A1 | 11/2018 |
| WO | 2019043005 | A1 | 3/2019 |
| WO | 2019064127 | A1 | 4/2019 |
| WO | 2020069446 | A1 | 4/2020 |
| WO | 2020223714 | A1 | 11/2020 |
| WO | 2020223744 | A1 | 11/2020 |
| WO | 2020223745 | A1 | 11/2020 |
| WO | 2020223745 | A9 | 11/2020 |
| WO | 2021225916 | A2 | 11/2021 |
| WO | 2021225916 | A3 | 11/2021 |
| WO | 2021252675 | A1 | 12/2021 |

OTHER PUBLICATIONS

International Search Report and Written Opinion mailed Aug. 6, 2020, International Application No. PCT/US2020/031211, 28 pages.
International Search Report and Written Opinion mailed Aug. 26, 2020, International Application No. PCT/US2020/070017, 12 pages.
International Search Report and Written Opinion mailed Jul. 19, 2021, International Application No. PCT/US2021/070469, 14 pages.
International Search Report and Written Opinion mailed Mar. 13, 2017, International Application No. PCT/US2016/065174, 13 pages.
International Search Report and Written Opinion mailed Nov. 11, 2021, International Application No. PCT/US2021/030377, 24 pages.
International Search Report and Written Opinion mailed Oct. 8, 2020, International Application No. PCT/US2020/070016, 18 pages.
Baron Pascal, et al., "Customized Brackets and the Straight Arch Technique Combined in One Appliance to Simplify Lingual Orthodontics", J. Dentofacial Anom Orthod, 2012, pp. 1-16.
Faber Zackary, "Incognito Customized Orthodontic Appliance: A Giant Leap Forward in Orthodontic Technology", Dentistry iQ, 2012, pp. 1-5.
Gracco Antonio, et al., "The Insignia System of Customized Orthodontics", JCO, Inc., 2011, pp. 442-451.
Khosravi, Rooz , "Biomechanics in lingual orthodontics: What the future holds", Seminars in Orthodontics, vol. 24, No. 3, 2018, pp. 363-371.
Kusy Robert, "Orthodontic Biomaterials: From the Past to the Present", The Angle Orthodontist, 2002, pp. 501-512.
Mankar Mugdha, et al., "Precision Multiloop (PM Design) with Space Closing Circles for Lingual Orhodontics", Journal of Indian Orthodontic Society, 2016, pp. S88-S93.
Miura Fujio, et al., "New Application of Superelastic NiTi Rectangular Wire", J. Clin. Orthod., 1990, pp. 544-548.
Raboud D.W., "Superelastic Response to NiTi Shape Memory Alloy Wires for Orthodontic Applications", Smart Materials and Stuctures, 2000, pp. 684-692.
Ribeiro Gerson Luiz Ulema, et al., "Multiloop Edgewise Archwire in the Treatment of a Patient with an Anterior Open Bite and a Long Face", American Journal of Orthodontics and Dentofacial Orthopedics, 2010, pp. 89-95.
Sanjay N., et al., "Space Closure with Loop Mechanics for Treatment of Bimaxillary Protrusion: A Case Report", Journal of International Oral Health, 2015, pp. 65-67.
Siatkowski Raymond, "Continuous Arch Wire Closing Loop Design, Optimization, and Verification. Part I", American Journal of Orthodontics and Dentofacial Orthopedics, 1997, pp. 393-408.
Teramoto Alberto, "Sentalloy the Story of Superelasticity", Materials Science, 2012, pp. 1-12.
Viecilli Amanda, et al., "The T-Loop in Details", Dental Press J. Orthod., 2018, pp. 108-117.
Werner Alison, "MEAW Therapy", Orthodontic Products, https://orthodonticproductsonline.com/clinical-tips/meaw-therapy/, 2012, pp. 1-7.
Wiechmann Dirk, et al., "Customized Brackets and Archwire for Lingual Orthodontic Treatment", American Journal of Orthodontics and Dentofacial Orthopedics, 2003, pp. 593-599.
Yang Won-Sik, et al., "A Study of the Regional Load Deflection Rate of Multiloop Edgewise Arch Wire", The Angle Orthodontist, 2001, pp. 103-109.
KR20180107481A (Yoon Sung Hee; Oh Yoon Joon) (Biocetec Co Ltd) Self ligation orthodontic bracket assembly, Oct. 2, 2018. [retrieved on May 26, 2022], Translation retrieved from: Espacenet (Year: 2018).

* cited by examiner

DENTAL APPLIANCES AND ASSOCIATED SYSTEMS AND METHODS

CROSS REFERENCE TO RELATED APPLICATIONS

This application claims priority to U.S. Provisional Patent Application No. 63/110,344, titled DENTAL APPLIANCES AND ASSOCIATED SYSTEMS AND METHODS, filed Nov. 5, 2020.

This application is also related to the following applications, each of which is hereby incorporated by reference in its entirety: U.S. Provisional Patent Application No. 62/842,391, titled TEETH REPOSITIONING SYSTEMS AND METHODS, filed May 2, 2019, and U.S. Provisional Patent Application No. 62/956,290, titled ORTHODONTIC APPLIANCES AND ASSOCIATED SYSTEMS AND METHODS OF USE, filed Jan. 1, 2020; U.S. patent application Ser. No. 16/865,323, titled DENTAL APPLIANCES, SYSTEMS AND METHODS, filed May 2, 2020; International Patent Application No. PCT/US20/31211, titled DENTAL APPLIANCES, SYSTEMS AND METHODS, filed May 2, 2020; U.S. patent application Ser. No. 15/929,443, titled DENTAL APPLIANCES AND ASSOCIATED SYSTEMS AND METHODS OF USE, May 2, 2020; U.S. patent application Ser. No. 15/929,444, titled DENTAL APPLIANCES AND ASSOCIATED SYSTEMS AND METHODS OF USE, filed May 2, 2020; International Patent Application No. PCT/US20/70017, titled DENTAL APPLIANCES AND ASSOCIATED SYSTEMS AND METHODS OF USE, filed May 2, 2020; U.S. patent application Ser. No. 15/929,442, titled DENTAL APPLIANCES AND ASSOCIATED METHODS OF MANUFACTURING, filed May 2, 2020; and International Application No. PCT/US20/70016, titled DENTAL APPLIANCES AND ASSOCIATED METHODS OF MANUFACTURING, filed May 2, 2020.

TECHNICAL FIELD

The present technology relates to the field of orthodontics and, more particularly, to devices, systems, and methods for securing orthodontic appliances to a patient's teeth.

BACKGROUND

A common objective in orthodontics is to move a patient's teeth to positions where the teeth function optimally and aesthetically. To move the teeth, the orthodontist begins by obtaining multiple scans and/or impressions of the patient's teeth to determine a series of corrective paths between the initial positions of the teeth and the desired ending positions. The orthodontist then fits the patient to one of two main appliance types: braces or aligners.

Traditional braces consist of brackets and an archwire placed across a front side of the teeth, with elastic ties or ligature wires to secure the archwire to the brackets. In some cases self-ligating brackets may be used in lieu of ties or wires. The shape and stiffness of the archwire as well as the archwire-bracket interaction governs the forces applied to the teeth and thus the direction and degree of tooth movement. To exert a desired force on the teeth, the orthodontist often manually bends the archwire. The orthodontist monitors the patient's progress through regular appointments, during which the orthodontist visually assesses the progress of the treatment and makes manual adjustments to the archwire (such as new bends) and/or replaces or repositions brackets. The adjustment process is both time consuming and tedious for the patient and more often than not results in patient discomfort for several days following the appointment. Moreover, braces are not aesthetically pleasing and make brushing, flossing, and other dental hygiene procedures difficult.

Aligners comprise clear, removable, polymeric shells having cavities shaped to receive and reposition teeth to produce a final tooth arrangement. Dubbed "invisible braces," aligners offer patients significantly improved aesthetics over braces. Aligners do not require the orthodontists to bend wires or reposition brackets and are generally more comfortable than braces. However, unlike braces, aligners cannot effectively treat all malocclusions. Certain tooth repositioning steps, such as extrusion, translation, and certain rotations, can be difficult or impossible to achieve with aligners. Moreover, because the aligners are removable, success of treatment is highly dependent on patient compliance, which can be unpredictable and inconsistent.

Lingual braces are an alternative to aligners and traditional (buccal) braces and have been gaining popularity in recent years. Two examples of existing lingual braces are the Incognito™ Appliance System (3M United States) and INBRACE® (Swift Health Systems, Irvine, California, USA), each of which consists of brackets and an archwire placed on the lingual, or tongue side, of the teeth. In contrast to traditional braces, lingual braces are virtually invisible, and, unlike aligners, lingual braces are fixed to the patient's teeth and force compliance. These existing lingual technologies, however, also come with several disadvantages. Most notably, conventional lingual appliances still rely on a bracket-archwire system to move the teeth, thus requiring multiple office visits and painful adjustments. For example, lingual technologies have a relatively short inter-bracket distance, which generally makes compliance of the archwire stiffer. As a result, the overall lingual appliance is more sensitive to archwire adjustments and causes more pain for the patient. Moreover, the lingual surfaces of the appliance can irritate the tongue and impact speech, and make the appliance difficult to clean.

Therefore, a need exists for improved orthodontic appliances.

SUMMARY

The subject technology is illustrated, for example, according to various aspects described below, including with reference to FIGS. 1A-134. Various examples of aspects of the subject technology are described as numbered clauses (1, 2, 3, etc.) for convenience. These are provided as examples and do not limit the subject technology.

1. An appliance for installing on a patient's teeth, the appliance comprising:
   - at least one first rigid segment having a length dimension, and at least one second rigid segment having a length dimension, wherein each of the first and second rigid segments is configured to extend along two or more adjacent teeth in a jaw of the patient when the appliance is installed;
   - at least one arm extending from the at least one first rigid segment; at least one loop or curved feature formed along the length dimension of the second segment; and
   - a plurality of bracket connectors, each bracket connector configured to selectively connect to a bracket that may be secured to respective one of the patient's teeth, the plurality of bracket connectors including at least one first bracket connector on the at least one arm and at least one second bracket connector on the at least one second rigid segment.

2. The appliance of Clause 1, wherein the first and second rigid segments are configured to extend along the same two or more adjacent teeth in the jaw of the patient when the appliance is installed.

3. The appliance of Clause 1, wherein the at least one first rigid segment is configured to extend along a different set of two or more adjacent teeth in the jaw of the patient relative to the teeth that the at least one second rigid segment is configured to extend along, when the appliance is installed.

4. The appliance of Clause 1, wherein at least a portion of the first segment comprises an arch shaped member having an arch shape or partial arch shape and configured to extend along two or more adjacent teeth in the patient's jaw.

5. The appliance of Clause 4, wherein the at least one arm comprises a first arm extending from the first rigid segment to a first one of the first bracket connectors, and a second arm extending from the first rigid segment to a second one of the first bracket connectors, and wherein the at least one second rigid segment extends from the first one of the first bracket connectors to the second one of the first bracket connectors.

6. The appliance of Clause 5, wherein the at least one second bracket connector comprises a plurality of second bracket connectors located along the at least one second rigid segment, between the first one of the first bracket connectors to the second one of the first bracket connectors.

7. The appliance of Clause 6, wherein the at least one first bracket connector comprises one or more further bracket connectors on the at least one first rigid segment.

8. The appliance of Clause 4, wherein each of the first arm and the second arm includes a spring member.

9. The appliance of Clause 4, wherein the at least one second rigid segment has a length dimension extending from one end of the arch shaped member of the first rigid segment.

10. The appliance of Clause 9, wherein the at least one arm extending from the at least one first rigid segment comprises a plurality of arms, the at least one first bracket connector comprises a plurality of first bracket connectors on the plurality of arms, and the at least one second bracket connectors comprise a plurality of bracket connectors along the length dimension of the second rigid segment.

11. The appliance of Clause 9, wherein the at least one second rigid segment comprises has a length dimension extending from a second end of the arch shaped member of the first rigid segment.

12. The appliance of Clause 11, wherein the at least one arm extending from the at least one first rigid segment comprises a plurality of arms, the at least one first bracket connector comprises a plurality of first bracket connectors on the plurality of arms, and the at least one second bracket connectors comprise a plurality of bracket connectors along the length dimension each of the second rigid segments.

13. The appliance of Clause 1, wherein the at least one arm comprises a first arm extending from the first rigid segment to a first one of the first bracket connectors, and a second arm extending from the first rigid segment to a second one of the first bracket connectors, and wherein the at least one second rigid segment extends from the first one of the first bracket connectors to the second one of the first bracket connectors.

14. The appliance of Clause 13, wherein the at least one arm comprises at least one additional arm located along the length of the first rigid segment between the first arm and the second arm, each additional arm extending from the first rigid segment to a respective further one of the first bracket connectors located between the first one of the first bracket connectors and the second one of the second bracket connectors.

15. The appliance of Clause 1, wherein at least a portion of the second rigid segment comprises an arch shaped member having an arch shape or partial arch shape and configured to extend along two or more adjacent teeth in the patient's jaw.

16. The appliance of Clause 1, wherein the appliance is configured as single, unitary structure from a single sheet of material.

17. An appliance for installing on a patient's teeth, the appliance comprising:

at least one first rigid segment having a length dimension, and at least one second rigid segment having a length dimension, wherein at least one of the first and second rigid segments is configured to extend along two or more adjacent teeth in a jaw of the patient when the appliance is installed;

at least one arm extending from the at least one first rigid segment;

at least one loop or curved feature formed along the length dimension of the second rigid segment; and a plurality of bracket connectors, each bracket connector configured to selectively connect to a bracket that may be secured to respective one of the patient's teeth, the bracket connectors being provided along the length dimension of the second rigid segment, the bracket connectors including at least one bracket connector connected to the at least one arm extending from the at least one first rigid segment.

18. The appliance of Clause 17, wherein the at least one arm includes a spring member located between the at least one first rigid segment and the bracket connector to which the at least one arm is connected.

19. The appliance of Clause 17, wherein two or more of the bracket connectors are connected to two or more of the arms extending from the at least one first rigid segment.

20. The appliance of Clause 18, wherein each of the two or more of the arms includes a spring member located between the at least one first rigid segment and the bracket connector to which the arm is connected.

21. An orthodontic appliance, comprising:

an anchor configured to be positioned adjacent a patient's teeth; and an arm extending away from and coupled to the anchor, the arm including a first end portion at the anchor and a second end portion configured to be coupled to a securing member adhered to a tooth of the patient, wherein the second end portion comprises a first region and a second region extending from the first region at an angle, the first region being farther from the anchor than the second region, wherein, when the appliance is positioned adjacent the patient's teeth and the second end portion is secured to the securing member, (a) the second region extends in a generally mesial-distal direction and abuts a coupling arm of the securing member, and (b) the first region abuts a portion of the coupling arm, thereby inhibiting rotation of the second end portion relative to the securing member.

22. The appliance of Clause 1, wherein, when the appliance is positioned adjacent the patient's teeth and the second end portion is secured to the securing member, the first region extends in a generally occlusal-gingival direction.

23. The appliance of any one of the Clauses herein, wherein, when the appliance is positioned adjacent the patient's teeth, the second region extends in a generally mesial-distal direction under the coupling arm of the securing member.

24. The appliance of any one of the Clauses herein, wherein, when the appliance is positioned adjacent the patient's teeth and the second end portion is secured to the securing member, the first region inhibits translation of the second end portion relative to the securing member.

25. The appliance of any one of the Clauses herein, wherein:
 the second end portion further comprises a third region closer to the anchor than the second region,
 the portion of the coupling arm is a first portion of the coupling arm, and
 when the appliance is positioned adjacent the patient's teeth and the second end portion is secured to the securing member, the third region extends in a generally occlusal-gingival direction and abuts a second portion of the coupling arm that is closer to the patient's gingiva than the second region of the second end portion.

26. The appliance of any one of the Clauses herein, wherein:
 the coupling arm is a first coupling arm and the securing member further comprises a second coupling arm,
 the first region has a first side and a second side, and
 when the appliance is positioned adjacent the patient's teeth and the second end portion is secured to the securing member, the first side of the first region abuts the first coupling arm and the second side of the first region abuts the second coupling arm such that the first region opposes mesial and distal rotation and/or translation relative to the securing member.

27. The appliance of any one of the Clauses herein, wherein:
 the second end portion of the arm further comprises a third region closer to the anchor than the second region,
 the coupling arm is a first coupling arm and the securing member further comprises a second coupling arm, and
 when the appliance is positioned adjacent the patient's teeth and the second end portion is secured to the securing member, the third region abuts a region of each of the first and second coupling arms that is closer to the root of the patient's tooth than a region of each of the first and second coupling arms that extends over the second region of the second end portion.

28. The appliance of Clause 26 or Clause 27, wherein, when the appliance is positioned adjacent the patient's teeth and the second end portion is secured to the securing member, the second region extends under both the first and second coupling arms in a generally mesial-distal direction.

29. The appliance of any one of the Clauses herein, wherein:
 the portion of the coupling arm is a first portion of the coupling arm,
 the second end portion further comprises a third region extending from the second region toward the anchor, the third region having first and second legs, and
 when the appliance is positioned adjacent the patient's teeth and the second end portion is secured to the securing member, one or both of the first and second legs of the third region abut a second portion of the coupling arm that is closer to the root of the patient's tooth than the first portion.

30. The appliance of Clause 29, further comprising a fourth region extending between the first and second legs, wherein the first and second legs, second region, and fourth region together define an opening.

31. The appliance of any one of the Clauses herein, wherein:
 the second end portion further comprises a third region extending from the second region, the third region being farther from the anchor than the second region, and
 when the appliance is positioned adjacent the patient's teeth and the second end portion is secured to the securing member, the first region is adjacent a first side of the coupling arm and the third region is adjacent a second, opposing side of the coupling arm.

32. The appliance of Clause 31, wherein each of the first and third regions extends at an angle, relative to the second region, greater than 90°.

33. The appliance of Clause 31, further comprising a fourth region extending between the first and third regions, wherein the first, second, third, and fourth regions together define an opening.

34. The appliance of Clause 33, wherein:
 the portion of the coupling arm is a first portion of the coupling arm,
 the appliance further comprises a fifth region extending from the second region toward the anchor, the fifth region having first and second legs,
 when the appliance is positioned adjacent the patient's teeth and the second end portion is secured to the securing member, one or both of the first and second legs of the fifth region abut a second portion of the coupling arm that is closer to the root of the patient's tooth than the first portion.

35. The appliance of Clause 34, wherein:
 the opening is a first opening,
 the appliance further comprises a sixth region extending between the first and second legs of the fifth region, and
 the second, fifth, and sixth regions together define a second opening.

36. The appliance of any one of the Clauses herein, wherein the anchor is configured to be positioned adjacent a lingual side of the patient's teeth.

37. The appliance of any one of the Clauses herein, wherein the anchor is configured to be positioned adjacent a buccal side of the patient's teeth.

38. The appliance of any one of the Clauses herein, wherein the arm is one of a plurality of arms, each of the plurality of arms having a respective second end portion with first and second regions.

39. The appliance of any one of the Clauses herein, wherein the anchor and the arm are formed of a single, unitary member.
40. The appliance of any one of the Clauses herein, wherein the anchor and the arm are integral with one another.
41. The appliance of any one of the Clauses herein, wherein the anchor and the arm comprise a continuous surface.
42. The appliance of any one of the Clauses herein, wherein the angle is between 70°-110°.
43. The appliance of any one of the Clauses herein, wherein the anchor is arch-shaped.
44. The appliance of any one of the Clauses herein, wherein the anchor and the arm are formed of a superelastic material.
45. The appliance of any one of the Clauses herein, wherein the arm includes a biasing region between the first and second end portions, wherein the biasing region is configured to provide a rotational force and/or a longitudinal force to at least one of the patient's teeth when the second end portion is secured to the securing member.
46. The appliance of Clause 45, wherein the biasing region includes a serpentine shape.
47. The appliance of Clause 45, wherein the biasing region includes a first portion having a first inflection point and a second portion having a second inflection point, the second portion being farther from the anchor than the first portion.
48. The appliance of Clause 45, wherein the biasing region includes a first concave region facing a first direction, and a second concave region facing a second direction different than the first direction, the first concave region being farther from the anchor than the second concave region.
49. The appliance of any one of the Clauses herein, wherein the securing member is a 2D® lingual bracket.
50. The appliance of any one of the Clauses herein, wherein at least one of the anchor, the arm, or the securing member comprises nitinol, stainless steel, beta-titanium, cobalt chrome, other metal alloys, polymers, ceramics, and/or combinations thereof.
51. The appliance of any one of the Clauses herein, wherein the coupling arm of the securing member is bent over the second region of the second end portion.
52. The appliance of any one of the Clauses herein, wherein the coupling arm of the securing member is plastically deformed over the second region of the second end portion.
53. An orthodontic appliance, comprising:
  an anchor configured to be positioned adjacent a patient's teeth; and
  an arm extending away from the anchor, the arm including a first end portion at the anchor and a second end portion configured to be coupled to a securing member adhered to a tooth of the patient, wherein the second end portion comprises an extension and first and second shoulder regions adjacent the extension;
  wherein, when the appliance is positioned adjacent the patient's teeth and the second end portion is secured to the securing member, (a) the extension extends in a generally mesial-distal direction and abuts a coupling means of the securing member, and (b) the first and second shoulder regions abut mesial and distal sides of the coupling means, respectively, thereby inhibiting rotation and/or translation of the second end portion relative to the securing member.
54. The appliance of Clause 53, wherein, when the appliance is positioned adjacent the patient's teeth and the second end portion is secured to the securing member, the first region extends in a generally occlusal-gingival direction.
55. The appliance of any one of the Clauses herein, wherein the anchor is configured to be positioned on a lingual side of the patient's teeth.
56. The appliance of any one of the Clauses herein, wherein the anchor is configured to be positioned on a buccal side of the patient's teeth.
57. The appliance of any one of the Clauses herein, wherein the arm is one of a plurality of arms, each of the plurality of arms having a respective second end portion with respective first and second shoulder regions.
58. The appliance of any one of the Clauses herein, wherein the anchor and the arm are formed of a single, unitary member.
59. The appliance of any one of the Clauses herein, wherein the anchor and the arm are integral with one another.
60. The appliance of any one of the Clauses herein, wherein the anchor and the arm comprise a continuous surface.
61. The appliance of any one of the Clauses herein, wherein the anchor is arch-shaped.
62. The appliance of any one of the Clauses herein, wherein the anchor and the arm are formed of a superelastic material.
63. The appliance of any one of the Clauses herein, wherein at least one of the anchor, the arm, or the securing member comprises nitinol, stainless steel, beta-titanium, cobalt chrome, other metal alloys, polymers, ceramics, and/or combinations thereof.
64. The appliance of any one of the Clauses herein, wherein the arm includes a biasing region between the first and second end portions, wherein the biasing region is configured to provide a rotational force and/or longitudinal force to at least one of the patient's teeth when the distal portion is secured to the securing member.
65. The appliance of any one of the Clauses herein, wherein the securing member is a 2D® lingual bracket.
66. The appliance of any one of the Clauses herein, wherein the coupling arm of the securing member is bent over the second region of the distal portion.
67. The appliance of any one of the Clauses herein, wherein the coupling arm of the securing member is plastically deformed over the second region of the distal portion.
68. An orthodontic system, comprising:
  an anchor configured to be implanted adjacent a patient's teeth;
  a plurality of arms coupled to the anchor and spaced apart from one another, the plurality of arms comprising a first arm including (i) an end portion, (ii) a first member at the end portion and extending in a first direction, and (iii) a second member at the end portion and extending from the first member in a second direction at an angle relative to the first member, the first member being farther from the anchor than the second member; and
  a plurality of securing members configured to be disposed on the patient's teeth, the plurality of securing members comprising a first securing member including a coupling arm configured to secure the end portion of the first arm to the first securing member such that rotation and/or translation of the end portion relative to the first securing member is inhibited via the coupling arm.

69. The system of Clause 66, wherein, when the first arm is coupled to the first securing member, the first arm is generally oriented in an occlusal-gingival direction such that the end portion of the first arm is in apposition with a lingual face of at least one of the patient's teeth.

70. The system of any one of the Clauses herein, wherein the coupling arm is configured to be disposed over the second member and therein secure the first arm to the first securing member.

71. The system of any one of the Clauses herein, wherein the first securing member comprises a base attached to the coupling arm and configured to be fixed to a lingual face of one of the patient's teeth.

72. The system of Clause 71, wherein a portion of the coupling arm includes a curved surface, at least a portion of the curved surface being spaced apart from the base.

73. The system of any one of the Clauses herein, wherein the coupling arm is a first coupling arm, the system further comprising a second coupling arm, wherein, when the first arm is coupled to the first securing member, the first coupling arm is spaced apart from the second coupling arm via a base region of the end portion of the first arm.

74. The system of Clause 73, wherein the first coupling arm abuts a first side of the first member and the second coupling arm abuts a second side of the first member, the first side being opposite the second side.

75. The system of any one of the Clauses herein, wherein the first arm comprises a frame portion defining an opening and including the second member, a portion of the coupling arm being disposed within the opening when the first arm is coupled to the first securing member.

76. The system of any one of the Clauses herein, wherein the angle is within a range from 70° to 110°.

77. An orthodontic system, comprising:
- an anchor configured to be disposed adjacent a patient's teeth;
- an arm coupled to and extending from the anchor, the arm comprising—
  - a biasing portion, and
  - an attachment portion extending from the biasing portion, the attachment portion including (i) a first member extending in a first direction and (ii) a second member extending in a second direction at an angle relative to the first member; and
- a securing member configured to be attached to the patient's teeth, the securing members comprising a coupling arm configured to secure the attachment portion to the securing member such that rotation and/or translation of the attachment portion relative to the securing member is inhibited.

78. The system of Clause 77, wherein the first member is farther from the anchor than the second member.

79. The system of any one of the Clauses herein, wherein the anchor comprises an arch shape and is configured to be disposed on a lingual side of the patient's teeth.

80. The system of any one of the Clauses herein, wherein at least one of the anchor, the arm, or the securing member comprises nitinol, stainless steel, beta-titanium, cobalt chrome, other metal alloys, polymers, ceramics, and/or combinations thereof.

81. The system of any one of the Clauses herein, wherein the first direction is substantially orthogonal to the second direction.

82. The system of any one of the Clauses herein, wherein the coupling arm is attached to a base of the securing member and includes a coupling portion, wherein, when the attachment portion is coupled to the securing member, the coupling portion is disposed over the second member of the attachment portion to secure the attachment portion to the securing member.

83. The system of any one of the Clauses herein, wherein the arm comprises a frame portion defining an opening and including the second member, wherein, when the attachment portion is secured to the securing member, a portion of the coupling arm is disposed within the opening.

84. The system of any one of the Clauses herein, wherein, when the attachment portion is coupled to the securing member, the first member of the attachment portion is in apposition with or abuts the coupling arm.

85. The system of any one of the Clauses herein, wherein the arm comprises a third member extending in the second direction and is farther from the anchor than the second member, wherein, when the attachment portion is secured to the securing member, the third member abuts an end portion of the coupling arm.

86. The system of any one of the Clauses herein, wherein the arm comprises a third member extending in the first direction and is farther from the anchor than the second member, wherein the second member extends from the first member to the third member, and wherein, when the attachment portion is secured to the securing member, the coupling arm is between the first member and the third member.

87. The system of Clause 86, wherein the arm comprises a fourth member extending from the first member to the third member, the fourth member being farther from the anchor than the second member, wherein the first, second, third, and fourth members together define an opening, and wherein, when the attachment portion is secured to the securing member, a portion of the coupling arm is disposed within the opening.

88. A method for attaching an orthodontic appliance to a patient's tooth, the method comprising:
- providing an orthodontic appliance including—
  - an anchor; and
  - an arm extending away from and coupled to the anchor, the arm including a first end portion at the anchor and a second end portion farther from the anchor than the first end portion, wherein the second end portion comprises a first region and a second region extending at an angle from the first region, the first region being farther from the anchor than the second region;
- coupling a securing member to a patient's tooth; and
- coupling the appliance to the securing member, thereby inhibiting rotation and/or translation of the second end portion relative to the securing member.

89. The method of Clause 88, wherein the securing member includes a coupling arm, and wherein coupling the appliance to the securing member comprises:
- positioning the second end portion of the appliance in apposition to the securing member such that the second region of the second end portion extends in a generally mesial-distal direction under the coupling arm of the securing member.

90. The method of Clause 89, wherein coupling the appliance to the securing member further comprises:
 before positioning the second end portion, temporarily moving a portion of the coupling arm to an open position, thereby enabling the second region to be positioned under the coupling arm.

91. The method of any one of the Clauses herein, wherein:
 the second end portion of the arm includes a base region extending from the second region of the second end portion toward the anchor,
 the securing member includes a first coupling arm and a second coupling spaced apart from the first coupling arm, and
 coupling the appliance to the securing member comprises—
  positioning the second end portion of the appliance in apposition to the securing member such that (i) the second region of the second end portion extends in a generally mesial-distal direction under each of the first and second coupling arms of the securing member, and (ii) the base region is between the first and second coupling arms.

92. The method of any one of the Clauses herein, wherein the appliance is that of any one of the Clauses herein.

93. An orthodontic appliance, comprising:
 a positioning member including a first portion shaped to resiliently receive a patient's teeth, and a second portion shaped to receive a bracket configured to be adhered to one of the patient's teeth, the second portion defining a channel positioned to receive a coupling arm of the bracket.

94. The appliance of Clause 93, wherein the second portion includes a first region extending in a first direction and a second region extending in a second direction different than or angled relative to the first region, the first and second regions at least partially defining the channel.

95. The appliance of any one of the Clauses herein, wherein, when the appliance is disposed over the patient's teeth, the first direction extends in a generally occlusal-gingival direction.

96. The appliance of any one of the Clauses herein, wherein, when the appliance is disposed over the patient's teeth, the second direction extends in a generally mesial-distal direction.

97. The appliance of any one of the Clauses herein, wherein the channel is one of two channels, and wherein the second portion includes a first region extending in a first direction between the two channels and a second region extending in a second direction different than the first direction, the first and second regions at least partially defining the two channels.

98. The appliance of any one of the Clauses herein, wherein the channel is a first channel, and wherein the second portion further defines a second channel spaced apart from the first channel, each of the first and second channels being positioned to receive a coupling arm of the bracket.

99. The appliance of any one of the Clauses herein, further comprising a third region peripheral to the first region and extending in the first direction.

100. The appliance of any one of the Clauses herein, wherein the channel is a first channel, the appliance further comprising (i) a second channel, and (ii) a fourth region peripheral to the first region and extending in the first direction, the first channel being positioned between the first and third regions and the second channel being between the first and fourth regions.

101. The appliance of any one of the Clauses herein, the second portion further comprising a bracket receiving portion disposed in the channel.

102. The appliance of any one of the Clauses herein, wherein the bracket receiving portion comprises a recess shaped to receive the coupling arm of the bracket or an end portion of the coupling arm.

103. The appliance of any one of the Clauses herein, wherein the bracket receiving portion extends from a base surface of the second portion by a first distance, and wherein an outermost surface of the second portion extends from the base surface by a second distance greater than the first distance.

104. The appliance of any one of the Clauses herein, wherein the second portion includes a first side and a second side generally opposite the first side, the bracket receiving portion being disposed on and/or facing the first side.

105. The appliance of any one of the Clauses, wherein:
 the second portion includes a first side and a second side generally opposite the first side, and
 when the appliance is disposed over the patient's teeth, the first side at least partially faces a lingual direction and the second portion at least partially faces a buccal direction.

106. The appliance of any one of the Clauses, wherein the second side of the second portion includes a cavity to receive a base portion of the bracket, the coupling arm being fixed to the base portion.

107. The appliance of any one of the Clauses, wherein the second side of the second portion includes a cavity to receive a base of the bracket, the base being configured to be adhered directly to a lingual surface of the patient's teeth.

108. The appliance of any one of the Clauses herein, wherein the second portion protrudes from an outermost surface of the first portion.

109. The appliance of any one of the Clauses herein, wherein the first and second portions are integral with one another.

110. The appliance of any one of the Clauses herein, wherein the first and second portions comprise a single component.

111. The appliance of any one of the Clauses herein, wherein the first and second portions comprise a unitarily formed structure.

112. The appliance of any one of the Clauses herein, wherein the first and second portions comprise a continuous surface.

113. The appliance of any one of the Clauses herein, wherein the first and second portions comprise a polymer, plastic, or composite material.

114. The appliance of any one of the Clauses herein, wherein the first and second portions comprise a flexible, resilient, and/or non-rigid material.

115. The appliance of any one of the Clauses herein, wherein the positioning member is an aligner.

116. The appliance of any one of the Clauses herein, wherein the positioning member is configured to perform indirect bonding of a bracket.

117. The appliance of any one of the Clauses herein, wherein the positioning member is not configured to reposition a patient's teeth.

118. The appliance of any one of the Clauses herein, wherein the second portion, when disposed over the patient's teeth, generally has an orientation corresponding to an occlusal-gingival axis.
119. The appliance of any one of the Clauses herein, wherein, when the positioning member is disposed over the patient's teeth, the second portion is generally positioned adjacent or lingual to a lingual surface of one of the patient's teeth.
120. The appliance of any one of the Clauses herein, wherein the second portion of the positioning member is one of a plurality of second portions, each of the second portions corresponding to different ones of the patient's teeth.
121. The appliance of any one of the Clauses here, wherein the bracket is the securing member of any one of the Clauses herein.
122. The appliance of any one of the Clauses herein, wherein the first portion comprises a cavity to be disposed over the patient's teeth.
123. The appliance of any one of the Clauses herein, wherein the first portion comprises a plurality of individual cavities each configured to be disposed over one of the patient's teeth.
124. An orthodontic appliance, comprising:
   a positioning member including a first portion shaped to resiliently receive a patient's teeth, and a second portion shaped to receive a bracket to be adhered to one of the patient's teeth, the second portion including a first region extending in a first direction, and a second region extending in a second direction angled relative to the first direction, wherein the first and second regions in part define an area configured to receive a coupling arm.
125. The appliance of Clause 124, wherein the area is a first area on a first side of the first region and the coupling arm is a first coupling arm, and wherein the first and second regions in part define a second area on a second side of the first region configured to receive a second coupling arm.
126. The appliance of any one of the Clauses herein, wherein the first and second regions form a "T" shape.
127. A method for fixing one or more brackets to a patient's tooth using an orthodontic appliance, the method comprising:
   providing a positioning member including (i) a first portion shaped to resiliently receive a patient's teeth, and (ii) a second portion shaped to receive a bracket to be fixed to the patient's teeth, the second portion defining a channel;
   positioning the bracket in the second portion; and
   disposing the positioning member over the patient's teeth.
128. The method of Clause 127, wherein the positioning member comprises the positioning member of any one of the Clauses herein.
129. The method of any one of the Clauses herein, wherein disposing the positioning member over the patient's teeth comprises disposing the positioning member over the patient's teeth such that bracket in the second portion of the positioning member is adjacent a lingual surface of the patient's teeth.
130. The method of any one of the Clauses herein, further comprising, after disposing the positioning member over the patient's teeth, exposing the bracket to a light source thereby causing the bracket to adhere to the patient's teeth.
131. The method of any one of the Clauses herein, further comprising:
   after disposing the positioning member over the patient's teeth, exposing the bracket to a light source thereby causing the bracket to adhere to the patient's teeth; and
   after exposing the bracket, removing the positioning member from the patient's teeth such that the bracket remains adhered to the patient's teeth.
132. The method of any one of the Clauses herein, wherein positioning the bracket in the second portion comprises sliding the bracket into the second portion such that a coupling arm of the bracket is received in a channel of the second portion.
133. The method of any one of the Clauses herein, wherein positioning the bracket in the second portion comprises sliding the bracket into the second portion such that a coupling arm of the bracket (i) is received in a channel of the second portion and (ii) is coupled to the positioning member.
134. The method of any one of the Clauses herein, wherein positioning the bracket in the second portion comprises coupling a coupling arm of the bracket to the positioning member.
135. The method of any one of the Clauses herein, wherein the second portion includes a bracket receiving portion having a recess, and wherein positioning the bracket in the second portion comprises coupling the bracket to the positioning member by moving the bracket into the second portion and causing a coupling arm of the bracket to snap into the recess.
136. The method of any one of the Clauses herein, wherein:
   the positioning member includes a first side and a second side opposite the first side, the second side including a generally flat base surface,
   the bracket includes a base portion and a coupling arm disposed over the base portion, and
   positioning the bracket in the second portion comprises positioning the bracket such that the coupling arm is received in a channel of the second portion at the first side.
137. The method of any one of the Clauses herein, wherein:
   the positioning member comprises a first side and a second side opposite the first side, the second side including a generally flat base surface,
   the bracket includes a base portion and a coupling arm disposed over the base portion, and
   positioning the bracket in the second portion comprises positioning the bracket such that the base portion is received at the second side of positioning member.
138. An orthodontic appliance, comprising:
   an anchor configured to be positioned adjacent a patient's teeth; and
   an arm extending away from and coupled to the anchor, the arm including a first end portion at the anchor and a second end portion configured to be coupled to a securing member adhered to a tooth of the patient, wherein the second end portion comprises a first region and a second region extending from the first region at an angle, the first region being farther from the anchor than the second region,
   wherein the second end portion includes an opening extending through the second end portion.
139. The appliance of Clause 138, wherein, when the appliance is positioned adjacent the patient's teeth and the second end portion is secured to the securing member, (a) the second region extends in a generally mesial-distal direction and abuts a coupling arm of the securing member, and (b) the first region abuts a portion of the coupling arm, thereby inhibiting rotation of the second end portion relative to the securing member.

140. The appliance any one of the Clauses herein, wherein the opening is an elongate opening such that, when the appliance is positioned adjacent the patient's teeth and the second end portion is secured to the securing member, the opening extends in a generally occlusal-gingival direction.

141. The appliance any one of the Clauses herein, wherein the opening is an elongate opening extending through a portion of the first region.

142. The appliance any one of the Clauses herein, wherein the opening has a first dimension such that the opening is configured to receive an orthodontic tool.

143. The appliance any one of the Clauses herein, wherein the opening has first and second dimensions such that the opening is configured to receive an orthodontic tool.

144. The appliance any one of the Clauses herein, wherein the arm further comprises a notch extending from a position of the arm, the notch being at an angle relative to the arm at the position.

145. The appliance of any one of the Clauses herein, wherein the notch is generally normal to the arm at the position.

146. The appliance of any one of the Clauses herein, wherein the angle is between 60-120 degrees.

147. The appliance of any one of the Clauses herein, wherein the notch is a first notch extending in a first direction, the arm further comprising a second notch extending from the position of the arm in a second direction different than first direction.

148. The appliance of any one of the Clauses herein, wherein the first direction is generally opposite the second direction.

149. The appliance of any one of the Clauses herein, wherein, when the appliance is positioned adjacent the patient's teeth and the second end portion is secured to the securing member, at least one of the first notch or the second notch extends in a generally mesial-distal direction.

150. An orthodontic appliance, comprising:

an anchor configured to be positioned adjacent a patient's teeth; and an arm extending away from and coupled to the anchor, the arm including a first end portion at the anchor and a second end portion configured to be coupled to a securing member adhered to a tooth of the patient, wherein the second end portion comprises a first region and a second region extending from the first region at an angle, the first region being farther from the anchor than the second region, wherein the arm further comprises a notch extending from a position of the arm, the notch being at an angle relative to the arm at the position.

151. The appliance of Clause 150, wherein the notch is a first notch extending in a first direction, the arm further comprising a second notch extending from the position of the arm in a second direction different than first direction.

152. The appliance of any one of the Clauses herein, wherein the first direction is generally opposite the second direction.

153. The appliance of any one of the Clauses herein, wherein, when the appliance is positioned adjacent the patient's teeth and the second end portion is secured to the securing member, at least one of the first notch or the second notch extends in a generally mesial-distal direction.

154. An orthodontic appliance, comprising:

an anchor configured to be positioned adjacent a patient's teeth; and an arm extending away from and coupled to the anchor, the arm including a first end portion at the anchor and a second end portion configured to be coupled to a securing member adhered to a patient's teeth, the second end portion being farther from the anchor than the first end portion, wherein the second end portion comprises first and second extensions extending from a common point, each of the first and second extensions including (i) a first region and (ii) a second region spaced apart from the first region, wherein the first and second regions of the first extension extend in a first direction and the first and second regions of the second extension extend in a second direction different than the first direction.

155. The appliance of Clause 93, wherein, when the appliance is positioned adjacent the patient's teeth and the second end portion is coupled to the securing member, the first extension is biased in a mesial direction and the second extension is biased in a distal direction.

156. The appliance of any one of the Clauses herein, wherein, when the second end portion is coupled to the securing member, the first and second regions extend generally in the mesial-distal directions.

157. The appliance of any one of the Clauses herein, wherein at least one of the first extension or the second extensions is biased away from the other extension.

158. The appliance of any one of the Clauses herein, wherein the second region is farther from the common point than the first region.

159. The appliance of any one of the Clauses herein, wherein the first extension is generally a reflection of the second extension about an axis.

160. The appliance of any one of the Clauses herein, wherein the second region is at a terminal end portion of the respective extension.

161. The appliance of any one of the Clauses herein, wherein the first region is spaced apart from the respective second region such that the first and second regions and a portion of the respective extension define a three-sided opening.

162. The appliance of any one of the Clauses herein, wherein the first region is spaced apart from the respective second region such that the first and second regions and a portion of the respective extension define a U-shaped opening.

163. The appliance of any one of the Clauses herein, wherein the arm includes a biasing region between the proximal and distal portions, wherein the biasing region is configured to provide a rotational force and/or longitudinal force to at least one of the patient's teeth when the distal portion is secured to the securing member.

164. The appliance of any one of the Clauses herein, wherein at least one of the anchor, the arm, or the securing member comprises nitinol, stainless steel, beta-titanium, cobalt chrome, other metal alloys, polymers, ceramics, and/or combinations thereof.

165. The appliance of any one of the Clauses herein wherein, when the appliance is positioned adjacent the patient's teeth and the second end portion is secured to the securing member, the first and second regions of each of the first and second extensions are configured to abuts respective protrusions of the securing member.

166. The appliance of any one of the Clauses herein, wherein, when the appliance is positioned adjacent the patient's teeth and the second end portion is secured to the securing member, the first extension is biased in an occlusal direction.

167. The appliance of any one of the Clauses here, wherein, when the appliance is positioned adjacent the patient's teeth and the second end portion is secured to the securing member the second extension is biased in a gingival direction.

168. The appliance of any one of the Clauses herein, wherein at least one of the first extension or the second extension is biased away from the other extension.

169. The appliance of any one of the Clauses herein, wherein the first extension includes a biasing region, wherein, when, the second end portion is coupled to the securing member, the biasing region is configured to bias the first and second regions in the occlusal-gingival direction.

170. The appliance of any one of the Clauses herein, wherein the first and second regions of the first extension are farther from the common point than the first and second regions of the second extension.

171. The appliance of any one of the Clauses herein, wherein the first and second regions are at a terminal end portion of the respective extension.

172. The appliance of any one of the Clauses herein, wherein the first region is spaced apart from the respective second region such that the first and second regions and a portion of the respective extension define a three-sided opening.

173. The appliance of any one of the Clauses herein, wherein the first region is spaced apart from the respective second region such that the first and second regions and a portion of the respective extension define a U-shaped opening.

174. The appliance of any one of the Clauses herein, wherein the first extension comprises a biasing region such that, when the appliance is positioned adjacent the patient's teeth and the second end portion is secured to the securing member, the biasing region of the first extension is configured to bias the patient's tooth in the occlusal direction.

175. The appliance of any one of the Clauses herein, wherein the arm includes a biasing region between the first and second end portions, wherein the biasing region is configured to provide a rotational force and/or translational force to at least one of the patient's teeth when the second end portion is secured to the securing member.

176. The appliance of any one of the Clauses herein wherein, when the appliance is positioned adjacent the patient's teeth and the second end portion is secured to the securing member, the first and second regions of each of the first and second extensions are configured to abut respective protrusions of the securing member.

177. The appliance of any one of the Clauses herein, wherein at least one of the anchor, the arm, or the securing member comprises nitinol, stainless steel, beta-titanium, cobalt chrome, other metal alloys, polymers, ceramics, and/or combinations thereof.

178. An orthodontic appliance, comprising:
- an anchor configured to be positioned adjacent a patient's teeth; and
- an arm extending away from and coupled to the anchor, the arm including a first end portion at the anchor and a second end portion configured to be coupled to a securing member adhered to a tooth of the patient, the second end portion being farther from the anchor than the first end portion, wherein the second end portion comprises a first region, a second region extending from the first region, and a third region extending from the second regions, wherein at least a portion of each of the first and third regions are biased away from one another in opposing directions.

179. The appliance of Clause 177, wherein the second end portion is configured to be coupled to a securing member via the first and third regions.

180. The appliance of any one of the Clauses herein, wherein at least one of the first region or the third region includes a first protrusion, a second protrusion spaced apart from the first protrusion, and an opening defined by the first and second protrusions, wherein, when the appliance is coupled to the securing member, the first and second protrusions are disposed on opposing sides of a protrusion of the securing member.

181. The appliance of any one of the Clauses herein, wherein, when the appliance is coupled to the securing member, the first and second protrusions generally extend in the mesial distal direction.

182. The appliance of any one of the Clauses herein, wherein the second region has a curved surface and/or a semi-circular shape.

183. The appliance of any one of the Clauses herein, wherein the first, second, and third regions comprise a single component and/or a continuous surface.

184. An orthodontic securing member, comprising:
- a base region configured to be coupled to a patient's tooth; and
- first and second protrusions disposed over the base region, each of the first and second protrusions including a first portion extending away from the base region, and a second portion extending from the first portion toward a central area of the base region.

185. The securing member of Clause 184, wherein the first and second portions of each of the first and second protrusions define an opening for receiving an end portion of an orthodontic appliance.

186. The securing member of any one of the Clauses herein, wherein, when the base region is coupled to the patient's tooth, the first portions of the first and second protrusions extend in a generally buccal direction away from the patient's tooth.

187. The securing member of any one of the Clauses herein, wherein, when the base region is coupled to the patient's tooth, the second portions of the first and second protrusions extend in a generally mesial or distal direction.

188. The securing member of any one of the Clauses herein, wherein, when the base region is coupled to the patient's tooth, (i) the second portion of the first protrusion extends in a generally mesial direction, and (ii) the first portion of the first protrusion extends in a generally distal direction.

189. The securing member of any one of the Clauses herein, further comprising a third protrusion disposed over an upper portion of the base region, the third protrusion extending from the upper portion and toward the central area of the base region.

190. The securing member of any one of the Clauses herein, wherein the third protrusion includes a first portion extending away from the central area, and a second portion extending from the first portion and toward the central area.

191. The securing member of any one of the Clauses herein, wherein a terminal end portion of the third protrusion is spaced apart from the base region.

192. The securing member of any one of the Clauses herein, wherein the second portion extends in a lateral direction, the appliance further comprising a third protrusion disposed over an upper portion of the base region, the third protrusion extending in the lateral direction across the base region.

193. The securing member of any one of the Clauses herein, wherein the third projection defines a surface facing toward the first and second protrusions.

194. The securing member of any one of the Clauses herein, further comprising third and fourth protrusions disposed over the base region, each of the third and fourth protrusions including a first portion extending away from the base region, and a second portion extending from the first portion toward a central area of the base region.

195. The securing member of any one of the Clauses herein, wherein the third protrusion is spaced apart from the first protrusion to define a first opening and the fourth protrusion is spaced apart from the second protrusion to define a second opening.

196. The securing member of any one of the Clauses herein, wherein, when the securing member is coupled to the patient's tooth, the second portions of the first and second protrusions extend in a generally occlusal-gingival direction.

197. The securing member of any one of the Clauses herein, wherein, when the base region is coupled to the patient's tooth, (i) the second portion of the first protrusion extends in a generally gingival direction, and (ii) the first portion of the first protrusion extends in a generally occlusal direction.

198. An orthodontic securing member, comprising:
- a body region configured to be adhered to a patient's tooth, the body region including a slot; and
- a clip portion coupled to the body region, the clip portion being movable relative to the body region from a closed position to an open position, wherein the slot is configured to receive a portion of an orthodontic appliance when the clip portion is in the open position.

199. The securing member of Clause 198, wherein the slot is not configured to receive the orthodontic appliance when the clip portion is in the closed position.

200. The securing member of any one of the Clauses herein, further comprising a biasing element biasing the clip portion toward the closed position.

201. The securing member of any one of the Clauses herein, wherein, when the body region is adhered to a patient's tooth, movement of the clip portion from the closed position to the open position is generally in the occlusal-gingival direction.

202. The securing member of Clause 191, wherein the biasing element is disposed between the body region and clip portion.

203. The securing member of any one of the Clauses herein, wherein the body region further comprises a lip portion peripheral to the clip portion, wherein, when the body region is adhered to a patient's tooth, the lip portion inhibits movement of the clip portion in the lingual or buccal direction.

204. An orthodontic system, comprising:
- the appliance of any one of the Clauses herein; and
- the securing member of any one of the Clauses herein.

205. An orthodontic securing member, comprising:
- a cured structure configured to be adhered directly to a patient's tooth, the cured structure having at least a first portion and a second portion, the first and second portions being spaced apart from one another to define a continuous gap configured to receive an attachment portion of an orthodontic appliance,
- wherein the cured structure is configured to secure the attachment portion to the tooth.

206. The securing member of Clause 205, wherein the securing member secures the attachment portion to the tooth such that the patient cannot remove the orthodontic appliance.

207. The securing member of any one of the Clauses herein, wherein the securing member only includes the cured structure.

208. The securing member of any one of the Clauses herein, wherein the securing member does not include a metal.

209. The securing member of any one of the Clauses herein, wherein the cured structure comprises a cured composite resin or synthetic material.

210. The securing member of any one of the Clauses herein, wherein the cured structure further comprises a third portion, and wherein the first, second, and third portions are spaced apart from one another to define the gap.

211. The securing member of any one of the Clauses herein, wherein the cured structure further comprises a third portion and a fourth portion, and wherein the first, second, third, and fourth portions are spaced apart from one another to define the gap.

212. The securing member of any one of the Clauses herein, wherein
- the cured structure further comprises a third portion and a fourth portion,
- the first, second, third, and fourth portions are spaced apart from one another to define the gap,
- the first portion has first abutting portions comprising a gingival-facing surface and a mesial-facing surface,
- the second portion has second abutting portions comprising a gingival-facing surface and a distal-facing surface,
- the third portion has third abutting portions comprising an occlusal-facing surface and a mesial-facing surface,
- the fourth portion has fourth abutting portions comprising an occlusal-facing surface and a distal-facing surface, and
- when the appliance is positioned adjacent the patient's teeth and the attachment portion is engaged with the cured structure, the first, second, third, and fourth abutting portions abut adjacent regions of the attachment portion, thereby opposing rotation and/or translation of the attachment portion relative to the securing member.

213. The securing member of any one of the Clauses herein, wherein the gap defines a pattern that is complementary to the portion of the orthodontic appliance to be received by the gap.

214. A method for attaching an orthodontic securing member to a patient's tooth, the method comprising:

positioning a support containing a curable material adjacent a patient's tooth such that the curable material on the support engages a patient's tooth;

after positioning the support, curing the curable material, thereby causing the curable material to obtain a cured structure and/or adhere to the patient's tooth; and removing the support from the cured structure.

215. The method of Clause 213, further comprising engaging an orthodontic appliance with an indentation or opening defined by the cured structure.

216. The method of Clause 215, further comprising, after engaging the orthodontic appliance, securing the orthodontic appliance to the cured structure via a moldable material.

217. The method of Clause 216, wherein the moldable material comprises a composite resin or synthetic material.

218. The method of any one of the Clauses herein, wherein the curable material is a composite resin or synthetic material.

219. The method of any one of the Clauses herein, wherein the curable material comprises a photoinitiator.

220. An appliance system including an appliance for installing on a patient's teeth and comprising:

at least one rigid segment having a length dimension configured to extend along two or more adjacent teeth in a jaw of the patient when the appliance is installed;

at least one bracket connector supported by the at least one rigid segment in and configured to selectively connect to a tooth bracket, the at least one bracket connector including:

a body portion having first and second arm sections that connect to each other at an interface and that each have a free end, the body portion being sufficiently flexible and resilient to allow the free ends of the first and second arm sections to be forced to move toward each other into a compressed state when a sufficient squeezing force is applied to the first and second arm sections, and to resiliently move back away from each other from the squeezed state to an uncompressed or partially uncompressed state when the force is removed;

wherein at least part of the body portion has a first width dimension when the first and second arm sections are in the compressed state and a second width dimension when the first and second arm sections are in the uncompressed state, and wherein the second width dimension is greater than the first width dimension.

221. The appliance system of Clause 220, wherein the body portion is configured to be received by the bracket when the first and second arm sections are in the compressed state, and to be locked to the bracket in which it is received, when the first and second arm sections are in the uncompressed state.

222. The appliance system of any one of the Clauses herein, wherein the interface at which the first and second arm sections connect to each other is a U-shaped interface.

223. The appliance system of any one of the Clauses herein, wherein each of the first and second arm sections has a free end and one or more projections extending from the arm section at or near the free end.

224. The appliance system of any one of the Clauses herein, wherein each of the first and second arm sections has a free end and a plurality of projections extending from the arm section at or near the free end.

225. The appliance system of Clause 224, further comprising the bracket, including a base configured to be secured to a tooth, a plurality of projections extending from the base, including at least two projections arranged to define a gap between the at least two projections, wherein the gap has a size sufficient to receive the first and second arm sections of the bracket connector between the at least two projections when the first and second arm sections are in the compressed state, and wherein the plurality of projections extending from each arm section are arranged to extend on two respective sides of one of the two projections when the first and second arm sections are received in the gap and in the un-compressed state.

226. The appliance system of any one of the Clauses herein, further comprising the bracket, including a base configured to be secured to a tooth, a plurality of projections extending from the base, including at least two projections arranged to define a gap between the at least two projections.

227. The appliance system of Clause 226, wherein the gap has a size sufficient to receive the body portion between the at least two projections when the first and second arm sections are in the compressed state, and to be locked to the bracket in which it is received, when the first and second arm sections are in the uncompressed state.

228. The appliance system of Clause 226, wherein each of the at least two projections has an extension, extending in a direction away from the gap.

229. The appliance system of Clause 226, wherein the at least two projections comprises a plurality of projections on a first side of the gap and a plurality of projections on the second side of the gap.

230. The appliance system of Clause 229, wherein the plurality of projections on the first side of the gap include first and second projections that are spaced apart by a distance at least as great as a width dimension of a projection extending from the first or second arm section.

231. The appliance system of any one of the Clauses herein, further comprising either (a) at least one arm extending from the at least one first rigid segment, (b) at least one loop or curved feature formed along the length dimension of the second rigid segment, or (c) at least one arm extending from the at least one first rigid segment and at least one loop or curved feature formed along the length dimension of the second rigid segment.

232. The appliance system of any one of the Clauses herein, wherein the appliance is configured as single, unitary structure from a single sheet of material.

233. A bracket connector for a dental appliance comprising:
a body portion having first and second arm sections that connect to each other at an
interface and that each have a free end, the body portion being sufficiently flexible and resilient to allow the free ends of the first and second arm sections to be forced to move toward each other into a compressed state when a sufficient squeezing force is applied to the first and second arm sections, and to resiliently move back away from each other from the squeezed state to an uncompressed or partially uncompressed state when the force is removed;
wherein at least part of the body portion has a first width dimension when the first and second arm sections are in the compressed state and a second width dimension when the first and second arm sections are in the uncompressed state, and wherein the second width dimension is greater than the first width dimension.

234. The bracket connector of Clause 233, wherein the body portion is configured to be received by a bracket when the first and second arm sections are in the compressed state, and to be locked to the bracket in which it is received, when the first and second arm sections are in the uncompressed state.

235. The bracket connector of Clause 233 or 234, wherein the interface at which the first and second arm sections connect to each other is a U-shaped interface.

236. The bracket connector of any one of the Clauses herein, wherein each of the first and second arm sections has a free end and one or more projections extending from the arm section at or near the free end.

237. The bracket connector of any one of the Clauses herein, wherein each of the first and second arm sections has a free end and a plurality of projections extending from the arm section at or near the free end.

238. The bracket connector of any one of the Clauses herein, wherein the bracket connector is configured as single, unitary structure from a single sheet of material.

239. A bracket for a dental appliance comprising:
a base configured to be secured to a tooth;
a plurality of projections extending from the base, including at least two projections
arranged to define a gap between the at least two projections, wherein the gap has a size sufficient to receive the first and second arm sections of the bracket connector between the at least two projections when the first and second arm sections are in the compressed state, and
wherein the plurality of projections extending from each arm section are arranged to extend on two respective sides of one of the two projections when the first and second arm sections are received in the gap and in the un-compressed state.

240. An orthodontic appliance, comprising:
an anchor configured to be positioned adjacent a patient's teeth; and
a connector extending away from and coupled to the anchor, the connector including an attachment portion and a biasing portion disposed between the anchor and the attachment portion along a longitudinal axis of the connector, wherein the attachment portion is configured to be releasably secured to an orthodontic bracket that is adhered to a tooth of the patient, wherein the attachment portion comprises (a) a base extending along a generally occlusogingival dimension when the appliance is installed in the patient's mouth, (b) an arm extending away from the base at an angle, wherein the arm is disposed at an intermediate location along length of the base, and wherein the base comprises a proximal region proximal to the intermediate location and a distal region distal to the intermediate location,
wherein, when the appliance is positioned adjacent the patient's teeth and the attachment portion is secured to the securing member, (a) the arm extends in a generally mesial-distal direction and abuts a coupling arm of the securing member, and (b) each of the proximal and distal regions abut a portion of the coupling arm, thereby inhibiting rotation of the connector relative to the securing member.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

I. Definitions

Figure 1A:
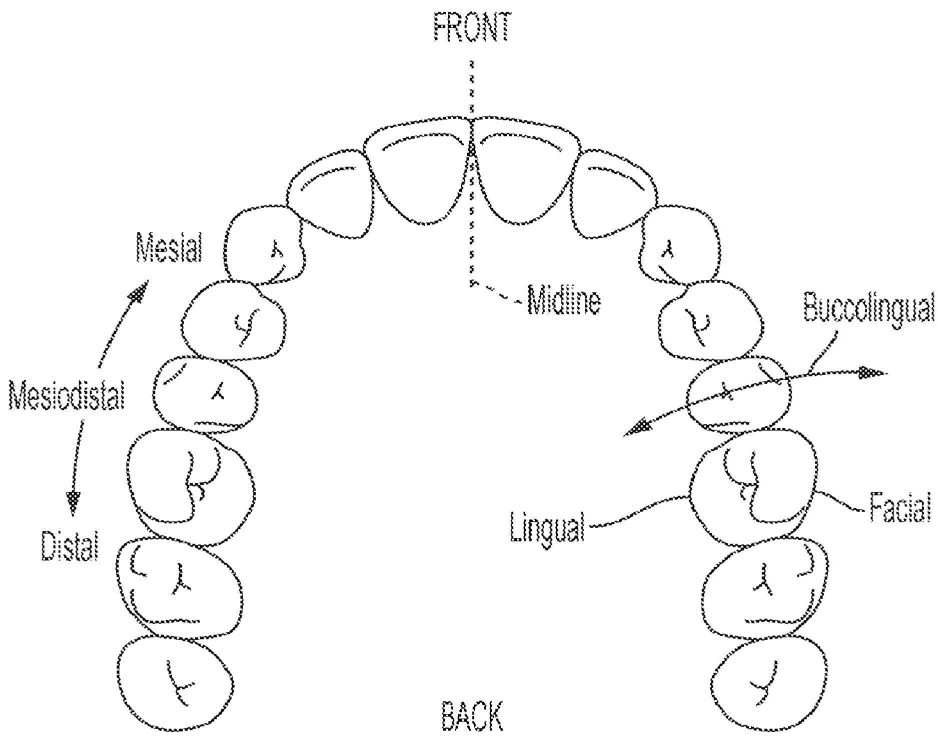
FIGS. 1A and 1B schematically illustrate directional references relative to a patient's dentition.
Figure 1B:
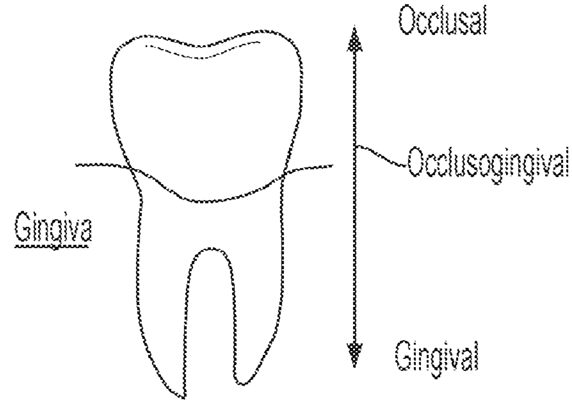

FIGS. 1A and 1B schematically depict several directional terms related to a patient's dentition. Terms used herein to provide anatomical direction or orientation are intended to encompass different orientations of the appliance as installed in the patient's mouth, regardless of whether the structure being described is shown installed in a mouth in the drawings. As illustrated in FIGS. 1A and 1B: "mesial" means in a direction toward the midline of the patient's face along the patient's curved dental arch; "distal" means in a direction away from the midline of the patient's face along the patient's curved dental arch; "occlusal" means in a direction toward the chewing surfaces of the patient's teeth; "gingival" means in a direction toward the patient's gums or gingiva; "facial" means in a direction toward the patient's lips or cheeks (used interchangeably herein with "buccal" and "labial"); and "lingual" means in a direction toward the patient's tongue.

As used herein, the terms "proximal" and "distal" refer to a position that is closer and farther, respectively, from a given reference point. In many cases, the reference point is a certain connector, such as an anchor, and "proximal" and "distal" refer to a position that is closer and farther, respectively, from the reference connector along a line passing through the centroid of the cross-section of the portion of the appliance branching from the reference connector.

As used herein, the terms "generally," "substantially," "about," and similar terms are used as terms of approximation and not as terms of degree, and are intended to account for the inherent variations in measured or calculated values that would be recognized by those of ordinary skill in the art.

As used herein, the term "operator" refers to a clinician, practitioner, technician or any person or machine that designs and/or manufactures an orthodontic appliance or portion thereof, and/or facilitates the design and/or manufacture of the appliance or portion thereof, and/or any person or machine associated with installing the appliance in the patient's mouth and/or any subsequent treatment of the patient associated with the appliance.

As used herein, the term "force" refers to the magnitude and/or direction of a force, a torque, or a combination thereof.

II. Overview of Orthodontic Appliances of the Present Technology

Figure 2A:
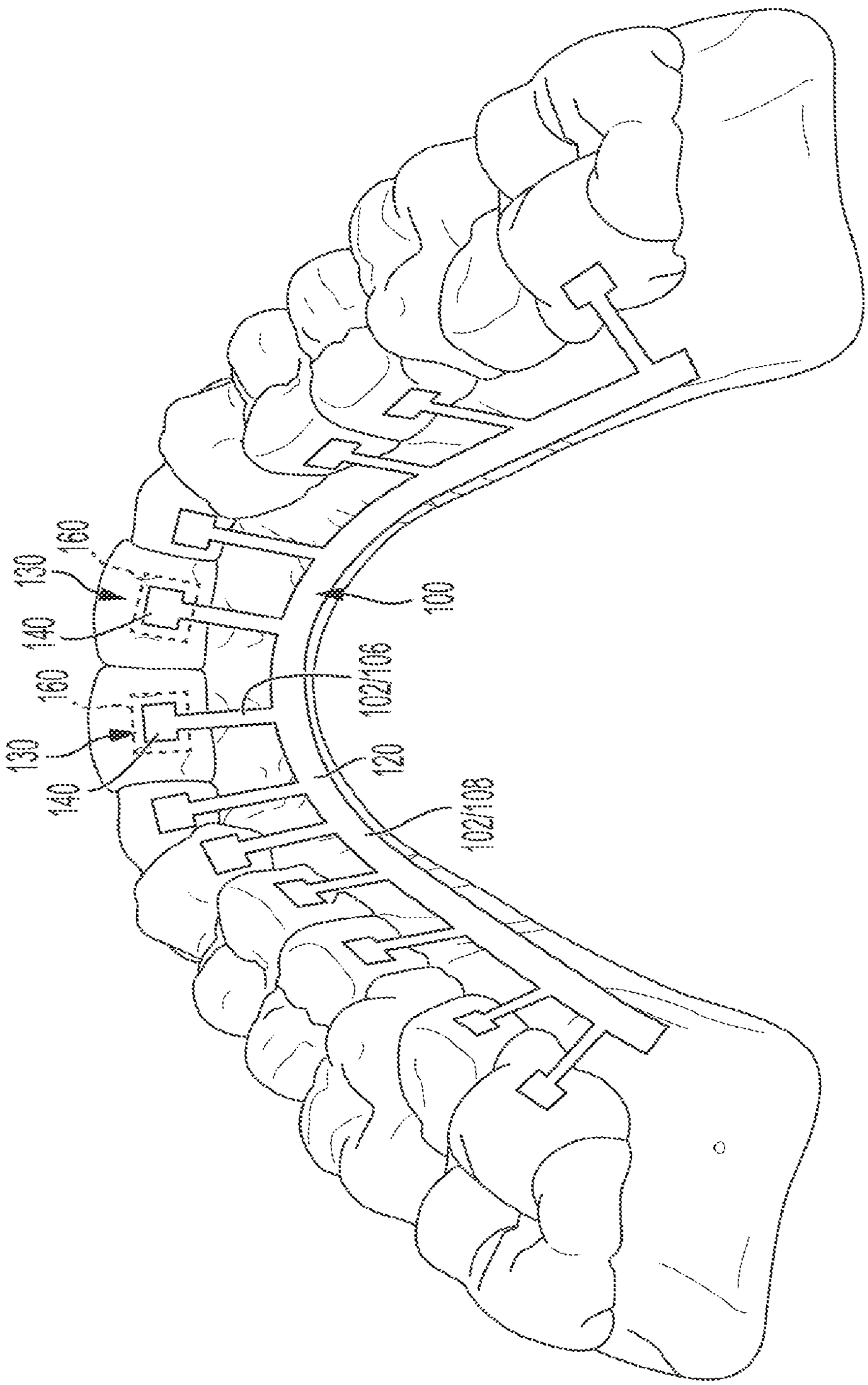
FIG. 2A shows the schematic representation of an orthodontic appliance configured in accordance with the present technology installed in a patient's mouth adjacent the patient's dentition.
Figure 2B:
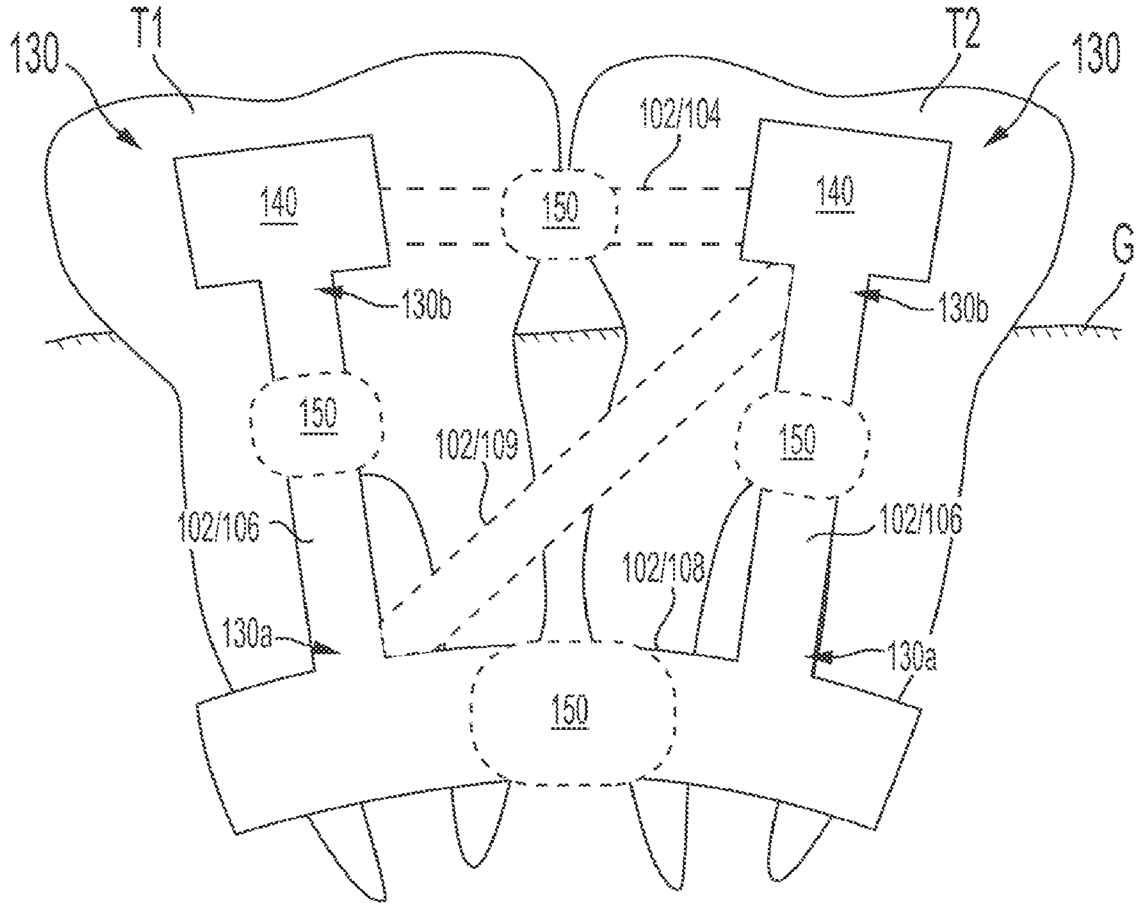
FIG. 2B is a schematic depiction of connection configuration options configured in accordance with embodiments of the present technology.

FIG. 2A is a schematic representation of an orthodontic appliance 100 (or "appliance 100") configured in accordance with embodiments of the present technology, shown positioned in a patient's mouth adjacent the patient's teeth. FIG. 2B is an enlarged view of a portion of the appliance 100. The appliance 100 is configured to be installed within a patient's mouth to impart forces on one or more of the teeth to reposition all or some of the teeth. In some cases, the appliance 100 may additionally or alternatively be configured to maintain a position of one or more teeth. As shown schematically in FIGS. 2A and 2B, the appliance 100 can comprise a deformable member that includes one or more attachment portions 140 (each represented schematically by a box), each configured to be secured to a tooth surface directly or indirectly via a securing member 160. The appliance 100 may further comprise one or more connectors 102 (also depicted schematically), each extending directly between attachment portions 140 ("first connectors 104"), between an attachment portion 140 and one or more other connectors 102 ("second connectors 106"), or between two or more other connectors 102 ("third connectors 108"). Only two attachment portions 140 and two connectors 102 are labeled in FIG. 2A for ease of illustration. As discussed herein, the number, configuration, and location of the connectors 102 and attachment portions 140 may be selected to provide a desired force on one or more of the teeth when the appliance 100 is installed. Additional details regarding different configurations of connectors 102 are provided elsewhere herein, for example below with reference to FIGS. 5-35.

The attachment portions 140 may be configured to be detachably coupled to a securing member 160 that is bonded, adhered, or otherwise secured to a surface of one of the teeth to be moved. In some embodiments, one or more of the attachment portions 140 may be directly bonded, adhered, or otherwise secured to a corresponding tooth without a securing member or other connection interface at the tooth. The attachment portions 140 may also be referred to as "bracket connectors" or "male connector elements" herein. The different attachment portions 140 of a given appliance 100 may have the same or different shape, same or different size, and/or same or different configuration. The attachment portions 140 may comprise any one or combination of the attachment portions disclosed herein (including but not limited to attachment portions 9540, 9940, 10040, 10140, 10240, 10340, 10440, 11040, 11140, 11240, 11340, 11940, 12140, 12440, 12540, 12640, 12740, 12840, 12940, 13040), any one of the bracket connectors and/or male connector elements disclosed herein, as well as any of the attachment portions, bracket connectors, and/or male connector elements disclosed in U.S. patent application Ser. No. 15/370,704 (Publ. No. 2017/0156823) filed Dec. 6, 2016, which is incorporated by reference herein in its entirety.

The appliance 100 may include any number of attachment portions 140 suitable for securely attaching the appliance 100 to the patient's tooth or teeth in order to achieve a desired movement. In some examples, multiple attachment portions 140 may be attached to a single tooth. The appliance 100 may include an attachment portion for every tooth, fewer attachment portions than teeth, or more attachment portions 140 than teeth. In these and other embodiments, the appliance 100 one or more of the attachment portions 140 may be configured to be coupled to one, two, three, four, five or more connectors 102.

As previously mentioned, the connectors 102 may comprise one or more first connectors 104 that extend directly between attachment portions 140. The one or more first connectors 104 may extend along a generally mesiodistal dimension when the appliance 100 is installed in the patient's mouth. In these and other embodiments, the appliance 100 may include one or more first connectors 104 that extend along a generally occlusogingival and/or buccolingual dimension when the appliance 100 is installed in the patient's mouth. In some embodiments, the appliance 100 does not include any first connectors 104.

Additionally or alternatively, the connectors 102 may comprise one or more second connectors 106 that extend between one or more attachment portions 140 and one or more connectors 102. The one or more second connectors 106 can extend along a generally occlusogingival dimension when the appliance 100 is installed in the patient's mouth. In these and other embodiments, the appliance 100 may include one or more second connectors 106 that extend along a generally mesiodistal and/or buccolingual dimension when the appliance 100 is installed in the patient's mouth. In some embodiments, the appliance 100 does not include any second connectors 106. In such embodiments, the appliance 100 would only include first connectors 104 extending between attachment portions 140. A second connector 106 and the attachment portion 140 to which it is attached may comprise an "arm," as used herein (such as arm 130 in FIGS. 2A and 2B). In some embodiments, multiple second connectors 106 may extend from the same location along the appliance 100 to the same attachment portion 140. In such cases, the multiple second connectors 106 and the attachment portion 140 together comprise an "arm," as used herein. The use of two or more connectors to connect two points on the appliance 100 enables application of a greater force (relative to a single connector connecting the same points) without increasing the strain on the individual connectors. Such a configuration is especially beneficial given the spatial constraints of the fixed displacement treatments herein. Additional details regarding the use of multiple connectors for a discrete connection (such as an arm) are provided elsewhere herein, for example below with reference to FIGS. 36-57.

Additionally or alternatively, the connectors 102 may comprise one or more third connectors 108 that extend between two or more other connectors 102. The one or more third connectors 108 may extend along a generally mesiodistal dimension when the appliance 100 is installed in the patient's mouth. In these and other embodiments, the appliance 100 may include one or more third connectors 108 that extend along a generally occlusogingival and/or buccolingual dimension when the appliance 100 is installed in the patient's mouth. In some embodiments, the appliance 100 does not include any third connectors 108. One, some, or all of the third connectors 108 may be positioned gingival to one, some, or all of the first connectors 104. In some embodiments, the appliance 100 includes a single third connector 108 that extends along at least two adjacent teeth and provides a common attachment for two or more second connectors 106. In several embodiments, the appliance 100 includes multiple non-contiguous third connectors 108, each extending along at least two adjacent teeth.

As shown in FIG. 2A, in some embodiments the appliance 100 may be configured such that all or a portion of one, some, or all of the connectors 102 are disposed proximate the patient's gingiva when the appliance 100 is installed within the patient's mouth. For example, one or more third connectors 108 may be configured such that all or a portion of the one or more third connectors 108 is positioned below the patient's gum line and adjacent to but spaced apart from the gingiva. In many cases it may be beneficial to provide a small gap (e.g., 0.5 mm or less) between the third connector(s) 108 and the patient's gingiva, as contact between the third connector(s) 108 (or any portion of the appliance 100) and the gingiva can cause irritation and patient discomfort. In some embodiments, all or a portion of the third connector(s) 108 is configured to be in direct contact with the gingiva when the appliance 100 is disposed in the patient's mouth. Additionally or alternatively, all or a portion of one or more first connectors 104 and/or second connectors 106 may be configured to be disposed proximate the gingiva.

According to some embodiments, one or more connectors 102 may extend between an attachment portion 140 or connector 102 and a joint comprising (a) two or more connectors 102, (b) two or more attachment portions 140, or (c) at least one attachment portion 140 and at least one connector 102. According to some embodiments, one or more connectors 102 may extend between a first joint comprising (a) two or more connectors 102, (b) two or more attachment portions 140, or (c) at least one attachment member and at least one connector 102, and a second joint comprising (a) two or more connectors 102, (b) two or more attachment portions 140, or (c) at least one attachment portion 140 and at least one connector 102. An example of a connector 102 extending between (a) a joint between a second and third connector 106, 108, and (b) a joint between a second connector 106 and an attachment portion 140 is depicted schematically and labeled 109 in FIG. 2B.

Each of the connectors 102 may be designed to have a desired stiffness so that an individual connector 102 or combination of connectors 102 imparts a desired force on one or more of the teeth. In many cases, the force applied by a given connector 102 may be governed by Hooke's Law, or F=k×x, where F is the restoring force exerted by the connector 102, k is the stiffness coefficient of the connector 102, and x is the displacement. In the most basic example, if a connector 102 does not exist between two points on the appliance 100, then the stiffness coefficient along that path is zero and no forces are applied. In the present case, the individual connectors 102 of the present technology may have varying non-zero stiffness coefficients. For example, one or more of the connectors 102 may be rigid (i.e., the stiffness coefficient is infinite) such that the connector 102 will not flex or bend between its two end points. In some embodiments, one or more of the connectors 102 may be "flexible" (i.e., the stiffness coefficient is non-zero and positive) such that the connector 102 can deform to impart (or absorb) a force on the associated tooth or teeth or other connector 102.

In some embodiments it may be beneficial to include one or more rigid connectors between two or more teeth. A rigid connector 102 is sometimes referred to herein as a "rigid bar" or an "anchor." Each rigid connector 102 may have sufficient rigidity to hold and maintain its shape and resist bending. The rigidity of the connector 102 can be achieved by selecting a particular shape, width, length, thickness, and/or material. Connectors 102 configured to be relatively rigid may be employed, for example, when the tooth to be connected to the connector 102 or arm is not to be moved (or moved by a limited amount) and can be used for anchorage. Molar teeth, for example, can provide good anchorage as molar teeth have larger roots than most teeth and thus require greater forces to be moved. Moreover, anchoring one or more portions of the appliance 100 to multiple teeth is more secure than anchoring to a single tooth. As another example, a rigid connection may be desired when moving a group of teeth relative to one or more other teeth. Consider, for instance, a case in which the patient has five teeth separated from a single tooth by a gap, and the treatment plan is to close the gap. The best course of treatment is typically to move the one tooth towards the five teeth, and not vice versa. In this case, it may be beneficial to provide one or more rigid connectors between the five teeth. For all of the foregoing reasons and many others, the appliance 100 may include one or more rigid first connectors 104, one or more rigid second connectors 106, and/or one or more rigid third connectors 108.

In these and other embodiments, the appliance 100 may include one or more flexible first connectors 104, one or more flexible second connectors 106, and/or one or more flexible third connectors 108. Each flexible connector 102 may have a particular shape, width, thickness, length, material, and/or other parameters to provide a desired degree of flexibility. According to some embodiments of the present technology, the stiffness of a given connector 102 may be tuned via incorporation of a one or more resiliently flexible biasing portions 150. As shown schematically in FIG. 2B, one, some, or all of the connectors 102 may include one or more biasing portion 150, such as springs, each configured to apply a customized force specific to the tooth to which it is attached.

Figure 2C:
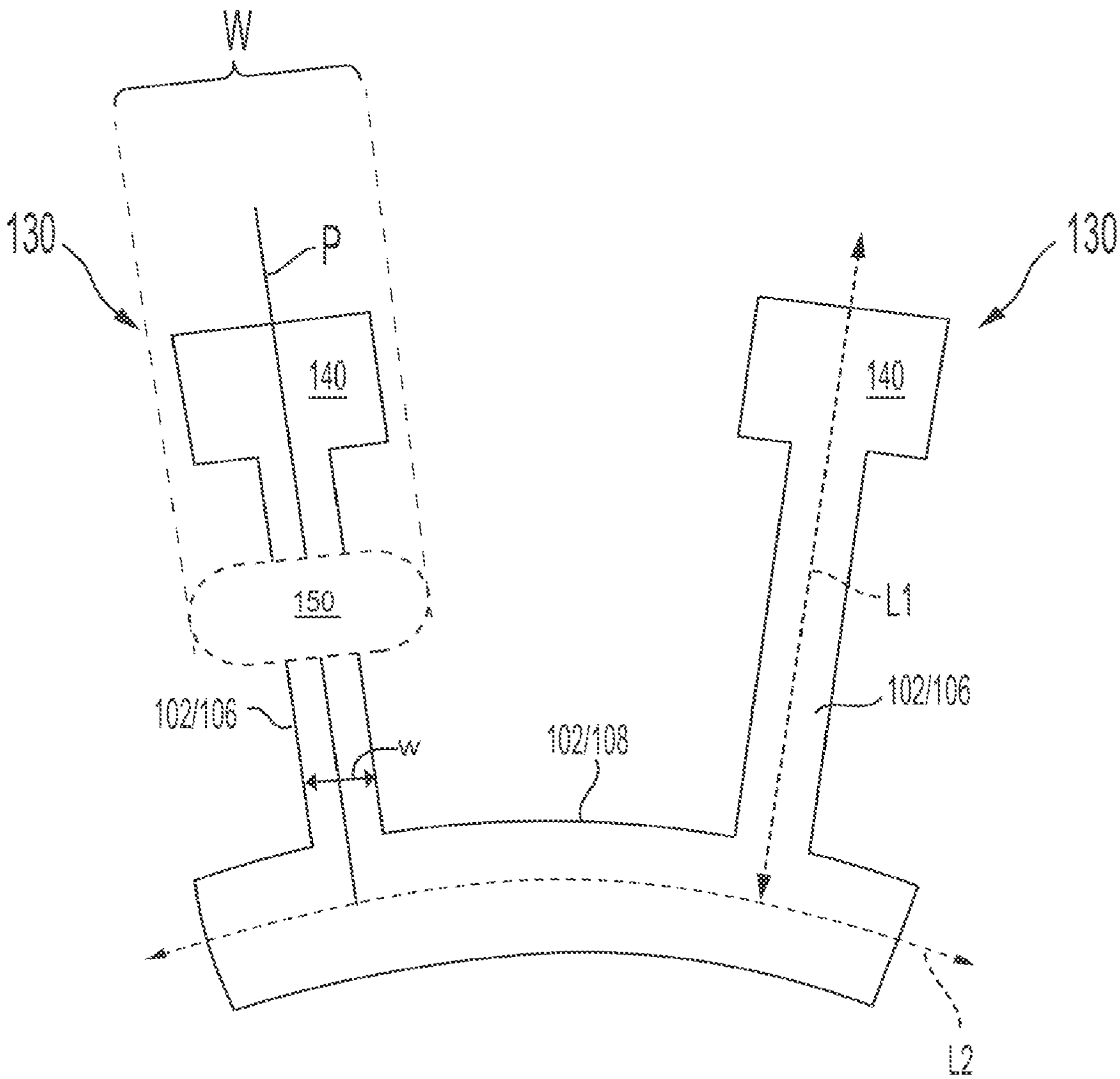
FIG. 2C is a schematic depiction of a portion of an appliance configured in accordance with embodiments of the present technology.

As depicted in the schematic shown in FIG. 2C, the biasing portion(s) 150 may extend along all or a portion of the longitudinal axis L1 of the respective connector 102 (only the longitudinal axis L1 for second connector 106 and the longitudinal axis L2 for third connector 108 is labeled in FIG. 2C). The direction and magnitude of the force and torque applied on a tooth by a biasing portion 150 depends, at least in part, on the shape, width, thickness, length, material, shape set conditions, and other parameters of the biasing portion 150. As such, one or more aspects of the biasing portion 150 (including the aforementioned parameters) may be varied so that the corresponding arm 130, connector 102, and/or biasing portion 150 produces a desired tooth movement when the appliance 100 is installed in the patient's mouth. Each arm 130 and/or biasing portion 150 may be designed to move one or more teeth in one, two, or all three translational directions (i.e., mesiodistal, buccolingual, and occlusogingival) and/or in one, two, or all three rotational directions (i.e., buccolingual root torque, mesiodistal angulation and mesial out-in rotation).

The biasing portions 150 of the present technology can have any length, width, shape, and/or size sufficient to move the respective tooth towards a desired position. In some embodiments, one, some, or all of the connectors 102 may have one or more inflection points along a respective biasing portion 150. The connectors 102 and/or biasing portions 150 may have a serpentine configuration such that the connector 102 and/or biasing portion 150 doubles back on itself at least one or more times before extending towards the attachment portion 140. For example, in some embodiments the second connectors 106 double back on themselves two times along the biasing portion 150, thereby forming first and second concave regions facing in generally different directions relative to one another (as an example, see FIG. 13B). The open loops or overlapping portions of the connector 102 corresponding to the biasing portion 150 may be disposed on either side of a plane P (FIG. 2C) bisecting an overall width W (FIG. 2C) of the arm 130 and/or connector 102 such that the extra length of the arm 130 and/or connector 102 is accommodated by the space medial and/or distal to the arm 130 and/or connector 102. This allows the arm 130 and/or connector 102 to have a longer length (as compared to a linear arm) to accommodate greater tooth movement, despite the limited space in the occlusal-gingival or vertical dimension between any associated third connector 108 and the location at which the arm 130 attaches to the tooth.

It will be appreciated that the biasing portion 150 may have other shapes or configurations. For example, in some embodiments the connector 102 and/or biasing portion 150 may include one or more linear regions that zig-zag towards the attachment portion 140. One, some, or all of the connectors 102 and/or biasing portions 150 may have only linear segments or regions, or may have a combination of curved and linear regions. In some embodiments, one, some, or all of the connectors 102 and/or biasing portions 150 do not include any curved portions.

According to some examples, a single connector 102 may have multiple biasing portions 150 in series along the longitudinal axis of the respective connector 102. In some embodiments, multiple connectors 102 may extend between two points along the same or different paths. In such embodiments, the different connectors 102 may have the same stiffness or different stiffnesses. Additional details regarding the latter embodiments are provided elsewhere herein, for example below with reference to FIGS. 36-57.

In those embodiments where the appliance 100 has two or more connectors 102 with biasing portions 150, some, none, or all of the connectors 102 may have the same or different lengths, the same or different widths, the same or different thicknesses, the same or different shapes, and/or may be made of the same or different materials, amongst other properties. In some embodiments, less than all of the connectors 102 have biasing portions 150. Connectors 102 without biasing portions 150 may, for example, comprise one or more rigid connections between a rigid third connector 108 and the attachment portion 140. In some embodiments, none of the connectors 102 of the appliance 100 have a biasing portion 150.

According to some embodiments, for example as depicted schematically in FIG. 2A, the appliance 100 may include a single, continuous, substantially rigid third connector (referred to as "anchor 120") and a plurality of flexible arms 130 extending away from the anchor 120. When the appliance 100 is installed in the patient's mouth, each of the arms 130 may connect to a different one of the teeth to be moved and exerts a specific force on its respective tooth, thereby allowing an operator to move each tooth independently. Such a configuration provides a notable improvement over traditional braces in which all of the teeth are connected by a single archwire, such that movement of one tooth can cause unintentional movement of one or more nearby teeth. As discussed in greater detail herein, the independent and customized tooth movement enabled by the appliances of the present technology allows the operator to move the teeth from an original tooth arrangement ("OTA") to a final tooth arrangement ("FTA") more efficiently, thereby obviating periodic adjustments, reducing the number of office visits, and reducing or eliminating patient discomfort, and reducing the overall treatment time (i.e., the length of time the appliance is installed in the patient's mouth) by at least 50% relative to the overall treatment time for traditional braces.

The anchor 120 may comprise any structure of any shape and size configured to comfortably fit within the patient's mouth and provide a common support for one or more of the arms 130. In many embodiments, the anchor 120 is disposed proximate the patient's gingiva when the appliance 100 is installed within the patient's mouth, for example as shown in FIG. 2B. For instance, the appliance may be designed such that, when installed in the patient's mouth, all or a portion of the anchor 120 is positioned below the patient's gum line and adjacent but spaced apart from the gingiva. In many cases it may be beneficial to provide a small gap (e.g., 0.5 mm or less) between the anchor 120 (or any portion of the appliance 100) and the patient's gingiva as contact between the anchor 120 and the gingiva can cause irritation and patient discomfort. In some embodiments, all or a portion of the anchor 120 is configured to be in contact with the gingiva when the appliance 100 is disposed in the patient's mouth.

The anchor 120 may be significantly more rigid than the arms 130 such that the equal and opposite forces experienced by each of the arms 130 when exerting a force on its respective tooth are countered by the rigidity of the anchor 120 and the forces applied by the other arms 130, and do not meaningfully affect the forces on other teeth. As such, the anchor 120 effectively isolates the forces experienced by each arm 130 from the rest of the arms 130, thereby enabling independent tooth movement.

According to some embodiments, for example as shown schematically in FIGS. 2A and 2B, the anchor 120 comprises an elongated member having a longitudinal axis L2 (see FIG. 2C) and forming an arched shape configured to extend along a patient's jaw when the appliance 100 is installed. In these and other embodiments, the anchor 120 may be shaped and sized to span two or more of the patient's teeth when positioned in the patient's mouth. In some examples, the anchor 120 includes a rigid, linear bar, or may comprise a structure having both linear and curved segments. In these and other embodiments, the anchor 120 may extend laterally across all or a portion of the patient's mouth (e.g., across all or a portion of the palate, across all or a portion of the lower jaw, etc.) and/or in a generally anterior-posterior direction. Moreover, the appliance 100 may comprise a single anchor or multiple anchors. For example, the appliance 100 may comprise multiple, discrete, spaced apart anchors, each having two or more arms 130 extending therefrom. In these and other embodiments, the appliance 100 may include one or more other connectors extending between adjacent arms 130.

Any and all of the features discussed above with respect to anchor 120 applies to any of the third connectors 108 disclosed herein.

As shown in FIG. 2B, each of the arms 130 may extend between a proximal or first end portion 130*a* and a distal or second end portion 130*b*, and may have a longitudinal axis L extending between the first end portion 130*a* and the second end portion 130*b*. The first end portion 130*a* of one, some, or all of the arms 130 may be disposed at the anchor 120. In some embodiments, one, some, or all of the arms 130 are integral with the anchor 120 such that the first end portion 130*a* of such arms are continuous with the anchor 120. The arms 130 may extend from the anchor 120 at spaced intervals along the longitudinal axis L2 of the, as shown in FIG. 2A. In some embodiments, the arms 130 may be spaced at even intervals relative to each other, or at uneven intervals relative to each other, along the longitudinal axis L2 of the anchor 120.

One, some, or all of the arms 130 may include an attachment portion 140 at or near the second end portion 130*b*. In some embodiments, for example as shown in FIGS. 2A-2C, one or more of the arms 130 is cantilevered from the anchor 120 such that the second end portion 130*b* of the cantilevered arm(s) 130 has a free distal end portion 130*b*. In these and other embodiments, a distal terminus of the attachment portion 140 may coincide with a distal terminus of the arm 130. The attachment portion 140 may be configured to detachably couple the respective arm 130 to a securing member (e.g., a bracket) that is bonded, adhered, or otherwise secured to a surface of one of the teeth to be moved. In some embodiments, the attachment portion 140 may be directly bonded, adhered, or otherwise secured to a corresponding tooth without a securing member or other connection interface at the tooth.

Referring to still to FIGS. 2A and 2B, one, some, or all of the arms 130 may include one or more resiliently flexible biasing portions 150, such as springs, each configured to apply a customized force, torque or combination of force and torque specific to the tooth to which it is attached. The biasing portion(s) 150 may extend along all or a portion of the longitudinal axis L1 of the respective arm 130 between the anchor 120 and the attachment portion 140. The direction and magnitude of the force and torque applied on a tooth by a biasing portion 150 depends, at least in part, on the shape, width, thickness, length, material, shape set conditions, and other parameters of the biasing portion 150. As such, one or more aspects of the arm 130 and/or biasing portion 150 (including the aforementioned parameters) may be varied so that the arm 130 and/or biasing portion 150 produce a desired tooth movement when the appliance 100 is installed in the patient's mouth. Each arm 130 and/or biasing portion 150 may be designed to move one or more teeth in one, two, or all three translational directions (i.e., mesiodistal, buccolingual, and occlusogingival) and/or in one, two, or all three rotational directions (i.e., buccolingual root torque, mesiodistal angulation and mesial out-in rotation).

The biasing portions 150 of the present technology can have any length, width, shape, and/or size sufficient to move the respective tooth towards a desired FTA. In some embodiments, one, some, or all of the arms 130 may have one or more inflection points along a respective biasing portion 150. The arms 130 and/or biasing portions 150 may have a serpentine configuration such that the arm 130 and/or biasing portion 150 doubles back on itself at least one or more times before extending towards the attachment portion 140. In FIG. 2B, the arm 130 doubles back on itself two times along the biasing portion 150, thereby forming first and second concave regions facing in generally different directions relative to one another. The open loops or overlapping portions of the arm 130 corresponding to the biasing portion 150 may be disposed on either side of a plane P bisecting an overall width W of the arm 130 such that the extra length of the arm 130 is accommodated by the space medial and/or distal to the arm 130. This allows the arm 130 to have a longer length (as compared to a linear arm) to accommodate greater tooth movement, despite the limited space in the occlusal-gingival or vertical dimension between the anchor 20 and the location at which the arm 130 attaches to the tooth.

It will be appreciated that the biasing portion 150 may have other shapes or configurations. For example, in some embodiments the arm 130 and/or biasing portion 150 may include one or more linear regions that zig-zag towards the attachment portion 140. One, some, or all of the arms 130 and/or biasing portions 150 may have only linear segments or regions, or may have a combination of curved and linear regions. In some embodiments, one, some, or all of the arms 130 and/or biasing portions 150 do not include any curved portions.

According to some examples, a single arm 130 may have multiple biasing portions 150. The multiple biasing portions 150 may be in series along the longitudinal axis L1 of the respective arm 120. In some embodiments, multiple arms 130 may extend in parallel between two points along the same path or along different paths. In such embodiments, the different arms 130 may have the same stiffness or different stiffnesses. 10135I In those embodiments where the appliance 100 has two or more arms 130 with biasing portions 150, some, none, or all of the arms 130 may have the same or different lengths, the same or different widths, the same or different thicknesses, the same or different shapes, and/or may be made of the same or different materials, amongst other properties. In some embodiments, less than all of the arms 130 have biasing portions 150. Arms 130 without biasing portions 150 may, for example, comprise one or more rigid connections between the anchor 120 and the attachment portion 140. In some embodiments, none of the arms 130 of the appliance 100 have a biasing portion 150.

The appliances of the present technology may include any number of arms 130 suitable for repositioning the patient's teeth while taking into account the patient's comfort. Unless explicitly limited to a certain number of arms in the specification, the appliances of the present technology may comprise a single arm, two arms, three arms, five arms, ten arms, sixteen arms, etc. In some examples, one, some, or all of the arms 130 of the appliance may be configured to individually connect to more than one tooth (i.e., a single arm 130 may be configured to couple to two teeth at the same time). In these and other embodiments, the appliance 100 may include two or more arms 130 configured to connect to the same tooth at the same time.

Any portion of the appliances of the present technology may include a biasing portion 150. For example, in some embodiments, portion thereof (e.g., the anchor(s), the arm(s), the biasing portion(s), the attachment portion(s), the link(s), etc.) may comprise one or more superelastic materials.

Additional details related to the individual directional force(s) applied via the biasing portion 150 or, more generally the arm 130, are described in U.S. application Ser. No. 15/370,704, now U.S. Pat. No. 10,383,707, issued Aug. 20, 2019, the disclosure of which is incorporated by reference herein in its entirety.

The appliances disclosed herein and/or any portion thereof (e.g., the anchor(s), the arm(s), the biasing portion(s), the attachment portion(s), the link(s), etc.) may comprise one or more superelastic materials. The appliances disclosed herein and/or any portion thereof (e.g., the anchor(s), the arm(s), the biasing portion(s), the attachment portion(s), the link(s), etc.) may comprise Nitinol, stainless steel, beta-titanium, cobalt chrome, MP35N, 35N LT, one or more metal alloys, one or more polymers, one or more ceramics, and/or combinations thereof.

Figure 3B:
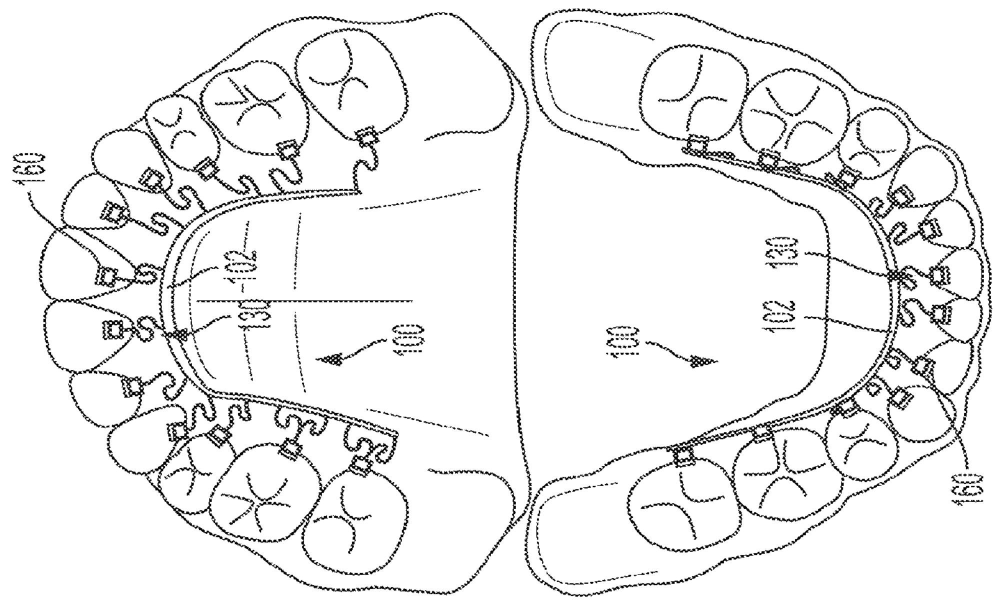
FIGS. 3A and 3B are elevation views of an appliance configured in accordance with several embodiments of the present technology installed in an upper and lower jaw of a patient's mouth with the patient's teeth in an original tooth arrangement and a final tooth arrangement, respectively.
Figure 3A:
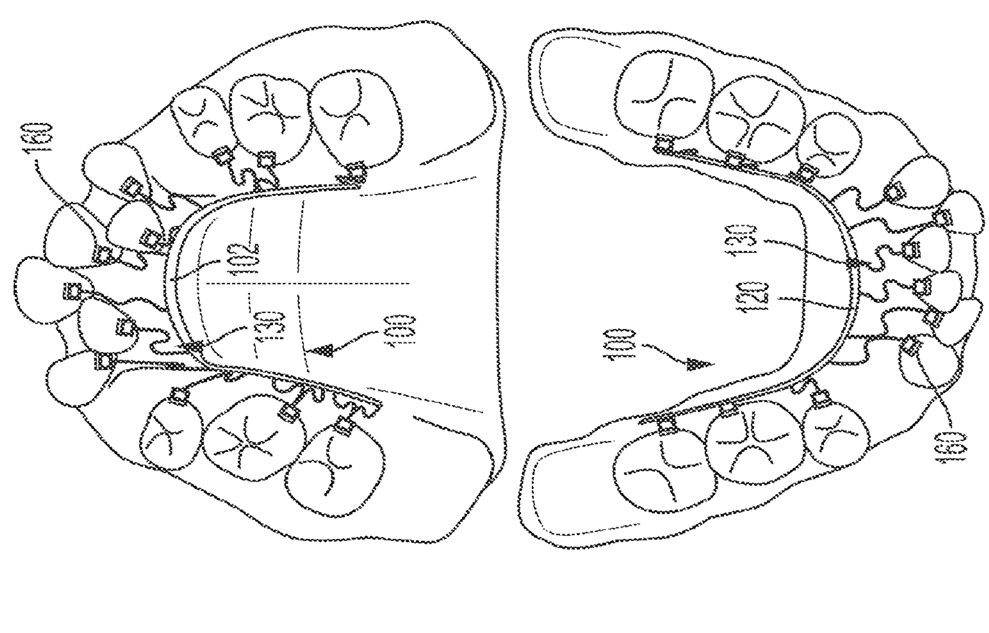

FIGS. 3A and 3B are elevation views of the appliance 100 installed on both the upper and lower arches of a patient's mouth M with the arms 130 coupled to securing members 160 attached to the lingual surfaces of the teeth. It will be appreciated that the appliance 100 of one or both of the upper and lower arches may be positioned proximate a buccal side of a patient's teeth, and that the securing elements 160 and/or arms 130 may alternatively be coupled to the buccal surface of the teeth.

FIG. 3A shows the teeth in an OTA with the arms 130 in a deformed or loaded state, and FIG. 3B shows the teeth in the FTA with the arms 130 in a substantially unloaded state. When the arms 130 are initially secured to the securing members 160 when the teeth are in the OTA, the arms 130 are forced to take a shape or path different than their "as designed" configurations. Because of the inherent memory of the resilient biasing portions 150, the arms 130 impart a continuous, corrective force on the teeth to move the teeth towards the FTA, which is where the biasing portions 150 are in their as-designed or unloaded configurations. As such, tooth repositioning using the appliances of the present technology can be accomplished in a single step, using a single appliance. In addition to enabling fewer office visits and a shorter treatment time, the appliances of the present technology greatly reduce or eliminate the pain experienced by the patient as the result of the teeth moving as compared to braces. With traditional braces, every time the orthodontist makes an adjustment (such as installing a new archwire, bending the existing archwire, repositioning a bracket, etc.), the affected teeth experience a high force which is very painful for the patient. Over time, the applied force weakens until eventually a new wire is required. The appliances of the present technology, however, apply a movement-generating force on the teeth continuously while the appliance is installed, which allows the teeth to move at a slower rate that is much less painful (if painful at all) for the patient. Even though the appliances disclosed herein apply a lower and less painful force to the teeth, because the forces being applied are continuous and the teeth can move independently (and thus more efficiently), the appliances of the present technology arrive at the FTA faster than traditional braces or aligners, as both alternatives require intermediate adjustments.

Figure 3C:
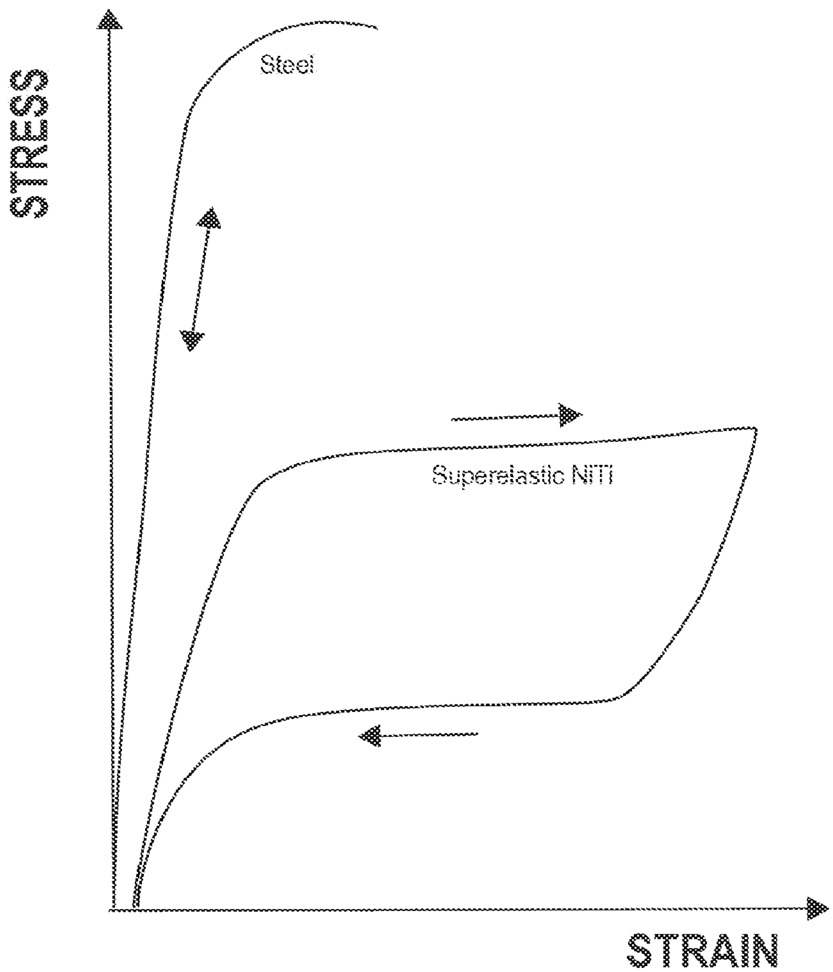
FIG. 3C is a graph showing the stress-strain curves for nitinol and steel.

In many embodiments, the movement-generating force is lower than that applied by traditional braces. In those embodiments in which the appliance comprises a superelastic material (such as nitinol), the superelastic material behaves like a constant force spring for certain ranges of strain, and thus the force applied does not drop appreciably as the tooth moves. For example, as shown in the stress-strain curves of nitinol and steel in FIG. 3C, the curve for nitinol is relatively flat compared to that of steel. Thus, the superelastic connectors, biasing portions, and/or arms of the present technology apply essentially the same stress for many different levels of strain (e.g., deflection). As a result, the force applied to a given tooth stays constant as the teeth move during treatment, at least up until the teeth are very close or in the final arrangement. The appliances of the present technology are configured to apply a force just below the pain threshold, such that the appliance applies the maximum non-painful force to the tooth (or teeth) at all times during tooth movement. This results in the most efficient (i.e., fastest) tooth movement without pain.

In some embodiments, tooth repositioning may involve multiple steps performed progressively, by using multiple appliances. Embodiments involving multiple steps (or multiple appliances, or both) may include one or more intermediate tooth arrangements (ITAs) between an original tooth arrangement (OTA) and a desired final tooth arrangement (FTA). Likewise, the appliances disclosed herein may be designed to be installed after a first or subsequently used appliance had moved the teeth from an OTA to an ITA (or from one ITA to another ITA) and was subsequently removed. Thus, the appliances of the present technology may be designed to move the teeth from an ITA to an FTA (or to another ITA). Additionally or alternatively, the appliances may be designed to move the teeth from an OTA to an ITA, or from an OTA to an FTA without changing appliances at an ITA.

In some embodiments, the appliances disclosed herein may be configured such that, once installed on the patient's teeth, the appliance cannot be removed by the patient. In some embodiments, the appliance may be removable by the patient.

Any of the example appliances or appliance portions described herein may be made of any suitable material or materials, such as, but not limited to Nitinol (NiTi), stainless steel, beta-titanium, cobalt chrome or other metal alloy, polymers or ceramics, and may be made as a single, unitarily-formed structure or, alternatively, in multiple separately-formed components connected together in single structure. However, in particular examples, the rigid bars, bracket connectors and loop or curved features of an appliance (or portion of an appliance) described in those examples are made by cutting a two dimensional (2D) form of the appliance from a 2D sheet of material and bending the 2D form into a desired 3D shape of the appliance, according to processes as described in U.S. patent application Ser. No. 15/370,704 (Publ. No. 2017/0156823), filed Dec. 6, 2016, or other suitable processes.

Methods of Manufacturing

FIGS. 4A-4I illustrate an example method for designing and fabricating an orthodontic appliance as described herein. The particular processes described herein are exemplary only, and may be modified as appropriate to achieve the desired outcome (e.g., the desired force applied to each tooth by the appliance, the desired material properties of the appliance, etc.). In various embodiments, other suitable methods or techniques can be utilized to fabricate an orthodontic appliance. Moreover, although various aspects of the methods disclosed herein refer to sequences of steps, in various embodiments the steps can be performed in different orders, two or more steps can be combined together, certain steps may be omitted, and additional steps not expressly discussed can be included in the process as desired.

As noted above, in some embodiments an orthodontic appliance is configured to be coupled to a patient's teeth while the teeth are in an OTA. In this position, elements of the appliance exert customized loads on individual teeth to urge them toward a desired FTA. For example, an arm 130 of the appliance 100 can be coupled to a tooth and configured to apply a force so as to urge the tooth in a desired direction toward the FTA. In one example, an arm 130 of the appliance 100 can be configured to apply a tensile force that urges the tooth lingually along the facial-lingual axis. By selecting the appropriate dimensions, shape, shape set, material properties, and other aspects of the arms 130, a customized load can be applied to each tooth to move each tooth from its OTA toward its FTA. In some embodiments, the arms 130 are each configured such that little or no force is applied once the tooth to which the arm 130 is coupled has achieves its FTA. In other words, the appliance 100 can be configured such that the arms 130 are at rest in the FTA state.

Figure 4A:
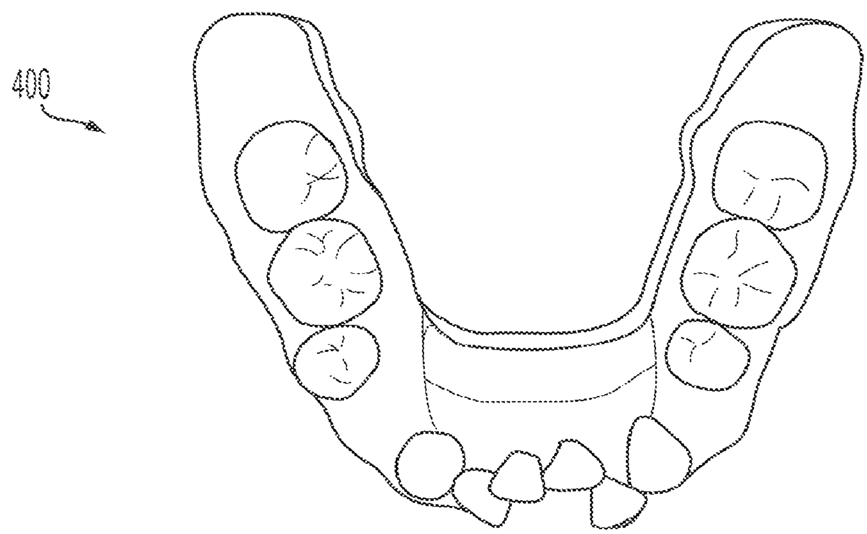
FIGS. 4A-4I depict an example method of manufacturing an orthodontic appliance in accordance with the present technology.

The method may begin with obtaining data (e.g., position data) characterizing the patient's OTA. As depicted in FIG. 4A, in some embodiments the operator may obtain a digital representation 400 of the patient's OTA, for example using optical scanning, cone beam computed tomography (CBCT), scanning of patient impressions, or other suitable imaging technique to obtain position data of the patient's teeth, gingiva, and optionally other adjacent anatomical structures while the patient's teeth are in the original or pre-treatment condition.

The method may further comprise obtaining data (e.g., position data) characterizing the patient's intended or desired FTA, and in many cases generating a digital representation of the patient's FTA. The data characterizing the FTA can include coordinates (e.g., X,Y,Z coordinates) for each of the patient's teeth and the gingiva. Additionally or alternatively, such data can include positioning of each of the patient's teeth relative to other ones of the patient's teeth and/or the gingiva.

Figure 4B:
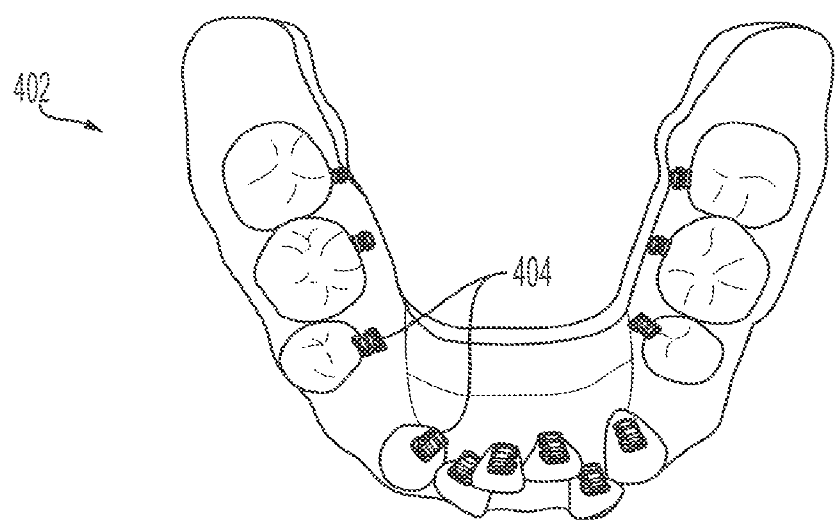
Figure 4C:
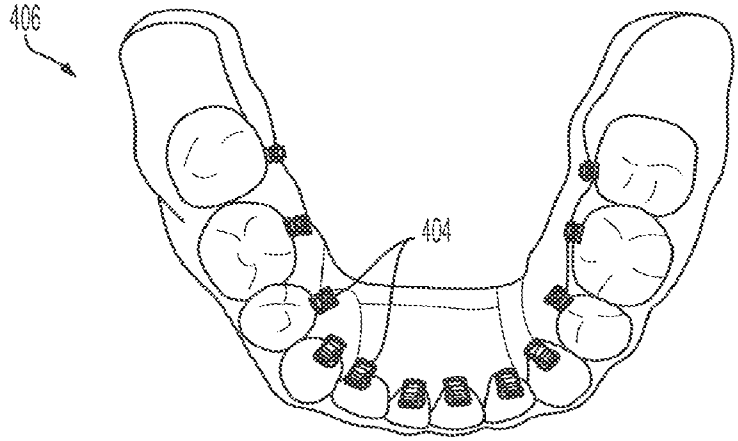

In some embodiments, segmentation software (e.g., iROK Digital Dentistry Studio) be used to create individual virtual teeth and gingiva from the OTA data. Suitable software can be used to move the virtual teeth to their FTA positions. As shown in FIG. 4B, in some cases digital models of securing members 404 can be added to the OTA digital model 400 (e.g., by an operator selecting positions on the tooth surface for placement of securing members 404 thereon). Suitable software can be used to move the virtual teeth with the attached securing members 404 from the OTA to a desired final position. An example of a digital FTA model with the virtual securing member models 404 attached is shown in FIG. 4C.

Figure 4D:
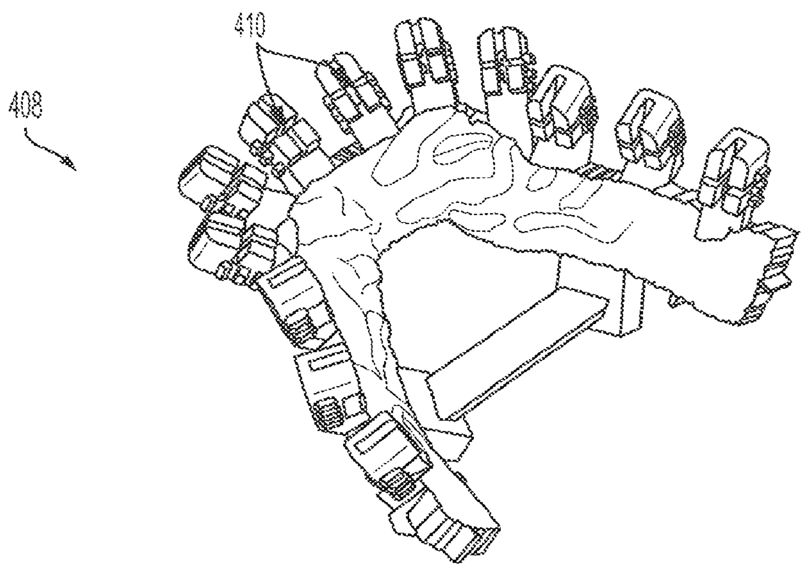

As shown in FIG. 4D, in some embodiments a heat treatment fixture digital model 408 can be obtained. In some embodiments, the heat treatment fixture digital model 408 can correspond to and/or be derived from the FTA digital model (such as the FTA digital model of FIG. 4C). For example, the FTA digital model can be modified (e.g., using MeshMixer or other suitable modeling software) in a variety of ways to render a model suitable for manufacturing a heat treatment fixture. In some embodiments, the FTA digital model can be modified to replace the securing members 404 (which are configured to couple to arms 130 of an appliance 100 (FIG. 2A)) with members 410 (which can be configured to facilitate temporary coupling of the heat treatment fixture to the appliance for shape-setting). Additionally or alternatively, the FTA digital model can be modified to enlarge or thicken the gingiva, to remove one or more of the teeth, and/or to add structural components for increased rigidity. In some embodiments, enlarging or thickening the gingiva may be done to ensure portions (e.g., the anchor) of the fabricated appliance, which is based in part on the FTA digital model, does not engage or contact the patient's gingiva when the appliance is installed. As a result, modifying the FTA digital model as described herein may be done to provide a less painful teeth repositioning experience for the patient.

The method may further comprise obtaining an appliance digital model. As used herein, the term "digital model" and "model" are intended to refer to a virtual representation of an object or collection of objects. For example, the term "appliance digital model" refers to the virtual representation of the structure and geometry of the appliance, including its individual components (e.g., the anchor, arms, biasing portions, attachment portions, etc.). In some embodiments, a substantially planar digital model of the appliance is generated based at least in part on the heat treatment fixture digital model (and/or the FTA digital model). According to some examples, a contoured or 3D appliance digital model generally corresponding to the FTA can first be generated that conforms to the surface and attachment features of the heat treatment fixture digital model. In some embodiments, the 3D appliance digital model can include generic arm portions and securing members, without particular geometries, dimensions, or other properties of the arms being selected or defined by a particular patient. The 3D appliance digital model may then be flattened to generate a substantially planar appliance digital model. In some embodiments, the particular configuration of the arms 130 (e.g., the geometry of biasing portions 150, the position along the anchor 120 (FIG. 2A), etc.) can then be selected so as to apply the desired force to urge the corresponding tooth (to which the arm 130 is attached) from its OTA toward its FTA. As noted previously, in some embodiments the arms are configured so as to be substantially at rest or in a substantially unstressed state when at the FTA. The selected arm configurations can then be substituted or otherwise incorporated into the planar appliance digital model.

In some cases, it may be beneficial to evaluate an intended appliance design prior to fabricating a physical appliance based on the intended appliance design to assess how the physical appliance would perform during treatment. For example, because the pre-installation form of the appliance is based at least in part on a desired FTA, the position of one or more portions of the appliance may shift relative to the gingiva once the physical appliance is installed in the patient's mouth (e.g., with the patient's teeth in the OTA). As a result, one or more shifted positions of the physical appliance may cause pain for the patient that may reduce treatment compliance and/or satisfaction.

Figure 4E:
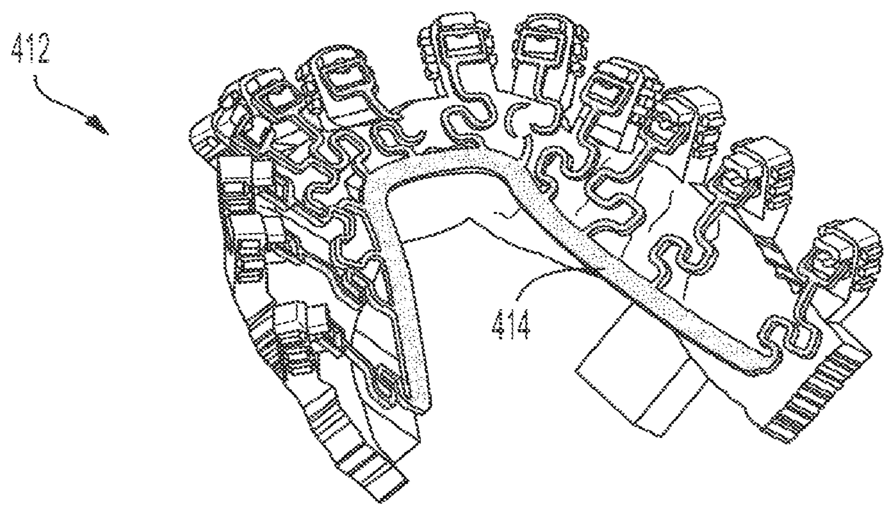

In some embodiments, finite element analysis (or other suitable computational techniques) can be used to manipulate the 3D appliance digital model to assess its performance prior to fabrication. For example, as shown in FIG. 4E, the 3D appliance digital model 414 can be virtually deformed (e.g., using finite element analysis) into a position for engagement with the patient's teeth in the OTA. As shown in FIG. 4E, the resulting virtual model 412 represents the appliance digital model 414 after it has been deformed into position to be engaged with the patient's teeth in the OTA. An output of the virtual deformation can be evaluated to assess whether the physical appliance will function as intended. Based on the evaluation of the output, the intended appliance design can be modified as needed, or a final appliance design can be obtained. In the example shown in FIG. 4E, a portion of the appliance digital model 414 impinges on the gingiva digital model. As a result, the design of the appliance may be modified, and the evaluation may be repeated until the appliance digital model 414 no longer impinges on the gingiva. This process may be repeated iteratively until a satisfactory appliance design is achieved.

Next, the heat treatment fixture can be fabricated. For example, using the heat treatment fixture digital model, the heat treatment fixture can be cast, molded, 3D printed, or otherwise fabricated using suitable materials configured to withstand heating for shape setting of an appliance thereon.

Figure 4F:
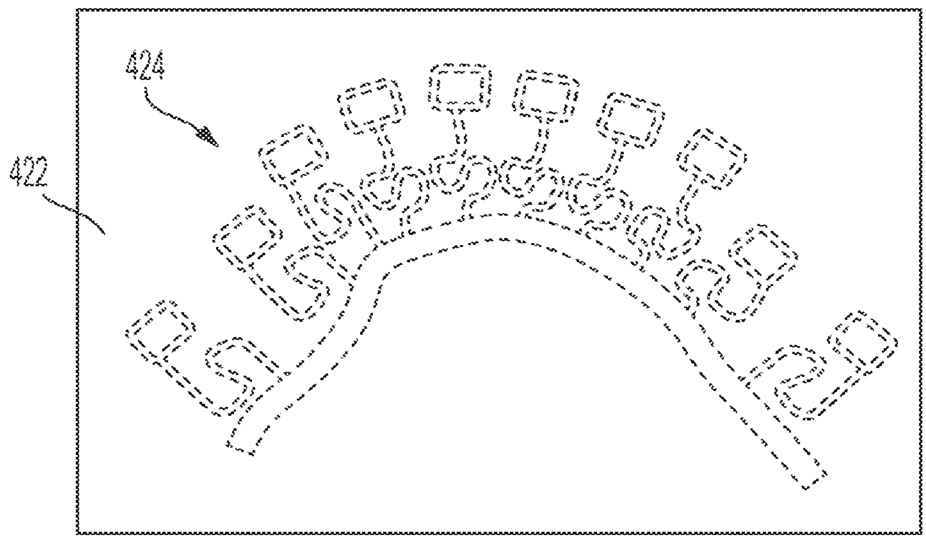
Figure 4G:
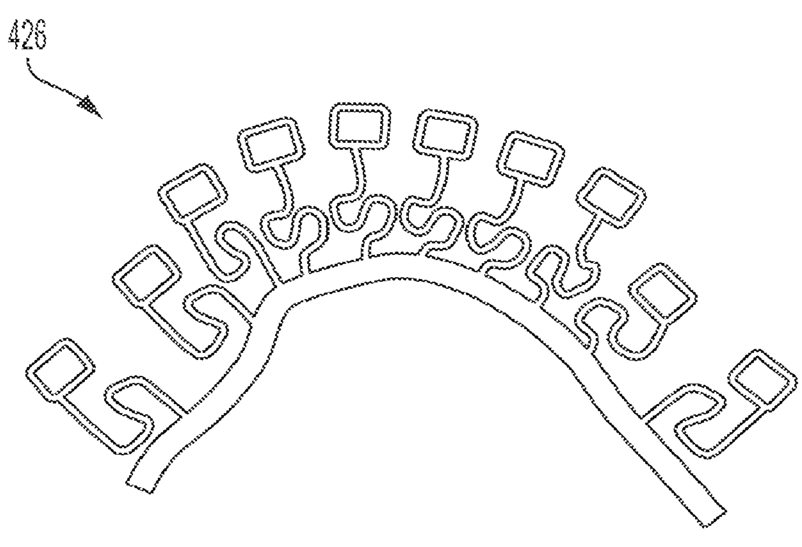

In some embodiments, fabricating the appliance includes first fabricating the appliance in a planar configuration based on the planar appliance digital model. For example, as shown in FIGS. 4F and 4G, a pattern 424 of the planar form of the final device can be cut out of a sheet of material 424 to get a planar member 426. In some embodiments, the appliance is cut out of a sheet of Nitinol or other metal using laser cutting, water jet, stamping, or other suitable technique. The thickness of the material can be varied across the appliance, for example by electropolishing, etching, depositing, or otherwise manipulating the material of the appliance to achieve the desired material properties.

Figure 4H:
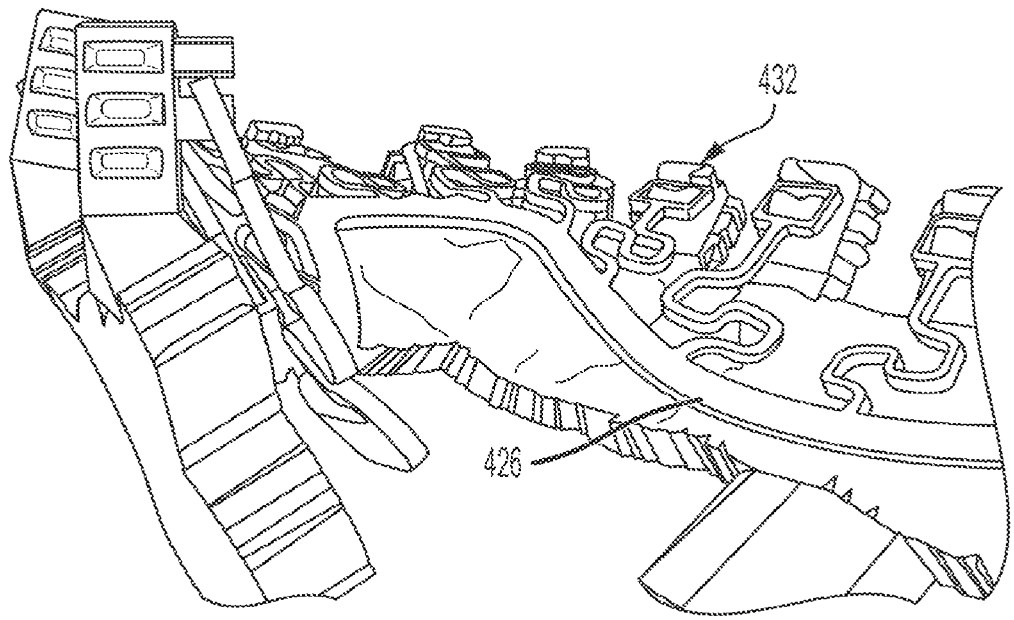
Figure 4I:
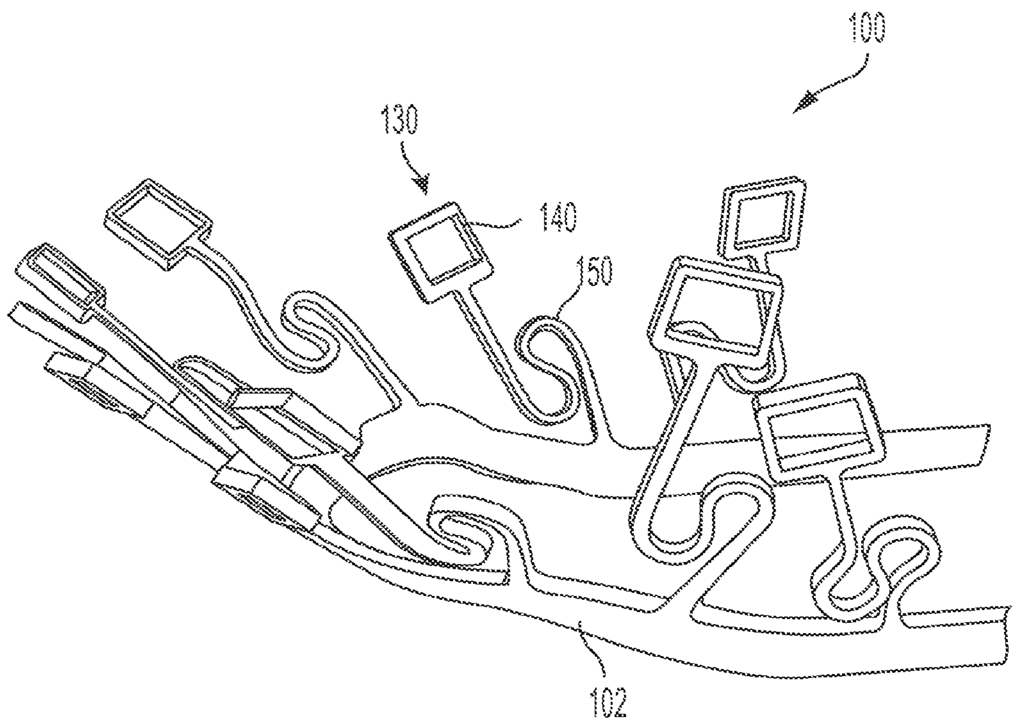

According to some embodiments, the planar member 426 (e.g., as 3D-printed or as cut out from a sheet of material) can be bent or otherwise manipulated into the desired arrangement (e.g., substantially corresponding to the FTA) to form a 3D appliance for treatment. In some embodiments, the planar member 426 can be bent into position by coupling the planar member 426 to a heat treatment fixture 432, as shown in FIG. 4H. The heat treatment fixture 432 may be, for example, the physical form of the previously-obtained heat treatment fixture digital model 408. For example, the arms of the planar member 426 can be removably coupled to hook members of the heat treatment fixture, and optionally ligature wire or other temporary fasteners can be used to secure the arms or other portions of the appliance to the heat treatment fixture 432. The resulting assembly (i.e., the appliance fastened to the heat treatment fixture) can then be heated to shape-set the appliance into its final form, which can correspond or substantially correspond to the FTA. As a result, the appliance is configured to be in an unstressed state in the FTA. The shape set appliance can then be removed from the heat treatment fixture 432.

In operation, the appliance can then be installed in the patient's mouth (e.g., by bending or otherwise manipulating arms of the appliance to be coupled to brackets of the patient's teeth while in the OTA). Due to the shape set of the appliance and the geometry of the arms and anchor, the arms will tend to urge each tooth away from its OTA and toward the FTA.

According to various embodiments, a method of manufacturing an appliance can comprise cutting the appliance from a sheet of material in an intermediate configuration (e.g., a planar configuration, etc.), manipulating the appliance into a desired, 3D configuration, and setting a shape of the appliance such that the appliance maintains the desired, 3D configuration. However, other methods of manufacturing an appliance are disclosed herein. In some embodiments, an appliance can be directly manufactured in its desired, 3D configuration, bypassing the process of manipulating the appliance into the desired configuration and/or shape setting the appliance. Producing an appliance via additive manufacturing can provide certain advantages over other manufacturing methods such as, but not limited to, reduced costs, time, and labor for producing customized appliances. With an additive manufacturing process, little to no custom machines or tooling are required to produce unique appliances that are each customized for a patient. In contrast, many other manufacturing processes require tooling (e.g., molds, dies, jigs, etc.) that must also be custom made for each customized appliance. As a result, such manufacturing processes can be expensive and may be slowed down by the additional steps of producing customized tooling before producing the customized appliance. Moreover, many other manufacturing processes require multiple steps with specialized machinery, further increasing the cost and time to produce an appliance. Additive manufacturing addresses these challenges by providing a process for producing customized appliances with complex shapes and small dimensions with reduced costs and time to produce the appliances.

A process for manufacturing an orthodontic appliance in accordance with several embodiments of the present technology can comprise obtaining an appliance digital model characterizing an appliance to be manufactured and forming the appliance by an additive manufacturing process. The appliance digital model can be similar to any of the appliance digital models disclosed herein. An additive manufacturing process in accordance with several embodiments of the present technology can comprise successively fusing particles of a material, which can occur in a layer-by-layer manner. In some embodiments, fusing the particles can comprise delivering thermal energy to the particles. For example, thermal energy can be delivered to the particles via a laser, a hotend, etc. Additionally or alternatively, mechanical forces and/or chemical agents can be applied to the particles to cause them to fuse. In some embodiments, the build piece can be formed by successively fusing particles in successive layers. For example, forming the build piece can comprise successively fusing particles in a first, two-dimensional (2D) layer, fusing particles in a second 2D layer on the first 2D layer, fusing particles in a third 2D layer on the second 2D layer, and so on. Such additive manufacturing processes can comprise selective laser melting, selective laser sintering, electron beam melting, powder direct energy deposition, wire direct energy deposition, fused deposition modeling, fused filament fabrication, binder jetting, bound powder extrusion, combinations thereof, and/or other suitable additive manufacturing process In some embodiments, forming the appliance comprises obtaining instructions for an additive manufacturing machine. Obtaining the instructions can comprise, for example, importing the appliance digital model into suitable slicing software, orienting the digital model relative to a virtual build surface and/or within a virtual build volume, generating support structures, virtually separating the digital model into finite layers, creating a tool path, and/or specifying parameters (e.g., speed, time, temperature, resolution, etc.) that the additive manufacturing machine should use. Such suitable slicing software can include, but is not limited to, Cura, Netfabb Standard, PrusaSlicer, Simplify3D, OctoPrint, Slic3r, MatterControl, MakerBot Print, Repetier, ideaMaker, ChiTuBox, Z-Suite, IceSL, Astroprint, CraftWare, SelfCAD, 3DPrinterOS, KISSlicer, Tinkerine Suite, SuperSlicer, Pathio, and others. In some embodiments, the instructions comprise a geometric code (e.g., G-code) and/or another suitable numerical control programming language.

The appliance can be formed from a material comprising a metal, a ceramic, a polymer, or others. In some embodiments, the material comprises Nitinol, stainless steel, cobalt-chromium, titanium, gold, platinum, alloys thereof, or other suitable metals or metal alloys. The material can comprise a superelastic material and/or a shape memory alloy. Additionally or alternatively, the material can comprise a thermoplastic, a photopolymer, a biological material, an aluminum oxide, or another suitable material. In some embodiments, the material is biocompatible. The material can comprise a powder, a filament, a liquid, and/or another suitable form.

In some embodiments, the appliance can be formed on a build surface such as a bed of a 3D printer, a build plate of a 3D printer, a workbench, etc. A first layer of the appliance can be formed on the build surface, a second layer can be formed on the first layer, a third layer can be formed on the second layer, and so on. In such layer-by-layer approach, each layer should generally be supported by the build surface or the layers between the layer being formed and the build surface. If the appliance has a shape comprising overhangs, bridges, or angles generally greater than 45 degrees, structural reinforcement (e.g., supports) may be required to prevent deformation of the appliance during the additive manufacturing process.

To form an appliance in a 3D configuration by additive manufacturing, structural reinforcement such as supports will often be required as a result of the complex 3D shape of the appliance. Such supports can be challenging to remove, particularly when formed of metal, and removal often comprises cutting, grinding, milling, sanding, etc. The harsh, laborious post-processing methods required to remove supports from an appliance can damage the appliance, inadvertently modify a surface roughness of the appliance, and/or change material properties of the appliance.

To address the above-noted challenges, a method of the present technology comprises manufacturing an appliance by forming the appliance in an intermediate configuration via additive manufacturing, which can then be manipulated into a desired, 3D configuration and shape set. The appliance can be formed by additive manufacturing in a planar or flat configuration to reduce or limit the need for structural reinforcement during the forming process. The appliance can then be shape set to its desired, 3D configuration. Forming the appliance in a substantially planar configuration can eliminate or reduce any overhangs, bridges, and/or cantilevered regions in the geometry of the appliance such that support structures are not required when forming the appliance by additive manufacturing. The reduction or elimination of supports can significantly reduce the required post-processing of the appliance. Additionally, the time required to form a planar appliance by additive manufacturing can be significantly less than the time required to form a 3D appliance by additive manufacturing. This is because fewer layers will be formed for the planar appliance than the 3D appliance, and the speed of the additive manufacturing process is related to the number of layers to be formed.

To manipulate the planar appliance from the planar configuration to the 3D configuration, the appliance can be conformed and/or secured to a shape forming fixture (e.g., the heat treatment fixtures disclosed herein, etc.). In some embodiments, the shape forming fixture can comprise one or more securing portions and a gingiva portion. The securing portions can be configured to releasably retain one or more portions of the appliance at a specific location relative to other portions of the appliance. For example, the securing portions can be configured to retain attachment portions (e.g., attachment portions 140, etc.) of an appliance during a shape setting procedure in positions corresponding to intended positions of corresponding securing members when the appliance is later installed in the patient's mouth and the securing members are secured to the patient's teeth (for example, when the teeth, and thus securing members, are in an OTA or FTA). In some embodiments, the securing portions are positioned relative to one another and to the gingiva portion to reflect the positions of the teeth in the FTA. In other embodiments, the securing portions are positioned to reflect the teeth in the OTA or an ITA.

The securing portions can have a geometry configured to facilitate positioning and/or retaining corresponding attachment portions at the intended positions. For example, the securing portions can define first channels and second channels angled with respect to the first channels. The first and second channels are configured to receive attachment portions of an appliance at least partially therein to locate the attachment portions at their intended positions. The securing portions can be configured to receive and/or coupled with other fasteners, such as ties, sutures, bands, clasps, and others.

The gingiva portion of the fixture comprises the shape of gingival tissue and provides a surface on which a portion of the appliance is conformed during a shape setting procedure. The gingiva portion may be substantially identical to the gingiva portion of a fixture digital model and/or the gingiva portion from an OTA or FTA digital model. For example, it can be desirable to use the gingiva portion from the OTA digital model for the gingiva portion of the fixture to prevent or limit impingement of the patient's gingiva by an appliance installed in the patient's mouth and having a shape corresponding to a shape of the fixture. In some cases, the securing portions can be positioned to reflect the teeth in the FTA while the gingiva portion reflects the gingiva in the OTA.

The appliance and shape forming fixture can be processed to set a shape of the appliance (e.g., heat treatment, etc.). Some examples of a shape setting procedure can include heating the appliance to a selected temperature (such as, but not limited to 525 degrees centigrade) for a selected period of time (such as, but not limited to 20 minutes), followed by rapid cooling. The rapid cooling can be achieved by any suitable cooling procedure such as, but not limited to water quench or air-cooling. In other examples, the time and temperature for heat treatment can be different than those discussed above, for example, based upon the specific treatment plan. For example, heat treatment temperatures can be within a range from 200 degrees centigrade to 700 degrees centigrade and the time of heat treatment can be a time in the range up to about one hundred and twenty minutes. In particular examples, the heat treatment procedure may be carried out in an air or vacuum furnace, salt bath, fluidized sand bed or other suitable system. After completing the heat treatment, the appliance has a desired 3D shape and configuration. In other examples, other suitable heat-treating procedures may be employed including, but not limited to resistive heating or heating by running a current though the metal of the appliance structure. In some embodiments, the shape setting procedure does not rely on heat.

In any of the embodiments disclosed herein, an appliance and/or a device formed by additive manufacturing can be post-processed. For example, the appliance can be heat treated to stress relieve the appliance. Such heat treatment can be beneficial, as the rapid heating and cooling that occur during additive manufacturing processes can cause internal stresses in the appliance. The stress relief heat treatment process can be the same as the heat treatment process for setting a 3D shape of the appliance, or it can be distinct from the shape setting heat treatment process. In some cases, structures produced by additive manufacturing may have a greater surface roughness than is desirable for an orthodontic appliance or device. To reduce a surface roughness of the appliance, the appliance can be machined, milled, turned, sanded, filed, grinded, buffed, mechanically polished, electrochemically polished, chemically polished, etc.

While 3D printing has many advantages, in some embodiments it may be beneficial to form an appliance via a casting process. Casting enables the production of appliances with delicate and intricate geometry, high dimensional accuracy, smooth surface finishes, and other advantages. Further, a wide variety of materials can be used to form an appliance by casting, including shape memory alloys such as Nitinol.

A casting process of the present technology can comprise investment casting, sand casting, plaster casting, die casting, permanent mold casting, or another suitable casting process. Generally, forming an appliance by casting can comprise forming the appliance from a liquified material. In some embodiments, forming the appliance can comprise pouring liquified material, such as molten metal, into a cavity of a mold such that the material takes the shape of the desired form of the appliance (e.g., planar, flat, intermediate, 3D, as-installed, etc.). The liquified material is allowed to harden and solidify, and the appliance can then be removed from the mold and, optionally, post-processed. As but one example, a method of manufacturing an appliance can comprise investment casting in which a positive mold is formed having a shape corresponding to a shape of the appliance in a specific configuration. Casting can form appliances with delicate and intricate geometry, high dimensional accuracy, smooth surface finishes, and other advantages. A wide variety of materials can be used to form an appliance by casting, including shape memory alloys such as nitinol.

Casting can be used to form an appliance in any one of a number of configurations including, for example, a 3D configuration. However, a metal appliance formed directly in a 3D configuration via casting may have different material properties than an appliance formed in a 2D configuration from a wire, ribbon, sheet, tube, or other form of the same metal. Many metals, including shape memory alloys such as Nitinol, are often cold worked to enhance certain material properties of the metal via shaping of the metal. For example, cold working can increase a hardness, a stiffness, and/or a strength of the metal while decreasing a plasticity and/or a ductility of the metal. While cold working can beneficially modify material properties of a structure formed from a metal, the process inherently requires modification of a shape of the structure to cause grain and inclusion dislocations in the metal. As a result, it may be impractical and/or impossible to cold work the liquified material used to form an appliance by casting. Additionally or alternatively, it may be challenging to cold work the appliance after the appliance has been formed in its 3D configuration by casting without adversely modifying the 3D configuration of the appliance.

To facilitate the use of casting for forming an appliance while maintaining the desirable material properties associated with other methods of forming the appliance, the appliance can be cast in a planar configuration and the planar appliance can be post-processed (e.g., by cold working) and shape set into its final, desired 3D configuration. It can be easier to cold work the appliance in a planar configuration than in a 3D configuration, such that the material properties of the appliance can be modified as desired. The planar appliance can be rolled or pressed, for example, to increase a strength of the appliance. After the planar appliance is cold worked or otherwise processed, the planar appliance can be manipulated into the desired 3D configuration and shape set. For example, the planar appliance can be secured and conformed to a fixture and a heat treatment fixture can be applied to the appliance while the appliance is secured to the fixture such that, when the appliance is separated from the fixture, the appliance retains its 3D configuration.

III. Selected Examples of Orthodontic Appliance Configurations

Figure 5:
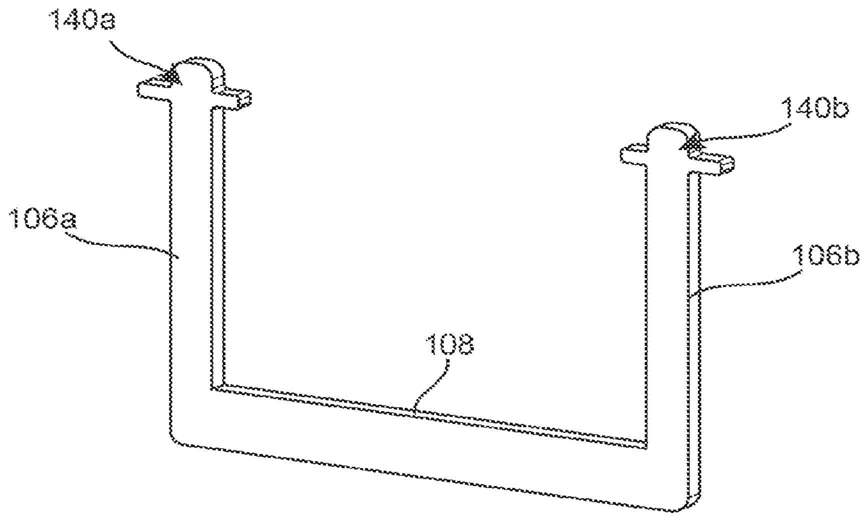
FIG. 5 is an isometric view of a connection configuration in accordance with examples of the present technology.

The appliances of the present technology may comprise any combination of structural elements to directly or indirectly couple a first tooth (or teeth) to a second tooth (or teeth) and/or another anatomical structure or location within or proximate the oral cavity. The particular configuration may be selected based on one or more desired functional characteristics, such as flexibility, bias force magnitude, bias force direction, durability, and others. FIGS. 5-34 depict several examples of configurations for use with the appliances of the present technology. Although each configuration is explained with reference to two attachment portions 140, the appliances of the present technology may ha As shown in FIG. 5, the appliance 100 may include one or more connection configurations comprising a first connector 106*a* extending gingivally from a first attachment portion 140*a*, a first connector 106*b* extending gingivally from a second attachment portion 140*b*, and a third connector 108 extending between the gingival end portions of the first connectors 106*a*, 106*b*. The attachment portions 140*a*, 140*b* are not connected by a first connector 104. In FIG. 5, all three of the connectors 106*a*, 106*b*, and 108 are generally linear, have a relatively large width w, and do not include any biasing portions. As a result, each of the connectors 106*a*, 106*b*, and 108 comprises a rigid connector (i.e., having an infinite stiffness coefficient k) such that the first and second teeth T1, T2 will not move relative to one another.

The attachment portions 140*a*, 140*b* utilized in a given connection configuration may have the same or different shape, size, and/or configuration, and may comprise any of the attachment portions, bracket connectors, and/or male connector elements disclosed herein, as well as any of the attachment portions, bracket connectors, and/or male connector elements disclosed in U.S. Pat. No. 10,383,707, filed Dec. 6, 2016, which is incorporated by reference herein in its entirety. Likewise, the appliance carrying the attachment portions 140*a*, 140*b* may be any of the appliances disclosed herein, as well as any of the appliances disclosed in U.S. Pat. No. 10,383,707, filed Dec. 6, 2016.

Figure 6:
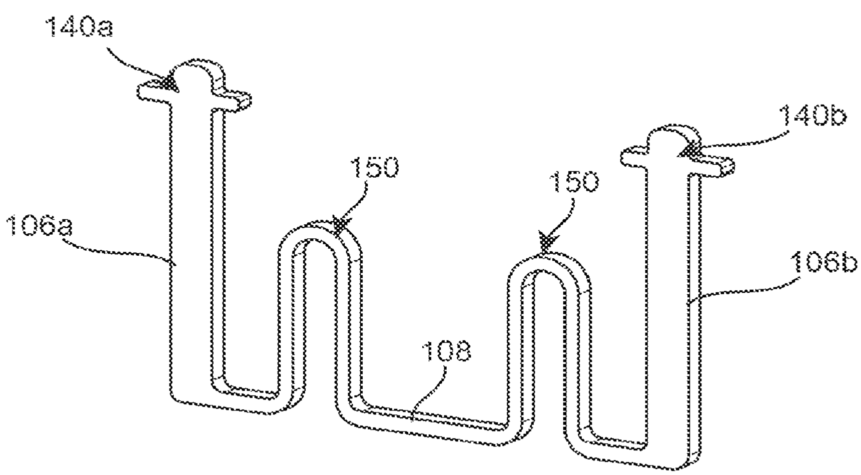
FIG. 6 is an isometric view of a connection configuration in accordance with examples of the present technology.

As shown in FIG. 6, the appliance 100 may include one or more connection configurations comprising a second connector 106*a* extending gingivally from a first attachment portion 140*a*, a second connector 106*b* extending gingivally from a second attachment portion 140*b*, and a third connector 108 extending between the gingival end portions of the first and second connectors 106*a*, 106*b*. The attachment portions 140*a*, 140*b* are not connected by a first connector 104. In FIG. 6, the second connectors 106*a*, 106*b* are generally linear, have a relatively large width w, and do not include any biasing portions. As a result, each of the second connectors 106*a*, 106*b* comprise a rigid connector (i.e., having an infinite stiffness coefficient k). The first connector 104, however, has a smaller width and two biasing portions 150 along its longitudinal axis. As a result, the first connector 104 has a positive, non-zero stiffness coefficient. Each of the biasing portions 150 comprise an open loop/U-shaped portion of the first connector 104 that extends in a generally occlusal direction such that each of the biasing portions 150 has a concave portion that faces in a gingival direction.

Figure 7:
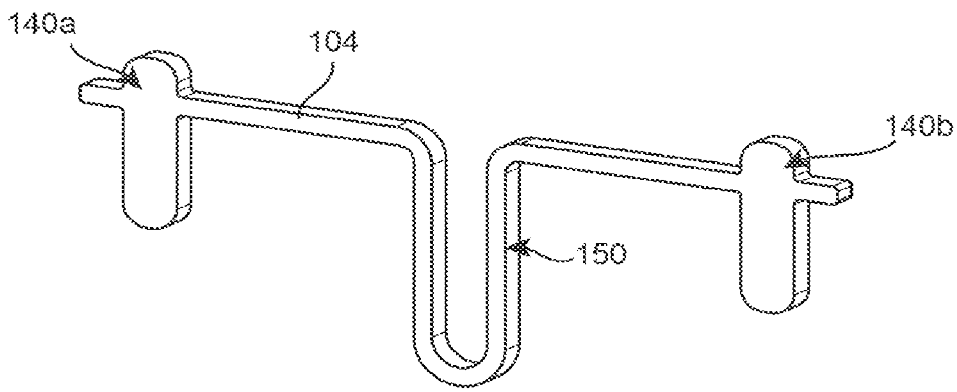
FIG. 7 is an isometric view of a connection configuration in accordance with examples of the present technology.

As shown in FIG. 7, the appliance 100 may include one or more connection configurations comprising a first connector 104 having a biasing portion 50 such that the first connector 104 has a non-zero, positive stiffness coefficient. As a result, the first connector 104 is relatively flexible and allows for movement between the first and second teeth T1, T2. The connection configuration of FIG. 7 does not include any second connectors or third connectors, and thus the attachment portions 140*a*, 140*b* (and associated teeth) are connected only by the first connector 104.

Figure 8:
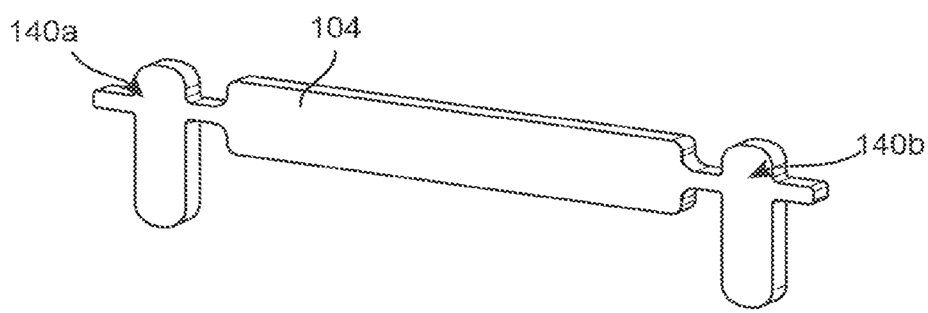
FIG. 8 is an isometric view of a connection configuration in accordance with examples of the present technology.

As shown in FIG. 8, in some embodiments, the appliance 100 may include one or more connection configurations comprising a first connector 104 that is generally rigid, for example as shown in FIG. 8. The first connector 104 does not have a biasing portion and has a relatively larger width. In contrast to the configuration of FIG. 7, the first connector 104 of FIG. 8 does not allow for relative movement between the teeth. Such a configuration may be beneficial, for example, when moving two or more teeth as a group, or when two or more teeth do not require any movement between the OTA and the FTA and so can be used to help anchor the anchor.

Figure 9:
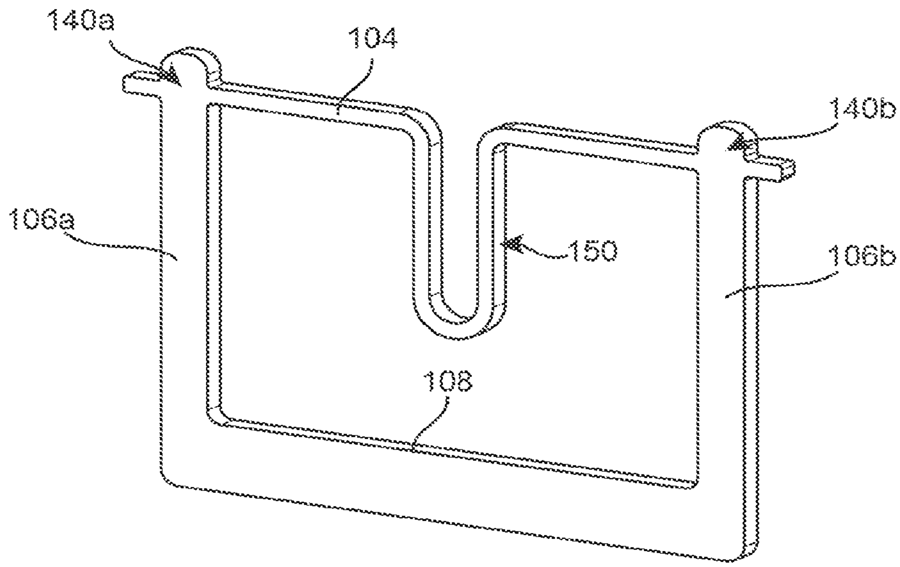
FIG. 9 is an isometric view of a connection configuration in accordance with examples of the present technology.

As shown in FIG. 9, the appliance 100 may include one or more connection configurations comprising a second connector 106*a* extending gingivally from a first attachment portion 140*a*, a second connector 106*b* extending gingivally from a second attachment portion 140*b*, a third connector 108 extending between the gingival end portions of the second connectors 106*a*, 106*b*, and a first connector 104 extending between the first and second attachment portions 140*a*, 140*b*. In FIG. 9, the second connector 106*a*, the second connector 106*b*, and the third connector 108 are generally linear, have a relatively large width w, and do not include any biasing portions. As a result, each of the connectors 106*a*, 106*b*, and 108 comprises a rigid connector (i.e., having an infinite stiffness coefficient k). The first connector 104 includes a single biasing portion 50 and thus has a non-zero, positive stiffness coefficient. However, the overwhelming rigidity provided by the second connector 106*a*, second connector 106*b*, and third connector 108 dictates that the first and second teeth T1, T2 will not move relative to one another.

Figure 10:
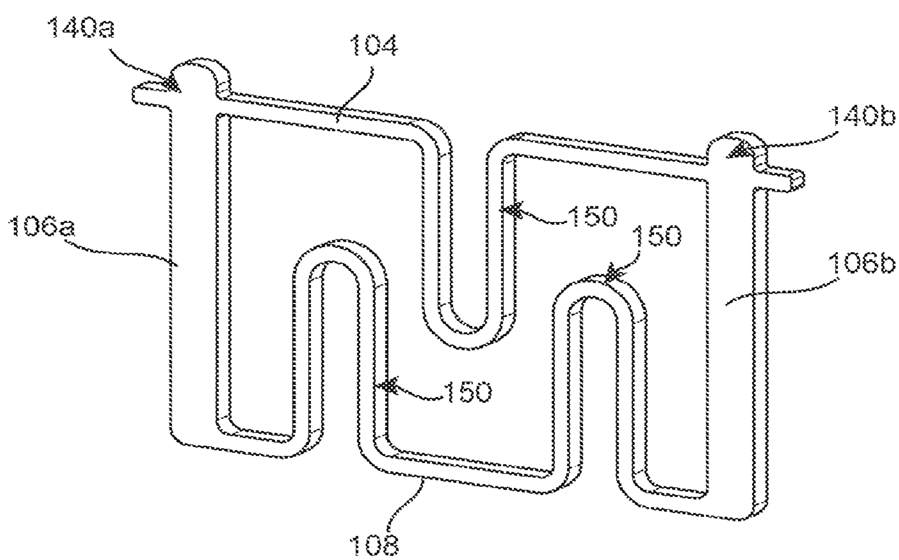
FIG. 10 is an isometric view of a connection configuration in accordance with examples of the present technology.

As shown in FIG. 10, the appliance 100 may include one or more connection configurations comprising a second connector 106*a* extending gingivally from a first attachment portion 140*a*, a second connector 106*b* extending gingivally from a second attachment portion 140*b*, a third connector 108 extending between the gingival end portions of the second connectors 106*a*, 106*b*, and a first connector 104 extending between the first and second attachment portions 140*a*, 140*b*. In FIG. 10, the second connector 106*a* and the second connector 106*b* are generally linear, have a relatively large width w, and do not include any biasing portions. As a result, each of the connectors 106*a*, 106*b* comprises a rigid connector (i.e., having an infinite stiffness coefficient k). The first connector 104 includes a single biasing portion 50 and thus has a non-zero, positive stiffness coefficient, and the third connector 108 includes two biasing portions 150 in series and thus also has a non-zero, positive stiffness coefficient.

Figure 11:
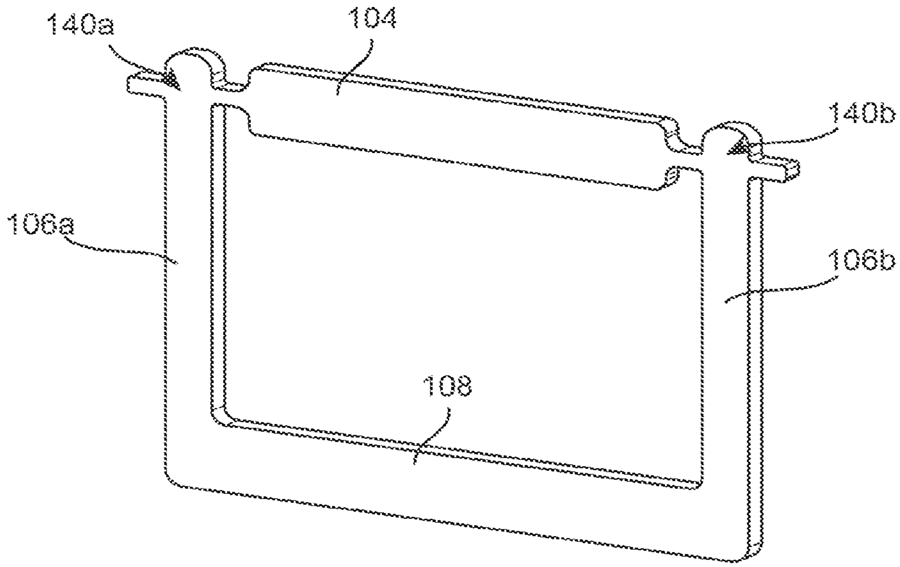
FIG. 11 is an isometric view of a connection configuration in accordance with examples of the present technology.

As shown in FIG. 11, the appliance 100 may include one or more connection configurations comprising a second connector 106*a* extending gingivally from a first attachment portion 140*a*, a second connector 106*b* extending gingivally from a second attachment portion 140*b*, a first connector 104 extending between the first and second attachment portions 140*a*, 140*b*, and a third connector 108 extending between the gingival end portions of the second connectors 106*a*, 106*b*. In FIG. 11, all of the connectors 106*a*, 106*b*, 108, and 104 are generally linear, have a relatively large width w, and do not include any biasing portions. As a result, each of the connectors 106*a*, 106*b*, 108, 104 comprises a rigid connector (i.e., having an infinite stiffness coefficient k) such that the first and second teeth T1, T2 will not move relative to one another.

Figure 12:
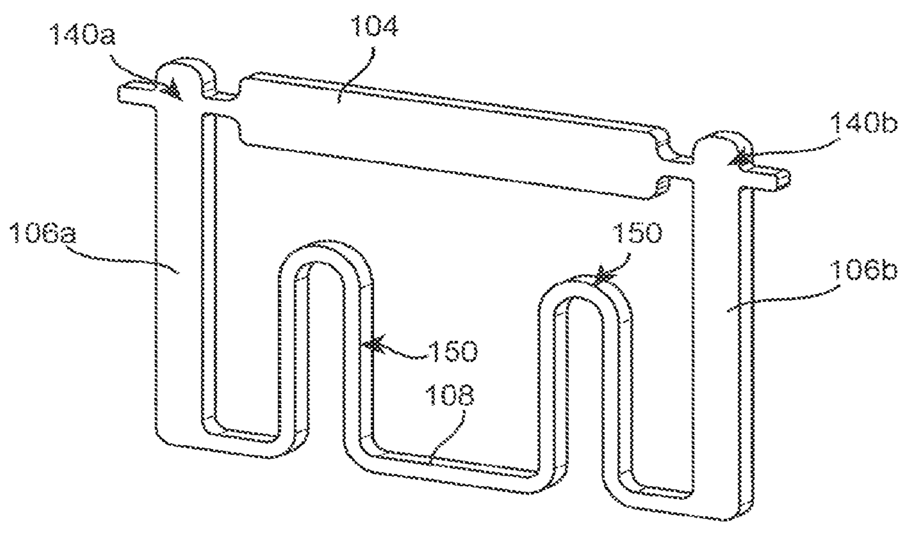
FIG. 12 is an isometric view of a connection configuration in accordance with examples of the present technology.

As shown in FIG. 12, the appliance 100 may include one or more connection configurations comprising a second connector 106*a* extending gingivally from a first attachment portion 140*a*, a second connector 106*b* extending gingivally from a second attachment portion 140*b*, a first connector 104 extending between the first and second attachment portions 140*a*, 140*b*, and a third connector 108 extending between the gingival end portions of the second connectors 106*a*, 106*b*. In FIG. 12, the second connector 106*a*, the second connector 106*b*, and the first connector 104 are generally linear, have a relatively large width w, and do not include any biasing portions. As a result, each of the connectors 106*a*, 106*b*, 104 comprises a rigid connector (i.e., having an infinite stiffness coefficient k). The third connector 108 has a relatively smaller width and two biasing portions 150 in series, and thus has a positive, non-zero stiffness coefficient. However, the overwhelming rigidity provided by the second connector 106*a*, second connector 106*b*, and first connector 104 dictates that the first and second teeth T1, T2 will not move relative to one another.

Figure 13:
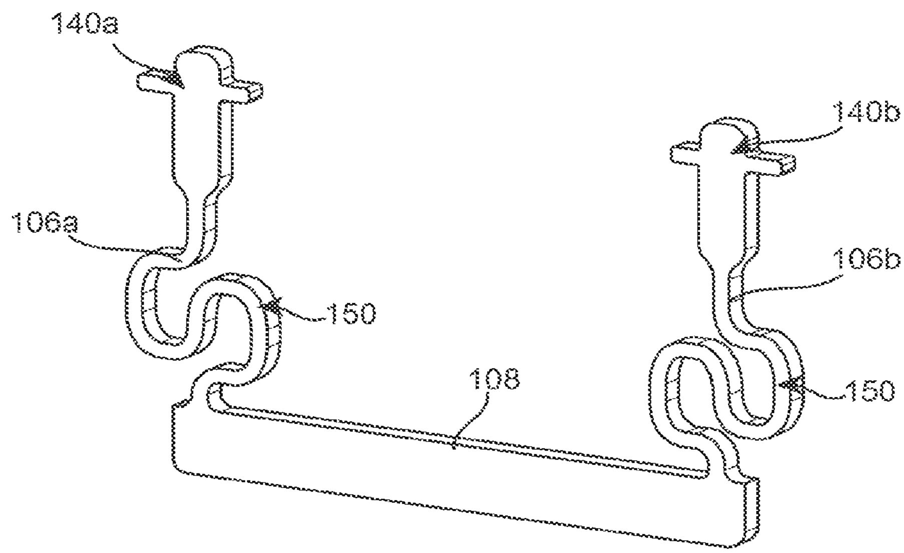
FIG. 13 is an isometric view of a connection configuration in accordance with examples of the present technology.

As shown in FIG. 13, the appliance 100 may include one or more connection configurations comprising a second connector 106*a* extending gingivally from a first attachment portion 140*a*, a second connector 106*b* extending gingivally from a second attachment portion 140*b*, and a third connector 108 extending between the gingival end portions of the second connectors 106*a*, 106*b*. The configuration does not include a first connector 104 extending between the attachment portions 140*a*, 140*b*. In FIG. 13, each of the second connector 106*a* and the second connector 106*b* comprise a single, S-shaped biasing portion 150 along their respective longitudinal axes, while the third connector 108 is generally linear, has a relatively large width w, and does not include any biasing portions. As a result, the third connector 108 comprises a rigid connector (i.e., having an infinite stiffness coefficient k). As a result, the first and second teeth T1, T2 can move relative to one another.

Figure 14:
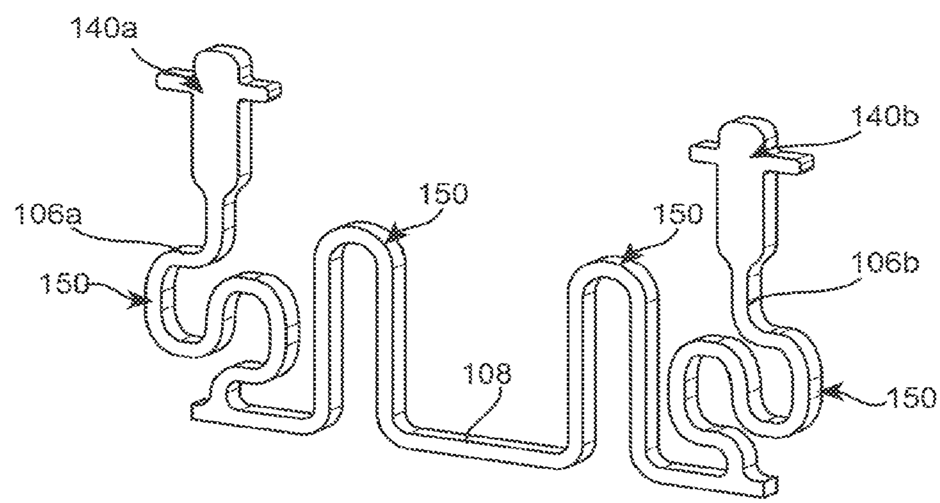
FIG. 14 is an isometric view of a connection configuration in accordance with examples of the present technology.

As shown in FIG. 14, the appliance 100 may include one or more connection configurations comprising a second connector 106*a* extending gingivally from a first attachment portion 140*a*, a second connector 106*b* extending gingivally from a second attachment portion 140*b*, and a third connector 108 extending between the gingival end portions of the second connectors 106*a*, 106*b*. The configuration does not include a first connector 104 extending between the attachment portions 140*a*, 140*b*. In FIG. 14, each of the second connector 106*a* and the second connector 106*b* comprise a single, S-shaped biasing portion 150 along their respective longitudinal axes, while the third connector 108 comprises two U-shaped biasing portions 150 in series. As a result, the first and second teeth T1, T2 can move relative to one another.

Figure 15:
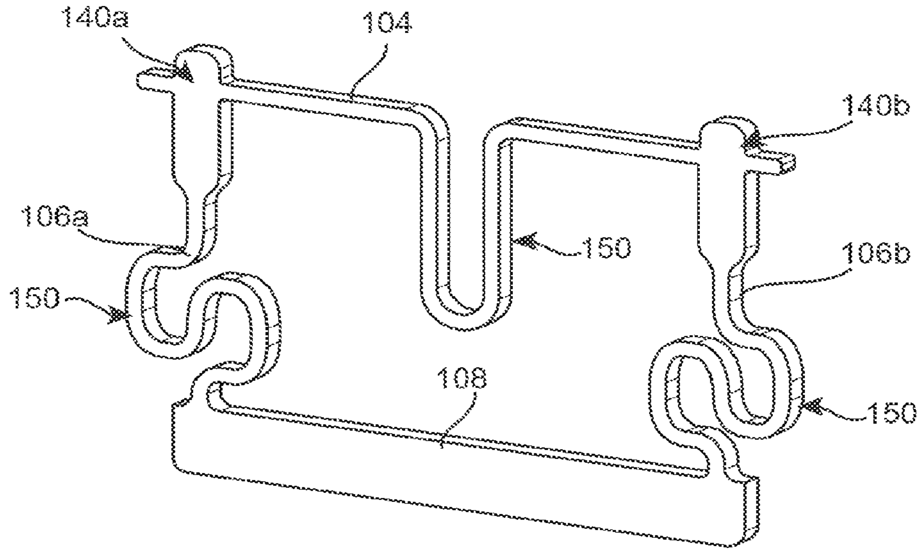
FIG. 15 is an isometric view of a connection configuration in accordance with examples of the present technology.

As shown in FIG. 15, the appliance 100 may include one or more connection configurations comprising a second connector 106*a* extending gingivally from a first attachment portion 140*a*, a second connector 106*b* extending gingivally from a second attachment portion 140*b*, a first connector 104 extending between the attachment portions 140*a*, 140*b*, and a third connector 108 extending between the gingival end portions of the second connectors 106*a*, 106*b*. In FIG. 15, each of the second connector 106*a* and the second connector 106*b* comprise a single, S-shaped biasing portion 150 along their respective longitudinal axes, and the first connector 104 comprises a single, U-shaped biasing portion 150. The third connector 108 is generally linear, has a relatively large width w, and does not include any biasing portions. As a result, the third connector 108 comprises a rigid connector (i.e., having an infinite stiffness coefficient k).

Figure 16:
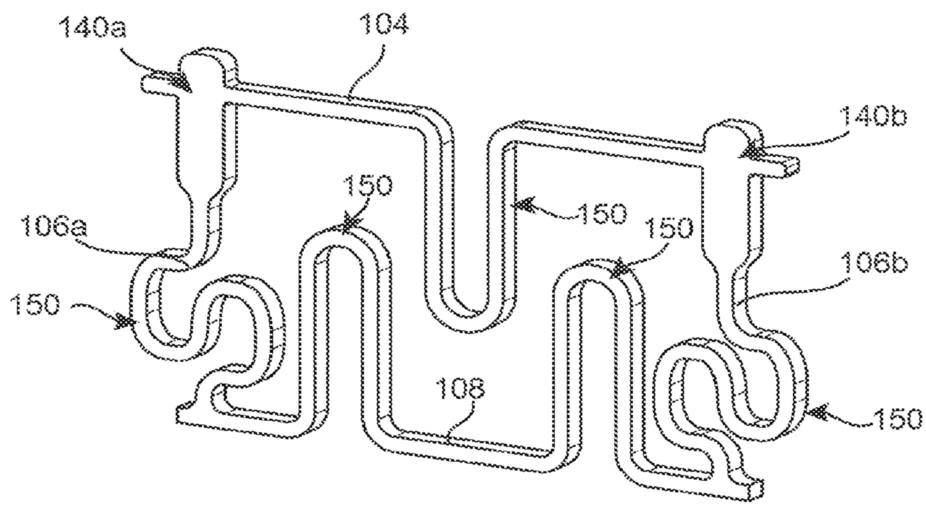
FIG. 16 is an isometric view of a connection configuration in accordance with examples of the present technology.

As shown in FIG. 16, the appliance 100 may include one or more connection configurations comprising a second connector 106*a* extending gingivally from a first attachment portion 140*a*, a second connector 106*b* extending gingivally from a second attachment portion 140*b*, a first connector 104 extending between the attachment portions 140*a*, 140*b*, and a third connector 108 extending between the gingival end portions of the second connectors 106*a*, 106*b*. In FIG. 16, each of the second connector 106*a* and the second connector 106*b* comprise a single, S-shaped biasing portion 150 along their respective longitudinal axes, the first connector 104 comprises a single, U-shaped biasing portion 150, and the third connector 108 comprises two, U-shaped biasing portions 150 in series. The U-shaped biasing portion 150 of the first connector 104 may be concave in an occlusal direction while both of the U-shaped biasing portions 150 of the third connector 108 may be concave in a gingival direction.

Figure 17:
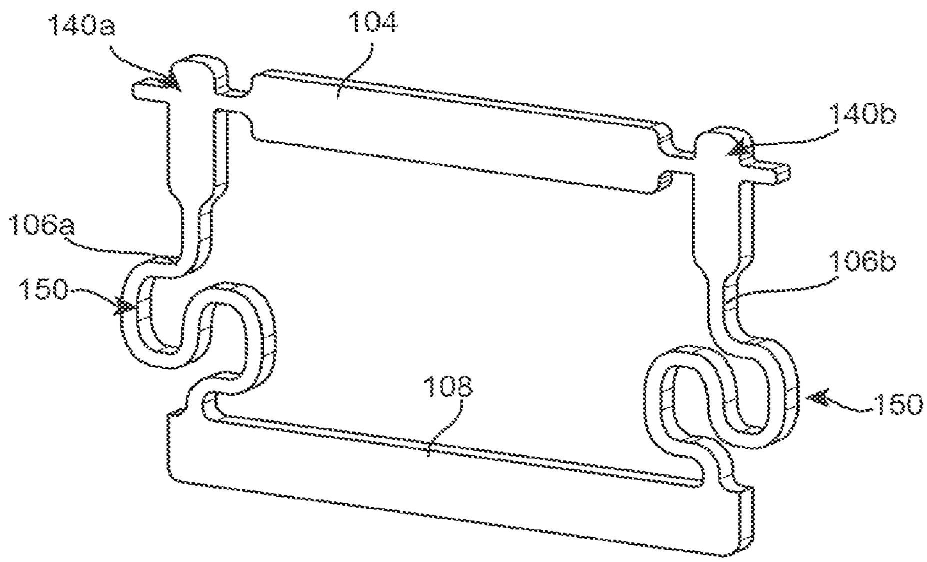
FIG. 17 is an isometric view of a connection configuration in accordance with examples of the present technology.

As shown in FIG. 17, the appliance 100 may include one or more connection configurations comprising a second connector 106*a* extending gingivally from a first attachment portion 140*a*, a second connector 106*b* extending gingivally from a second attachment portion 140*b*, a first connector 104 extending between the attachment portions 140*a*, 140*b*, and a third connector 108 extending between the gingival end portions of the second connectors 106*a*, 106*b*. In FIG. 17, each of the second connectors 106*a*, 106*b* may comprise a single, S-shaped biasing portion 150 along their respective longitudinal axes, while the first connector 104 and the third connector 108 are generally linear, have a relatively large width w, and do not include any biasing portions. As a result, each of the first and third connectors 104, 108 comprise a rigid connector (i.e., having an infinite stiffness coefficient k).

Figure 18:
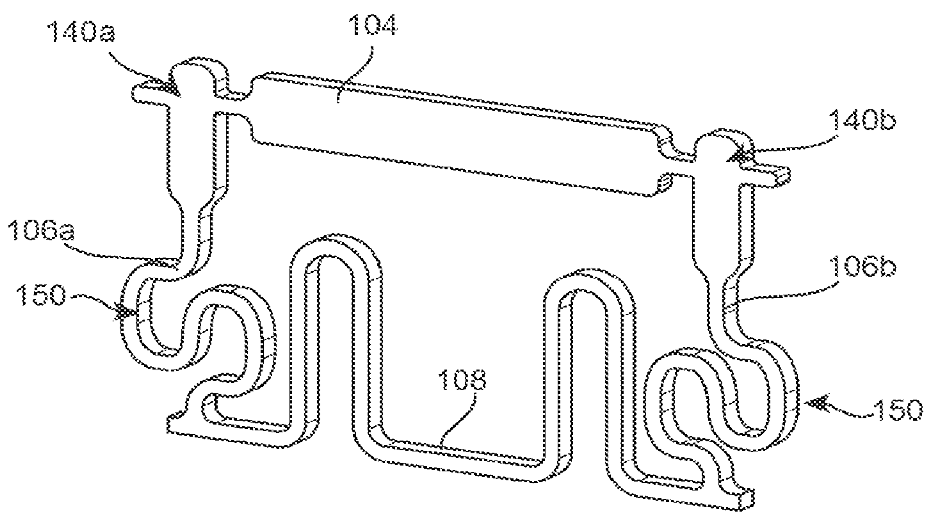
FIG. 18 is an isometric view of a connection configuration in accordance with examples of the present technology.

As shown in FIG. 18, the appliance 100 may include one or more connection configurations comprising a second connector 106*a* extending gingivally from a first attachment portion 140*a*, a second connector 106*b* extending gingivally from a second attachment portion 140*b*, a first connector 104 extending between the attachment portions 140*a*, 140*b*, and a third connector 108 extending between the gingival end portions of the second connectors 106*a*, 106*b*. In FIG. 18, each of the second connector 106*a* and the second connector 106*b* comprise a single, S-shaped biasing portion 150 along their respective longitudinal axes, and the third connector 108 comprises two, U-shaped biasing portions 150 in series. The U-shaped biasing portions 150 of the third connector 108 may be concave in a gingival direction. The first connector 104 is generally linear, has a relatively large width w, and does not include any biasing portions. As a result, the first connector 104 comprises a rigid connector (i.e., having an infinite stiffness coefficient k).

Figure 19:
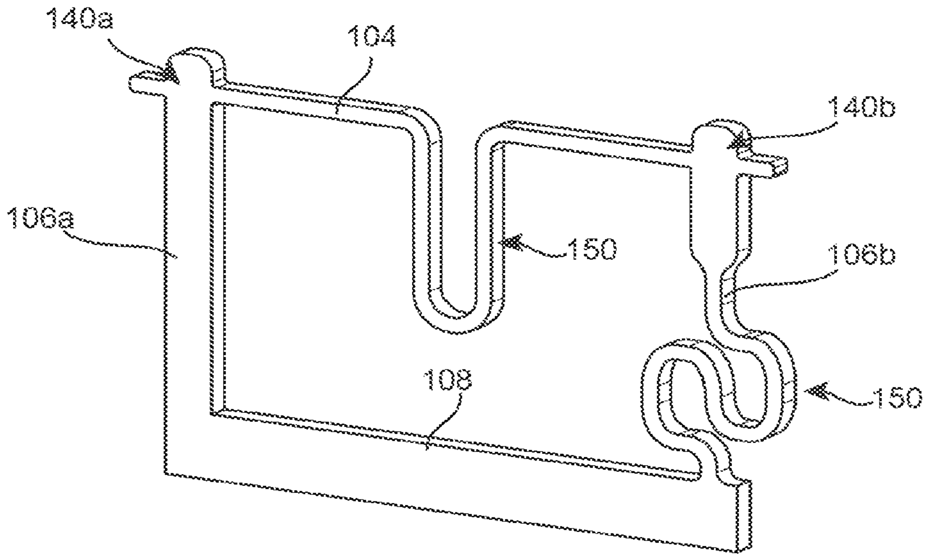
FIG. 19 is an isometric view of a connection configuration in accordance with examples of the present technology.

As shown in FIG. 19, the appliance 100 may include one or more connection configurations comprising a second connector 106*a* extending gingivally from a first attachment portion 140*a*, a second connector 106*b* extending gingivally from a second attachment portion 140*b*, a first connector 104 extending between the attachment portions 140*a*, 140*b*, and a third connector 108 extending between the gingival end portions of the second connectors 106*a*, 106*b*. In FIG. 19, the second connector 106*b* comprises a single, S-shaped biasing portion 150 along its respective longitudinal axis, and the first connector 104 comprises a single, U-shaped biasing portion 150. The second connector 106*a* and the third connector 108 are generally linear, have a relatively large width w, and do not include any biasing portions. As a result, each of the second connector 106*a* and the third connector 108 comprise a rigid connector (i.e., having an infinite stiffness coefficient k).

Figure 20:
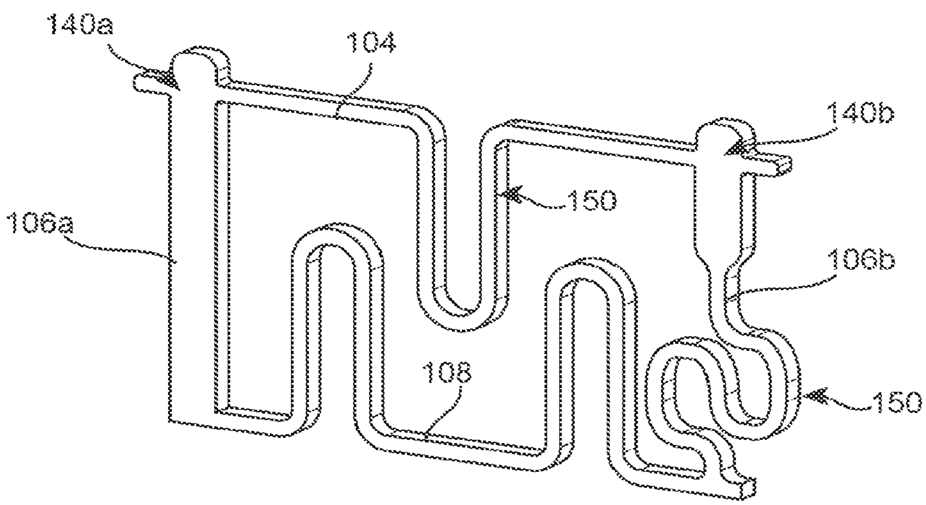
FIG. 20 is an isometric view of a connection configuration in accordance with examples of the present technology.

As shown in FIG. 20, the appliance 100 may include one or more connection configurations comprising a second connector 106*a* extending gingivally from a first attachment portion 140*a*, a second connector 106*b* extending gingivally from a second attachment portion 140*b*, a first connector 104 extending between the attachment portions 140*a*, 140*b*, and a third connector 108 extending between the gingival end portions of the second connectors 106*a*, 106*b*. In FIG. 20, the second connector 106*b* comprises a single, S-shaped biasing portion 150 along its respective longitudinal axis, the first connector 104 comprises a single, U-shaped biasing portion 150, and the third connector 108 comprises two, U-shaped biasing portions 150 in series. The U-shaped biasing portion 150 of the first connector 104 may be concave in an occlusal direction while both of the U-shaped biasing portions 150 of the third connector 108 may be concave in a gingival direction. The second connector 106*a* is generally linear, has a relatively large width w, and does not include any biasing portions. As a result, the second connector 106*a* comprises a rigid connector (i.e., having an infinite stiffness coefficient k).

Figure 21:
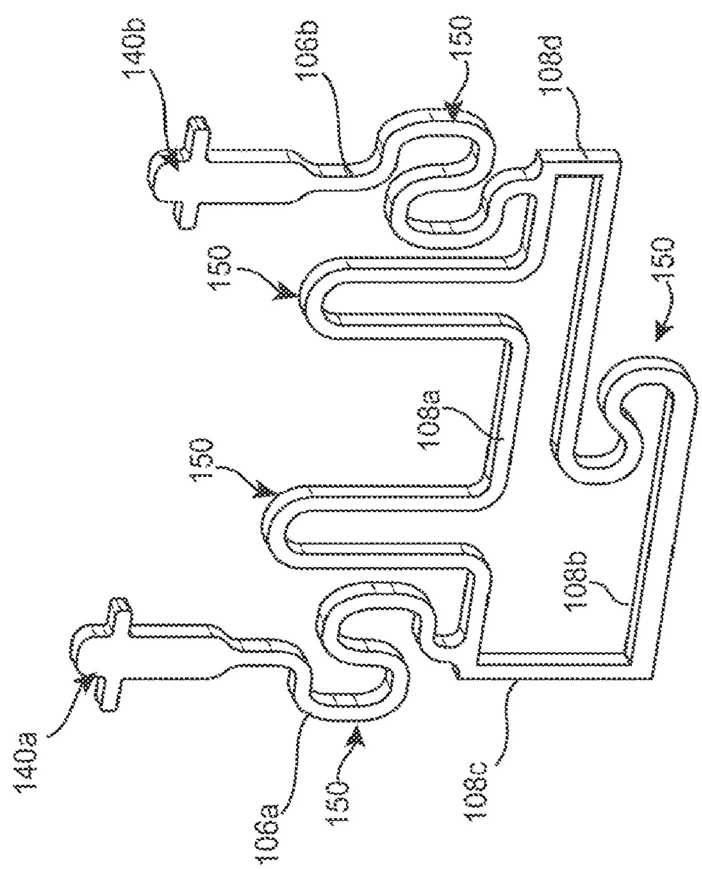
FIG. 21 is an isometric view of a connection configuration in accordance with examples of the present technology.

As shown in FIG. 21, the appliance 100 may include one or more connection configurations comprising a second connector 106*a* extending gingivally from a first attachment portion 140*a*, a second connector 106*b* extending gingivally from a second attachment portion 140*b*, and a third connector 108*a* extending between the gingival end portions of the second connectors 106*a*, 106*b*. The configuration shown in FIG. 21 does not include a first connector 104 extending between the attachment portions 140*a*, 140*b*, and does not include any rigid connectors. Each of the second connectors 106*a*, 106*b* may comprise a single, S-shaped biasing portion 150 along their respective longitudinal axes, and the third connector 108*a* may comprise two, U-shaped biasing portions 150 in series. Both of the U-shaped biasing portions 150 of the third connector 108*a* may be concave in a gingival direction. In some embodiments, one or both of the biasing portions 150 of third connector 108*a* are concave in an occlusal direction. The connection configuration shown in FIG. 21 further includes a third connector 108*c* extending gingivally from a gingival end portion of the second connector 106, a third connector 108*d* extending gingivally from a gingival end portion of the second connector 106*b*, and a third connector 108*b* extending between the gingival end portions of third connectors 108*c*, 108*d*. The entire length of the third connector 108*b* may be gingival to the entire length of third connector 108*a*. The third connector 108*b* may include a single, S-shaped biasing portion 150 with opposing concavities facing in a mesial direction and a distal direction, respectively, such that the third connector 108*b* comprises two generally linear portions spaced apart from one another in the occlusogingival direction. The third connectors 108*a*-108*d* together enclose a cell.

Figure 22:
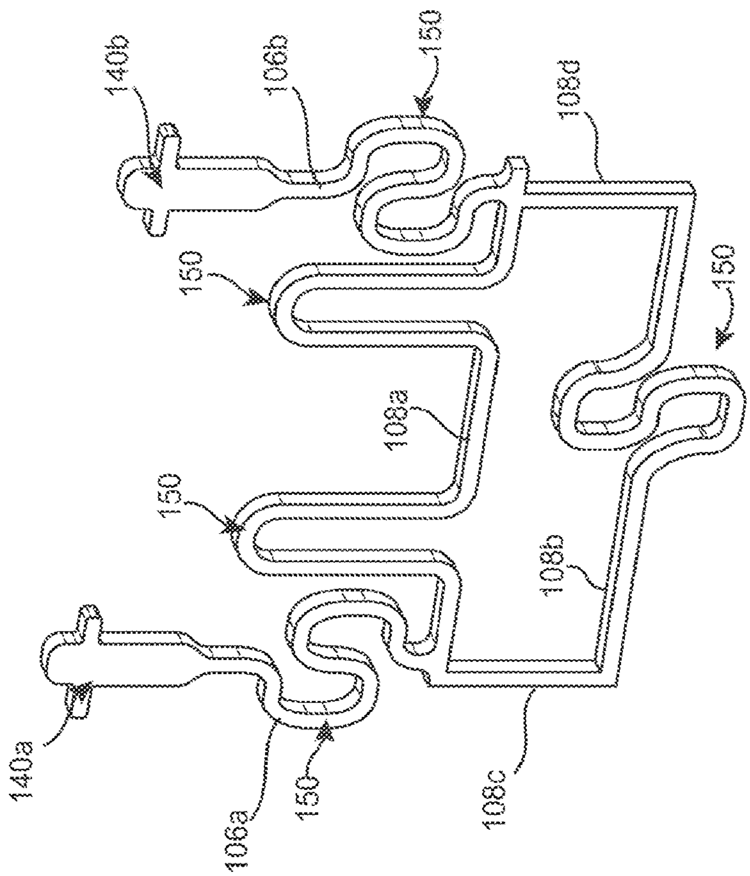
FIG. 22 is an isometric view of a connection configuration in accordance with examples of the present technology.

As shown in FIG. 22, the appliance 100 may include one or more connection configurations comprising a second connector 106*a* extending gingivally from a first attachment portion 140*a*, a second connector 106*b* extending gingivally from a second attachment portion 140*b*, and a third connector 108*a* extending between the gingival end portions of the second connectors 106*a*, 106*b*. The configuration shown in FIG. 22 does not include a first connector 104 extending between the attachment portions 140*a*, 140*b*, and does not include any rigid connectors. Each of the second connectors 106*a*, 106*b* may comprise a single, S-shaped biasing portion 150 along their respective longitudinal axes, and the third connector 108*a* may comprise two, U-shaped biasing portions 150 in series. Both of the U-shaped biasing portions 150 of the third connector 108*a* may be concave in a gingival direction. In some embodiments, one or both of the biasing portions 150 of third connector 108*a* are concave in an occlusal direction. The connection configuration shown in FIG. 22 further includes a third connector 108*c* extending gingivally from a gingival end portion of the second connector 106, a third connector 108*d* extending gingivally from a gingival end portion of the second connector 106*b*, and a third connector 108*b* extending between the gingival end portions of third connectors 108*c*, 108*d*. The entire length of the third connector 108*b* may be gingival to the entire length of third connector 108*a*. The third connector 108*b* may include a single, vertically-oriented S-shaped biasing portion 150 with two generally linear portions on either side that are generally aligned with one another along an occlusogingival dimension. The third connectors 108*a*-108*d* together enclose a cell.

Figure 23:
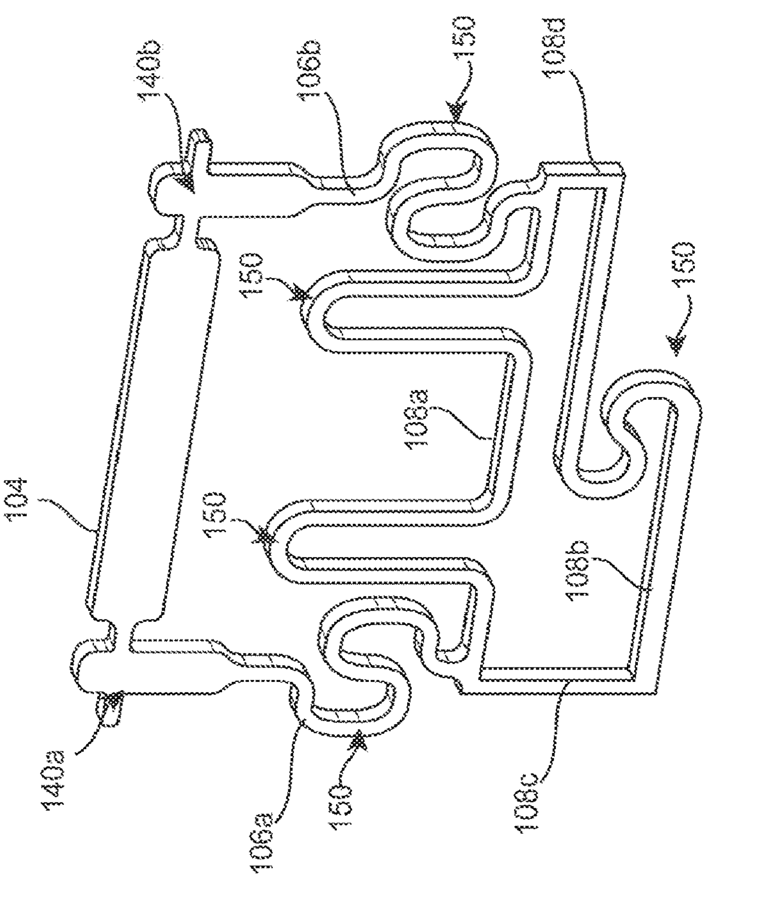
FIG. 23 is an isometric view of a connection configuration in accordance with examples of the present technology.

As shown in FIG. 23, the appliance 100 may include one or more connection configurations comprising a second connector 106*a* extending gingivally from a first attachment portion 140*a*, a second connector 106*b* extending gingivally from a second attachment portion 140*b*, a third connector 108*a* extending between the gingival end portions of the second connectors 106*a*, 106*b*, and a rigid first connector 104 extending between the first and second attachment portions 140*a*, 140*b*. Each of the second connectors 106*a*, 106*b* comprise a single, S-shaped biasing portion 150 along their respective longitudinal axes, and the third connector 108*a* comprises two, U-shaped biasing portions 150 in series. Both of the U-shaped biasing portions 150 of the third connector 108 may be concave in a gingival direction. In some embodiments, the U-shaped biasing portions 150 may be concave in an occlusal direction. The first connector 104 may be generally linear, has a relatively large width w, and does not include any biasing portions. The connection configuration shown in FIG. 23 further includes a third connector 108*c* extending gingivally from a gingival end portion of the second connector 106*a*, a third connector 108*d* extending gingivally from a gingival end portion of the second connector 106*b*, and a third connector 108*b* extending between the gingival end portions of the third connectors 108*c*, 108*d*. The entire length of the third connector 108*b* may be gingival to the entire length of third connector 108*a*. The third connector 108*b* may include a single, S-shaped biasing portion 150 with opposing concavities facing in a mesial direction and a distal direction, respectively, such that the third connector 108*b* comprises two generally linear portions spaced apart from one another in the occlusogingival direction. The third connectors 108*a*-108*d* together enclose a cell.

Figure 24:
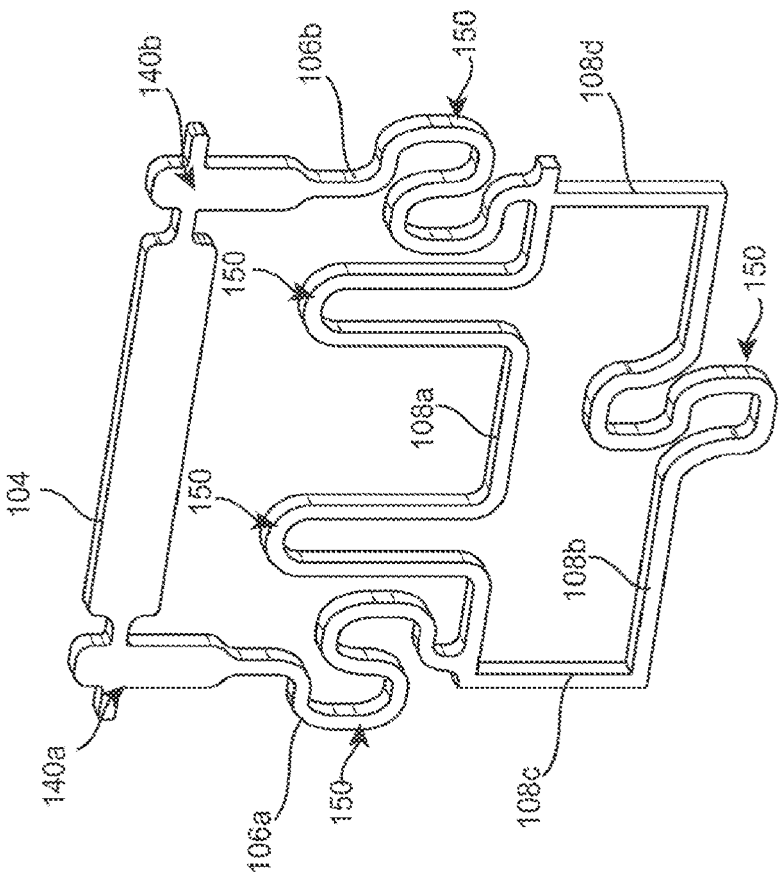
FIG. 24 is an isometric view of a connection configuration in accordance with examples of the present technology.

As shown in FIG. 24, the appliance 100 may include one or more connection configurations comprising a flexible second connector 106*a* extending gingivally from a first attachment portion 140*a*, a flexible second connector 106*b* extending gingivally from a second attachment portion 140*b*, a flexible third connector 108*a* extending between the gingival end portions of the second connectors 106*a*, 106*b*, and a rigid first connector 104 extending between the first and second attachment portions 140*a*, 140*b*. Each of the second connectors 106*a*, 106*b* may comprise a single, S-shaped biasing portion 150 along their respective longitudinal axes, and the third connector 108*a* may comprise two, U-shaped biasing portions 150 in series. Both of the U-shaped biasing portions 150 of the third connector 108*a* may be concave in a gingival direction. In some embodiments, one or both of the U-shaped biasing portions 150 of the third connector 108*a* may be concave in an occlusal direction. The first connector 104 is generally linear, has a relatively large width w, and does not include any biasing portions. The connection configuration shown in FIG. 24 further includes a third connector 108*c* extending gingivally from a gingival end portion of the second connector 106*a*, a third connector 108*d* extending gingivally from a gingival end portion of the second connector 106*b*, and a third connector 108*b* extending between the gingival end portions of the third connectors 108*c*, 108*d*. The third connector 108*b* may include a single, vertically-oriented S-shaped biasing portion 150 with two generally linear portions on either side that are generally aligned with one another along an occlusogingival dimension. The entire length of the third connector 108*b* may be gingival to the entire length of third connector 108*a*. The third connectors 108*a*-108*d* together enclose a cell.

Figure 25:
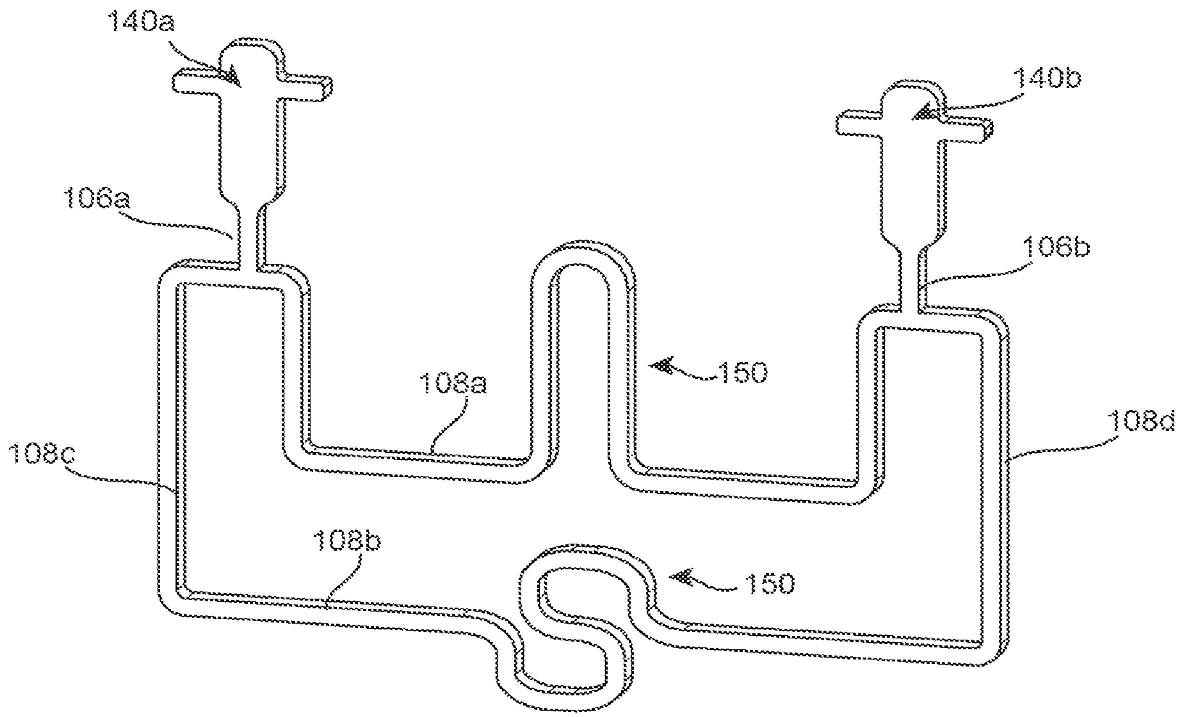
FIG. 25 is an isometric view of a connection configuration in accordance with examples of the present technology.
Figure 26:
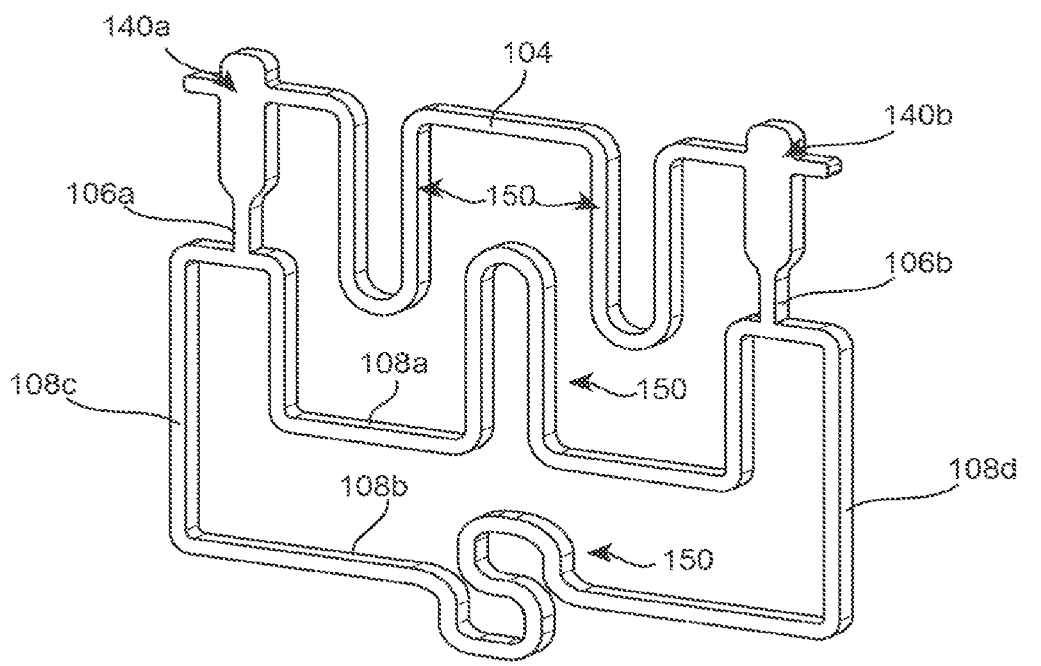
FIG. 26 is an isometric view of a connection configuration in accordance with examples of the present technology.
Figure 27:
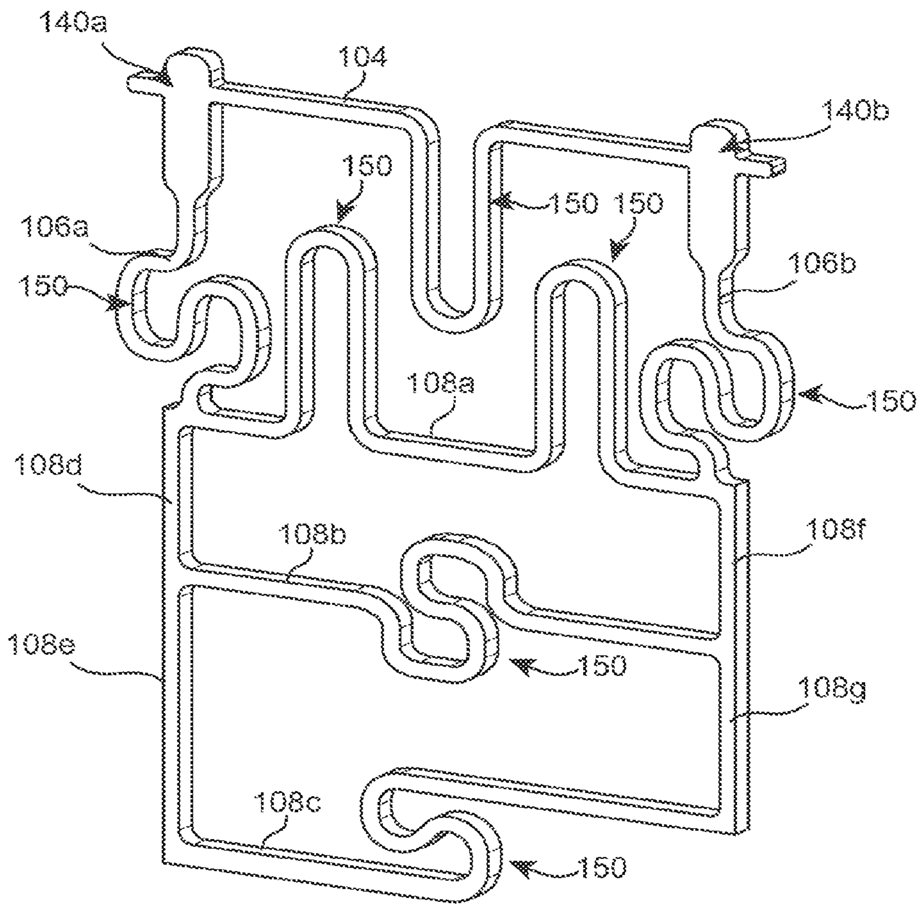
FIG. 27 is an isometric view of a connection configuration in accordance with examples of the present technology.
Figure 29:
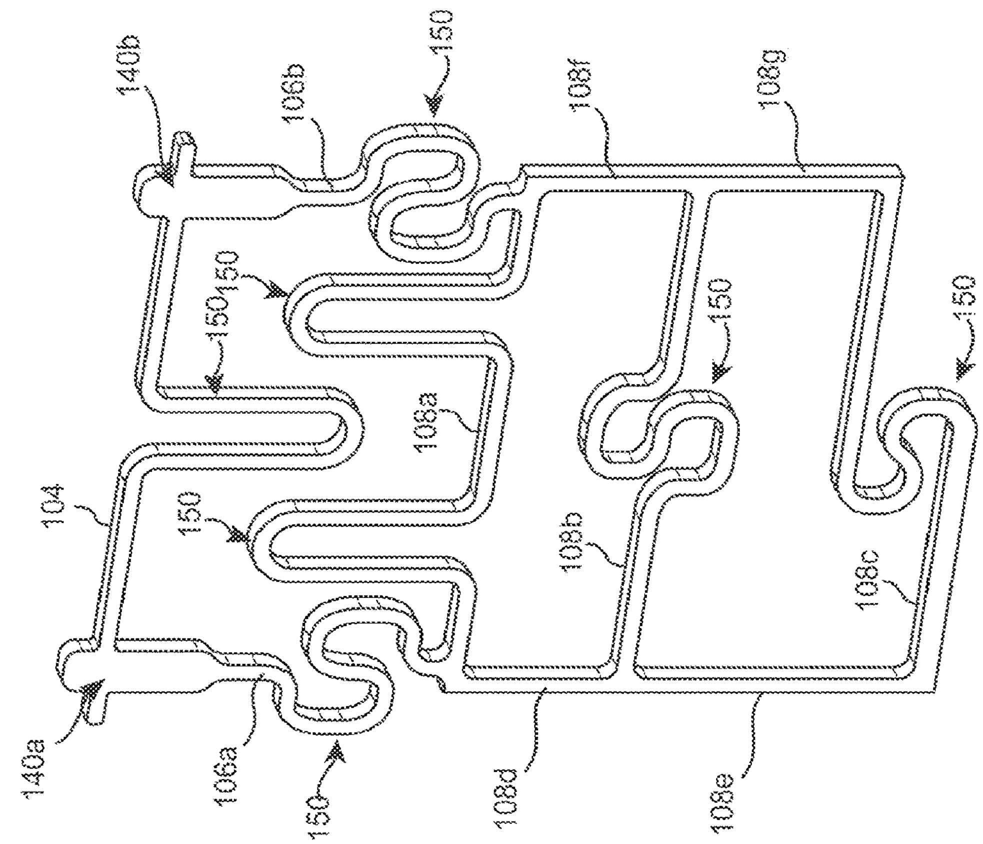
FIG. 29 is an isometric view of a connection configuration in accordance with examples of the present technology.
Figure 28:
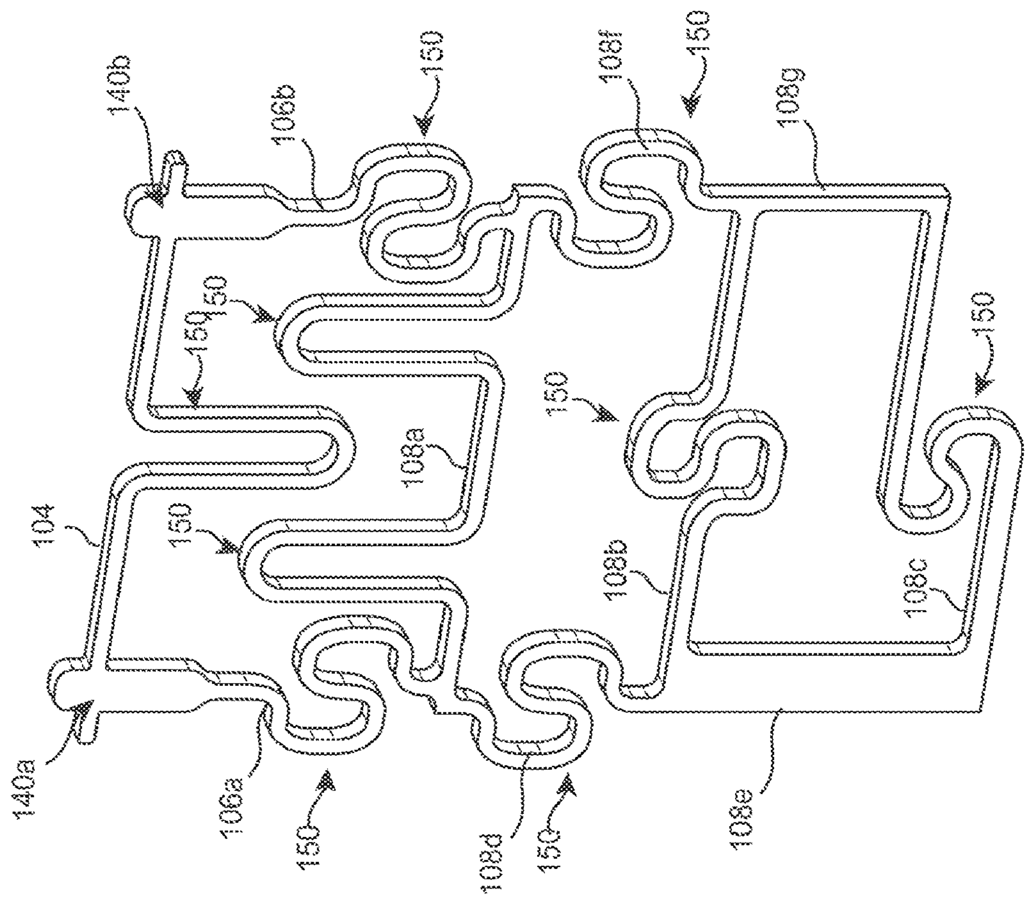
FIG. 28 is an isometric view of a connection configuration in accordance with examples of the present technology.
Figure 30:
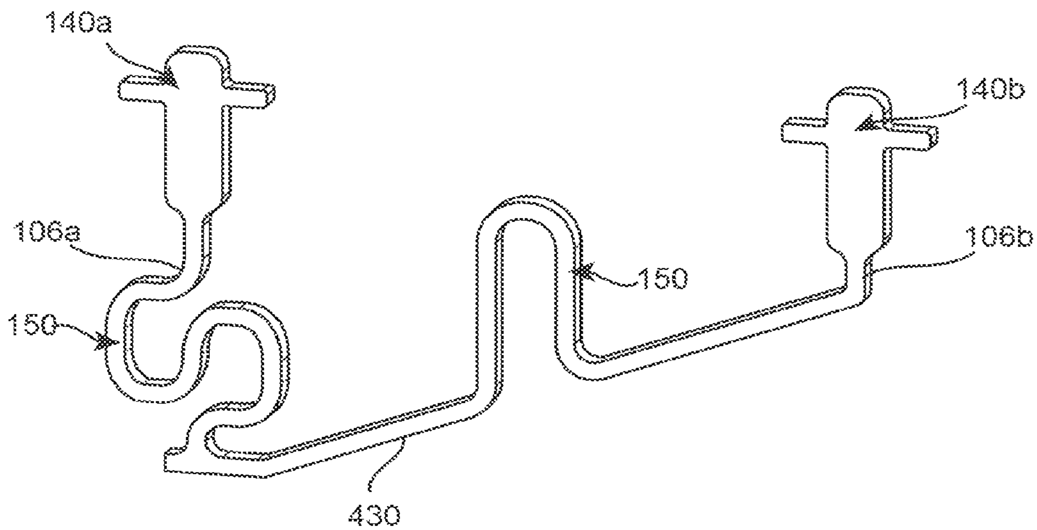
FIG. 30 is an isometric view of a connection configuration in accordance with examples of the present technology.
Figure 31:
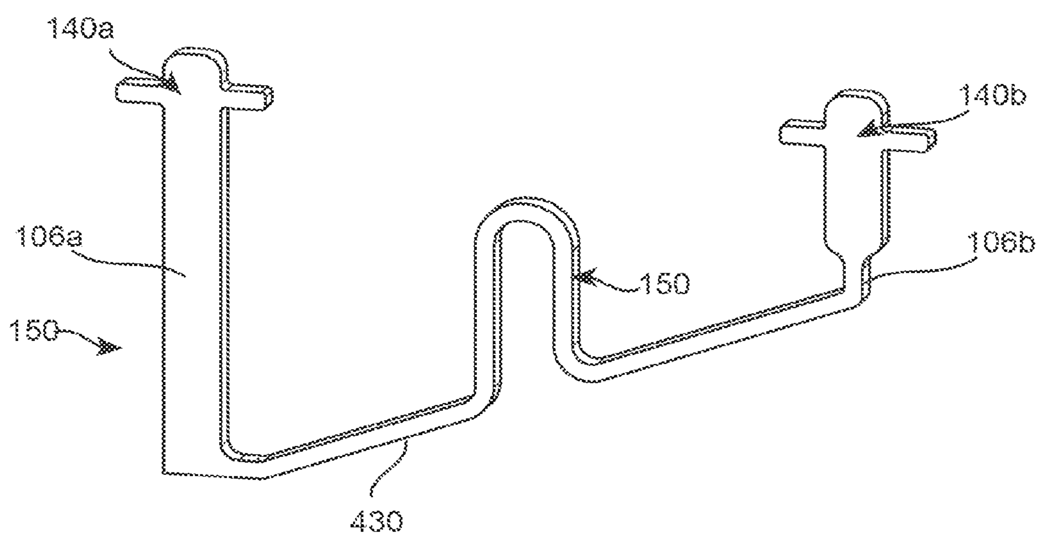
FIG. 31 is an isometric view of a connection configuration in accordance with examples of the present technology.
Figure 32:
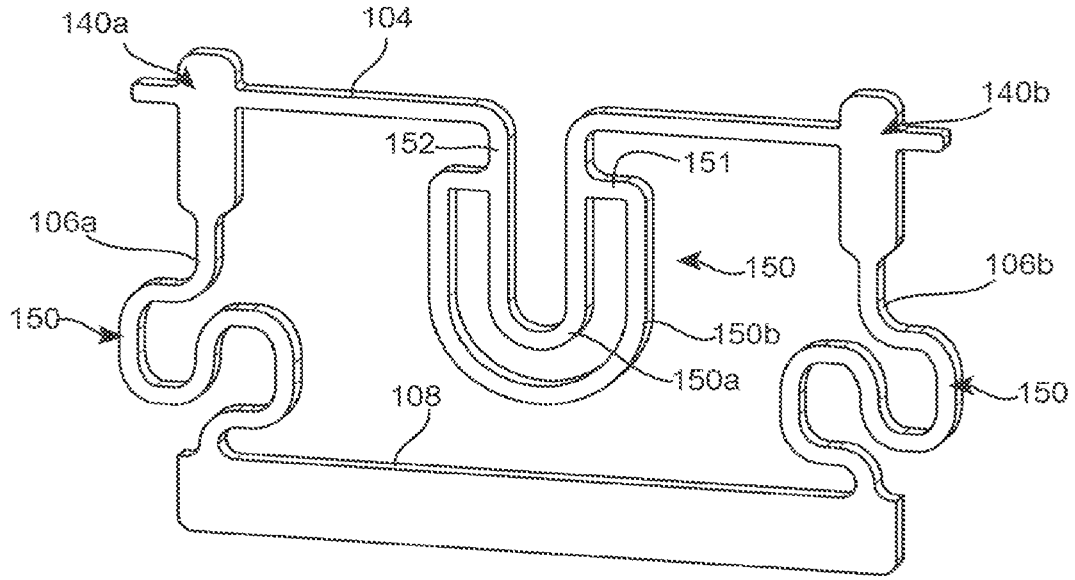
FIG. 32 is an isometric view of a connection configuration in accordance with examples of the present technology.
Figure 33:
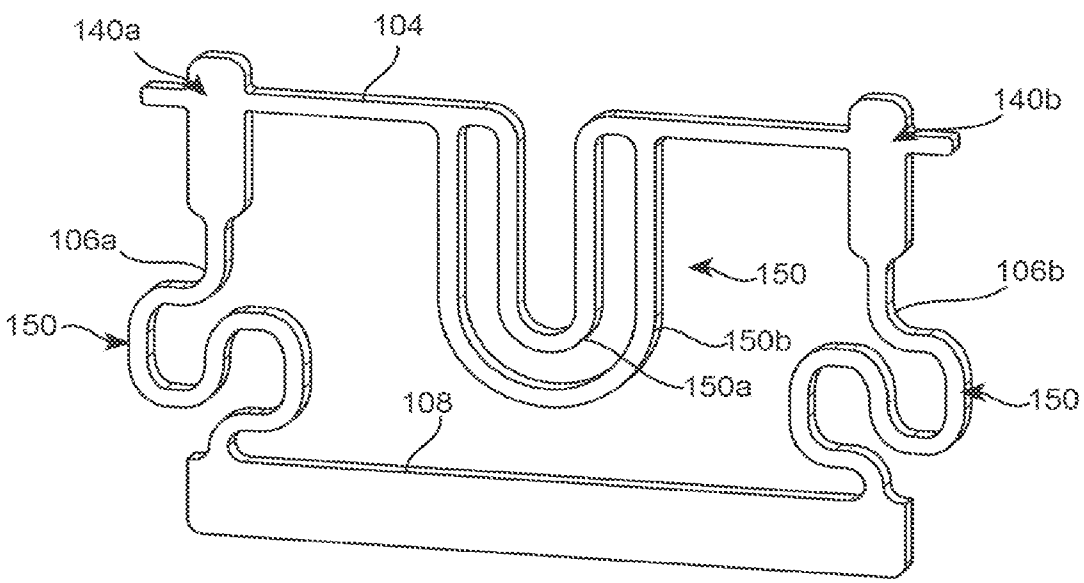
FIG. 33 is an isometric view of a connection configuration in accordance with examples of the present technology.

As shown in FIG. 25, the appliance 100 may include one or more connection configurations comprising a second connector 106*a* extending gingivally from a first attachment portion 140*a*, a second connector 106*b* extending gingivally from a second attachment portion 140*b*, and a third connector 108*a* extending between the gingival end portions of the second connectors 106*a*, 106*b*. The configuration shown in FIG. 25 does not include a first connector 104 extending between the attachment portions 140*a*, 140*b*, and does not include any rigid connectors. Each of the second connectors 106*a*, 106*b* may comprise relatively short segments. The third connector 108*a* may comprise a single U-shaped biasing portion 150 that is concave in a gingival direction. In some embodiments, the biasing portions 150 of third connector 108*a* is concave in an occlusal direction. The connection configuration shown in FIG. 25 further includes a third connector 108*c* extending gingivally from a gingival end portion of the second connector 106*a*, a third connector 108*d* extending gingivally from a gingival end portion of the second connector 106*b*, and a third connector 108*b* extending between the gingival end portions of third connectors 108*c*, 108*d*. In contrast to the configuration shown in FIG. 24, for example, only a portion of the length of the third connector 108*b* may be gingival to the entire length of third connector 108*a*. The third connector 108*b* may include a single, vertically-oriented S-shaped biasing portion 150 with two generally linear portions on either side that are generally aligned with one another along an occlusogingival dimension. The third connectors 108*a*-108*d* together enclose a cell.

FIGS. 25-33 depict several additional example configurations, labeled in accordance with the present technology.

Figure 34:
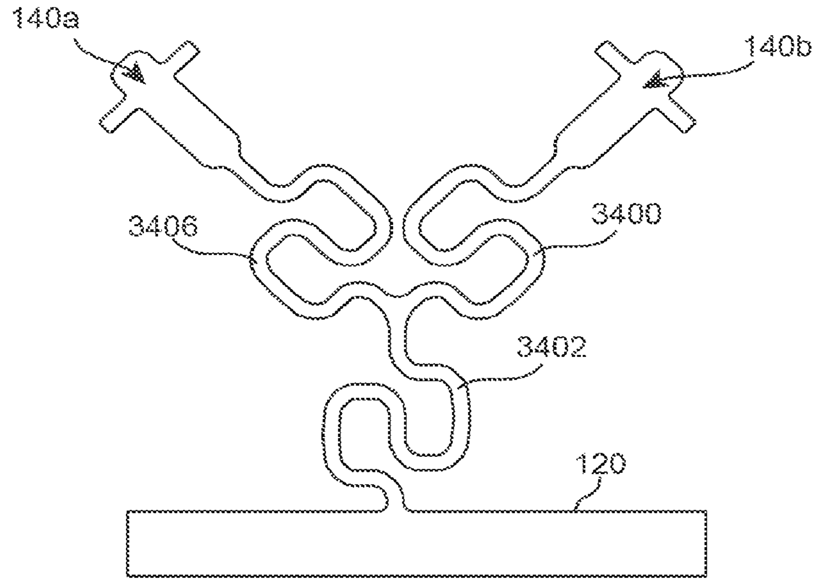
FIG. 34 is an isometric view of a connection configuration in accordance with examples of the present technology.
Figure 35:
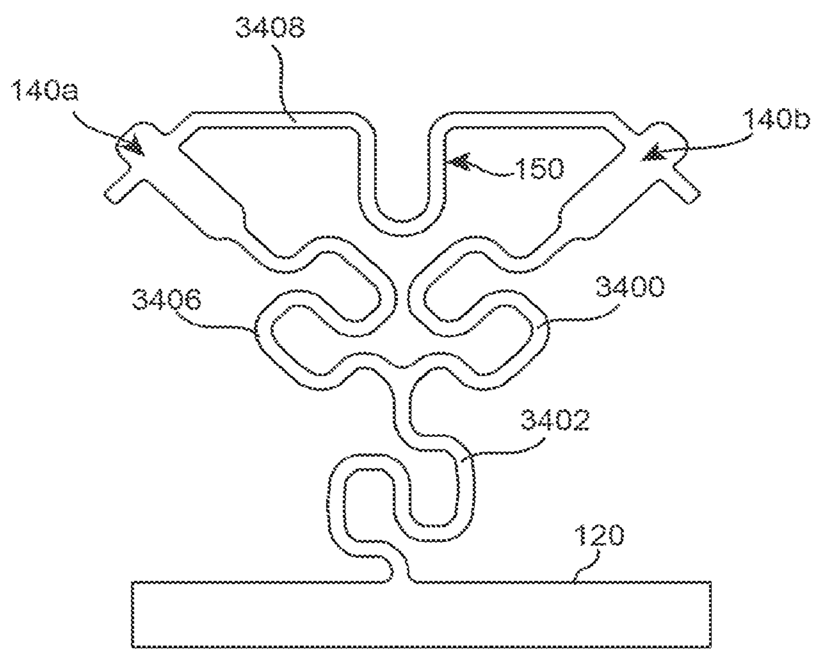
FIG. 35 is an isometric view of a connection configuration in accordance with examples of the present technology.

As shown in FIG. 34, in some embodiments the appliance 100 may include a portion in which a single, flexible third connector 3402 extends from the anchor 120 (or another more rigid third connector 108) and splits into two flexible second connectors 3406, 3400, each of which terminates at a corresponding attachment portion 140*a*, 140*b*. The third connector 3402 and each of the second connectors 3406, 3400 may include a biasing portion (as shown). In some embodiments, the third connector 3402 and/or one or both second connectors 3406, 3000 do not include a biasing portion and/or are rigid.

It will be appreciated that the first connectors 104, second connectors 106, third connectors 108, and other connectors of the present technology may include zero, three, four, five, six, or more biasing portions. Likewise, even though a particular connector may be shown or described with a particular type of biasing portion, it will be appreciated that the connectors can have any type of shape or biasing portion.

In some embodiments one or more of the arms of the appliance 100 may comprise multiple second connectors 106 extending from another more rigid connector to the same attachment portion 140. The use of two or more connectors to connect two points on the appliance 100 (such as the anchor and an attachment portion) enables application of a greater force (relative to a single connector connecting the same points) without increasing the strain on the individual connectors. Such a configuration is especially beneficial given the spatial constraints of the fixed displacement treatments herein. Additional details regarding the use of multiple connectors for a discrete connection (such as an arm) are provided below.

Figure 36:
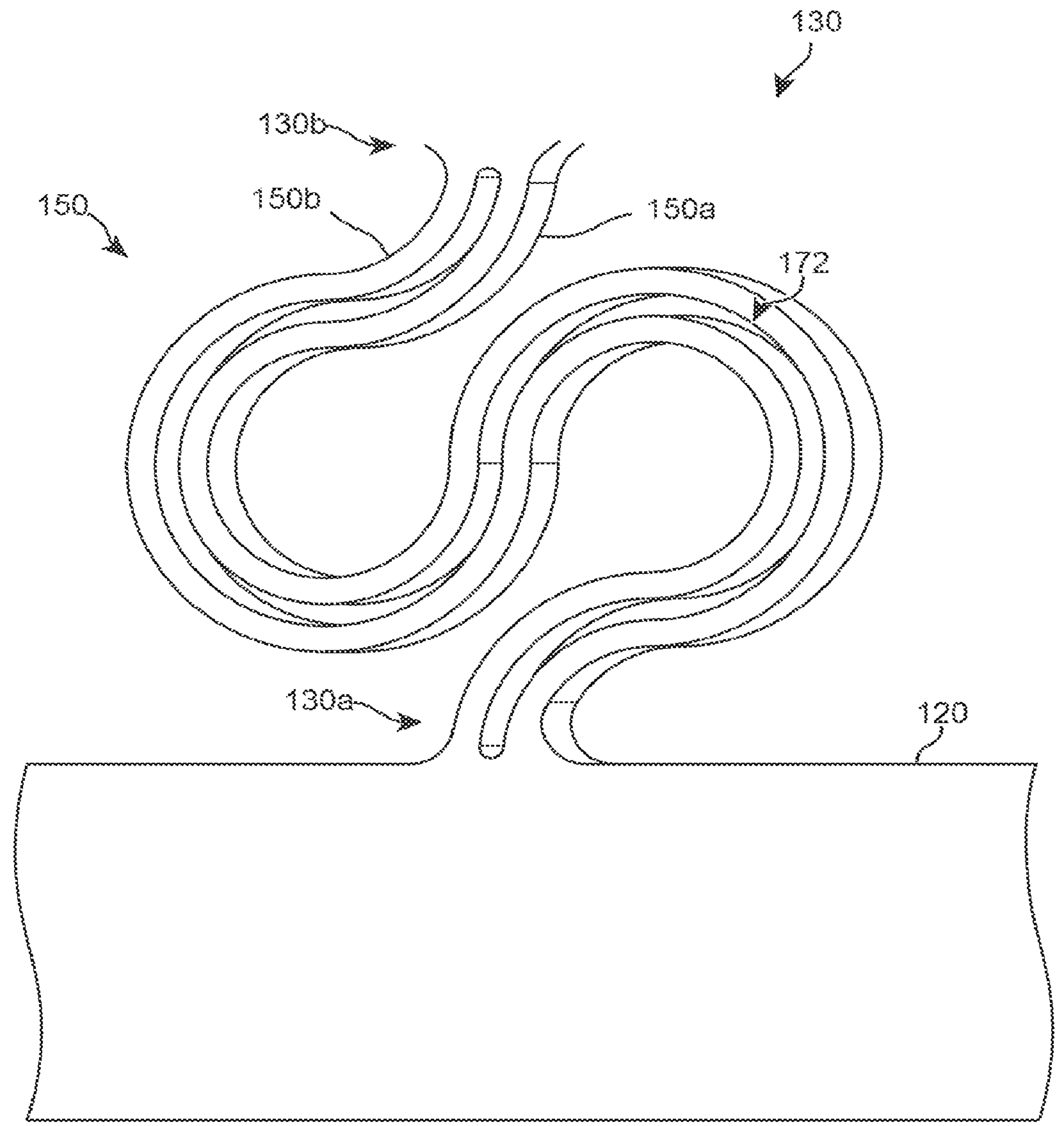
FIG. 36 shows an arm of an orthodontic appliance configured in accordance with examples of the present technology.

FIG. 36 is an isolated view of a portion of an appliance having an arm 130 comprising two second connectors 150*a*, 150*b* extending between the anchor 120 and the attachment portion (not shown). Each of the connectors 150*a*, 150*b* may have a first end 130*a* at the anchor 120 and a second end 130*b* at the attachment portion. The connectors 150*a*, 150*b* may be separated by a gap 172 between their first and second ends 130*a*, 130*b*. In the embodiment shown in FIG. 36, each of the connectors 150*a*, 150*b* also comprise a biasing portion. While the arm 130 is shown with two serpentine connectors 150*a*, 150*b* running parallel to one another, in some embodiments the arm may include more than two connectors. In these and other embodiments, the individual connectors may extend along the same or different paths and/or have the same or different shapes.

Figure 37:
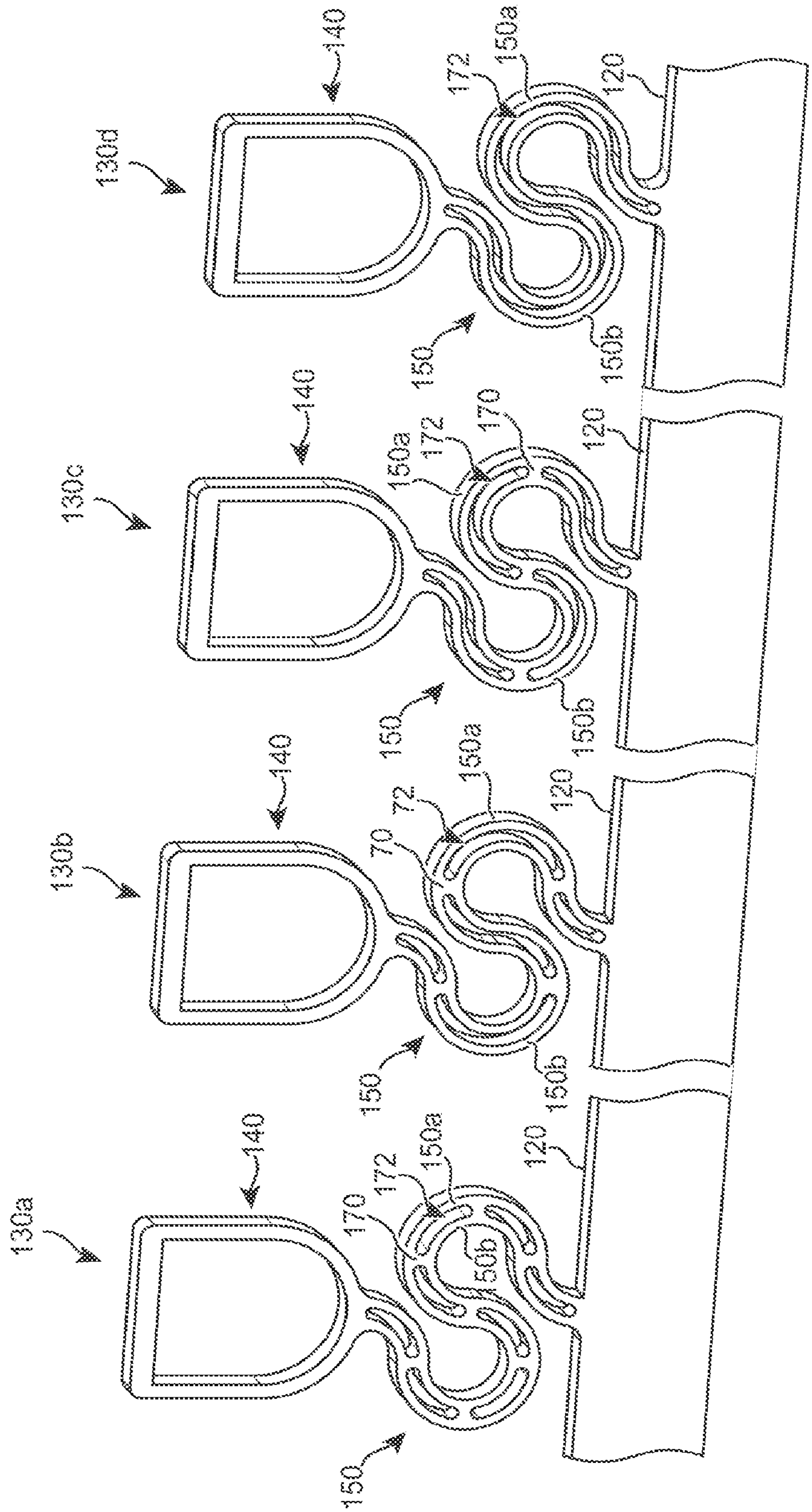
FIGS. 37-73 show various arm configurations for use with the orthodontic appliances of the present technology.
Figure 38:
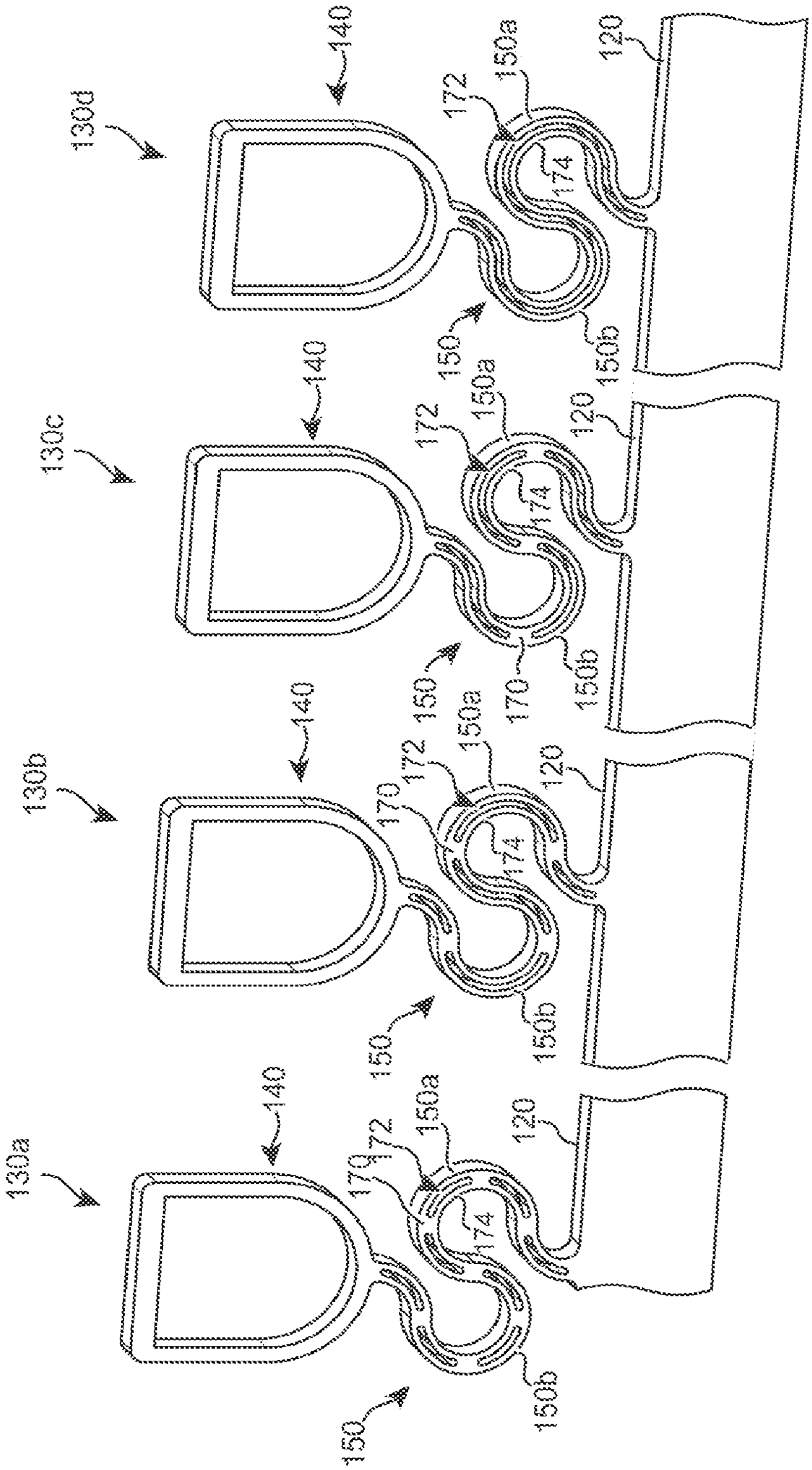
Figure 39:
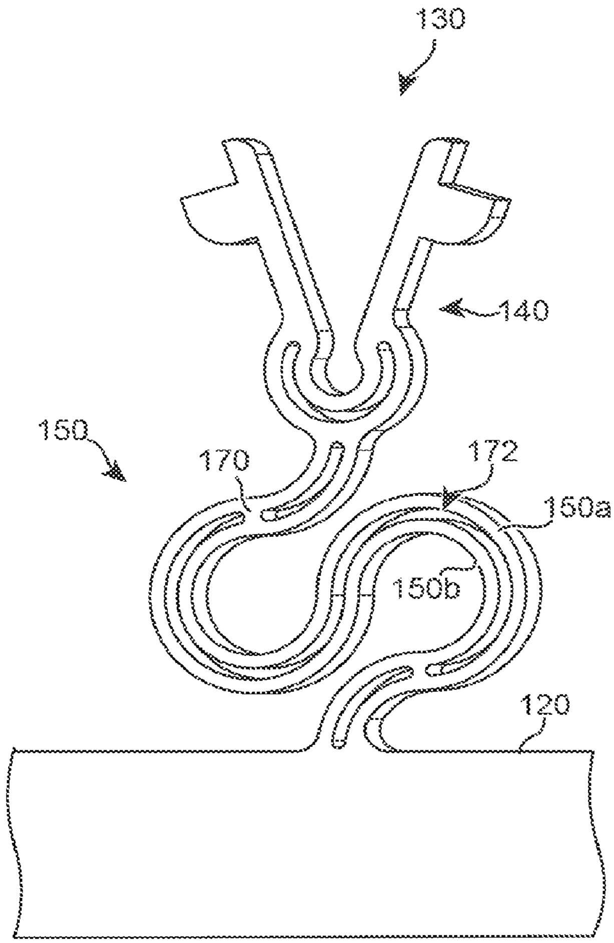
Figure 40:
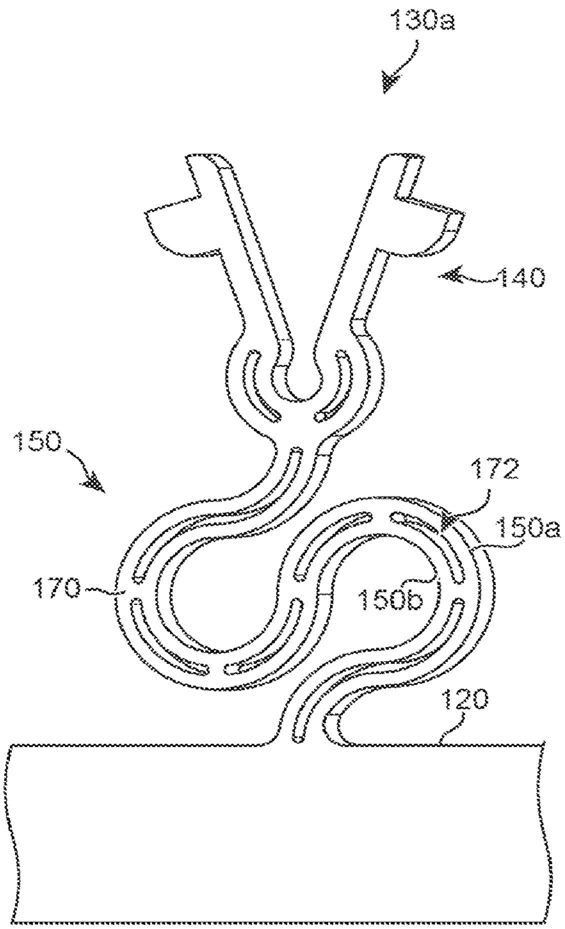
Figure 41:
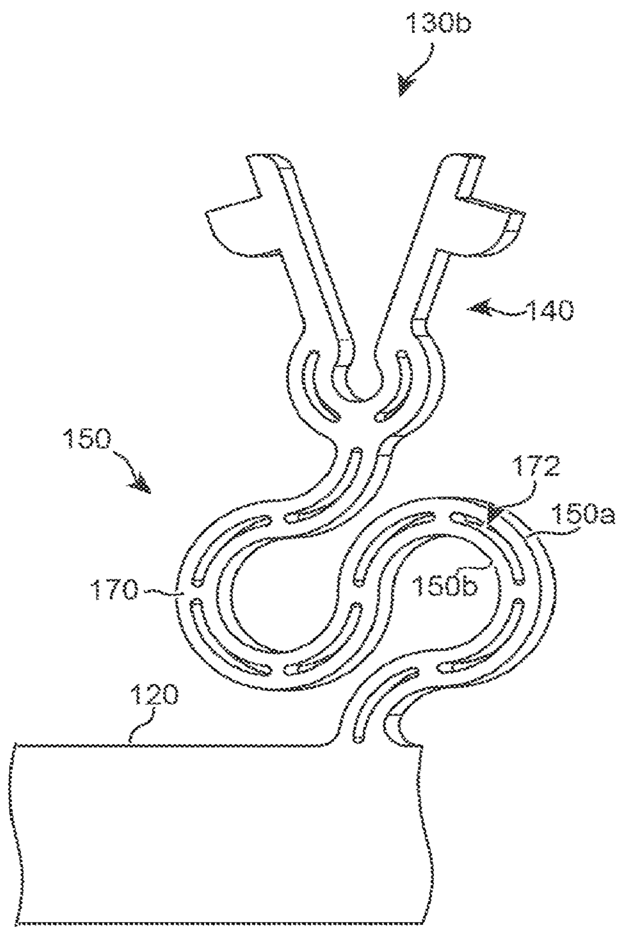
Figure 42:
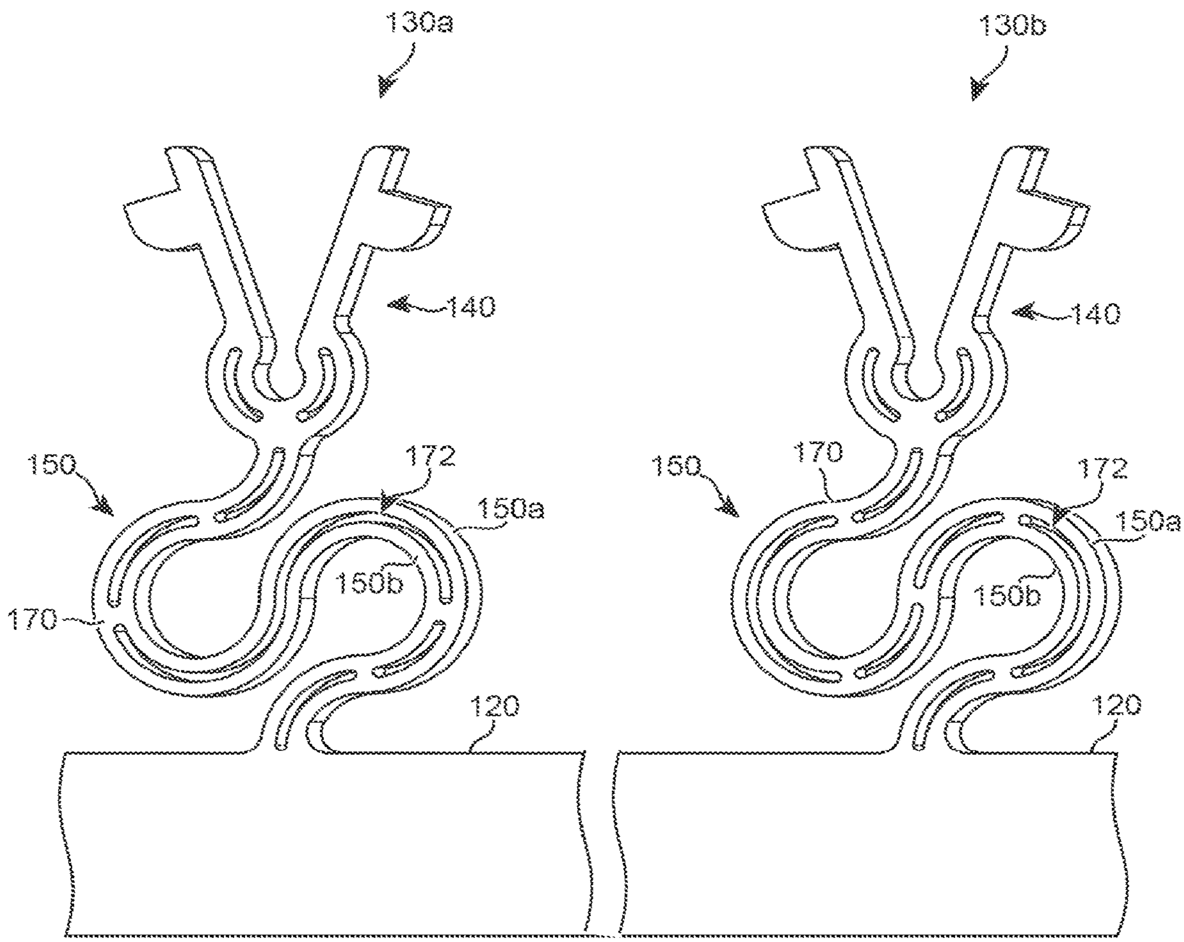

As shown in FIG. 37, in some embodiments the arm 130 includes one or more bridges 170 extending across the gap 172 and coupling the second connectors 150*a*, 150*b* at various locations along the lengths of the connectors 150*a*, 150*b*. The inclusion of one or more bridges 170 can increase the overall stiffness of the arm. Arm 130*a*, for example, has more bridges 170 and is stiffer than arm 130*b*, and arm 130*b* has more bridges and is stiffer than arm 130*c*. For those embodiments having more than one bridge, the multiple bridges 170 may have the same or different lengths. As demonstrated in FIG. 38, the width of one or both of the connectors 150*a*, 150*b* may be increased to increase a stiffness of the individual connector, or may be decreased to decrease the stiffness of the individual connector. The different connectors 150*a*, 150*b* may have the same or different widths.

As shown in FIGS. 39-42, the bridges 170 may be spaced at even intervals along the length of the arm, or may be positioned at random or uneven intervals. In some embodiments the arm 130 may include a first bridge closer to the anchor and a second bridge closer to the attachment portion 140.

Figure 43:
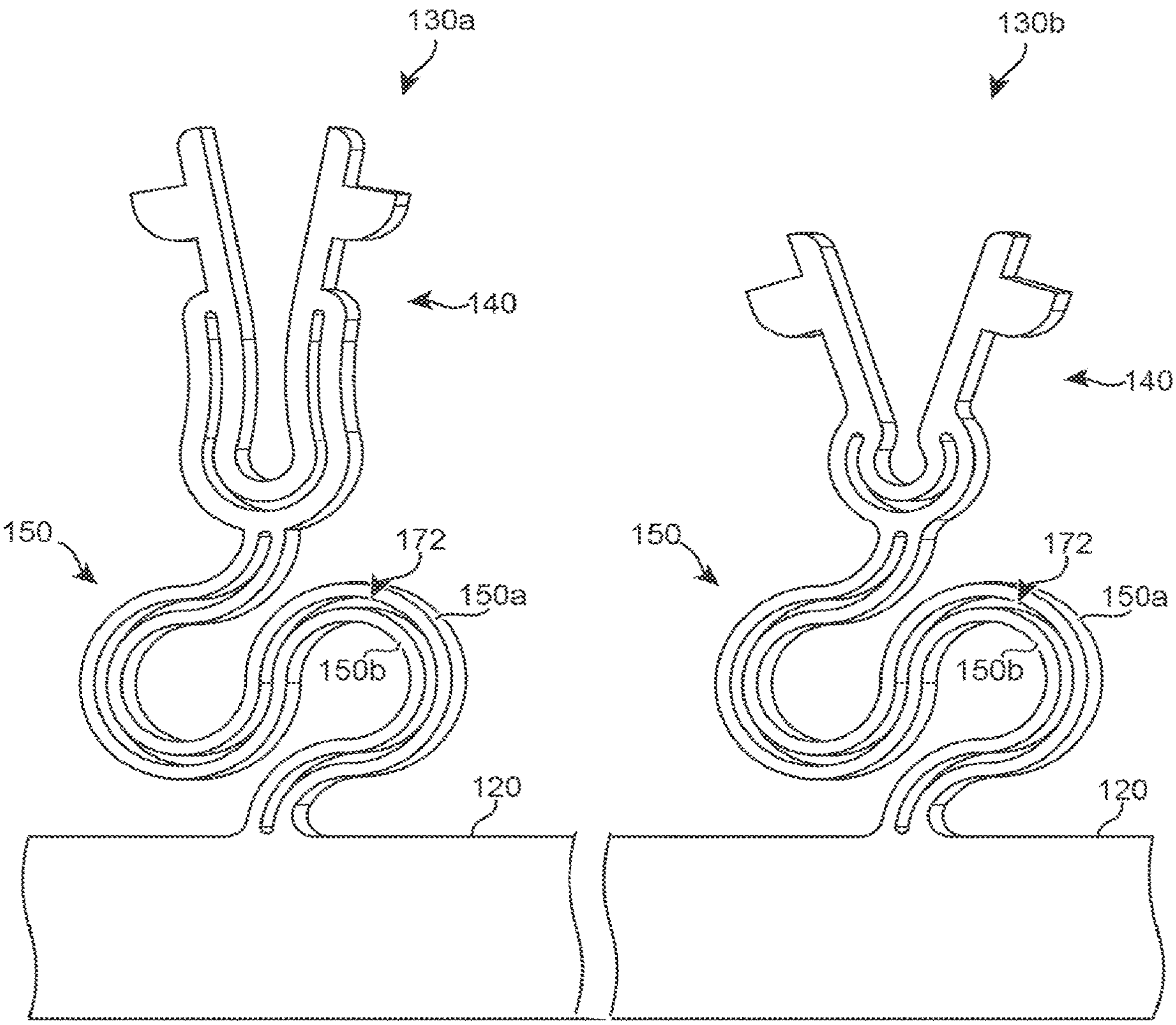

FIG. 43 shows additional examples of multiple connector-arm configurations. It will be appreciated that any of the attachment portions herein may be coupled to an anchor (or another connector) via multiple connectors.

Figure 44:
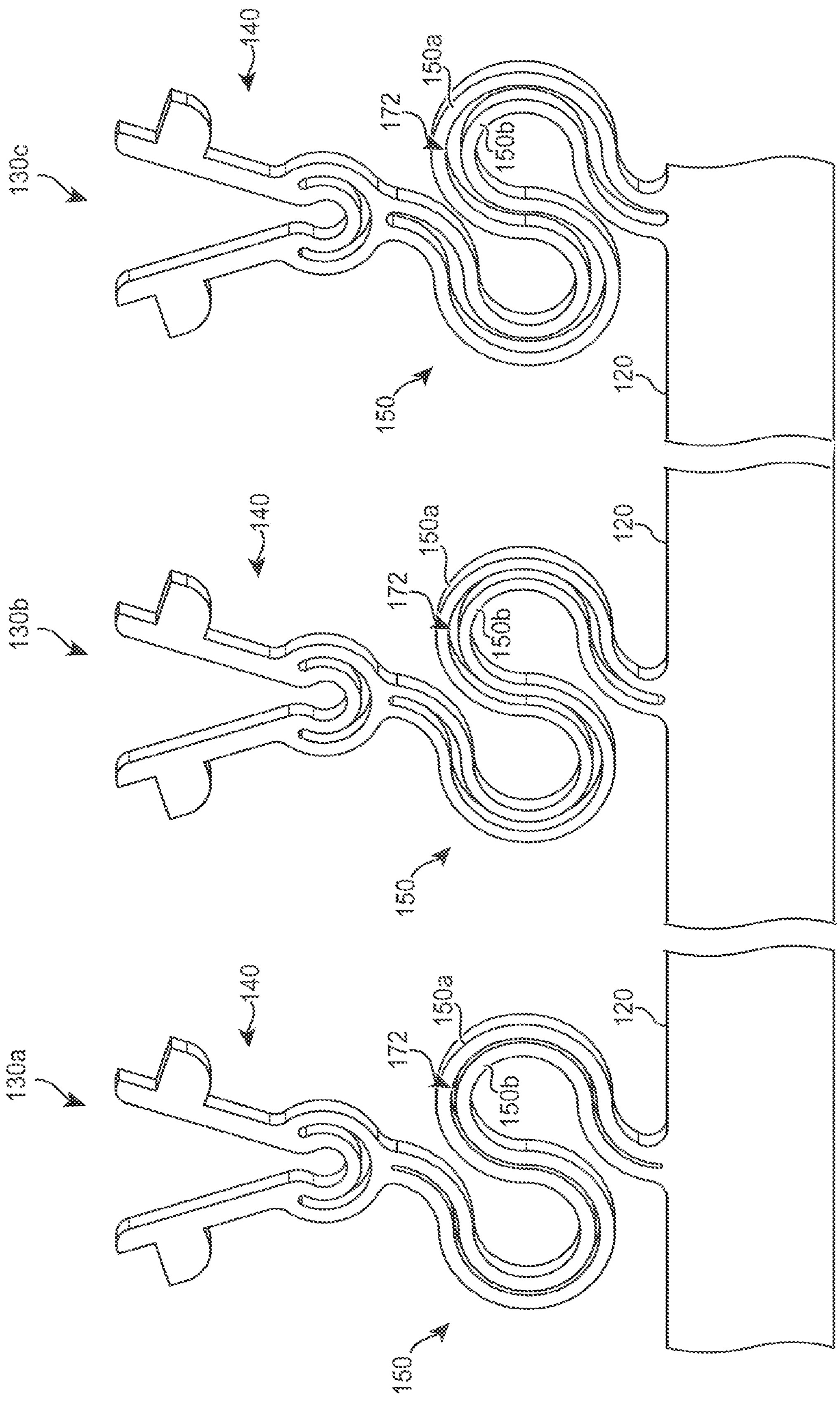

As demonstrated in FIG. 44, the width of one or both of the connectors 150*a*, 150*b* may be increased to increase a stiffness of the individual connector, or may be decreased to decrease the stiffness of the individual connector. The different connectors 150*a*, 150*b* may have the same or different widths.

Figure 45:
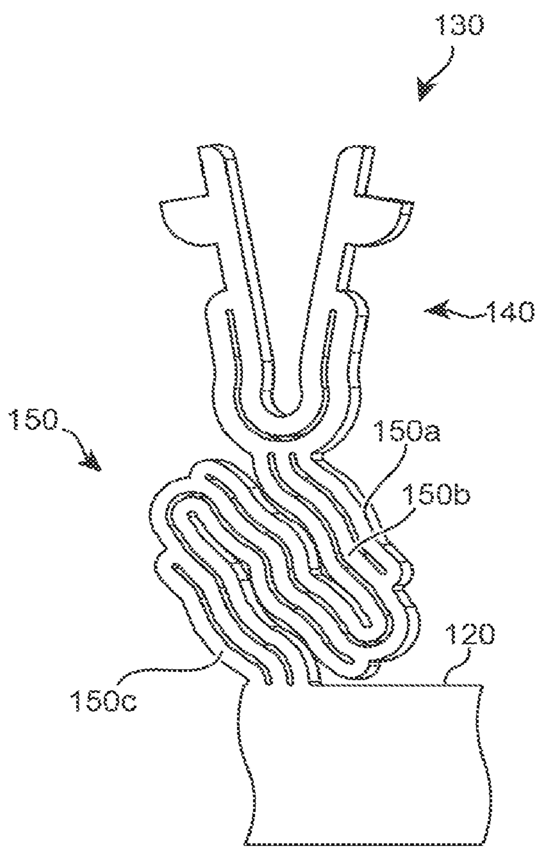
Figure 46:
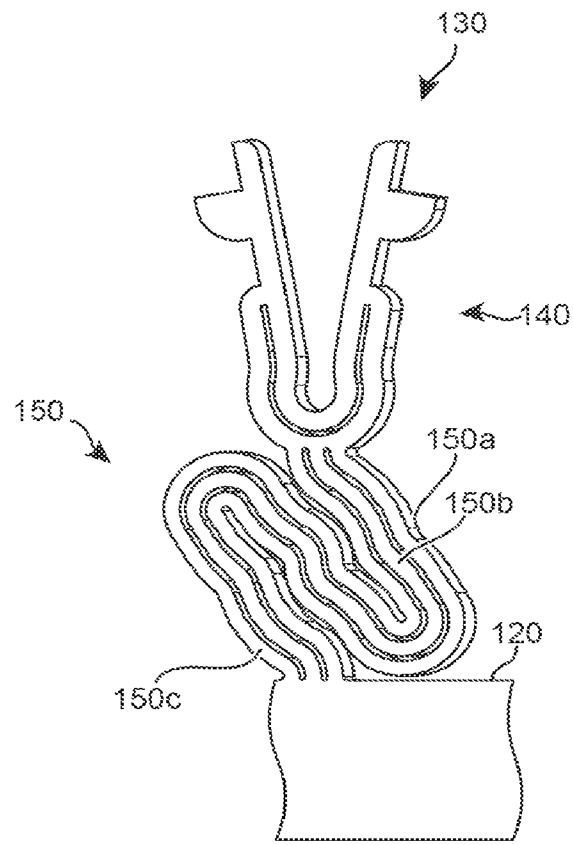

FIG. 45 shows an example arm 130 comprising multiple connectors 150*a*-150*c*. As shown in FIG. 45, fewer than all of the connectors extend the entire length between the anchor 120 and the attachment portion 140. For example, connectors 150*a*, 150*b*, and another connector (not labeled) all start at the anchor 120, but only connector 150*b* travels the entire length of the arm to the attachment portion 140. As shown in FIG. 46, in some embodiments the arm may comprise three or more connectors, all of which extend the entire length of the arm between the anchor and the attachment portion.

Figure 47:
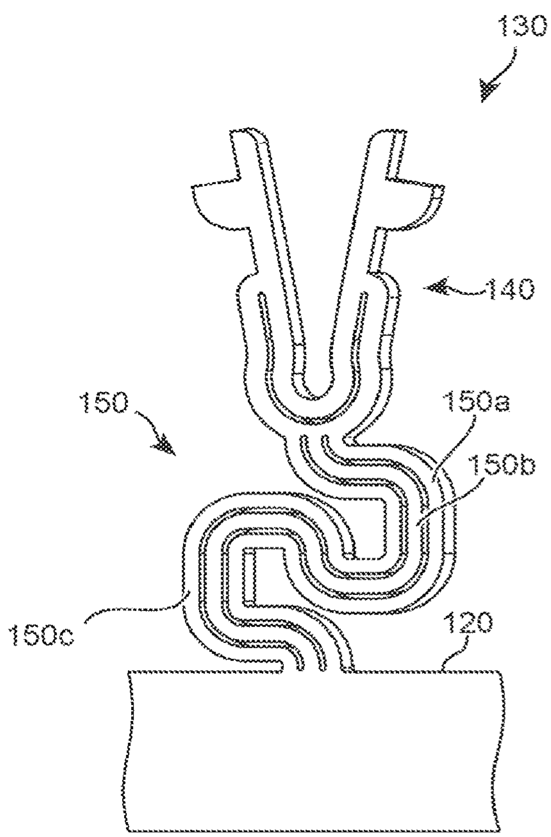
Figure 48:
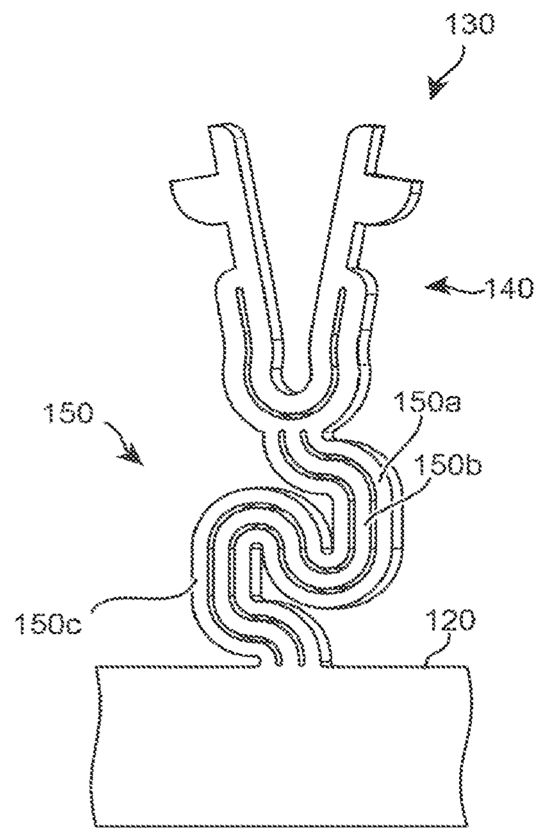
Figure 49:
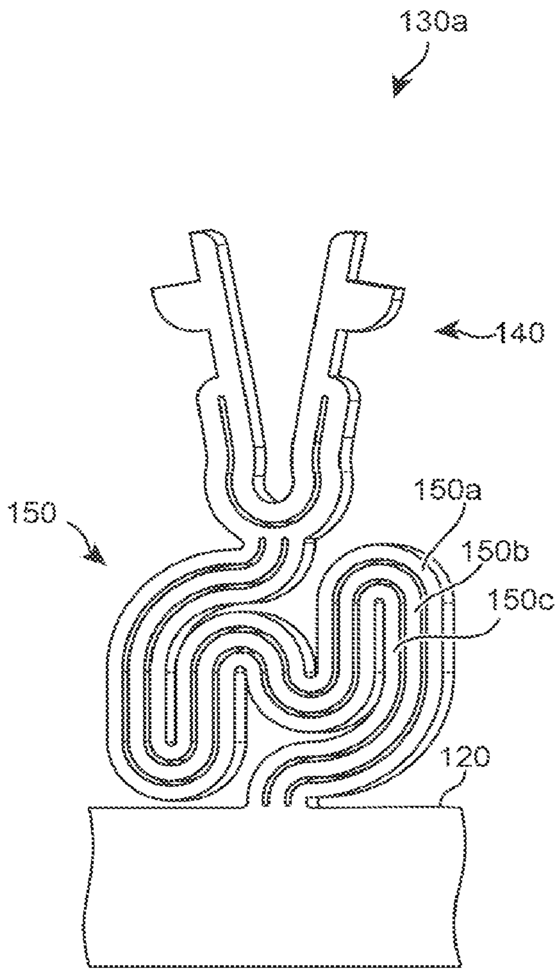
Figure 50:
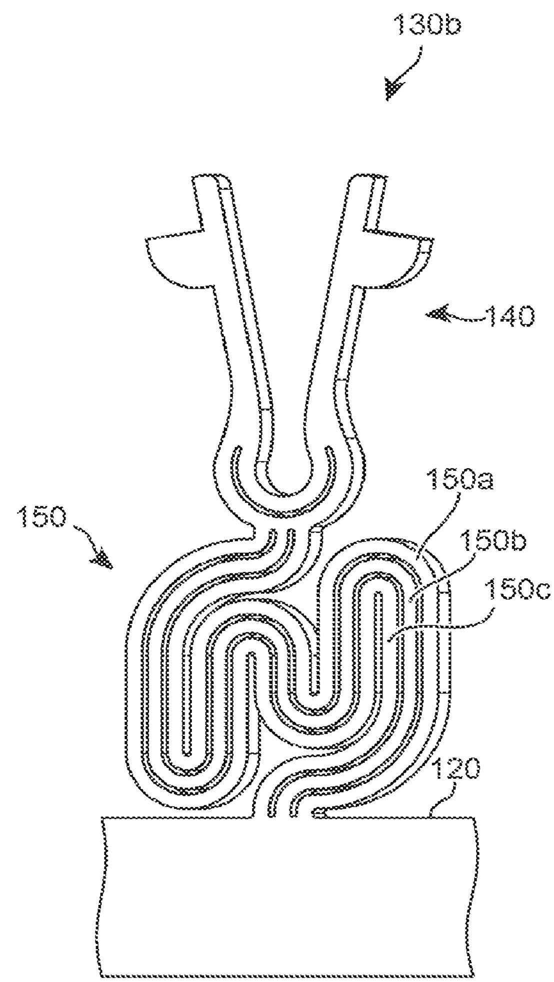
Figure 53:
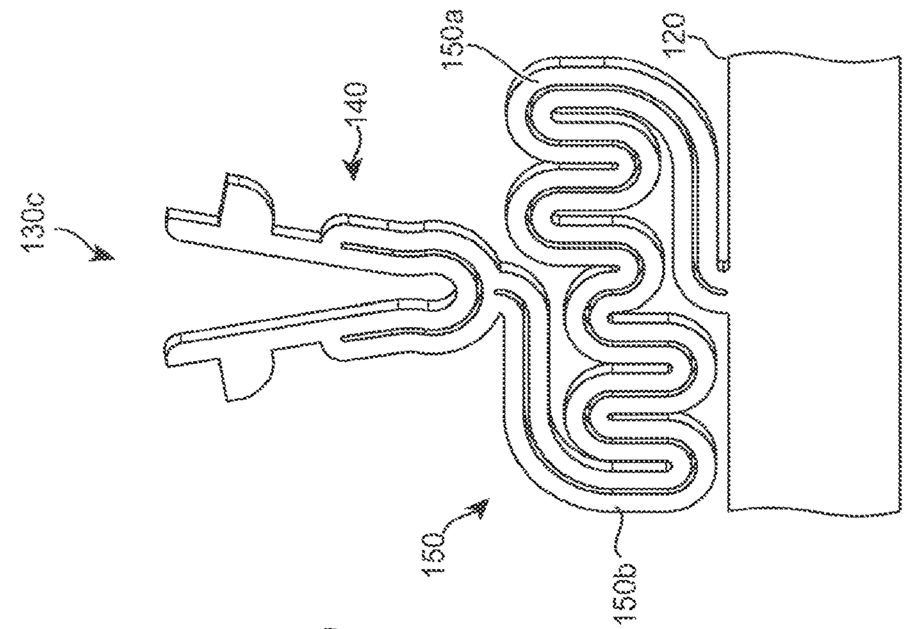
Figure 52:
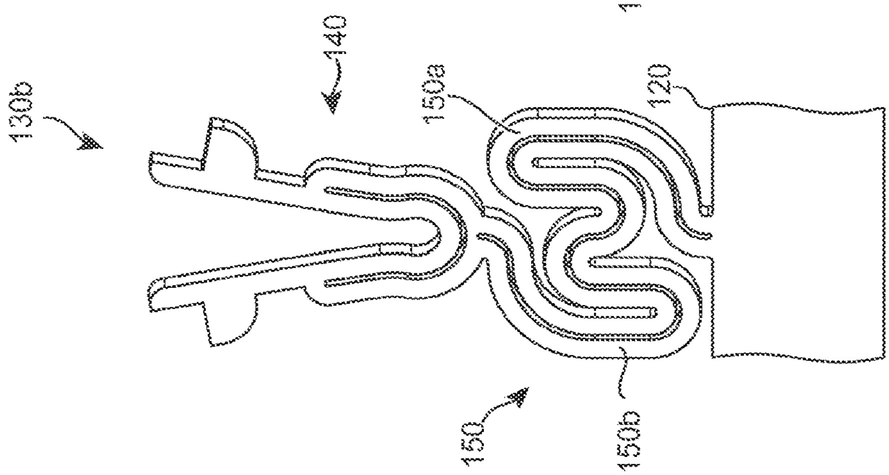
Figure 51:
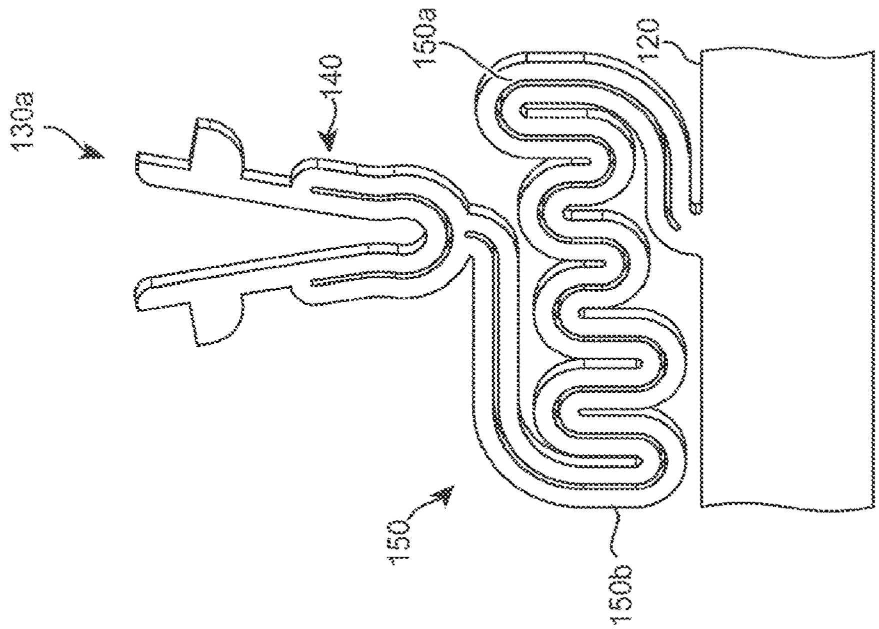
Figure 54:
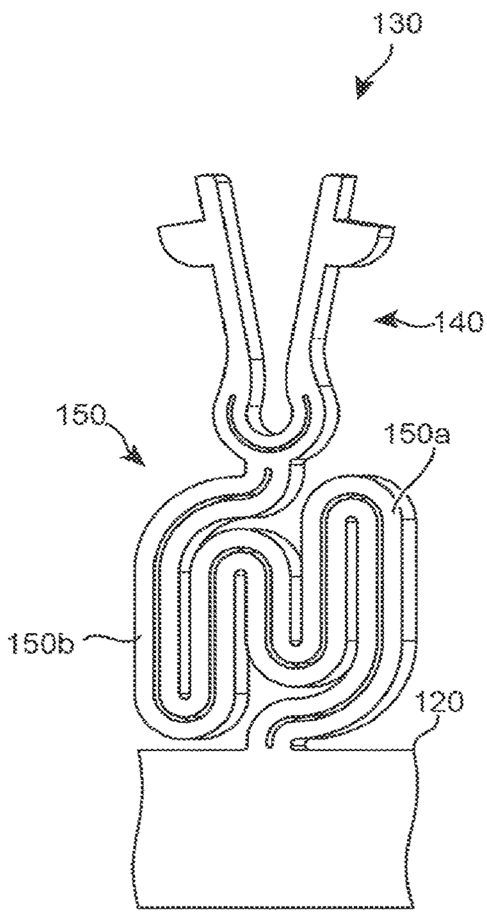
Figure 55:
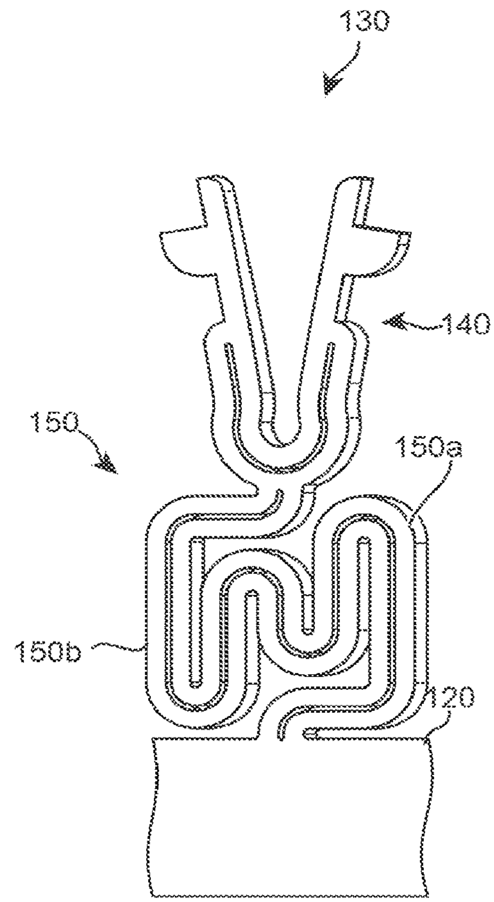
Figure 56:
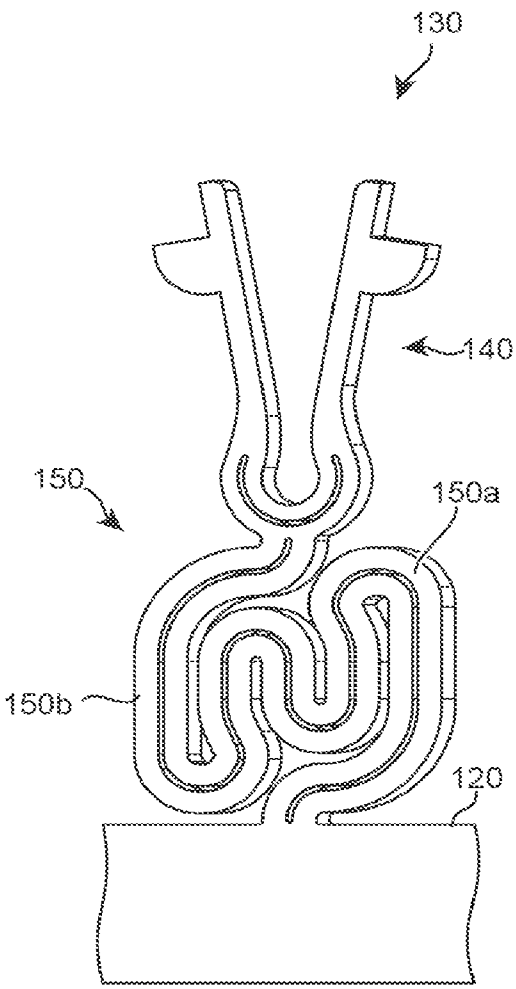
Figure 57:
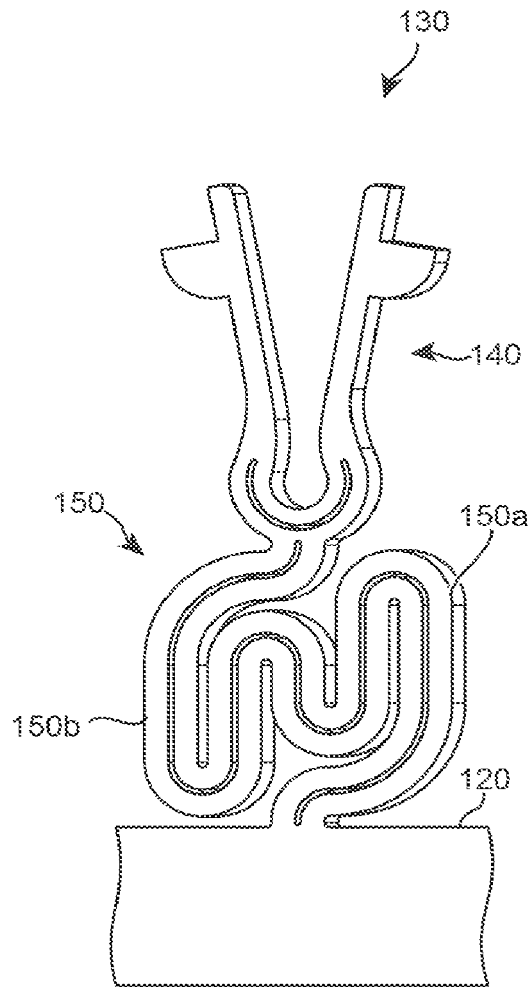

According to some embodiments, for example as shown in FIGS. 47 and 48, the multiple connectors may create a path between the anchor 120 and the attachment portion 140 that includes one or more substantially linear segments. The substantially linear segments may extend in an occlusogingival direction or a mesiodistal direction.

As shown in FIGS. 49-57, the multiple connectors can form multiple turns between the anchor 120 and the attachment portion 140. The turns may be stacked in a mesiodistal direction, or may be stacked in an occlusogingival direction. The peaks (more occlusal) of sequential turns may be aligned along an occlusogingival axis, or may be offset. In these and other embodiments, the valleys (more gingival) of sequential turns may be aligned along an occlusogingival axis, or may be offset.

Figure 58:
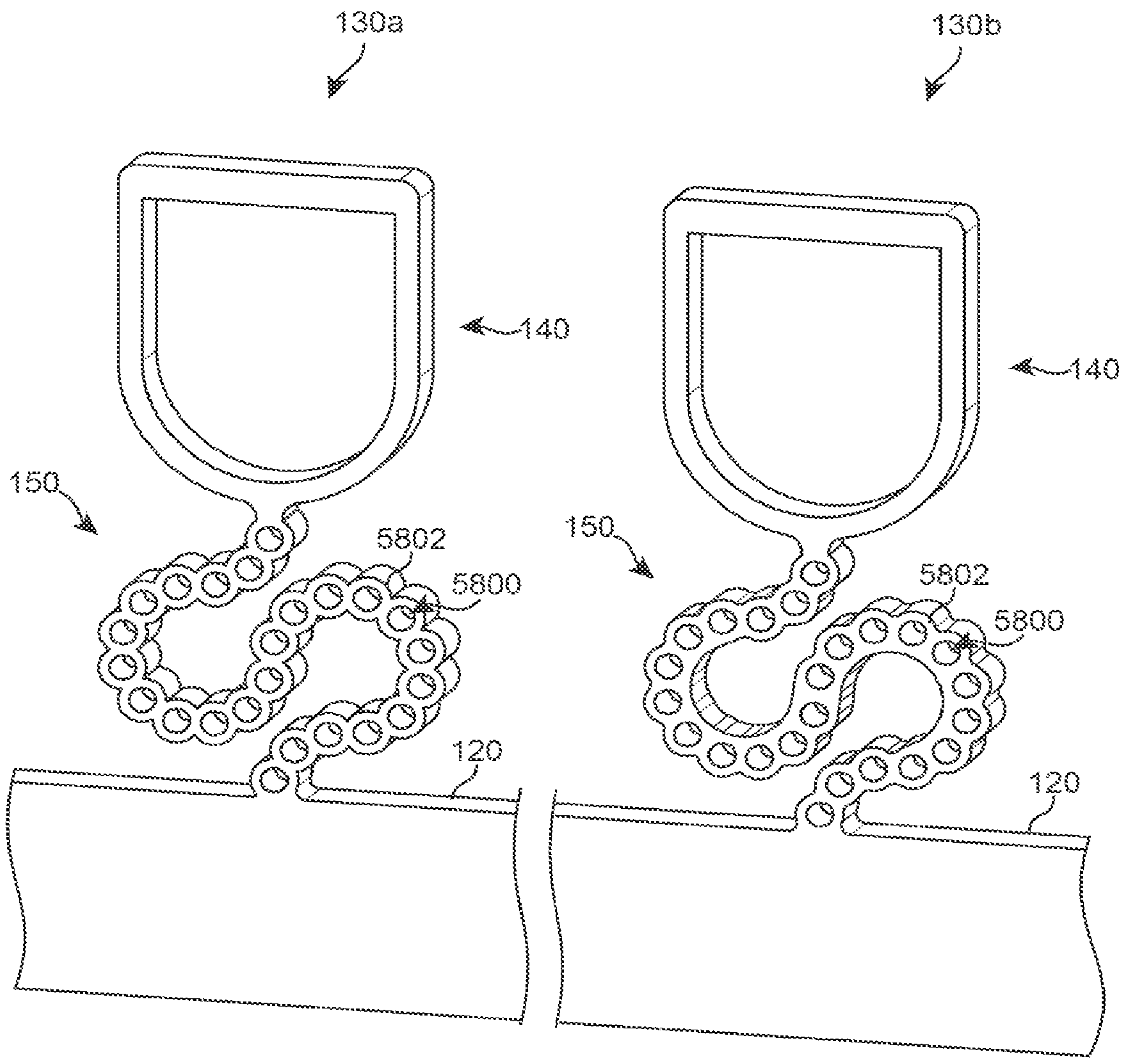
Figure 61:
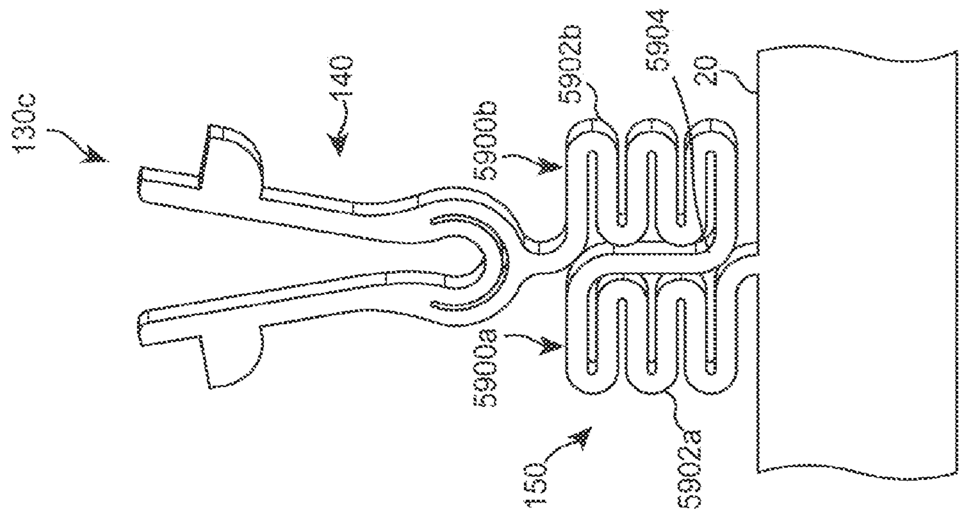
Figure 60:
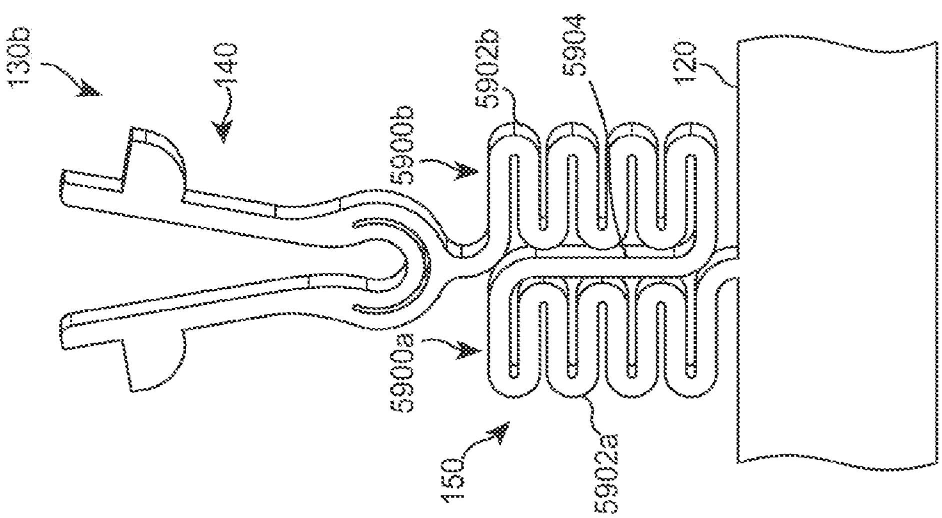
Figure 59:
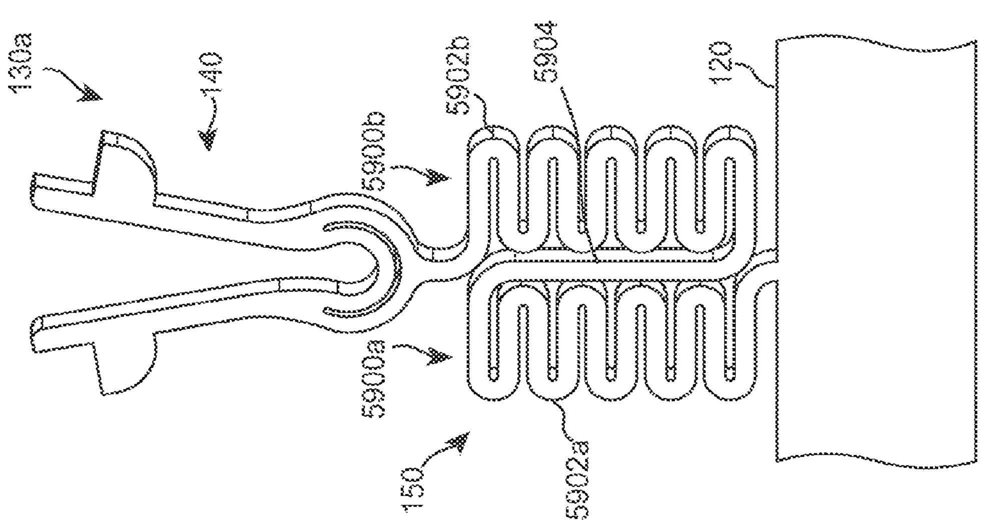
Figure 63:
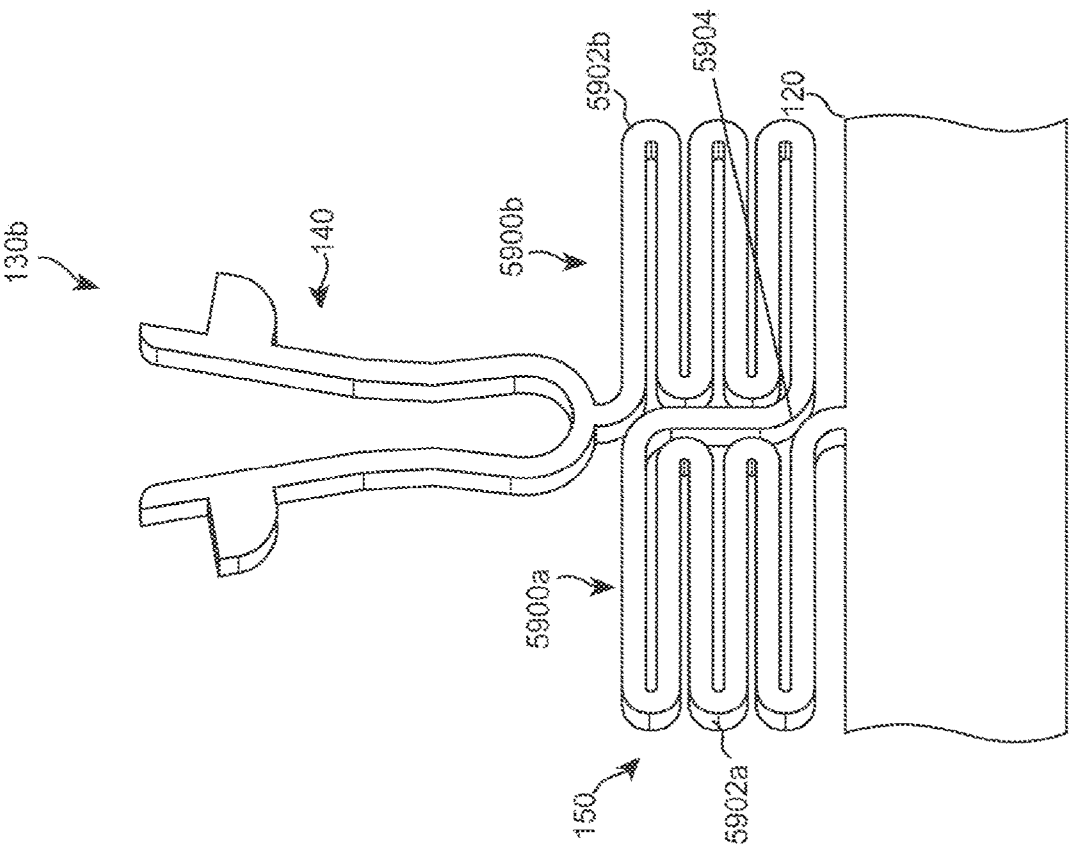
Figure 62:
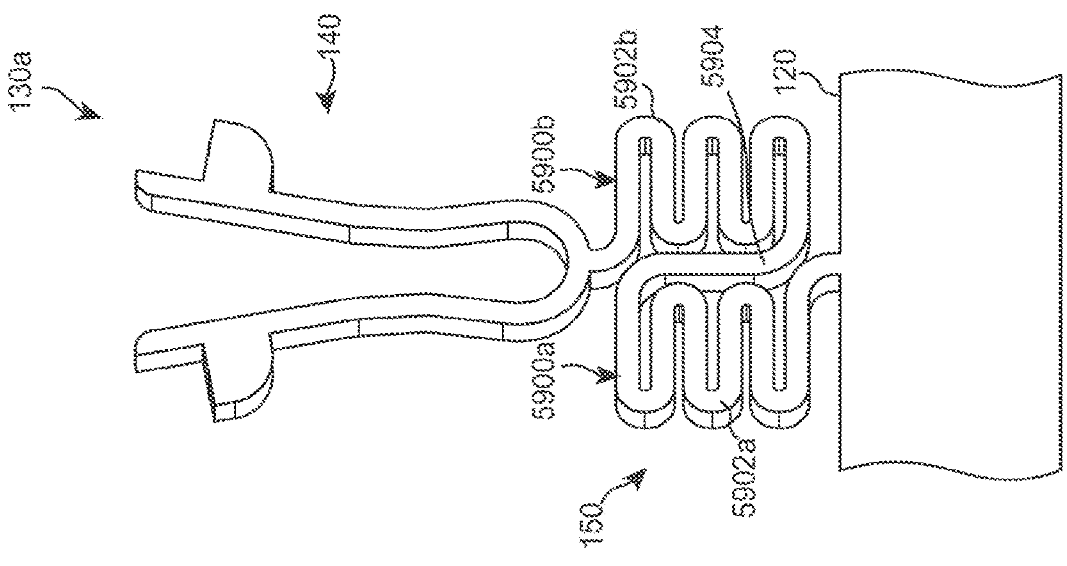
Figure 64:
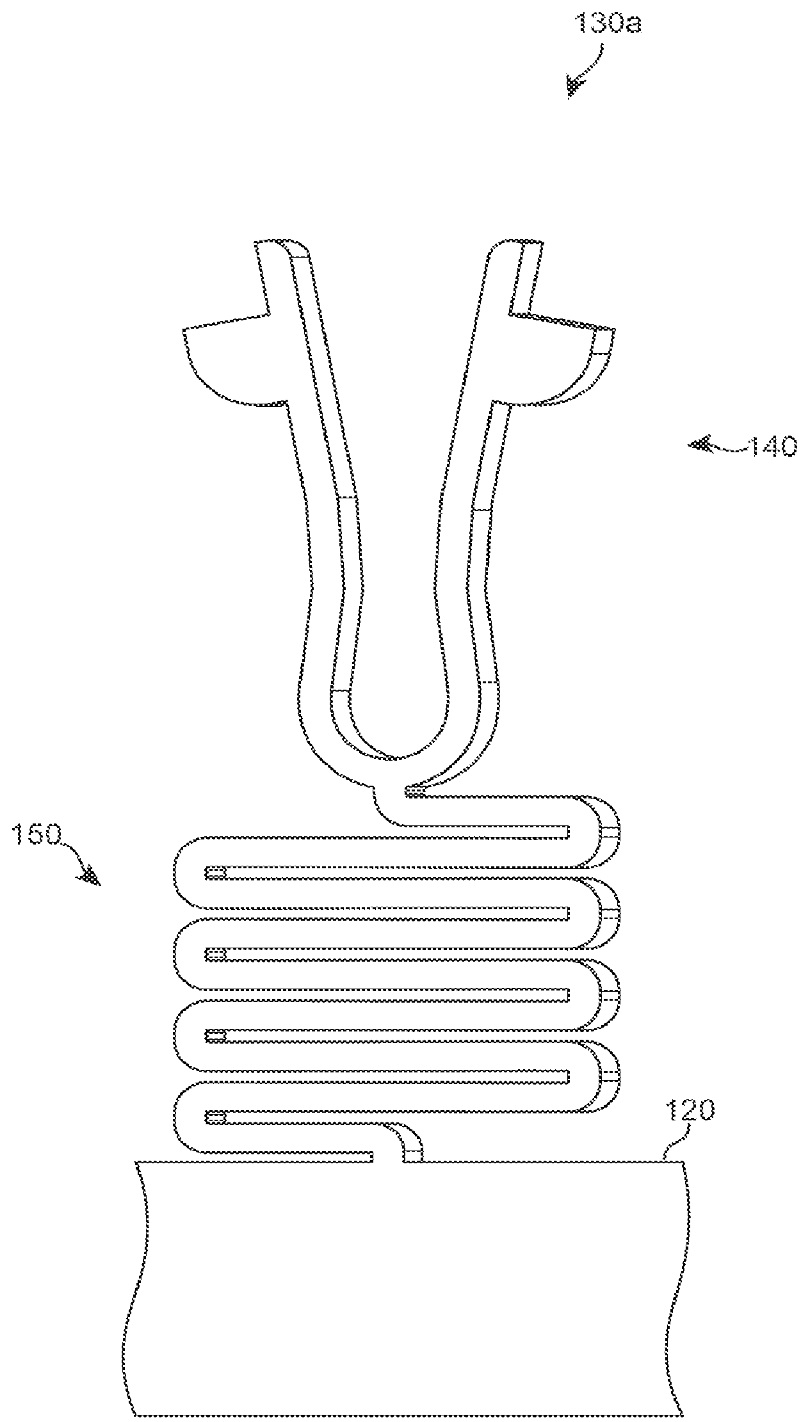
Figure 66:
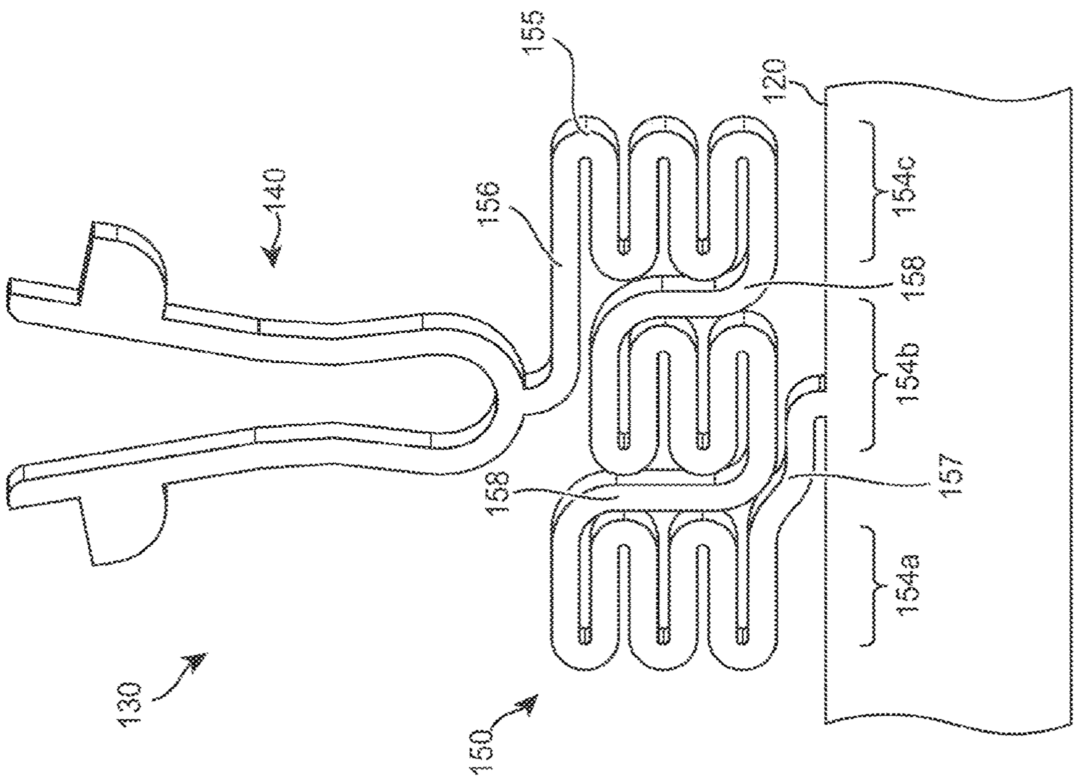
Figure 65:
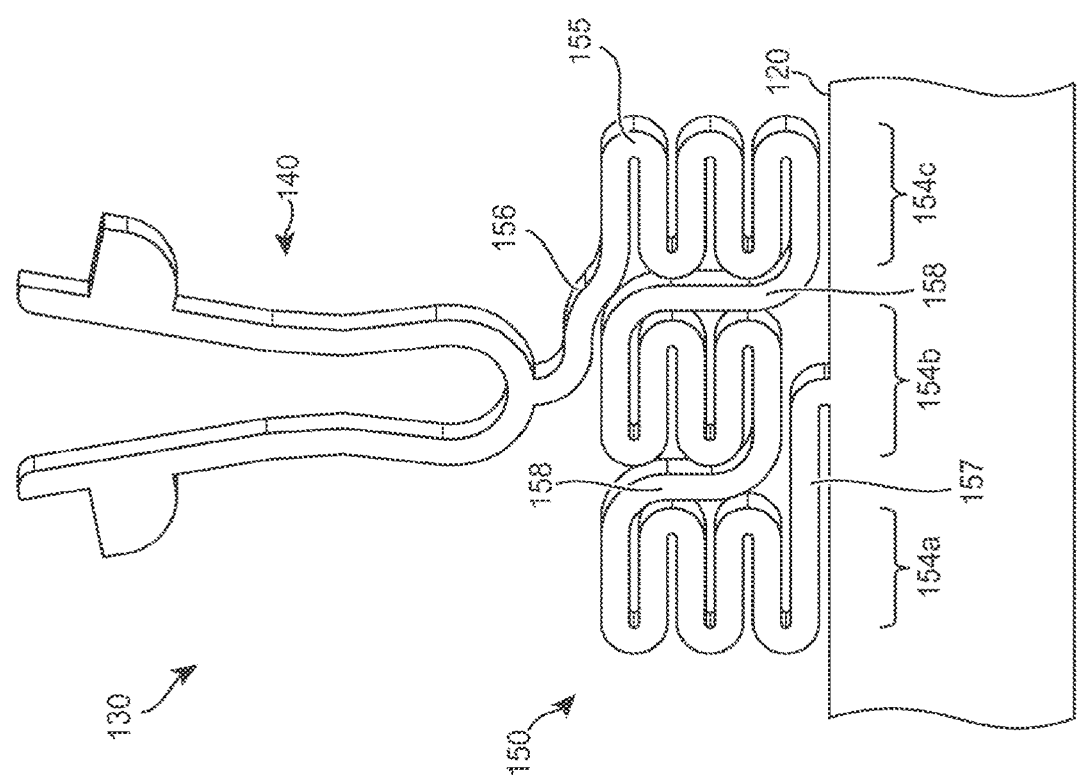
Figure 68:
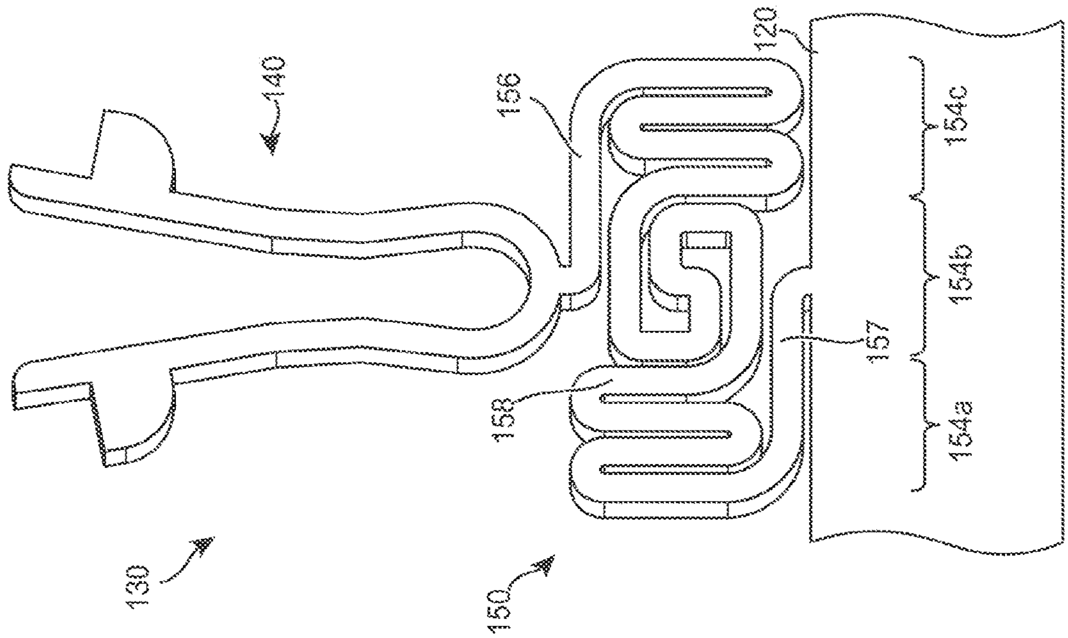
Figure 67:
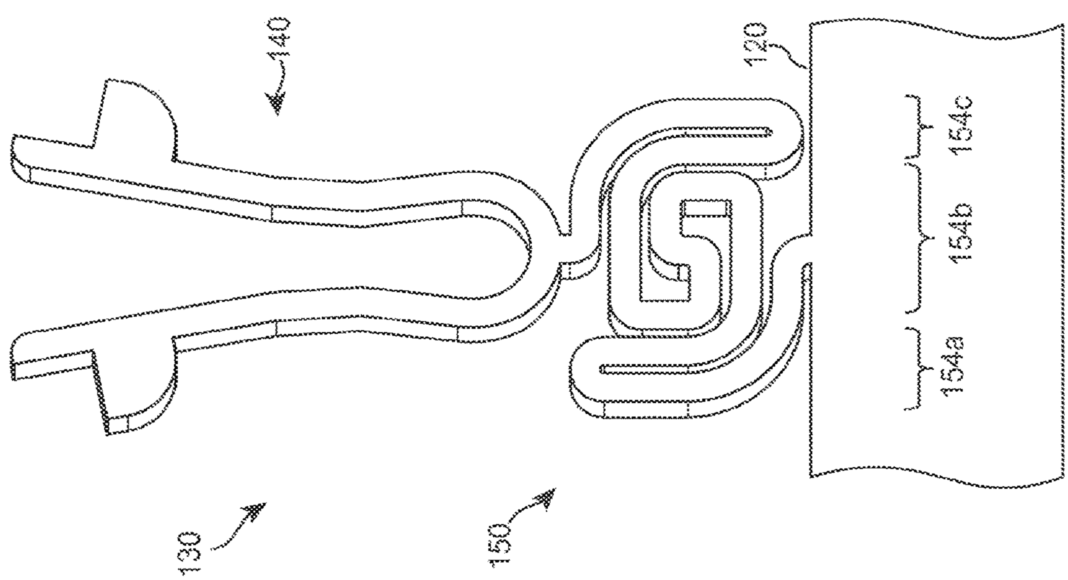
Figure 70:
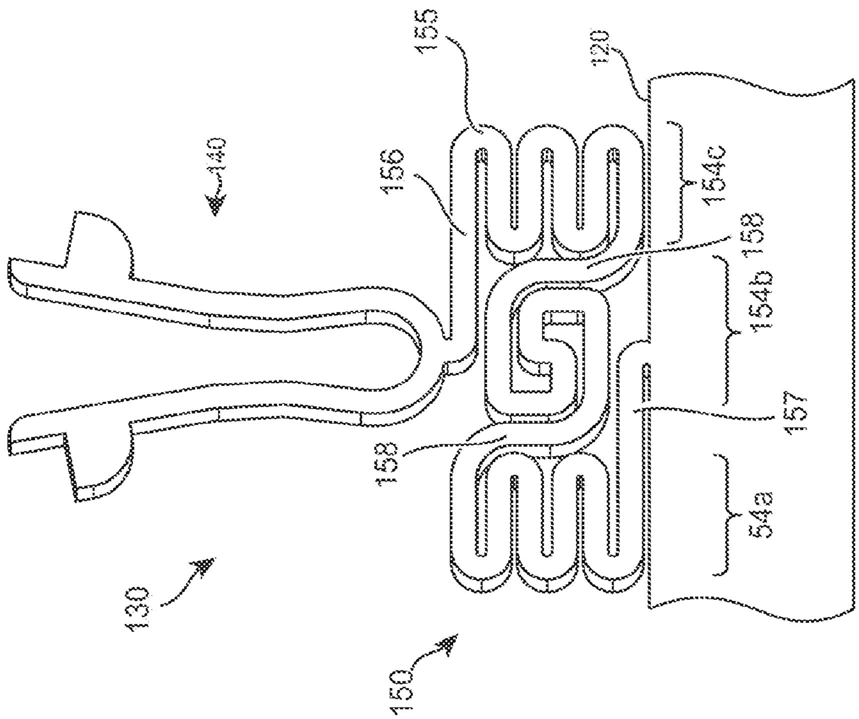
Figure 69:
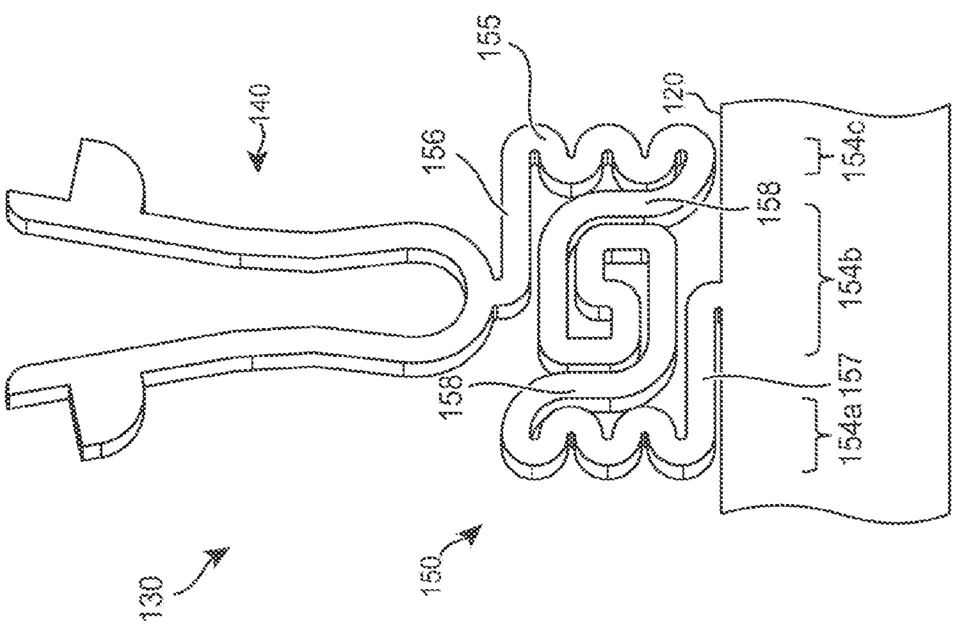
Figure 71:
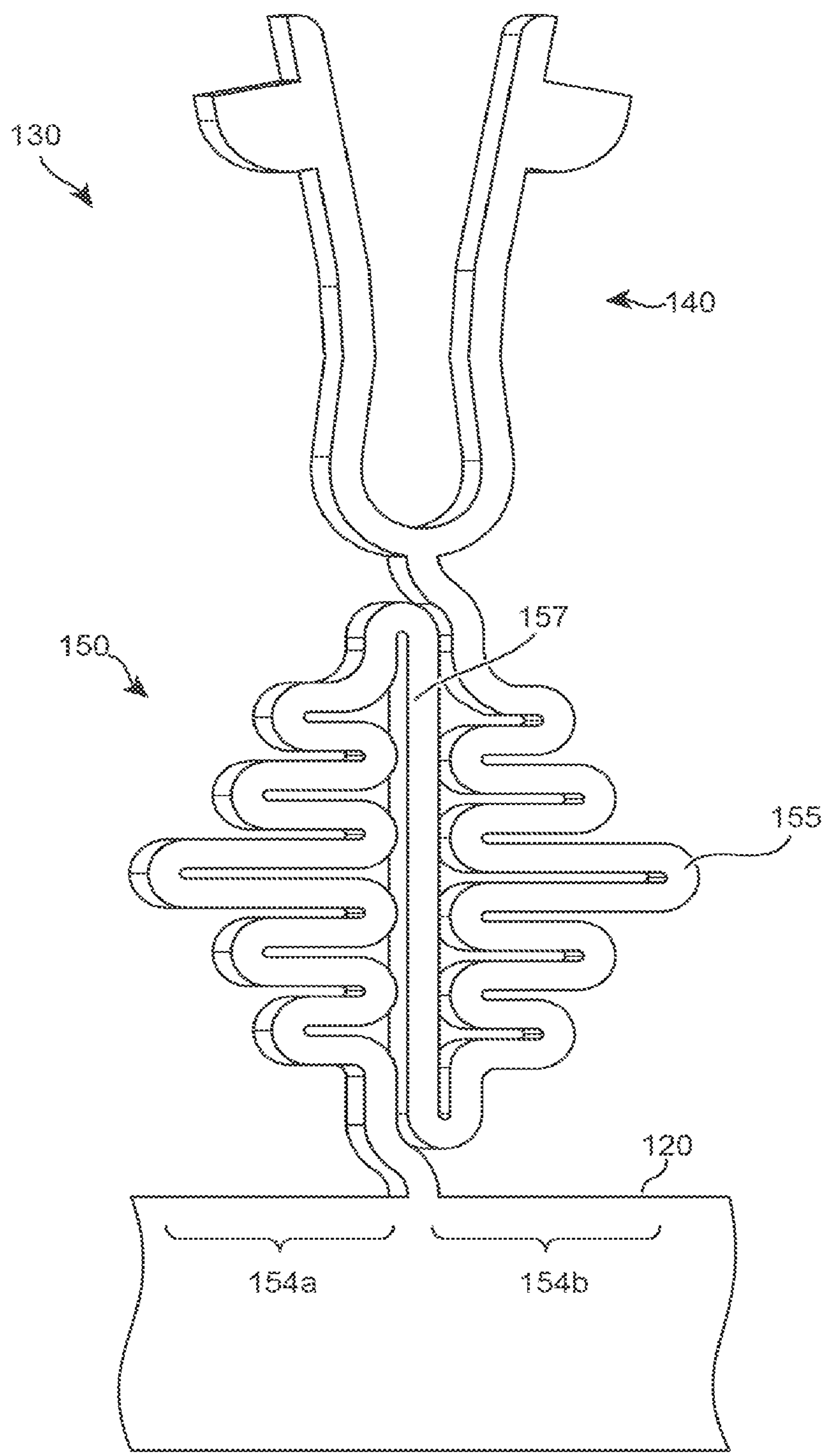
Figure 73:
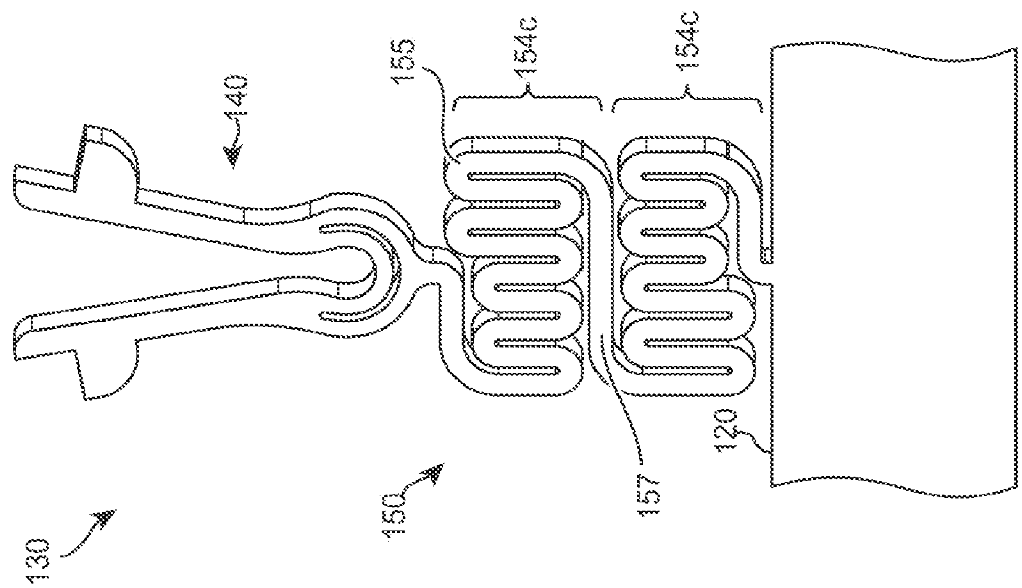
Figure 72:
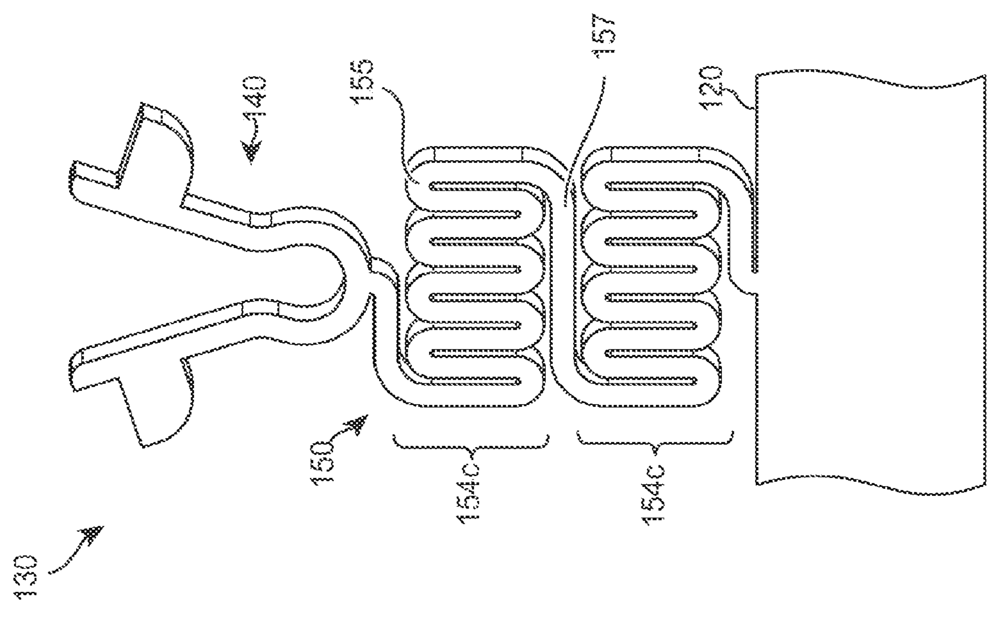

FIG. 58 depicts two arms 130*a*, 130*b* of the present technology, each having flexible connector 150 with a plurality of openings 5800 along its length. A thickness of the sidewalls 5802 of the openings 5800 may be increased or decreased to affect the flexibility of the arm.

As shown in FIGS. 59-74, a single, flexible connector may form multiple turns between the anchor 120 and the attachment portion 140. For example, the arm may form two or more stacks of turns 5900*a*, 5900*b*, where the turns are stacked in the occlusogingival direction. The stacks may be separated by a generally linear portion of the arm. In some embodiments, the arm may form two or more stacks of turns where the turns are stacked in the mesiodistal direction. In some embodiments, the arm may include both mesiodistal and occlusogingival stacks. The peaks (more occlusal or more mesial) of sequential turns may be aligned along an occlusogingival axis, or may be offset. In these and other embodiments, the valleys (more gingival or more mesial) of sequential turns may be aligned along an occlusogingival axis, or may be offset.

Figure 74:
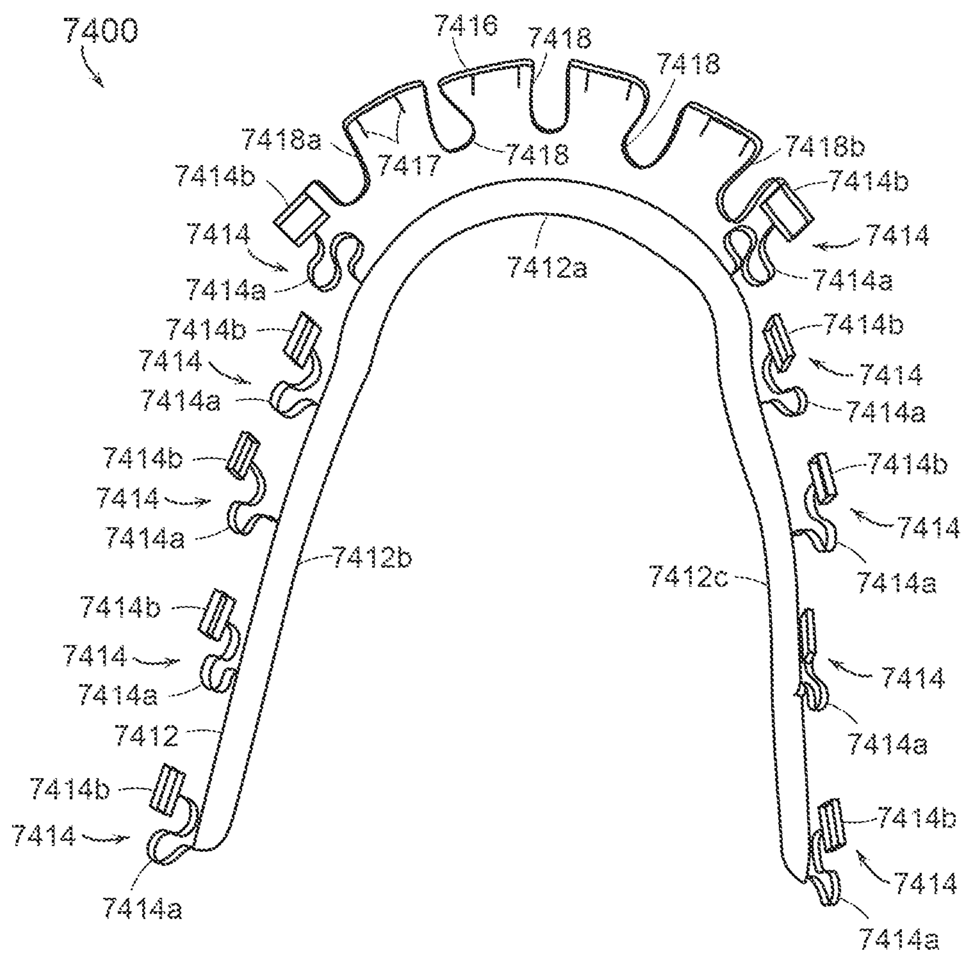
FIG. 74 is an isometric top view of an orthodontic appliance configured in accordance with embodiments of the present technology.

The example appliance 7400 shown in FIG. 74 includes an anchor 7412 and a plurality of arms 7414 extending from the anchor 7412. The anchor 7412 is formed in an arch shape (an arch shaped member having a generally arch-shaped configuration). The anchor 7412 is configured to extend along two or more (or a plurality of) adjacent teeth in one of the patient's jaws, when the appliance 7400 is installed, as described herein.

The anchor 7412 has a lengthwise dimension that includes a first portion 7412*a* that is configured to extend along the incisor, lateral incisor, and cuspid (canine) teeth. The lengthwise dimension of the anchor 7412 includes further second and third portions 7412*b* and 7412*c* configured to extend along some or all of the bicuspid and molar teeth. In other embodiments, the anchor 7412 may be smaller in length and, for example, may include the first portion 7412*a* (or a portion of the first portion 7412*a*), but no second or third portions 7412*b*, 7412*c*. In other embodiments, the anchor 7412 may include the first portion 7412*a* and a portion of the length of one or each of the second and third portions 7412*b*, 7412*c*. In some embodiments, the appliance may include one or more second and third portions 7412*b*, 7412*c* (of any suitable length) and no first portion 7412*a*. In yet other embodiments, the appliance may include one or more anchor second and third portions 7412*b*, 7412*c* (of any suitable length) and Z embodiment appliance features or other appliance features in the location of first portion 7412*a* (instead of an anchor portion) connecting second and third portions 7412*b*, 7412*c*.

The plurality of arms 7414 may extend from the anchor 7412 at spaced intervals along the longitudinal axis L2 of the anchor 7412. The plurality of arms 7414 may be spaced at even intervals relative to each other, or at uneven intervals relative to each other, along the length dimension of the anchor 7412. In particular examples, the arms 7414 are provided at locations along the length dimension of the anchor 7412 that correspond to or are associated with locations of teeth (or, in further particular examples, to the FTA of each tooth) to which the arms connect, when the appliance is installed.

Each arm 7414 includes a spring portion (or spring member) 7414*a* and a bracket connector element (or male connector element) 7414*b*. Each spring member 7414*a* in the appliance 7400 may correspond to any of the spring members or spring portions on arms described in U.S. patent application Ser. No. 15/370,704 (Publ. No. 2017/0156823) or herein. Each bracket connector element (or male connector element) 7414*b* in the appliance 7400 may correspond to any of the bracket connectors (or male connector elements) described in U.S. patent application Ser. No. 15/370,704 (Publ. No. 2017/0156823) or herein.

In the example in FIG. 74, the appliance 7400 includes ten arms 7414 extending from the anchor 7412, including five arms on the right side and five arms on the left side of the appliance. A respective one of the arms 7414 is located at each respective distal end of the anchor 7412. The five arms on the right side of the appliance 7400 are spaced apart and located along the length section 7412*b*, and the five arms on the left side of the appliance 74100 are spaced apart and along the length section 7412*c* of the anchor 7412. In other examples, the appliance 7400 may include fewer or more arms along one or both length sections 7412*b* and 7412*c*. In those or other examples, some or all of the arms 7414 may extend from the section 7412*a* of the anchor 7412.

In the example shown in FIG. 74, the arm 7414 closest to the section 7412*a* on the right side of the appliance and the arm 7414 closest to the section 7412*a* on the left side of the appliance are, each connected to (by being either coupled to or integral with) a respective end of a further rigid section of additional rigid material (or second rigid bar) 7416. The further rigid section 7416 extends along and adjacent to section 7412*a* of the anchor 7412. In other examples, the further rigid section 7416 may also or alternatively extend along and adjacent some or all of the length of section 7412*b* or of section 7412*c* (or of both sections 7412*b* and 7412*c*) of the anchor 7412. While the appliance 7400 in FIG. 74 includes one further rigid section 7416, other examples may include two or more further rigid sections of additional rigid material 7416 (for example, arranged over and adjacent two or more of the sections 7412*a*, 7412*b*, and 7412*c*, or of portions of those sections).

The further rigid section 7416 has a plurality of bracket connectors 7417 along its length dimension. The further rigid section 7416 also has a plurality of loop or curved features 7418 formed along its length dimension.

Each bracket connector 7417 may be a bracket connector (or male connector element) corresponding to any of the bracket connectors (or male connector elements) described in U.S. patent application Ser. No. 15/370,704 (Publ. No. 2017/0156823) or herein. Alternatively, some or all of the bracket connectors 7417 may have other suitable bracket connector configurations. In the example of FIG. 74, the bracket connectors 7417 have a configuration corresponding to the bracket connectors 266, 267, 268 or 269 described with respect to FIG. 29 in U.S. patent application Ser. No. 16/865,323.

In the example in FIG. 74, four bracket connectors 7417 extend from the further rigid section 7416. The bracket connectors 7417 are spaced apart and located along the length dimension of the further rigid section 7416 and, thus, along at least a portion of the corresponding length dimension of section 7412*a* of the anchor 7412. In other examples, the appliance 100 may include fewer or more bracket connectors 7417. In particular examples, the bracket connectors 7417 are provided at locations along the length dimension of the further rigid section 7416 that correspond to or are associated with locations of teeth to which the bracket connectors 7417 connect, when the appliance is installed.

One or more (or each) of the loop or curved features 7418 in the further rigid section 7416 may be configured to provide a flexibility or a bias or spring force in one or more directions (or both), a force magnitude, durability, or other characteristic, based in part on the shape, material and configuration of the feature 7418. In certain examples, as shown in FIG. 74, the appliance 7400 includes five loop or curved features 7418 along the length of the further rigid section 7416. Also, in certain examples, as shown in FIG. 74, one bracket connector 7417 is located between each adjacent pair of the loop or curved features 7418.

The loop or curved features 7418 may include a loop or curved feature 7418*a* located on the left end of the further rigid section 7416, and a loop or curved feature 7418*b* located on the right end of the further rigid section 7416. In such examples, the further rigid section 7416 may connect to arms 7414 extending from the anchor 7412, through the loop or curved feature 7418*a* and 7418*b*. Accordingly, one or both of the loop or curved feature 7418*a* or 7418*b* can be configured to provide one or more of a desired flexibility, bias force magnitude, bias force direction, durability or other characteristics at the interfaces of arms extending from the anchor 7412 and the further rigid section 7416.

In the example in FIG. 74, all of the bracket connectors 7417 on the further rigid section 7416 are located between the loop or curved features 7418*a* and 7418*b*. In other examples, one or more of the bracket connectors 7417 may be located between one or both features 7418*a* or 7418*b* and the respective arms 7414 that are connected to the ends of the further rigid section 7416.

Other examples may include more or less than five loop or curved features along the length of the further rigid section 7416, more or less than one bracket connector 7417 between each adjacent pair of loop or curved features 7418, or more than one loop or curved feature 7418 between two adjacent bracket connectors 7417. The number, configuration and location of the bracket connectors 7417 and the loop or curved features 7418 may be selected for the appliance 7400, to provide (when the appliance is installed) the desired teeth connection positions and desired forces on the teeth, as described herein. For example, the number, configuration and location of the bracket connectors 7417 and the loop or curved features 7418 may be selected to move one or more teeth from an original tooth arrangement (OTA) to the final tooth arrangement (FTA), or to an intermediate tooth arrangement (ITA), or from an ITA to an FTA or another ITA.

The appliance 7400 is configured to be installed on a patient, by coupling the bracket connector elements 7414*b* and bracket connectors 7417 to corresponding brackets (or female connector elements) that have been secured to the patient's teeth (or to a selected number of teeth) in one of the patient's jaws. The brackets or female connector elements may have any suitable configuration and may be secured to a patient's teeth in any suitable manner including, but not limited to the configurations and manners of securing described in connection with the brackets or female connector elements at reference numbers 700, 1300, 1501, 1601, 1706, 2600, and 2610 in U.S. patent application Ser. No. 15/370,704 (Publ. No. 2017/0156823).

The appliance 7400 and associated brackets (or female connector elements), may be manufactured in any suitable manners, including, but not limited to any of the manners of manufacturing any of the appliances or brackets (or female connector elements) as described in U.S. patent application Ser. No. 15/370,704 (Publ. No. 2017/0156823), including, but not limited to molding, casting, machining, 3D printing, stamping, extruding, or the like. However, in particular examples, the appliance 7400 or female connector elements (or both) are made by cutting a two dimensional (2D) form of the appliance from a 2D sheet of material and bending the 2D form into a desired 3D shape of the appliance, according to processes as described in U.S. patent application Ser. No. 15/370,704 (Publ. No. 2017/0156823) or other suitable processes. In those or other examples, the appliance 100 may be configured in a single, unitary structure, from a single sheet (or type) of material. In other examples, the appliance 7400 may be configured from multiple components that are coupled together in any suitable manner such as, but not limited to, welds, solder, adhesives, press or friction fitting, mechanical connector, or the like.

In the examples described with reference to FIG. 74, the appliance 7400 includes a combination of X and Z features (including one or more features of one or more examples according to embodiment Z and one or more features of one or more examples according to embodiment X). With regard to features according to embodiment X, the appliance 7400 includes one or more (or a plurality) of separate arms 7414 that extend from the one or more rigid bars 7412. With regard to features examples according to embodiment Z, the appliance 7400 also includes one or more rigid bars 7416 having one or more bracket connectors 7417 and one or more loop or curved feature 7418 (force applying feature) formed along its length dimension.

Figure 75:
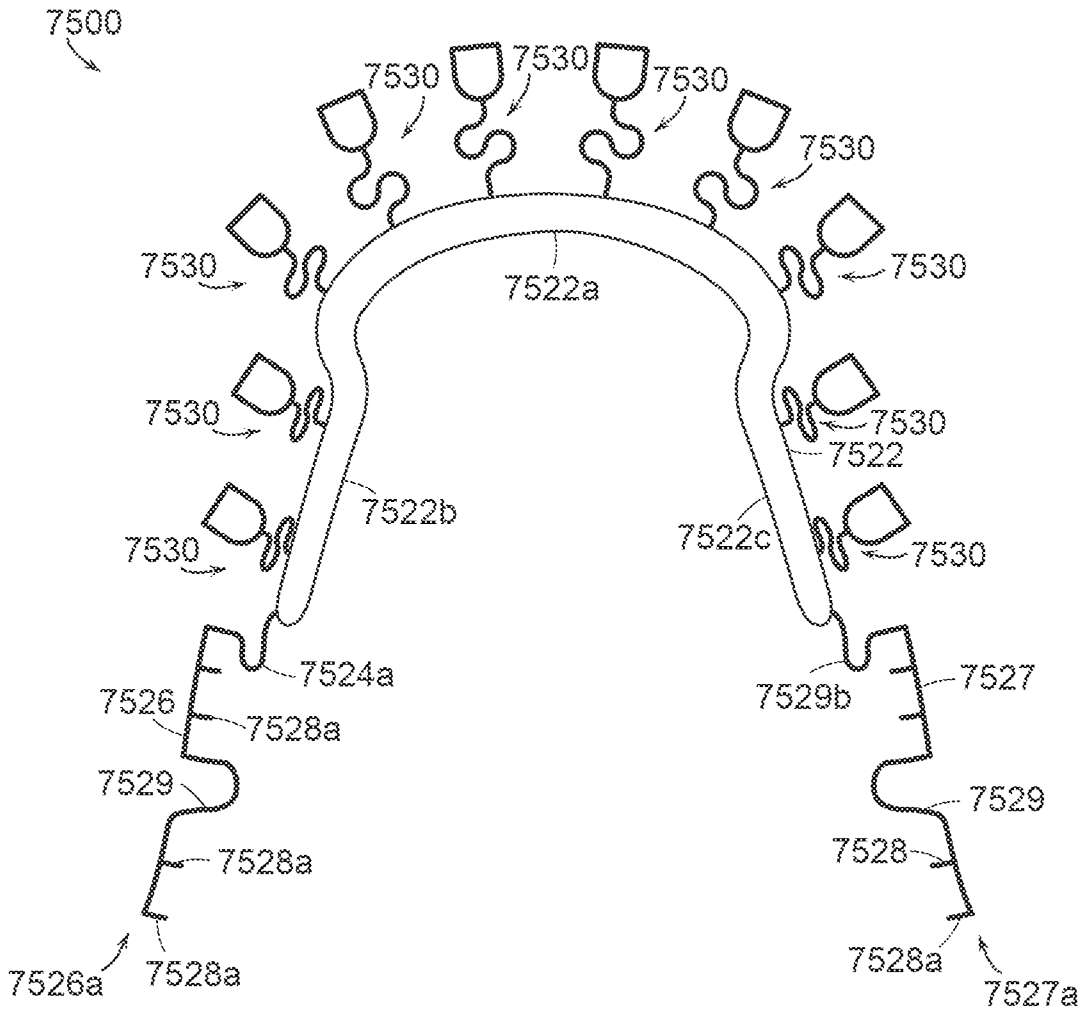
FIG. 75 is an isometric top view of an orthodontic appliance configured in accordance with embodiments of the present technology.
Figure 76:
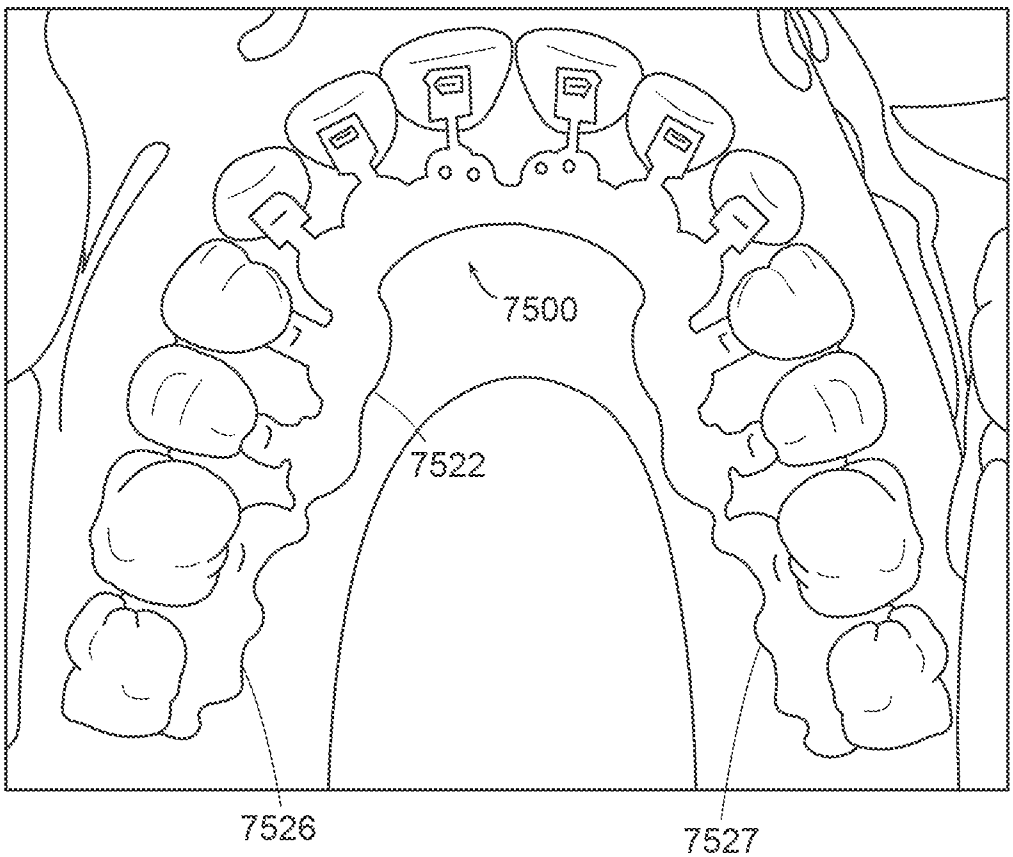
FIG. 76 is a perspective representation of the orthodontic appliance of FIG. 75, installed in a patient's mouth.

Another example of an appliance 7500 having a combination of X and Z features is shown in FIGS. 75 and 76. The appliance 7500 is shown in FIG. 75 in an uninstalled state (not installed on a patient). The appliance 7500 is shown in FIG. 76 in an installed state (installed on the teeth of a patient). The appliance 7500 includes an anchor 7522 that corresponds to the anchor 7412 of appliance 7400. However, the anchor 7522 has a lengthwise dimension including a section 7522*a* that is configured to extend along the incisor, lateral incisor, and cuspid (canine) teeth, and further sections 7522*b* and 7522*c* configured to extend along some, but not all of the bicuspid or molar teeth, when the appliance is installed. In other embodiments, the anchor 7522 may be smaller in length and, for example, may include section 7522*a* (or a portion of section 7522*a*), but no portions of sections 7522*b* or 7522*c*. In other embodiments, the anchor 7522 may include section 7522*a* and a longer section 7522*b* or a longer section 7522*c* that extend to molar teeth on one side of the appliance 7522, when the appliance is installed. The anchor 7522 may be formed in an arch shape (an arch shaped member having a generally arch-shaped configuration) that is configured to extend along two or more (or a plurality of) adjacent teeth in one of the patient's jaws, when the appliance 7500 is installed.

A plurality of arms 7530 extend from the anchor 7522. The arms 7530 of the appliance 7500 may correspond in structure and function as described with regard to the arms 7414 of the appliance 7400. For example, the arms 7530 may include spring members and bracket connectors (or male connector elements) similar to those described with regard to arms 7414 of the appliance 7400. The arms 7530 may be spaced along the length dimension of the anchor 7522 in a manner similar to the spacing described with regard to arms 7414 on the anchor 7412. However, in the appliance 7500, at least some of the arms 7530 are located along the anchor section 7522*a* that is configured to extend along some or all of the incisor, lateral incisor, and cuspid (canine) teeth. In other examples, the appliance 7500 may include a further rigid section extending along the anchor section 7522*a*, or along some or all of the anchor sections 7522*b* or 7522*c* (such as, but not limited to the further rigid section 7416 of the appliance 7400), instead of or in addition to one or more (or all) of the arms 7530 located along the anchor section 7522*a* (or along sections 7522*b* or 7522*c*).

In the example in FIG. 75, the appliance 7500 includes ten arms 7530 extending from the anchor 7522, including six arms extending from the anchor section 7522*a*, two arms extending from the anchor section 7522*b* and two arms extending from the anchor section 7522*c*. In other examples, the appliance 7500 may include fewer or more arms along one or more of the length sections 7522*a*, 7522*b* and 7522*c*.

The appliance 7500 also includes further rigid sections (or second rigid bars) 7526 and 7527, extending from the right side end and the left side end, respectively of the anchor 7522. Each further rigid section 7526 and 7527 has a lengthwise dimension extending from one end of the anchor 7522 to a distal end 7526*a* and 7527*a*, respectively. In other examples, the appliance 7500 may include one of the further rigid sections 7526 or 7527, but not the other further rigid section 7527 or 7526. In those or other examples, the appliance 7500 may include one or more further rigid sections (similar to the further rigid sections 7526 and 7527) located along a portion (or all) of the length of the anchor section 7522*a*, instead of (in place of) the anchor section 7522*a*.

In the example in FIG. 75, the further rigid section 7526 has a shape that corresponds to (or is a mirror image of) the shape of the further rigid section 7527. In other examples, the further rigid section 7526 may have a shape and configuration that is different from the shape and configuration of the further rigid section 7527.

Each further rigid section 7526 and 7527 has a plurality of bracket connectors 7528 and a plurality of loop or curved features 7529 formed along its length dimension. The distal end of each further rigid section 7526 and 7527 may include a portion of a bracket connector 7528*a*. Each of the bracket connectors 7528, and loop or curved features 7529 may correspond in structure, arrangement and function to any of the various examples described with regard to the bracket connectors 7417 and loop or curved features 7418 of the appliance 7400. In other examples, one or more (or all) of the bracket connectors 7528, or features 7529 may have other suitable structures, configurations or functions.

In certain examples, such as shown in FIG. 75, the loop or curved features 7529 may include a loop or curved feature 7529*a* at or adjacent the location at which the further rigid section 7526 extends from the anchor 7522, and a further loop or curved feature 7529*b* at or adjacent the location at which the further rigid section 7527 extends from the anchor 7522. In such examples, the further rigid sections 7526 and 7527 may connect to the anchor 7522, through the loop or curved feature 7529*a* or 7529*b*. In some examples, the loop or curved features 7529*a* and 7529*b* may be a curved or loop feature on an arm extending from the anchor 7522 (for example, similar to an arm 30). Accordingly, one or both of the loop or curved feature 7529*a* or 7529*b* can be configured to provide one or more of a desired flexibility, bias force magnitude, bias force direction, durability or other characteristics at the interfaces of the anchor 7522 and the further rigid sections 7526 and 7527.

In the example in FIG. 75, all of the bracket connectors 7528 on the left side of the appliance 7500 are located between the loop or curved feature 7529*a* and the distal end 7526*a* of the further rigid section 7526. Similarly, all of the bracket connectors 7528 on the right side of the appliance 7500 are located between the loop or curved feature 7529*b* and the distal end 7527*a* of the further rigid section 7527. In other examples, one or more of the bracket connectors 7528 may be located between the loop or curved feature 7529*a* or 7529*b* and the anchor distal ends 7526*a* or 7527*a*, respectively.

Similar to the appliance 7400, the number, configuration and location of the arms 7530, bracket connectors 7528 and loop or curved features 7529 may be selected for the appliance 7500, to provide (when the appliance is installed) the desired teeth connection positions and desired forces on the teeth, as described herein. For example, the number, configuration and location of the arms, the bracket connectors, and the loop or curved features may be selected to move one or more teeth from an original tooth arrangement (OTA) to the final tooth arrangement (FTA), or to an intermediate tooth arrangement (ITA), or from an ITA to an FTA or another ITA.

With regard to features according to embodiment X, the appliance 7500 includes one or more (or a plurality) of separate arms 30 that extend from the one or more rigid bars 7522. With regard to features examples according to embodiment Z, the appliance 7500 also includes one or more rigid bars 7526 or 7527 having one or more bracket connectors 7528 and one or more loop or curved feature 7529 (force applying feature) formed along its length dimension.

Figure 77:
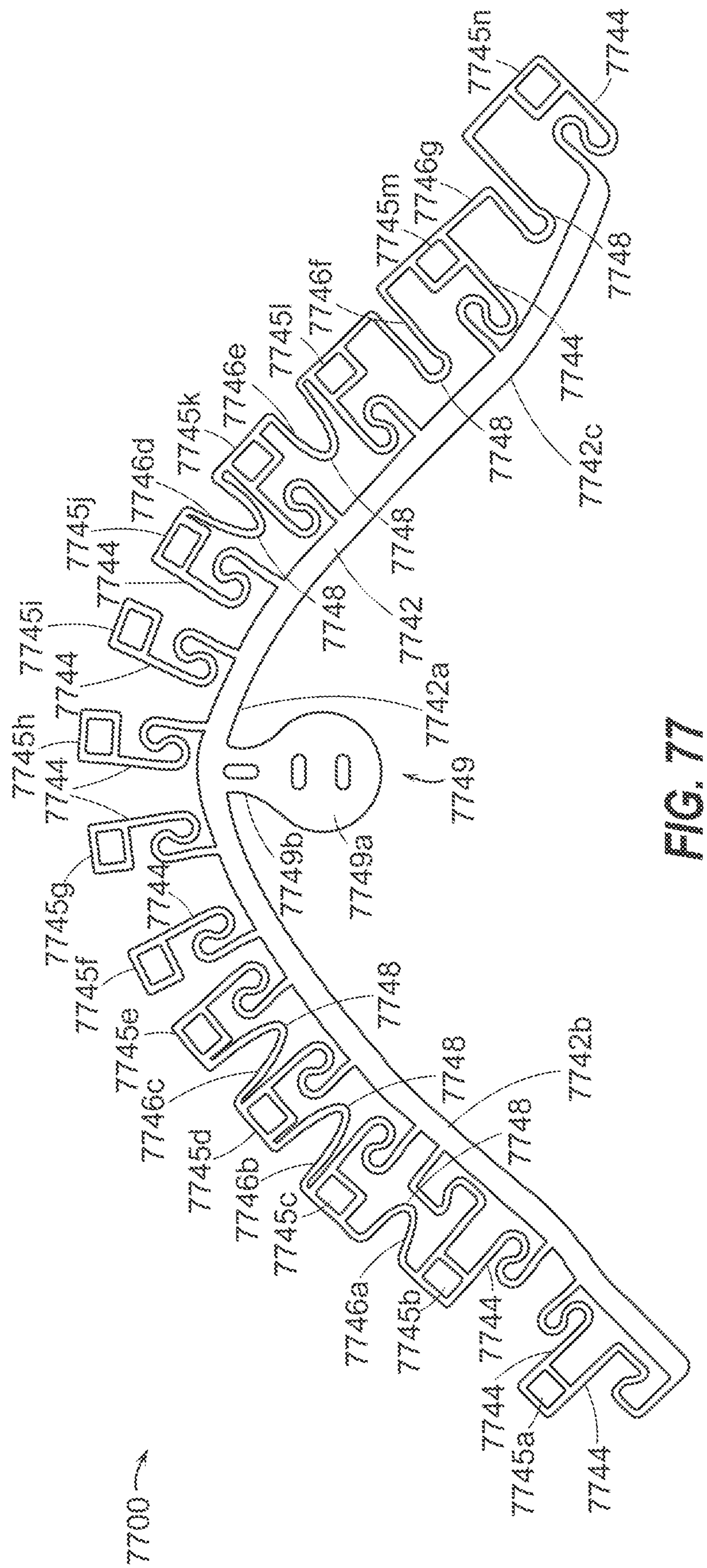
FIGS. 77-85 show various configurations of orthodontic appliances configured in accordance with embodiments of the present technology.

Another example of an appliance having a combination of X and Z features is described with regard to the 2D member 7700 for forming an appliance, as shown in FIG. 77. The 2D appliance member 7700 in FIG. 77 is configured to be bent or otherwise formed into a 3D appliance in any suitable manner, including processes as described in U.S. patent application Ser. No. 15/370,704 (Publ. No. 2017/0156823). However, an appliance having features as described with regard to the example in FIG. 77 may be made according to other suitable processes.

An appliance in accordance with the example of FIG. 77 may be made and used in manners similar or corresponding to such manners described herein for appliances 7400 and 7500. An appliance according to the example of FIG. 77 may include certain features corresponding in structure or function (or both) to some of the features of appliance 7400 or appliance 7500.

For example, the appliance member 7700 includes an anchor 7742 that corresponds to the anchor 7412 of appliance 7400. The anchor 7742 has a lengthwise dimension including a section 7742*a* that is configured to extend along the incisor, lateral incisor, and cuspid (canine) teeth, and further sections 7742*b* and 7742*c* configured to extend along some, but not all of the bicuspid or molar teeth, when the appliance formed from the appliance member 7700 is installed. In other embodiments, the anchor 7742 may be smaller in length and, for example, may include section 7742*a* (or a portion of section 7742*a*), but no portions of sections 7742*b* or 7742*c*. In other embodiments, the anchor 7742 may include section 7742*a* and a longer section 7742*b* or a longer section 7742*c* that extend to molar teeth on one side of the appliance, when the appliance is formed and installed. In yet other embodiments, the appliance may include an anchor 7742 having a length dimension, with one or two second rigid bars (or further rigid bar sections) having Z embodiment features (for example, corresponding to the second rigid bars 7526 or 7527 of the appliance 7500).

The anchor 7742 may have an arch shape (an arch shaped member having a generally arch-shaped configuration) that is configured to extend along two or more (or a plurality of) adjacent teeth in one of the patient's jaws, when the appliance is formed and installed. A plurality of arms 7744 extend from the anchor 7742. The arms 7744 may correspond in structure and function as described with regard to the arms 7414 or 7530 of the appliance 7400 or 7500. For example, the arms 7744 may include spring members and bracket connectors (or male connector elements) similar to those described with regard to arms 7414 and 7530.

The arms 7744 may be spaced along the length dimension of the anchor 7742 in a manner similar to the spacing described with regard to arms 7414 on the anchor 7412. However, in the appliance member 7700, at least some of the arms 7744 are located along the anchor section 7742*a* that is configured to extend along some or all of the incisor, lateral incisor, and cuspid (canine) teeth. In other examples, the appliance member 7700 may include a further rigid section extending along the anchor section 7742*a*, or along some or all of the anchor sections 7742*b* or 7742*c* (such as, but not limited to the further rigid section 7416 of the appliance 7400), instead of one or more (or all) of the arms 7744 located along the anchor section 7742*a* (or along sections 7742*b* or 7742*c*).

In the example in FIG. 77, the appliance member 7700 includes sixteen arms 7744 extending from the anchor 7742 to fourteen bracket connectors 7745*a*-7745*n*. One or more (or all) of the bracket connectors may be connected to or part of two respective arms 7744, such as shown in FIG. 77 with regard to the bracket connectors 7745*a* and 7745*b*. One or more (or all) of the other bracket connectors may be connected to or part of a single arm 7744, such as shown in FIG. 77 with regard to the bracket connectors 7745*c*-7745*n*. In other examples, the appliance member 7700 may include fewer or more arms along one or more of the length sections 7742*a*, 7742*b* and 7742*c*. Also, the appliance member 7700 of other examples may include fewer or more bracket connectors.

An appliance member according to the example in FIG. 77 includes one or more second rigid bars extending to and between two or more of the bracket connectors. In the example in FIG. 77, the appliance member 7700 includes a second rigid bar having segments 7746*a*, 7746*b* and 7746*c* extending between bracket connectors 7745*b*, 7745*c*, 7745*d* and 7745*e*. The appliance 7740 includes another second rigid bar having segments 7746*d*, 7746*e*, 7746*f* and 7746*g* extending between the bracket connectors 7745*j*, 7745*k*, 77451, 7745*m* and 7745*n*. In other examples, the number and configuration of second rigid bars and segments 7746*a*-*g*, and the number and location of bracket connectors 7745*a*-7745*n* to and between which the second rigid bar segments extend, is selected to provide a desired flexibility or force, or both, as described herein.

Each second rigid bar segment 7746*a*-7746*g* may have one or more (or a plurality of) loop or curved features 7748 formed along its length dimension. Each of the bracket connectors 7745*a*-7745*n* and loop or curved features 7748 may correspond in structure, arrangement and function to any of the various examples described with regard to the bracket connectors 7417 and loop or curved features 7418 of the appliance 7400. In other examples, one or more (or all) of the bracket connectors 7745*a*-7745*n*, or features 7748 may have other suitable structures, configurations or functions. One or more of the loop or curved features 7748 can be configured to provide one or more of a desired flexibility, bias force strength, bias force direction, between two or more of the bracket connectors 7745*a*-7745*n*.

In certain examples, such as shown in FIG. 77, the appliance member (or appliance) may include an anchor holder, for anchoring the appliance to a patient's palate. In the example in FIG. 77, the appliance member 7700 includes an anchor holder 7749 or Nance. The anchor holder 7749 is connected to (by being either coupled to or integral with) the anchor 7742. In the example in FIG. 77, the anchor holder 7749 has a rounded, plate-shaped head portion 7749*a* connected to the anchor 7742, through a narrowed neck section 7749*b*. A plurality of apertures is provided in the head portion 7749*a* and the neck portion 7749*b* of the anchor holder 7749. When the appliance is formed and installed, one or more temporary anchorage devices TADs (or other suitable anchorage devices) may be extended through the one or more apertures in the anchor holder 7749, and into the patient's palate (soft and hard tissue), to anchor the appliance to the patient's palate. In particular examples, the anchor holder 7749 is for soft tissue anchorage, where soft tissue is used to help anchor the appliance. In some examples, the appliance member (or appliance), including the anchor holder, may lay against the soft tissue in the patient's palate, without the use of TADs (or other suitable anchoring devices), when the appliance is installed. In other examples, TADs or other suitable anchor holders may be employed. An anchor holder (such as, but not limited to the anchor holder 7749) may be included in any of the example embodiments described herein.

Figure 78:
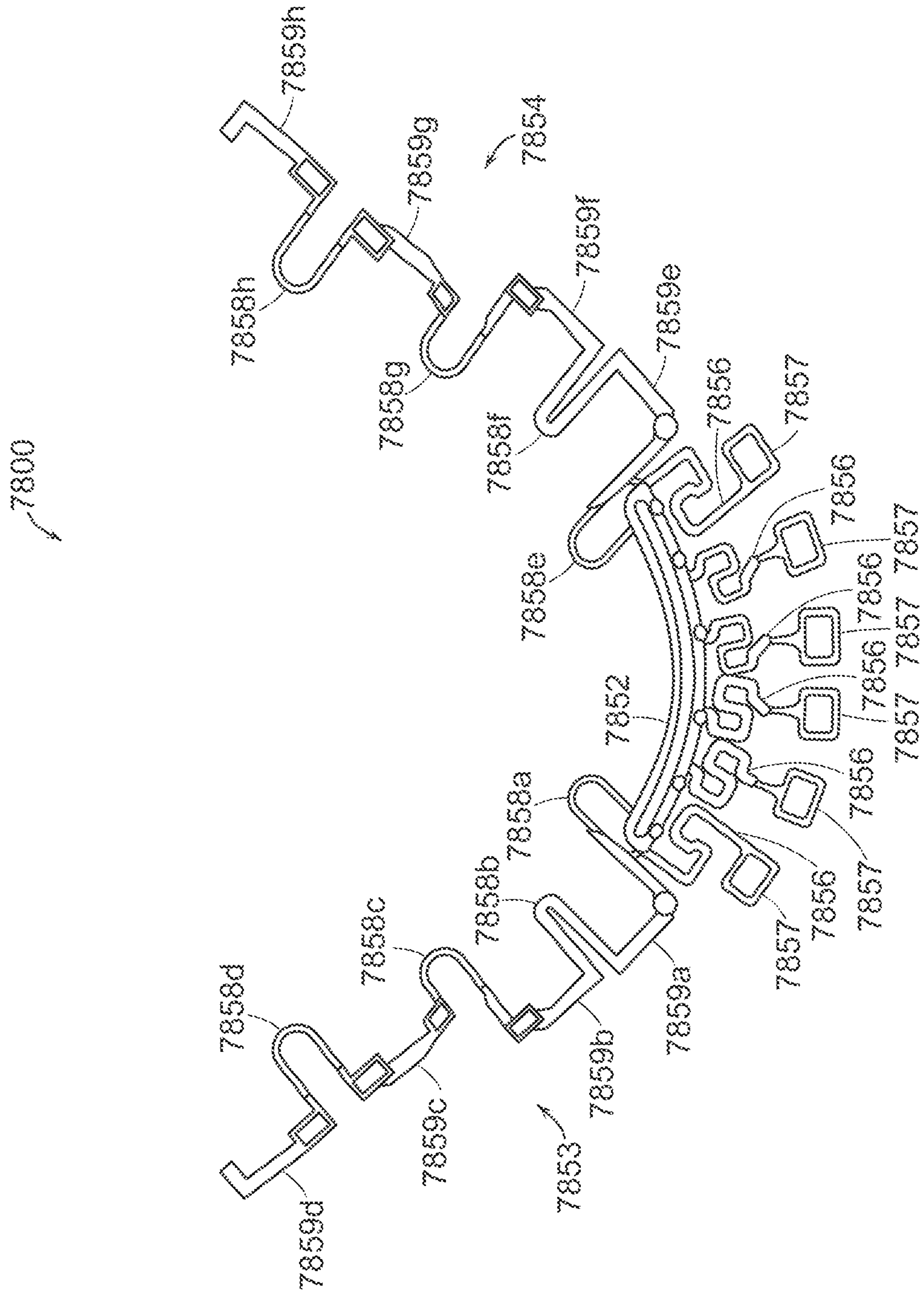
Figure 79:
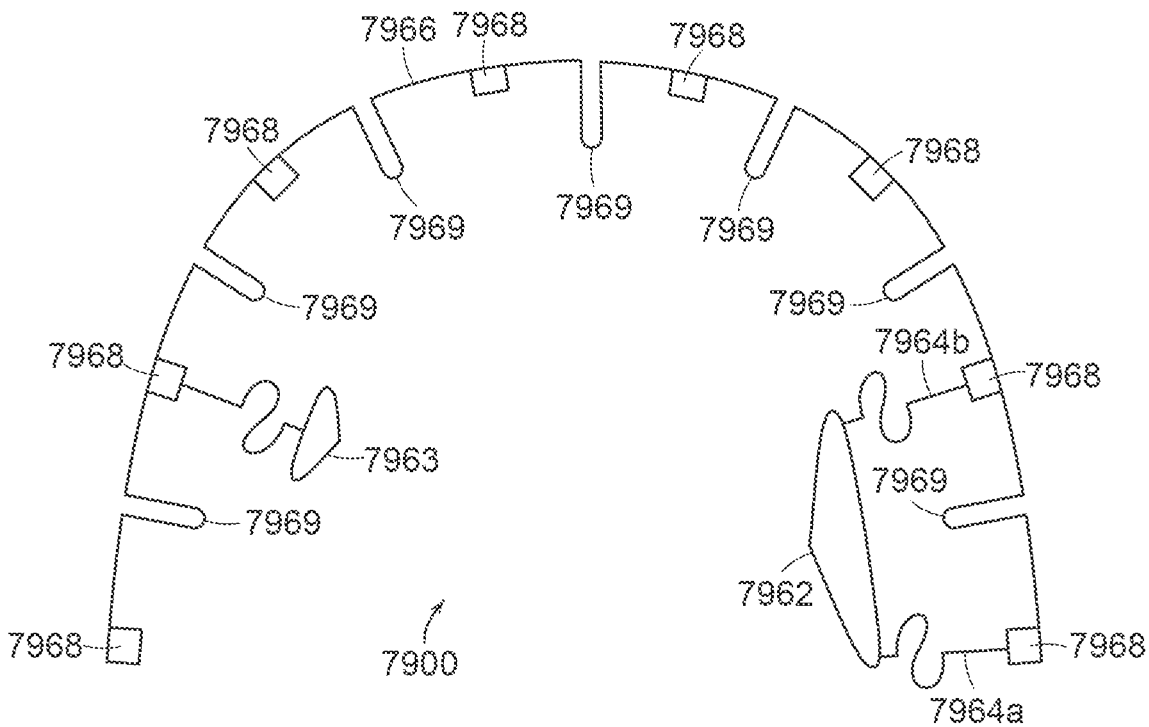
Figure 80:
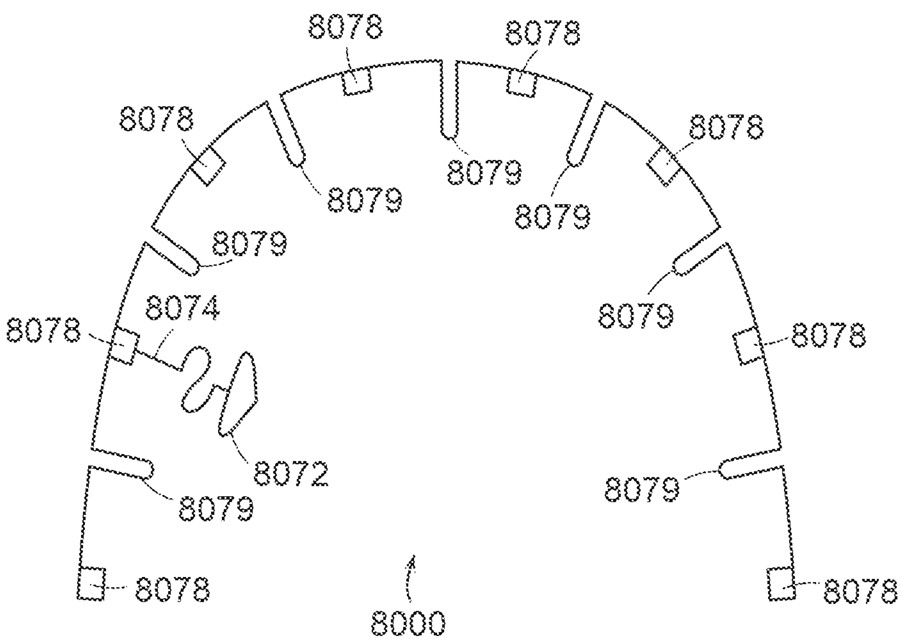
Figure 81:
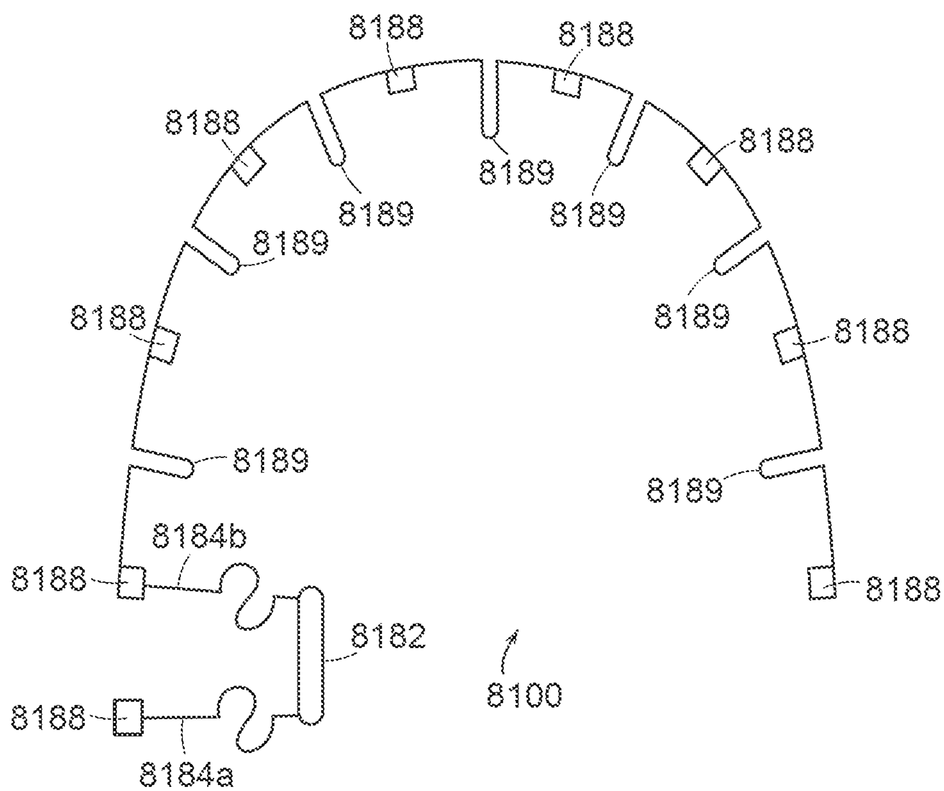
Figure 82:
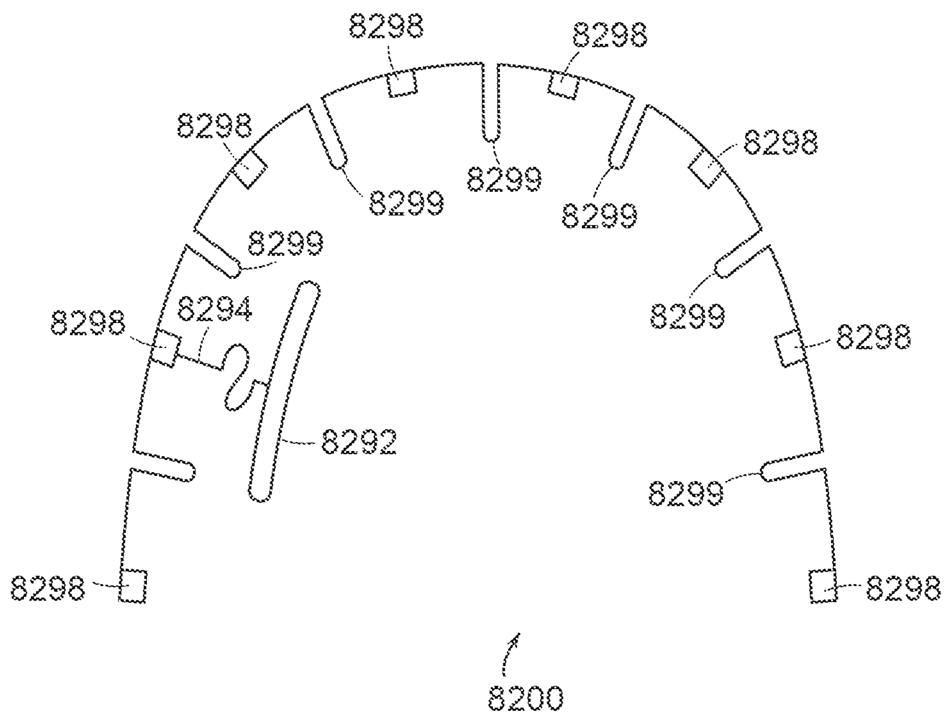

Another example of an appliance having a combination of X and Z features is described with regard to the 2D member 7800 for forming an appliance, as shown in FIG. 78. The 2D appliance member 7800 in FIG. 78 is configured to be bent or otherwise formed into a 3D appliance in any suitable manner, including processes as described in U.S. patent application Ser. No. 15/370,704 (Publ. No. 2017/0156823). However, an appliance having features as described with regard to the example in FIG. 78 may be made according to other suitable processes.

An appliance in accordance with the example of FIG. 78 may be made and used in manners similar or corresponding to such manners described herein for the appliances 7400 or 7500 or the appliance member 7700. An appliance according to the example of FIG. 78 may include certain features corresponding in structure or function (or both) to some of the features of the appliance 7400 or the appliance 7500, or the appliance member 7700.

For example, the appliance member 7800 includes an anchor 7852 that corresponds to the anchor 7412 of the appliance 7400, or the anchor 7522 of the appliance 7500, or the anchor 7742 of the appliance member 7700. The anchor 7852 has a lengthwise dimension that is configured to extend along the incisor, lateral incisor, and cuspid (canine) teeth, when the appliance is formed and installed. Further rigid bars or bar sections 7853 and 7854 are connected to (coupled to or extended from) the anchor 7852, to extend along some or all of the bicuspid or molar teeth, when the appliance formed from the appliance member 7850 and is installed. In other examples, the anchor 7852 may be smaller in length than shown in FIG. 78 and, for example, may extend along some (but not all) of the incisor, lateral incisor, and cuspid (canine) teeth when the appliance is formed and installed. In other examples, the anchor 7852 may extend further along bicuspid or molar teeth (in place of some or all of one or both bar or bar sections 7853 and 7854) when the appliance is formed and installed. In yet other examples, one or both sections 7853 and 7854 may be omitted or smaller than shown in FIG. 78.

The anchor 7852 may have an arch shape (an arch shaped member having a generally arch-shaped configuration) that is configured to extend along two or more (or a plurality of) adjacent teeth in one of the patient's jaws, when the appliance is formed and installed. A plurality of arms 7856 extend from the anchor 7852. The arms 7856 may correspond in structure and function as described with regard to the arms 7414, 7530 or 7744 of the appliance 7400 or 7500 or the appliance member 7700. For example, the arms 7856 may include spring members and bracket connectors (or male connector elements) similar to those described with regard to arms 7414, 7530 or 7744.

The arms 7856 may be spaced along the length dimension of the anchor 7852 in a manner similar to the spacing described with regard to arms 7414 on the anchor 7412 in FIG. 74, or the arms 7744 on the anchor 7742 in FIG. 77. In the appliance member 7800, all of the arms 7856 are located along the anchor 7852 that is configured to extend along some or all of the incisor, lateral incisor, and cuspid (canine) teeth.

In the example in FIG. 78, the appliance member 7800 includes six arms 7856 extending from the anchor 7852 to six corresponding bracket connectors 7857. Each respective bracket connector 7857 may be connected to or part of a single respective arm 7856, such as shown in FIG. 78. In other examples, one or more (or all) of the bracket connectors may be connected to or part of two respective arms (for example, similar to the manner shown in FIG. 77 with regard to the bracket connectors 7745*a* and 7745*b*). In other examples, the appliance member 7800 may include fewer or more arms along the length of rigid bar 7852. Also, the appliance member 7800 of other examples may include fewer or more bracket connectors.

An appliance member according to the example in FIG. 78 includes one or more further rigid bars or bar sections 7853 and 7854 connected to the anchor 7852. Each further rigid bar 7853 and 7854 may have one or more (or a plurality of) loop or curved features and one or more (or a plurality of) bracket connectors (or male connector elements) along its length dimension. In the example in FIG. 78, the anchors 7853 and 7854 have a total of eight loop or curved features 7858*a*-7858*h* and eight bracket connectors (or male connector elements) 7859*a*-7859*h*. In other examples, each rigid bar 7853 and 7854 may have more or less loop or curved features or bracket connectors than shown in the example of FIG. 78.

Each of the bracket connectors 7859 and loop or curved features 7858 may correspond in structure, arrangement and function to any of the various examples described with regard to the bracket connectors 7417 and loop or curved features 7418 of the appliance 7400, or with regard to the bracket connectors 7745*a*-7745*n* and loop or curved features 7748 of the appliance member 7700. In other examples, one or more (or all) of the bracket connectors 7859, or features 7858 may have other suitable structures, configurations or functions. One or more of the loop or curved features 58 can be configured to provide one or more of a desired flexibility, bias force strength, bias force direction, between two or more of the bracket connectors 7859.

In certain examples, such as shown in FIG. 78, the loop or curved features 7858 may include a loop or curved feature 7858*a* at or adjacent the location at which the further rigid bar 7853 extends from the anchor 7852, and a further loop or curved feature 7858*e* at or adjacent the location at which the further rigid bar 7854 extends from the anchor 7852. In such examples, the further rigid bars 7853 and 7854 may connect to the anchor 7852, through the loop or curved feature 7858*a* or 7858*e*. Accordingly, one or both of the loop or curved feature 7858*a* or 7858*e* can be configured to provide one or more of a desired flexibility, bias force magnitude, bias force direction, durability or other characteristics at the interfaces of the anchor 7852 and the further rigid bars 7853 and 7854.

Other example appliances (or appliance members) 7900, 8000, 8100 and 8200 having a combination of X and Z features are shown in FIGS. 79-82, respectively, and may be made and used in manners similar or corresponding to such manners described herein for the appliances 7400 or 7500, or the appliance members 7700 or 7800. An appliance according to any of the examples of FIGS. 79-82 may include certain features corresponding in structure or function (or both) to some of the features of the appliances 7400 or 7500, or the appliance members 7700 or 7800.

In particular, each of the appliances (or appliance members) 7900, 8000, 8100 and 8200 includes one or more rigid bars and one or more (or a plurality) of separate arms that extend from the one or more rigid bars, for example, in accordance with X embodiment features described herein. In particular, the appliance (or appliance member) 7900 includes two rigid bars 7962 and 7963. The appliance 8000 (or appliance member) includes an anchor 8072. The appliance 8100 includes an anchor 8182, and the appliance 8200 (or appliance member) includes an anchor 8292. Each of the anchors 7962, 8182 and 8292 have a lengthwise dimension that is configured to extend along two or more teeth, when the appliance is formed and installed. However, each of the anchors 7963 and 8072 has a lengthwise dimension that is configured to extend along one tooth, when the appliance is formed and installed. The anchors 7962, 7963, 8072, 8183 and 8292 may each correspond in structure to the anchor 7412 of the appliance 7400, the anchor 7522 of the appliance 7500, the anchor 7742 of the appliance member 7700 or the anchor 7852 of the appliance member 7800. Other examples may include any suitable number, size and locations of rigid bars.

Each of the appliances (or appliance members) 7900, 8000, 8100 and 8200 includes one or more (or a plurality of) arms extending from the one or more rigid bars. For example, the appliance (or appliance member) 7900 includes two arms 7964*a* and 7964*b* extending from the anchor 7962, and a third arm 7964*c* extending from the anchor 7963. The appliance (or appliance member) 8000 includes one arm 8074 extending from the anchor 8072. The appliance (or appliance member) 8100 includes arms 8184*a* and 8184*b* extending from the anchor 8182. The appliance 8200 (or appliance member) includes one arm 8294 extending from the anchor 8292. Each of the arms extends to a respective bracket connector (or male connector element).

Each of the appliances (or appliance members) 7900, 8000, 8100 and 8200 includes one or more further rigid sections having Z embodiment features, and connected to (by being coupled to or integral with) the anchor 7962, 7963, 8072, 8183 or 8292, through one or more arms. For example, the appliance (or appliance member) 7900 includes a further rigid section 7966 connected to the anchor 7962 through arms 7964*a* and 7964*b*, and connected to the anchor 7963 through the arm 7964*c*. Similarly, the appliance (or appliance member) 8000 includes a further rigid section 8076 that is connected to the anchor 8072 through the arm 8074. Also similarly, the appliance (or appliance member) 8100 includes a further rigid section 8186 that is connected to the anchor 8182 through an arm 8184*b*. Also similarly, the appliance (or appliance member) 8200 includes a further rigid section 8296 that is connected to the anchor 8292 through an arm 8294.

Each of the further rigid sections 7966, 8076, 8186 and 8296 have a length dimension extending in a generally arch shaped configuration. One or more bracket connectors and one or more loop or curved feature (force applying feature) are provided along the length dimension of the one or more further rigid sections 7966, 8076, 8186 and 8296. For example, the rigid section 7966 of the appliance (or appliance member) 7900 has eight bracket connectors 7968 and seven loop or curved features 7969. Similarly, the rigid section 8076 of the appliance (or appliance member) 8000 has eight bracket connectors 8078 and seven loop or curved features 8079, the rigid section 8186 of the appliance (or appliance member) 8180 has eight bracket connectors 8188 and seven loop or curved features 8189, and the rigid section 8296 of the appliance (or appliance member) 8290 has eight bracket connectors 8298 and seven loop or curved features 8299. Any of the examples described herein may include one or more further bracket connectors that are connected to an anchor, but not to the further rigid section, such as the bracket connector at the distal end of the arm 8184*a* in the appliance (or appliance member) 8100 of FIG. 81.

In the examples shown in FIGS. 79-82, each loop or curved feature (7969, 8079, 8189, or 8299) is located between a pair of adjacent bracket connectors (7968, 8078, 8188 or 8298) along the length dimension of the further rigid section (7966, 8076, 8186 or 8296, respectively). In other examples, the further rigid section may include no loop or curved feature (or two or more loop or curved features) between any of the adjacent pairs of bracket connectors. The number, configuration and location of loop or curved features on the further rigid bar 7966, 8076, 8186 or 8296 may be selected to provide the desired teeth connection positions and desired forces on the teeth, when the appliance is installed, as described herein.

Figure 83:
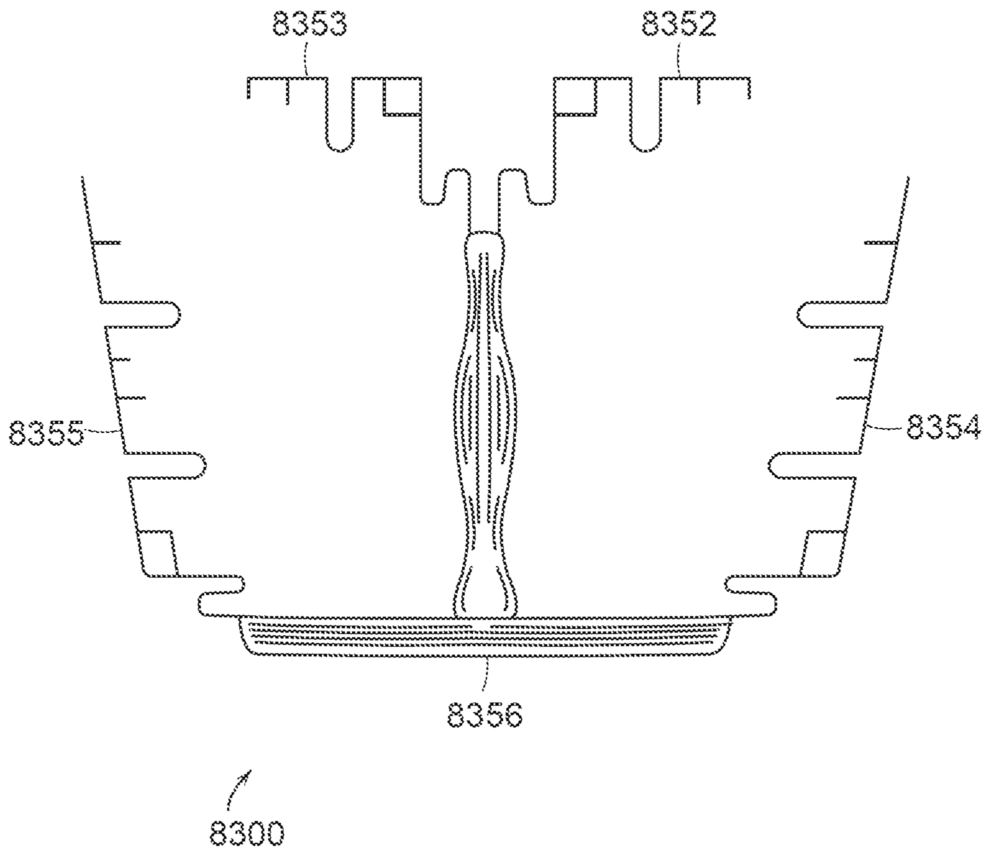
Figure 84:
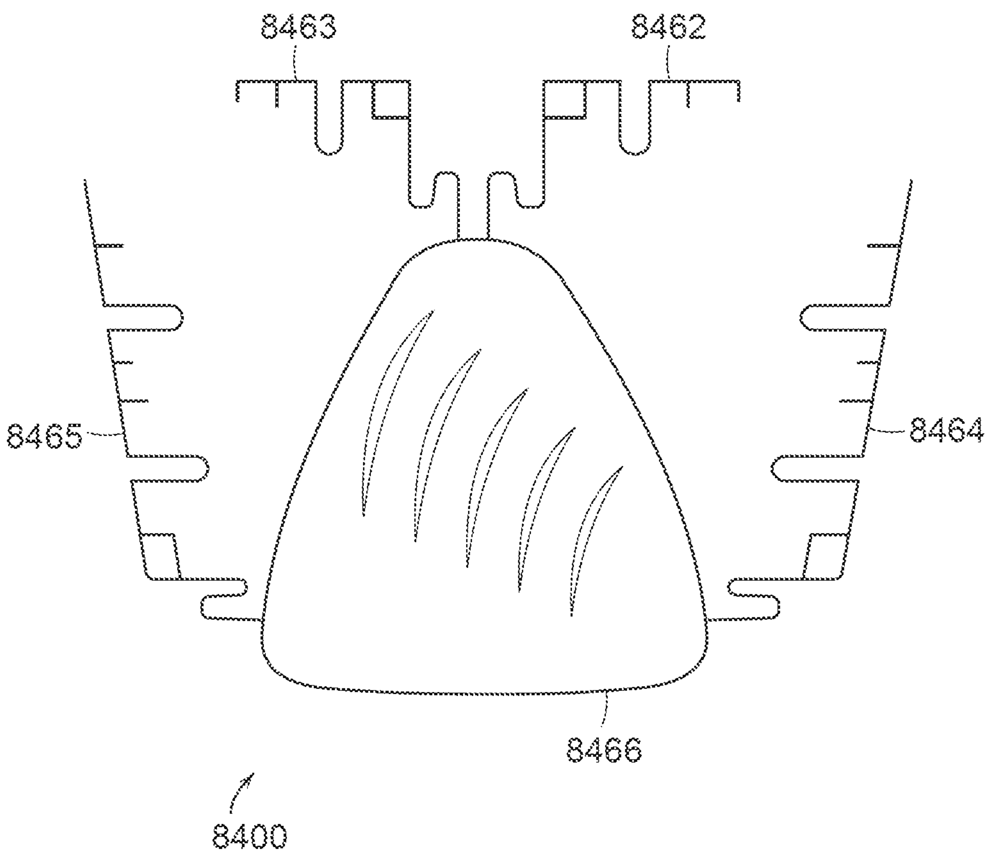
Figure 85:
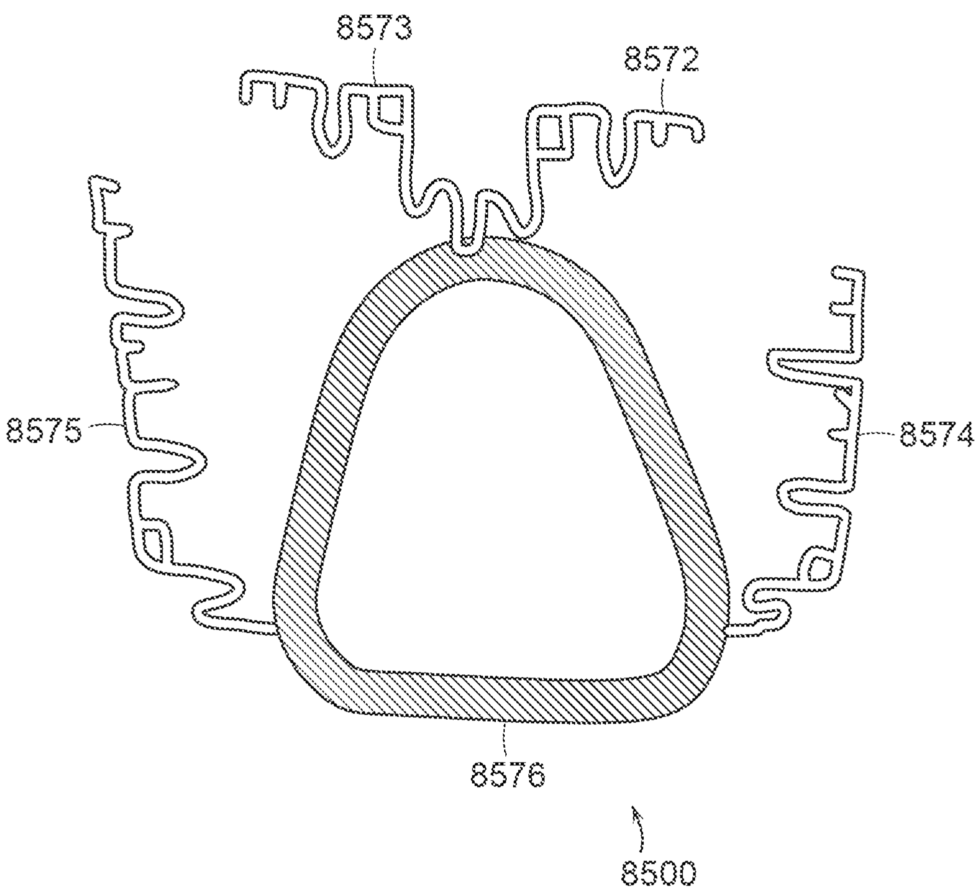

Additional examples of appliances (or appliance members) are shown in FIGS. 83-85, each including a plurality of further rigid sections, each having Z embodiment features. In the example appliance (or appliance member) 8300 in FIG. 83 has four further rigid sections 8352, 8353, 8354 and 8355 extending from a T-shaped central rigid bar 8356. The central rigid bar 8356 has a generally T shape. The example appliance (or appliance member) 8400 of FIG. 84, has four further rigid sections 8462, 8463, 8464 and 8465 extending from a central rigid palate plate 8466. The central rigid palate plate 8466 has a shape to fit against a patient's palate. The example appliance (or appliance member) 8500 in FIG. 85 has four further rigid sections 8572, 8573, 8574 and 8575 extending from a central annular-shaped rigid bar 8576. In any of the appliances described herein, one or more of the arms or loop or curved features or bracket connector elements may be omitted, and replaced with a portion of the anchor or further rigid section that is formed to be rigid with minimal or no flexibility, for example for improved anchorage.

In each of the examples in FIGS. 74-85, the appliance (or an appliance member) includes one or more X embodiment features (in combination with one or more Z embodiment features), including one or more (or a plurality of) arms, extending to one or more (or a plurality of) bracket connectors (or male connector elements). One or more (or each) of the arms may include one or more spring member features. Any of the arms, spring members, and bracket connectors (or male connector elements) of FIGS. 74-85 may have any suitable configuration, including the configurations shown in the respective drawings of those FIGS. 74-85. In other examples, any one or more of the arms, spring members, or bracket connectors (or male connector elements) in any of those or other appliances (or appliance members) described herein may have other suitable configurations according to any of the other arms, spring members, or bracket connectors (or male connector elements) described herein.

Further examples of arms that may be employed as one or more of the arms in any of the examples described herein or in U.S. patent application Ser. No. 15/370,704 (Publ. No. 2017/0156823), or yet other appliance examples, are described with reference to FIGS. 86-90. Each of the example arms extends from an anchor to an associated bracket connector (or male connector element). The anchor may correspond to the anchor in any of the examples of FIGS. 74-85, or the anchor of any other examples described herein, or of yet other appliance or appliance member examples.

Each of the arms 8600-8608, 8909-8930, 9031 and 9032 includes a spring member 8600*b*-8608*b*, 8909*b*-8930*b*, 9031*b* and 9032*b*. In other examples, an arm may include more than one spring member. In particular examples, each spring member has a configuration (including a shape, material, and size) that provides one or more of a desired flexibility, bias force magnitude, bias force direction, durability or other characteristics The number, configuration and location of the spring members may be selected to provide (when the appliance is installed) the desired forces on the teeth to which the bracket connectors of the appliance connect, when the appliance is installed as described herein. For example, the number, configuration and location of the spring members may be selected to move one or more teeth from an original tooth arrangement (OTA) to the final tooth arrangement (FTA), or to an intermediate tooth arrangement (ITA), or from an ITA to an FTA or another ITA.

Figure 86:
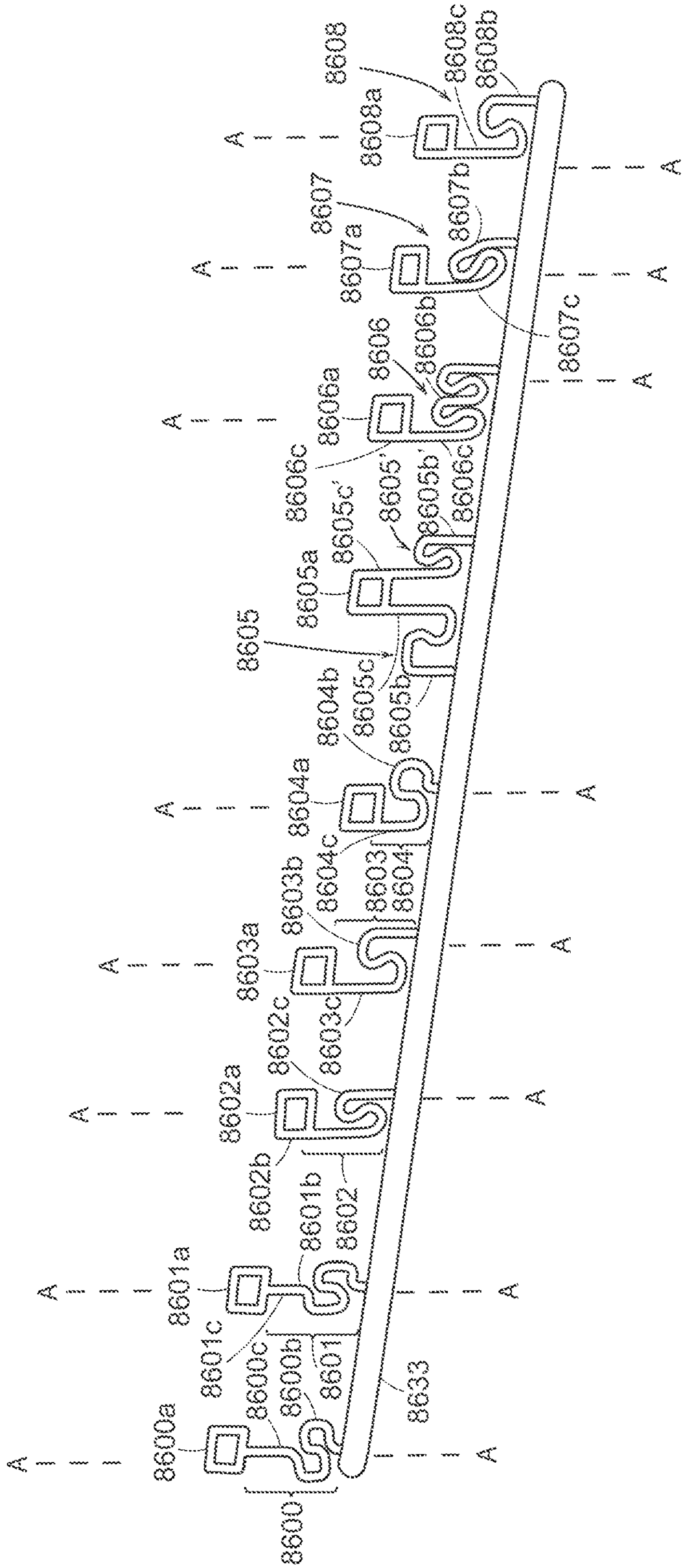
FIG. 86 shows various arm configurations configured in accordance with embodiments of the present technology.

The arm 8600 includes a spring member 8600*b* that has a shape having two open loop portions arranged adjacent each other in a horizontal direction (direction generally parallel to the length dimension of the anchor 8633), forming an "S" shape laying in that horizontal direction. In other examples, the spring member may have one open loop or more than two open loops. In the example of FIG. 86, the bracket connector 8600*a* of the arm 8600 is located vertically above the location at which the arm couples to or extends from the anchor 8633 (and is centered along an axis A perpendicular to the length dimension of the anchor 8633 at the location at which the arm 8600 connects to the anchor 8633). In other examples, the bracket connector 8600*a* may be located laterally offset from the axis A (e.g., toward the right or the left of the axis A).

The arm 8600 in the example in FIG. 86 includes a linear arm section 8600*c* that extends from the spring member 8600*b* to the bracket connector 8600*a*. In some examples, the linear arm section 8600*c* may extend along the axis A as shown in FIG. 86. In other examples, the linear arm section 8600*c* may be laterally spaced from but parallel to the axis A, or may extend at an angle transverse (non-parallel) to the axis A. In other examples, the arm section 8600*c* may be nonlinear (curved or other suitable shape) or may be omitted (such that the spring member 8600*b* extends to the bracket connector 8600*a*). In certain examples, the arm section 8600*c* (or corresponding arm section of other arms described herein) has a sufficient length dimension to be gripped by an operator, doctor or other trained personnel (e.g., with a tool, such as, but not limited to a Weingart tool as described herein) during installation of an appliance, to help guide the bracket connector 8600*a* into engagement with a bracket.

The two open loop portions of the spring member 8600*b* of the arm 8600 have a generally rectangular shape, including one or more straight edges (e.g., the horizontal and vertical edges of the spring member 8600*b* in FIG. 86) that meet at rounded corners. In other examples, the open loop portions of the spring member may have curved edges or may be elongated in the vertical (axis A) direction or in the horizontal direction (perpendicular to axis A), or in a direction that is at an obtuse angle relative to the axis A.

For example, the arm 8601 in FIG. 86 has a spring member 8601*b* and arm section 8601*c* that is similar in shape and configuration to the spring member 8600*b* and arm section 8600*c* of the arm 8600. However, the two open loop portions of the spring member 8601*b* of the arm 8601 have rounded edges. In addition, the two open loop portions of the spring member 8601*b* are more elongated in the vertical direction (direction of axis A) than in a horizontal direction (perpendicular to the direction of axis A). In other examples, the open loop portions of the spring member 8601*b* may be more elongated in the horizontal direction than in in the vertical direction, or in a direction at an obtuse angle relative to the axis A. Similarly, other examples of the spring member 8600*b* of the arm 8600 may have loop portions that are more elongated in the vertical direction, the horizontal direction, or an obtuse angled direction, relative to the axis A.

FIG. 86 shows another example of an arm 8602 that includes a spring member 8602*b* with a shape having two open loop portions arranged adjacent each other in a horizontal direction (direction generally parallel to the length dimension of the anchor 8633), forming an "S" shape laying in that horizontal direction. However, the center of the bracket connector 8602*a* of the arm 8602 is laterally offset from the axis A, such that the bracket connector 8602*a* is located mostly or entirely on one side of the axis A (the left side in FIG. 86). In other examples, the spring member 8602*b* may be oriented in the opposite direction as shown, such that the bracket connector 8602*a* is located mostly or entirely on the other side of the axis A (the right side in FIG. 86).

In the arm 8602, the spring member 8602*b* is configured such that the entire spring member 8602*b* (or substantially the entire spring member 8602*b*) is located vertically below the bracket connector 8602*a* (between the bracket connector 8602*a* and the anchor 8633). In other examples, some or all of the spring member 8602*b* may be located laterally offset from the bracket connector 8602*a* (in a direction perpendicular to the axis A).

For example, the arm 8603 in FIG. 86 has a spring member 8603*b* and arm section 8603*c* that is similar in shape and configuration to the spring member 8602*b* and arm section 8602*c* of the arm 8602. However, the two open loop portions of the spring member 8603*b* are spread out in the lateral direction more than the open loop portions of the spring member 8602*b*. As a result, a substantial portion of the spring member 8603*b* (e.g., one of the loop portions) is laterally offset from the bracket connector 8603*a* in a direction perpendicular to the axis A.

The arm 8604 has a has a spring member 8604*b* and arm section 8604*c* that is similar in shape and configuration to the spring member 8603*b* and arm section 8603*c* of the arm 8603. However, the two loop portions of the spring member 8604*b* are shaped different from the loop portions 8603*b*. In particular, one of the open loop features of the spring member 8604*b* has a "U" shape, with one of the sides or arms of the "U" shape loop extending to the bracket connector 8604*a* and the other side or arm of the "U" shape loop extending from the other loop of the spring member 8604*b*. In addition, the length of the arm section 8604*c* is smaller than the length of the arm section 8603*c*. In certain examples, the length of the arm section 8600*c*-8630*c* may be selected, to provide a desired distance between the bracket connector 8600*a*-8630*a* and the anchor 8633. The arm section length may be selected to accommodate or fit a desired or particular patient tooth arrangement.

FIG. 86 shows other examples arms 8605, 8605', 8606, 8607 and 8608 that include a spring member with a shape having two or more open loop portions arranged adjacent each other in a horizontal direction (direction generally parallel to the length dimension of the anchor 8633), forming an "S" shape laying in that horizontal direction.

The arms 8605 and 8605' in FIG. 86 are each connected to the same (a common) bracket connector, such that the bracket connector 8605*a* is connected to the anchor 8633 through the two arms 8605 and 8605'. The arm 8605 has a spring member 8605*b* that is similar in shape to the spring member 8603*b*, but oriented in the opposite direction. The arm 8605' has a spring member 8605*b*' that is similar in shape to the spring member 8602*b*. In other examples, the arms 8605 and 8605' may have a spring member having any suitable configuration, shape and size such as, but not limited to the other examples of spring members described herein or in U.S. patent application Ser. No. 15/370,704 (Publ. No. 2017/0156823).

The arm 8606 in FIG. 86 includes a spring member 8606*b* having more than two (i.e., four) open loop portions. Other examples of that spring member or other spring members described herein may include any suitable number of loop portions. The spring member 8607*b* of the arm 8607 of FIG. 86 has loop portions that are elongated in a direction that is at an obtuse angle relative to the axis A. The arm 8608 in FIG. 86 has a spring member 8608*b* that is similar in shape to the spring member 8603*b*. However, the arm 8608 has an arm section 8608*c* that is wider (in the horizontal dimension) than other sections of the arm 8608. Other examples of any of the arm members described herein or in U.S. patent application Ser. No. 15/370,704 (Publ. No. 2017/0156823) may include an arm section (similar to arm section 8608*c*) that is wider than other sections of the arm.

Figure 88:
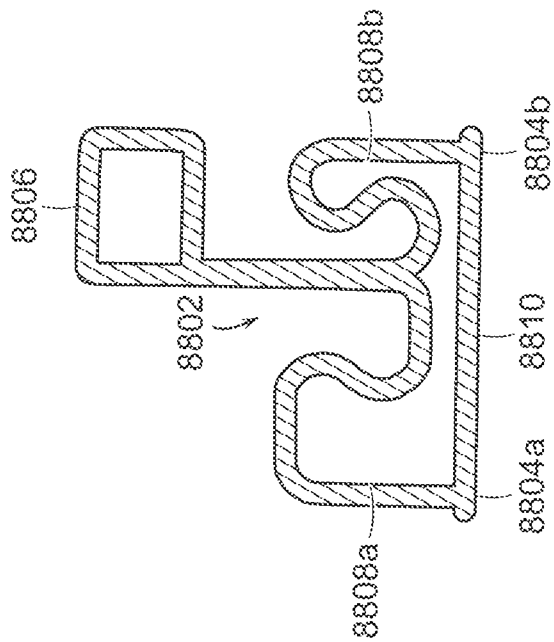
FIGS. 87 and 88 show different arm configurations for use with the orthodontic appliances of the present technology.
Figure 87:
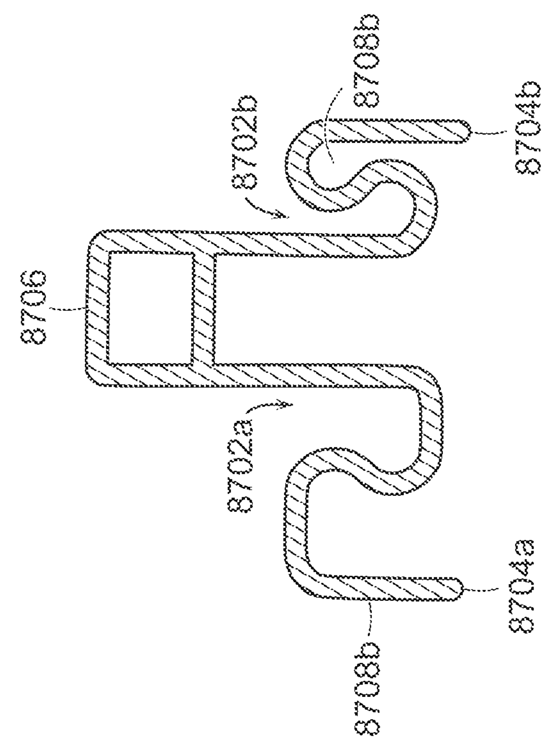

FIGS. 87 and 88 show an example configuration in which the attachment portion is coupled to the anchor (not shown in FIG. 87) by a single connector, or directly via multiple connectors.

Figure 89:
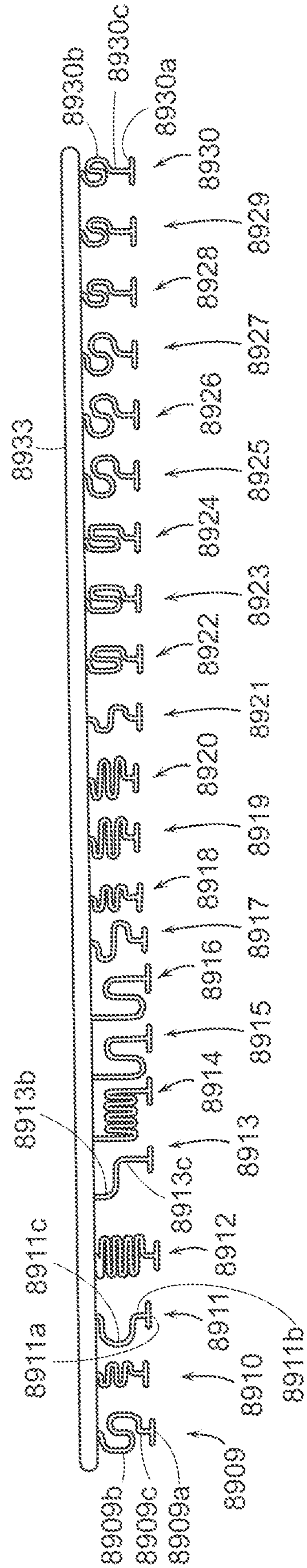
FIG. 89 shows various arm configurations configured in accordance with embodiments of the present technology.

FIG. 89 shows further examples of arms 8909, 8914, 8915 and 8922-8930 that include a spring member with a shape having at least two open loop portions arranged adjacent each other in a horizontal direction (direction generally parallel to the length dimension of the anchor 8933), forming an "S" shape laying in that horizontal direction. FIG. 89 also shows examples of arms 8910, 8912, and 8917-8921 that include a spring member with a shape having at least two open loop portions arranged adjacent each other in a vertical direction (direction generally perpendicular to the length dimension of the anchor 8933), forming one or more "S" shapes in that perpendicular direction. FIG. 89 shows a further example of an arm 8911 having a "U" shaped spring member 8911*b*. A further example of an arm 8913 in FIG. 89 has a spring member 8913*b* formed of two right angle bends along the length dimension of the arm.

In any of the examples described herein, the width dimensions of the arm or of one or more selected portions of the arm) may be selected to provide one or more of a desired flexibility, bias force magnitude, bias force direction, durability or other characteristics. For example, the arms 8915 and 8916 have a similar shape, but the width dimension of the arm 8915 is greater than the width of the arm 8916. As another example, the arms 8922, 8923 and 8924 in FIG. 89 have a similar shape, but the width dimension of the arm 8924 is greater than the width of the arm 8923. Similarly, the width dimension of the arm 8923 is greater than the width of the arm 8922. In further examples, as an alternative or in addition to varying width dimensions, one or more of the arms (or selected portions of the arms) may have a varying thickness dimension (in the dimension into and out of the plane of the page of FIG. 89), for a desired flexibility, bias force magnitude or direction, durability or other characteristic. In certain examples, the arms may be made smaller in width or thickness dimension (or both) relative to the anchor 8933 from which they extend, such that the anchor 8933 may provide a more rigid anchorage, while the arms provide a desired flexibility and resilience. Width or thickness dimension variances may be provided by any suitable process, including but not limited to machining, molding, laser cutting, 3D printing, or sinker EDM (Electronic Discharge Machining) to vary thickness of portions of an appliance member cut from a sheet. Alternatively or in addition to selecting or varying width or thickness dimensions, the arm length may be selected to provide or contribute to a desired flexibility, bias force, magnitude or direction, durability or other characteristic.

As another example, the arms 8925, 8926 and 8927 in FIG. 89 have a similar shape relative to each other, but the width dimension of the arm 8927 is greater than the width of the arm 8926, which is greater than the width of the arm 8925. As yet another example, the arms 8928, 8929 and 8930 in FIG. 89 have a similar shape relative to each other, but the width dimension of the arm 8930 is greater than the width of the arm 8929, which is greater than the width of the arm 8928. Each of the example arms 8909-8930 shown in FIG. 89 has a uniform width dimension that is constant over the entire arm. In other examples, the width dimension of one or more portions of any of the arms 8900-8932 may be made greater or smaller than the width dimension of one or more other portions of the same arm.

Figure 90:
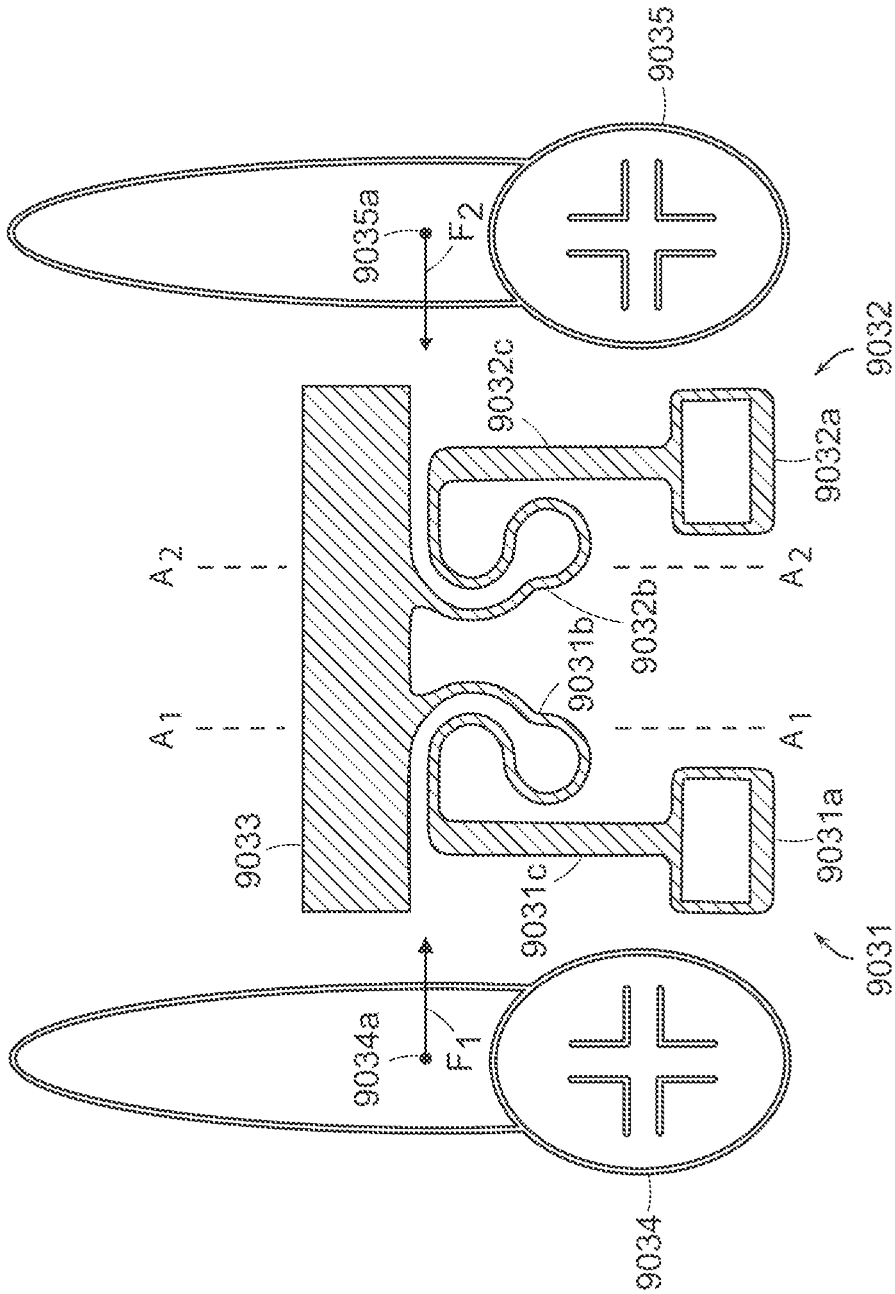
FIG. 90 shows an example appliance configuration in accordance with embodiments of the present technology.

FIG. 90 shows further examples of two adjacent arms 9031 and 9032 extending from an anchor 9033 of an appliance, appliance member (or a portion of an appliance or appliance member). Each arm 9031 and 9032 extends to an associated bracket connector (or male connector element) 9031*a* or 9031*b*. Each of the arms 9031 and 9032 include a spring member 9031*b* or 9032*b*, and an arm section 9031*c* or 9032*c* extending from the spring member to the bracket connectors 9031*a* or 9032*a*.

The bracket connector 9031*a* is configured to be connected to a bracket secured to a first tooth 9034 in a patient's jaw, and the bracket connector 9032*a* is configured to be connected to a bracket secured to a second tooth 9035 in the patient's jaw. The first tooth 9034 and the second tooth 9035 may be adjacent teeth in the patient's jaw. In other examples, one or more other teeth (or extracted teeth locations) may be located between the first tooth 9034 and the second tooth 9035. In one example, the tooth 9034 may be a canine tooth, while the tooth 9035 may be a second pre-molar. In other examples, the teeth 9034 and 9035 may be other teeth in a patient's jaw (upper jaw or lower jaw).

In certain examples, the arm configuration may be selected to provide one or more of a desired flexibility, bias force magnitude, bias force direction, durability or other characteristics. For example, arms configured according to examples 8600 and 8601 may provide sufficient force (magnitude and direction) for providing some, but a limited amount of movement in occlusogingival direction or a buccolingual direction, when the appliance is installed. Arms configured according to examples 8602, 8603 and 8604 may provide sufficient force (magnitude and direction) to move extrude or to move in occlusogingival direction. Arms configured to be relatively rigid may be employed when the tooth to be connected to the arm is not to be moved (or moved by a limited amount) and may be used for anchorage. In certain examples, arms configured according to examples 8606, 8607 and 8608 may be used in extraction cases to apply a force closer to the center of resistance of the teeth and to prevent the teeth from tipping, as the arm section 8606*c*, 8607*c* and 8608*c* in those examples is formed wider than other portions of the arm, such that the arm can act as a power arm.

In certain examples, any of the arms in FIG. 86, 89 or 90 (or other arms described herein) may be configured to provide a bias force direction and magnitude at a desired location along the length of the arm and, thus, at a desired location relative to the tooth structure of a patient. For example, the arms shown in FIG. 90 may be configured to provide a force on one or both teeth 9034 and 9035 (when the bracket connectors 9031*a* and 9032*a* are connected to respective brackets on the teeth 9034 and 9035), where the force on each tooth is directed toward the adjacent tooth. In particular examples, the arms 9031 and 9032 are configured to apply the force on one or both teeth 9034 and 9035, at a location along the length dimension of each tooth corresponding to a center of resistance location. In the drawing if FIG. 90, the teeth 9034 and 9035 are shown laterally adjacent to the respective arms 9031 and 9032. However, it will be understood that, when the bracket connectors 9031*a* and 9032*a* are connected to brackets on the respective teeth 9034 and 9035, each of the bracket connectors 9031*a* and 9032*a* will be placed on or directly adjacent to a surface of a respective tooth 9034 and 9035 on which a bracket (not shown in FIG. 90) is secured, as described herein.

In the example in FIG. 90, the arm 9031 is configured such that the arm section 9031*c* extends generally parallel to, but laterally offset from an axis A1 (the axis direction perpendicular to the length dimension of the anchor 9033 at the location at which the arm 9031 connects to the anchor 9033). Similarly, the arm 9032 is configured such that the arm section 9032c extends generally parallel to, but laterally offset from an axis A2 (the axis direction perpendicular to the length dimension of the anchor 9033 at the location at which the arm 9031 connects to the anchor 9033).

More specifically, the arm section 9031c is laterally offset from the axis A1, in a direction to the left of A1, such that spring member 9031b of the arm 9031 and the axis A1 are located between the arm section 9031c and the arm 9032. Similarly, the arm section 9032c is laterally offset from the axis A2, in a direction to the left of A2, such that spring member 9032b of the arm 9032 and the axis A2 are located between the arm section 9032c and the arm 9031. In addition, the spring members 9031b and 9032b of the arms 9031 and 9032 are configured such that (when the arms 9031 and 9032 are connected to respective teeth 9034 and 9035) the arm 9031 imparts a force F1 on the tooth 9034 in a direction toward the arm 9032, and the arm 9032 imparts a force F2 on the tooth 9035 in a direction toward the arm 9033. The magnitude of the force F1 and F2 depend on one or more (or a combination of) the shape and configuration of the arms 9031 and 9032 (including the spring members 9031b and 9032b), the lateral spacing between the arms 9031 and 9033, and the thickness and material of the arms 9031 and 9032.

In the example in FIG. 90, the spring members 9031b and 9032b of the arms 9031 and 9032 are located adjacent (or relatively close to) the anchor 9033. In addition, the length of the arm sections 9031c and 9032c may be configured to locate the anchor 9033 at or near the centers of resistance 9034a and 9035a of the respective teeth 9034 and 9035. In that manner, the spring members 9031b and 9032b may be located at or near the centers of resistance 9034a and 9035a of the respective teeth 9034 and 9035 (to impart the force F1 or F2 on the tooth 9034 or 9035, at or near the center of resistance 9034a or 9035a of the tooth 9034 or 9035). In other examples, the arms 9031 and 9032 may be configured to impart a force F1 or F2 on a tooth 9034 or 9035, at a location that is spaced apart (e.g., vertically offset in the orientation of FIG. 90) from the center of resistance 9034a or 9035a of the tooth 9034 or 9035, by a specified distance. In such other examples, the force F1 or F2 can have a lever-like action on a tooth 9034 or 9035, where the center of resistance acts as a fulcrum. The center of resistance of a tooth may depend on various factors, including the depth and angle of the root of the tooth, type of tooth or other factors. In particular examples described herein, an appliance (or method) may include one or more arms that are configured to impart one or more forces on one or more teeth, where the direction, and magnitude of the force or forces may be selected, and the location of the force (relative to a center of resistance of the tooth) may be selected based, in part, on the configuration of the arm (including, for example, the configuration of the spring member 9031b, 9032b, the distance and location of the spring member relative to the anchor 9033, and the length of the arm section 9031c, 9032c).

Each of the example arms 8600-8608 in FIG. 86 and arms 9031 and 9032 in FIG. 90 is shown as extending to (being formed integral with or coupled to) to a bracket connector 100a-108a that has an annular or ring shape and in particular, a square, annular shape (having a generally square-shaped outer perimeter and a generally square-shaped opening). In other examples, an annular or ring-shaped bracket connector may have a generally round or rounded shape, an oval shape (having a round or oval outer perimeter and a round or oval opening) or other suitable shape.

Each of the example arms 8909-8930 in FIG. 89 extends to a bracket connector 8900a-8908a that has a T shaped configuration. In certain examples, such T shaped bracket connectors may correspond to the T shaped male connector elements as described in U.S. patent application Ser. No. 15/370,704 (Publ. No. 2017/0156823) (such as those identified by reference numbers 1802, 1822, or 2500 in that publication).

In other examples, any of the arms described with regard FIGS. 86 and 90 may extend to (be formed integral with or coupled to) a T shaped bracket connector of FIG. 89, or any of the other bracket connectors (or male connector elements) described herein or in U.S. patent application Ser. No. 15/370,704 (Publ. No. 2017/0156823), in place of the bracket connectors 8600a-8608a. Similarly, in other examples, any of the arms described with regard FIG. 89, may extend to an annular or ring shaped bracket connector described in regard to the examples of FIG. 86, or any of the other bracket connectors (or male connector elements) described herein or in U.S. patent application Ser. No. 15/370,704 (Publ. No. 2017/0156823), in place of the bracket connectors 8909a-8930a.

Figure 91:
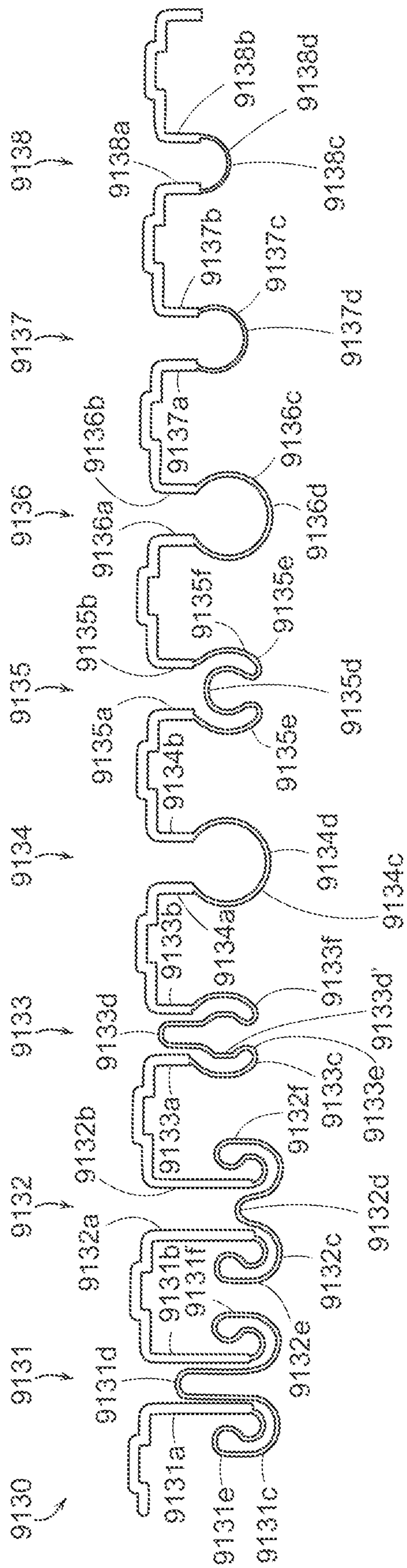
FIG. 91 shows various arm configurations configured in accordance with embodiments of the present technology.
Figure 92:
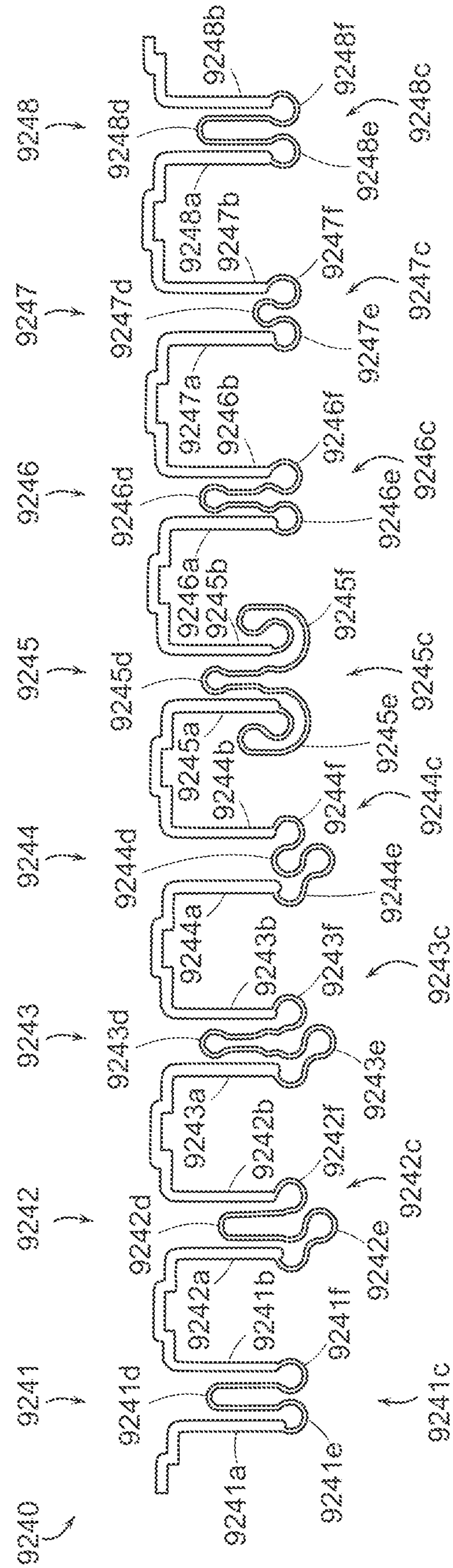
FIG. 92 shows various arm configurations configured in accordance with embodiments of the present technology.

FIGS. 91 and 92 show certain examples of Z embodiment features, including a rigid bar (9130 in FIGS. 91 and 9240 in FIG. 92) having loop or curved features (9131-9138 in FIGS. 91 and 9241-9248 in FIG. 92) according to various examples, between associated pairs of bracket connectors (or male connector elements).

Each of the loop or curved features 9131-9138 and 9241-9248 in FIGS. 91 and 92 includes a pair of linear arm sections coupled by one or more curved sections. For example, the loop or curved feature 9131 in FIG. 91 includes first and second linear arm sections 9131a and 9131b that extend from the rest of the rigid bar 9130 to a curved section 9131c. In each of the examples in FIGS. 91 and 92, both of the first and second arm sections of the loop or curved feature is larger (e.g., wider) in at least one dimension than the corresponding dimension of the curved section of that feature. For example, each of the linear arm sections 9131a and 9131b of the loop or curved feature 9131 in FIG. 91 has a larger (e.g., wider) dimension than the corresponding dimension (width) of the curved section 9131c of that feature 9131.

In other examples, one, but not both of the first and second arm sections of any of the loop or curved features 9131-9138 or 9241-9248 may be formed larger (e.g., wider) in at least one dimension than the corresponding dimension of the curved section. In other examples, the curved section of any of the features 9131-9138 or 9241-9248 may be formed to be larger (e.g., wider) in at least one dimension than the corresponding dimension of one or both of the arm sections. This can allow the appliance to apply a force closer to the center of resistance of the tooth (or any desired location along the length of the tooth, based on the location of the larger or wider section). In yet other examples, the first and second linear arm sections and the curved section of any of the features 9131-9138 or 9241-9248 may be formed to have a uniform or constant corresponding dimension (e.g., width).

The loop or curved feature 9131 includes a curved section 9131c having a generally U shaped portion 9131d (an inverted U in the orientation of FIG. 91), and two laterally extended curved loop portions 9131e and 9131f (located on the two respective sides of the U shaped portion 9131d). The U shaped portion 9131d extends along and between the first and second arm sections 9131a and 9131b. The curved loop portion 9131e connects one end of the U shaped portion 9131d to the first arm section 9131a, while the curved loop portion 9131*f* connects the other end of the U shaped portion 9131*d* to the second arm section 9131*b*. Each of the curved loop portions 9131*e* and 9131*f* has a rounded closed end that is wider (in the horizontal dimension of FIG. 91) than the rest of the curved loop portion of the feature 9131. The wider, rounded end (9131*e*' and 9131*f*) can provide increased flexibility while decreasing risk of fracture.

The loop or curved feature 9132 has a configuration that is similar to the configuration described with regard to feature 9131. For example, the loop or curved feature 9132 may include first and second linear arm sections 9132*a* and 9132*b*, and a curved section 9132*c* having a U shaped portion 9132*d* and curved loop portions 9132*e* and 9132*f* (corresponding to sections 9131*a*, 9131*b* and 9132*c* and portions 9131*d*, 9131*e* and 9131*f* of feature 9131). However, the U shaped portion 9132*d* of the loop or curved feature 9132 is smaller than the U shaped portion 9131*d* of the loop or curved feature 9131. In the examples in FIG. 91, the U shaped portion 9131*d* extends along about seventy-five percent of the length of the first and second arm sections 9131*a* and 9131*b*, while the U shaped portion 9132*d* extends along about twenty-five percent of the length of the first and second arm sections 9132*e* and 9132*f*. In other examples, the U shaped portion 9131*d* or 9132*d* may extend along any suitable portion of the length of the first and second arm sections. A longer U shaped portion (such as shown at 9131*d*) may be more flexible than a shorter U shaped portion (such as shown at 9132*d*).

Another example of a loop or curved feature 9133 also includes first and second linear arm sections 9133*a* and 9133*b* and a curved section 9133*c* (for example, corresponding to the arm sections 9131*a* and 9131*b* and curved section 9131*c* of the feature 9131). However, the linear arm sections 9133*a* and 9133*b* are smaller in length than the linear arm sections 9131*a* and 9131*b* of feature 9131. The linear arm sections of any of the loop or curved features 9131-9138 or 9241-9248 may be of any suitable length (or have different lengths for first and second arm sections). The length of the linear arm section of a loop or curved feature can at least partially determine an amount of force applied to adjacent teeth.

The curved section 9133*c* of the loop or curved feature 9133 has a generally U shaped portion 9133*d* (an inverted U in the orientation of FIG. 91), and two laterally extended curved loop portions 9133*e* and 9133*f* (located on the two respective sides of the U shaped portion 9133*d*). However, the generally U shaped portion 9133*d* has an enlarged section 9133*d*' adjacent where the curved loop portions 9133*e* and 9133*f* connect to the generally U shaped portion 9133*d*. The enlarged section 9133*d*' is larger (e.g., wider) in at least one dimension (the horizontal dimension in the orientation of FIG. 91) than the rest of the generally U shaped portion 9133*d*. The curved loop portions 9133*e* and 9133*f* correspond, generally to the curved loop portions 9131*e* and 9131*f* of feature 9131. However, the curved loop portion 9133*e* does not extend laterally beyond the left side of the first arm section 9133*a*, and the curved loop portion 9133*f* does not extend laterally beyond (or as far beyond) the right side of the second arm section 9133*b*, relative to lateral extension of the curved or loop portions 9131*e* and 9131*f*. The narrower profile provided by the curved loop portions 9133*e* and 9133*f* (relative to the curved or loop portions 9131*e* or 9131*f*) can be beneficial in contexts in which bracket connectors are closer together (for example, for anterior teeth or other contexts in which space in the mesiodistal dimension or lateral width dimension is limited).

Another example of a loop or curved feature 9135 also includes first and second linear arm sections 9135*a* and 9135*b* and a curved section 9135*c*. The linear arm sections 9135*a* and 9135*b* are similar to the linear arm sections 9133*a* and 9133*b* of the feature 9133. However, the curved section 9135*c* has a C shape or an open circle shaped portion 9135*d* (having a shape of a circle with an open edge), instead of a U shape described for feature 9133. The curved section 9135*c* also has two laterally extended curved loop portions 9135*e* and 9135*f* (corresponding to curved loop portions 9133*e* and 9133*f* of feature 9133) located on the two respective sides of the C shape portion 9135*d*.

Another example of a loop or curved feature 9134 also includes first and second linear arm sections 9134*a* and 9134*b* and a curved section 9134*c*. The linear arm sections 9134*a* and 9134*b* are similar to the linear arm sections 9133*a* and 9133*b* of the feature 9133. However, the curved section 9134*c* has a C shape or an open circle shape (shape of a circle, with an open edge). The radius of the circle shape of the curved section 9134*c* may be selected to provide a desired performance characteristic. For example, each of the loop or curved features 9136, 9137 and 9138 has a shape and configuration similar to that of the loop or curved feature 9134, but with a circle shape having a different diameter. More specifically, the loop or curved feature 9136 includes first and second linear arm sections 9136*a* and 9136*b* and a curved section 9136*c* that has a smaller diameter than the curved section 9134*c* of feature 9134. Similarly, the loop or curved feature 9137 includes first and second linear arm sections 9137*a* and 9137*b* and a curved section 9137*c* that has a smaller diameter than the curved section 9136*c* of feature 9136. Similarly, the loop or curved feature 9138 includes first and second linear arm sections 9138*a* and 9138*b* and a curved section 9138*c* that has a smaller diameter than the curved section 9137*c* of feature 9137. A smaller diameter may be beneficial in certain contexts, for example, for certain types of teeth or where space in the lateral width dimension is limited.

Another example of a loop or curved feature 9241 in FIG. 92 has a configuration having some similarities to the configuration of the loop or curved feature 9131 in FIG. 91. In particular, the loop or curved feature 9241 includes first and second linear arm sections 9241*a* and 9241*b* and a curved section 9241*c*. The linear arm sections 9241*a* and 9241*b* are similar to the linear arm sections 9131*a* and 9131*b* of the feature 9131. Also, the curved section 9241*c* has a generally U shaped portion 9241*d* (similar to the generally U shaped portion 9131*d* of feature 9131). However, the curved section 9241*c* of the feature 9240 has two laterally extended curved loop portions 9241*e* and 9241*f* that each have a C shape or an open circle shape (shape of a circle, with an open edge), instead of a curved loop shape of feature 9131. The loop or curved feature 9248 has a similar configuration as the loop or curved feature 9241.

Another example of a loop or curved feature 9245 in FIG. 92 has a configuration having some similarities to the configuration of the loop or curved feature 9131 in FIG. 91. In particular, the loop or curved feature 9245 includes first and second linear arm sections 9245*a* and 9245*b* and a curved section 9245*c*. The linear arm sections 9245*a* and 9245*b* are similar to the linear arm sections 9131*a* and 9131*b* of the feature 9131. Also, the curved section 9245*c* has a generally U shaped portion 9245*d* (corresponding to the generally U shaped portion 9131*d* of feature 9131). However, the generally U shaped portion 9245*d* has an enlarged section 9245*d*' at the closed end of the U shaped portion 9245*d*, and a second enlarged section 9245*d*" where curved loop portions 9245*e* and 9245*f* connect to the generally U shaped portion 9245*d*. The enlarged sections 9245*d'* and 9245*d''* are each larger (e.g., wider) in at least one dimension (the horizontal dimension in the orientation of FIG. 92) than other sections of the generally U shaped portion 9245*d*. The curved loop portions 9245*e* and 9245*f* correspond, generally to the curved loop portions 9131*e* and 9131*f* of feature 9131.

Another example of a loop or curved feature 9246 in FIG. 92 has a configuration corresponding to the configuration of feature 9245 (including first and second arm sections 9246*a*, 9246*b* and a curved section 9246*c* having a generally U shaped portion 9246*d* similar to corresponding parts of the feature 9245). However, the loop or curved feature 9246 has curved loop portions 9246*e* and 9246*f* that correspond in shape to the curved loop portions 9241*e* and 9241*f* of feature 9241.

Another example of a loop or curved feature 9247 in FIG. 92 has a configuration corresponding to the configuration of feature 9241 (including first and second arm sections 9247*a*, 9247*b* and a curved section 9247*c* having curved loop portions 9247*e* and 9247*f* that correspond in shape to the curved loop portions 9241*e* and 9241*f* of feature 9241). However, the curved section 9247*c* of the loop or curved feature 9247 has a C shape or an open circle shaped portion 9247*d* (having a shape of a circle with an open edge), instead of a generally U shape described for feature 9241*d*.

Other examples of loop or curved features 9242, 9243 and 9244 in FIG. 92 also include first and second linear arm sections and a curved section. The curved sections of each of the loop or curved features 9242, 9243 and 9244 include various combinations of generally U shaped portions and C or open circle shaped portions, configured to provide a desired flexibility, a bias or spring force in one or more directions (or both), a force magnitude, durability, or other characteristics.

Figure 93A:
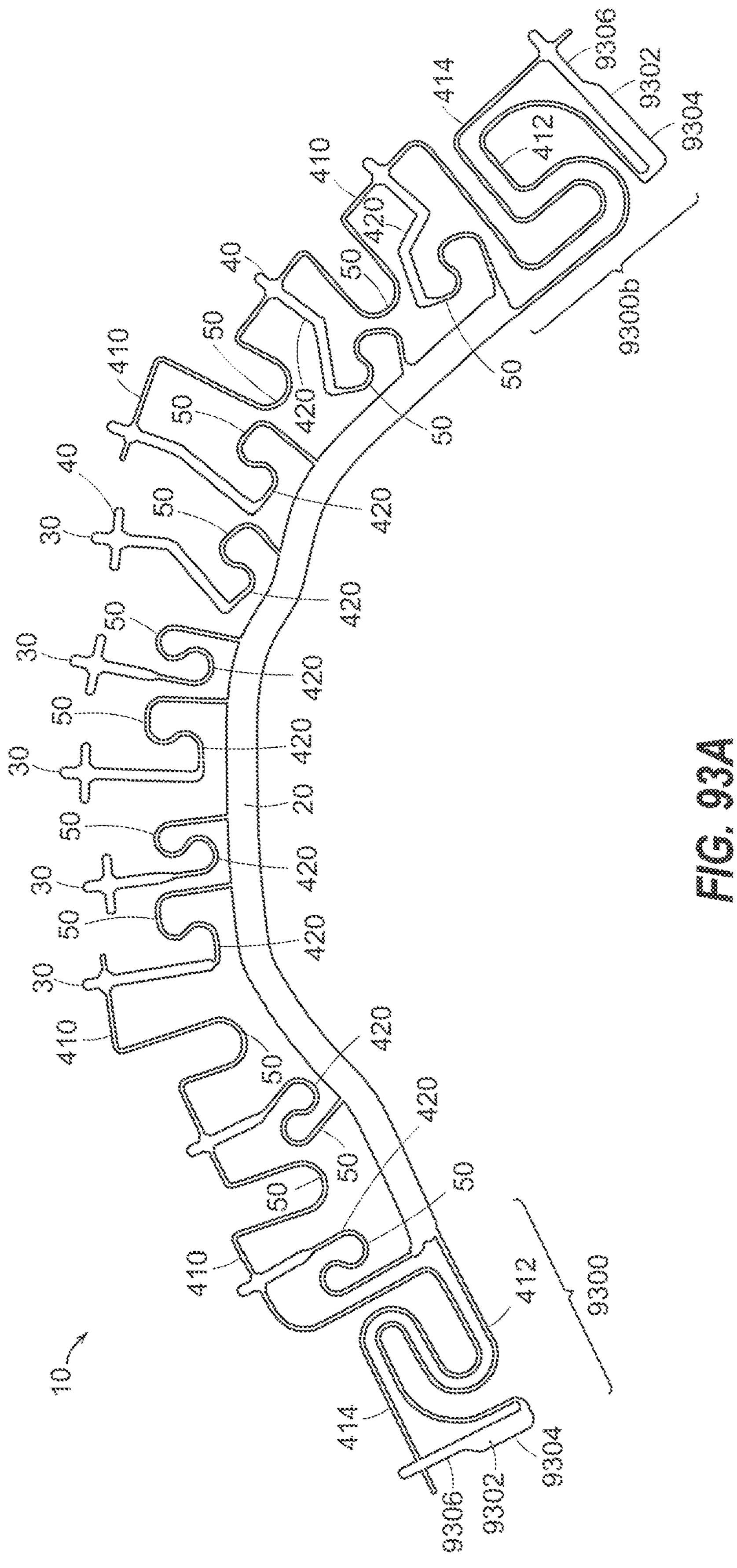
FIG. 93A is a plan view of a planar version of an orthodontic appliance configured in accordance with embodiments of the present technology.
Figure 93B:
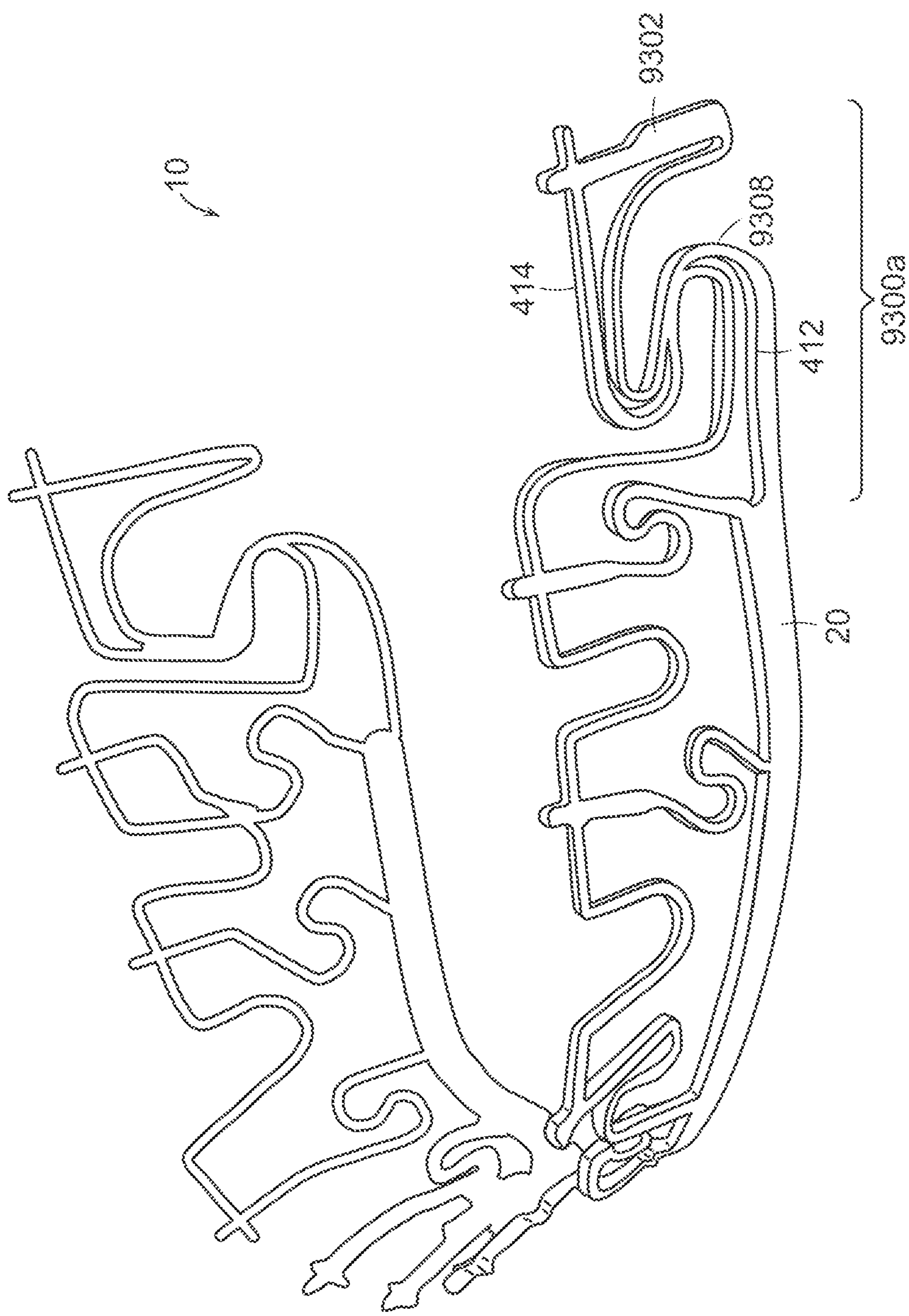
FIG. 93B is a treatment configuration of the appliance shown in FIG. 93A.

FIG. 93A is a plan view of a planar version of an orthodontic appliance configured in accordance with embodiments of the present technology, and FIG. 93B is a treatment configuration of the appliance shown in FIG. 93A.

Figure 94:
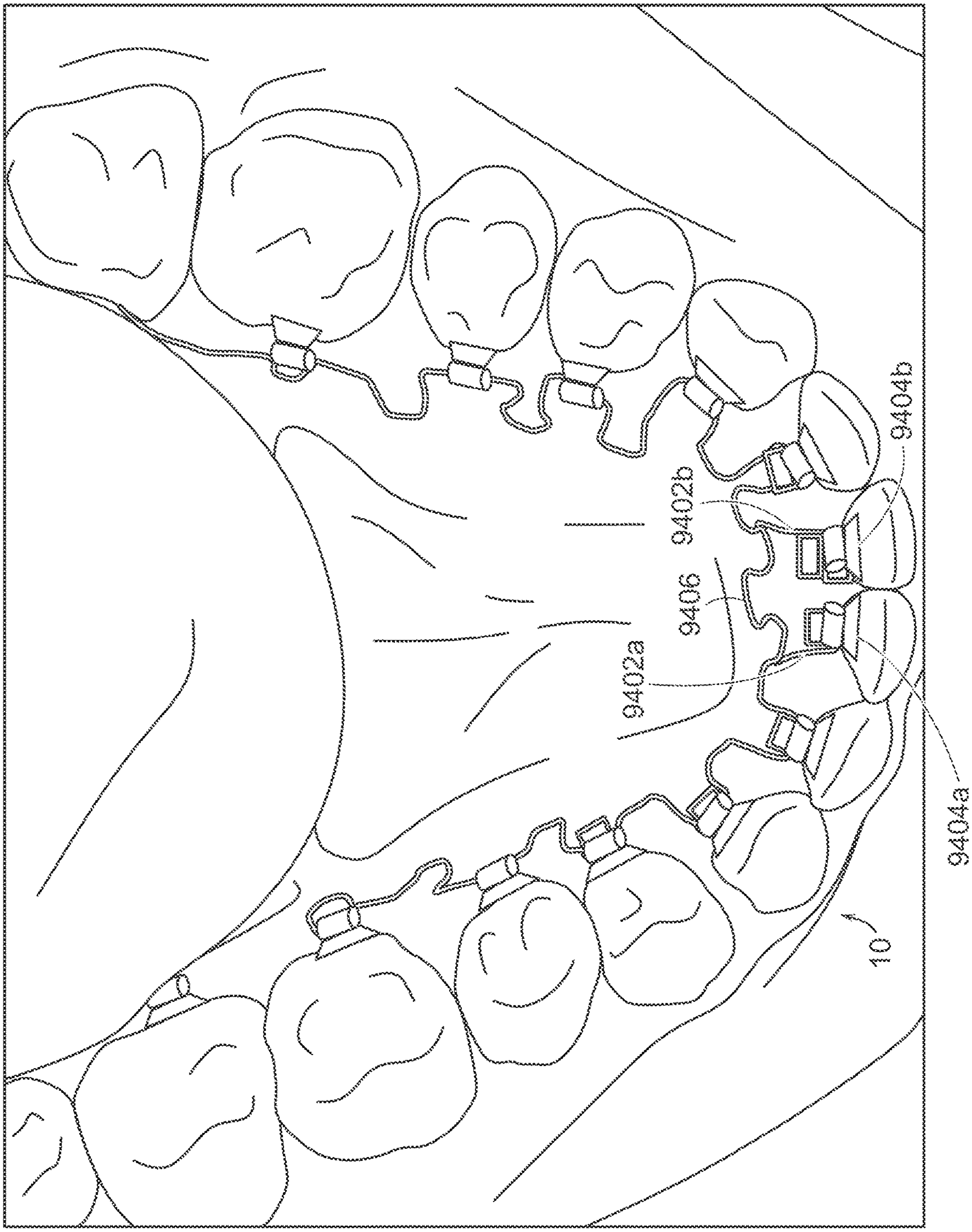
FIG. 94 depicts an orthodontic appliance configured in accordance with embodiments of the present technology, shown installed in a patient's mouth.

FIG. 94 depicts an orthodontic appliance configured in accordance with embodiments of the present technology, shown installed in a patient's mouth.

IV. Selected Devices, Systems, and Methods for Tooth Attachment

According to some aspects of the present technology, one or more portions of the orthodontic appliances and/or securing members disclosed herein may be configured to have a low profile (e.g., in a dimension extending away from the tooth, including the buccolingual, mesiodistal, and/or occlusogingival directions). A lower profile can improve the patient's experience, as the appliance and/or securing member will typically be less perceptible to the patient and less likely to agitate surrounding tissue.

Figure 95:
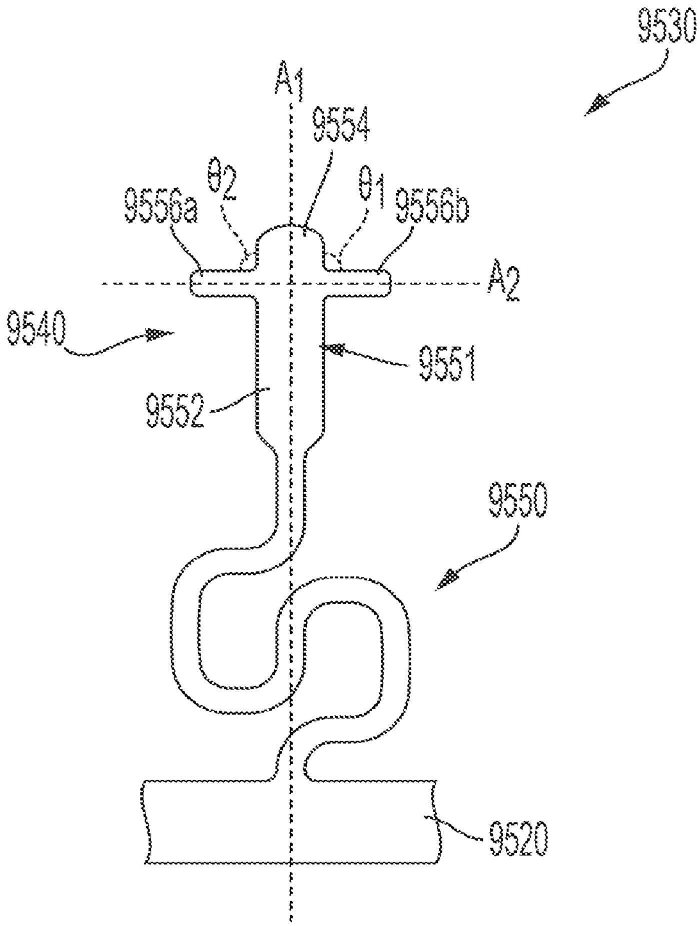
FIG. 95 is an enlarged front view of an example arm of an orthodontic appliance in accordance with the present technology.

FIG. 95, for example, shows a low-profile attachment portion 9540 configured in accordance with embodiments of the present technology. In FIG. 95, the attachment portion 9540 is depicted coupled to a serpentine biasing portion 9550 that, together with the attachment portion 9540, comprises an arm 9530 that extends from anchor 9520. It will be appreciated that the attachment portion 9540 may be used with any of the arm configurations described herein, and/or can be coupled to any of the biasing portions and/or connectors described herein.

As shown in FIG. 95, the attachment portion 9540 can comprise a base 9551 and first and second arms 9556*a*, 9556*b* (collectively "arms 9556") coupled to and extending laterally away from the base 9551. The base 9551 may comprise a proximal region 9552 proximal of where the arms 9556 connect to the base 9551 and a distal region 9554 distal to where the arms 9556 connect to the base 9551 (as well as distal to the proximal region 9552). The first arm 9556*a* may be disposed at a first angle $\theta_1$ relative to the base 9551, and the second arm 9556*b* may be disposed at a second angle $\theta_2$ relative to the base 9551. The base 9551 may extend in a first direction A1 and the arms 9556 may extend in a second direction A2 that is angled relative to the first direction A1. In some embodiments, the arms 9556 extend away from the base 9551 at substantially the same longitudinal location and/or at substantially the same angle. In some embodiments, the arms 9556 extend away from the base 9551 at different longitudinal locations and/or at different angles.

The first and second angles $\theta_1$, $\theta_2$ can be the same as or may differ from one another. In some embodiments, the first angle $\theta_1$ is (i) at least 30 degrees, (ii) no more than 120 degrees, or (iii) within a range of from 30-120 degrees, or any incremental value between one of these ranges (e.g., 35 degrees, 90 degrees, 110 degrees, etc.). In these and other embodiments, the second angle $\theta_2$ is (i) at least 30 degrees, (ii) no more than 120 degrees, or (iii) within a range of from 30-120 degrees, or any incremental value between one of these ranges (e.g., 35 degrees, 90 degrees, 110 degrees, etc.). In some embodiments, the first region 9554 is generally orthogonal to the second region 9556.

As described herein, the attachment portion 9540 is configured to detachably couple the arm 9530 to a securing member disposed on a patient's tooth. The attachment portion 9540 may be configured to engage the securing member in such a way that substantially inhibits longitudinal (e.g., translational) and/or rotational movement of the attachment portion 9540 relative to the corresponding securing member. Accordingly, the appliances of the present technology may efficiently transfer all or substantially all of the force provided by the arm (such as arm 9530) to a tooth via a corresponding securing member. By limiting or inhibiting movement of the attachment portion 9540 relative to the corresponding securing member, the appliances of the present technology are configured to move teeth with less force than is necessary with traditional braces.

Figure 96:
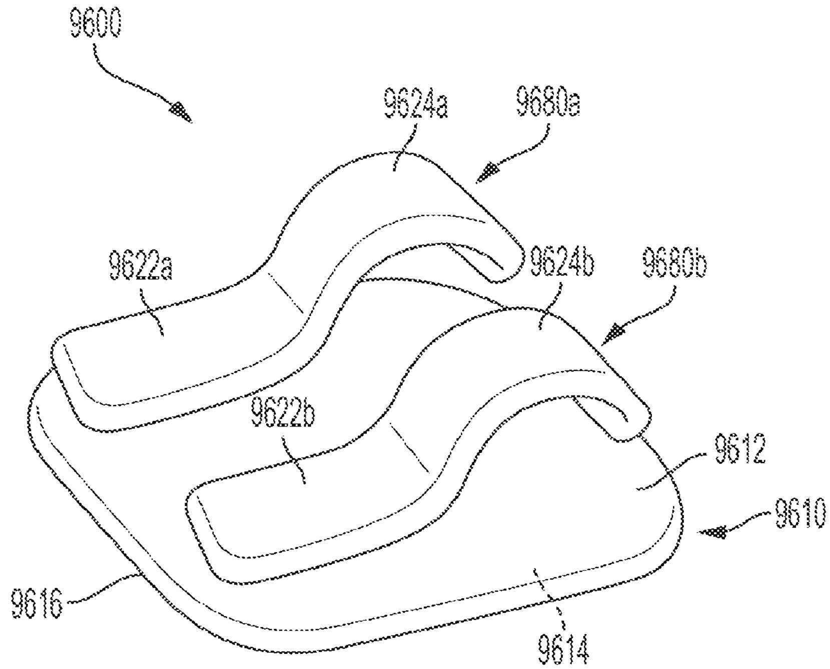
FIGS. 96 and 97 are isometric views of securing members, configured in accordance with embodiments of the present technology.
Figure 97:
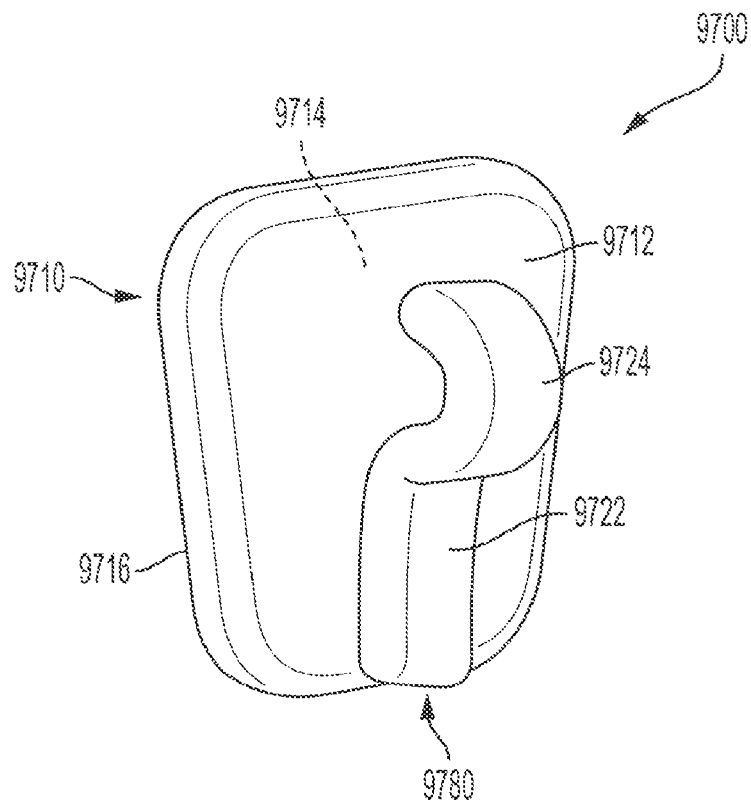

FIGS. 96 and 97 are isometric views of example securing members 9600, 9700 configured for use with the appliances of the present technology. The arms and/or attachment portions described herein may be configured to detachably couple one or both securing members 9600, 9700 to secure the appliance to the patient's dentition during treatment. As shown in FIG. 96, the securing member 9600 may include a base 9610 and coupling arms 9680*a*, 98680*b* (collectively "coupling arms 9680") coupled to the base 9610. The base 9610 may comprise a first side 9612 on which the coupling arms 9680 are disposed, and a second side 9614 configured to be directly or indirectly coupled to one or more of the patient's teeth, e.g., via an adhesive such as a composite resin. The base 9610 can be coupled to the patient's tooth such that the coupling arms 9680 are disposed in a generally vertical orientation (e.g., an occlusal-gingival direction). In some embodiments, the base 9610 can be coupled to the patient's teeth such that the coupling arms 9680 may be disposed in another orientation, such as a horizontal orientation (e.g., a mesial-distal direction) or diagonal orientation (e.g., a partial mesial-distal direction or partial occlusal-gingival direction). In some embodiments, the coupling arms 9680 may be disposed at the same angle and/or different angles from one another. The surface of the second side 9614 can be generally flat and/or roughened to increase its surface area for enhanced bonding to the one or more of the patient's teeth. In some embodiments, the surface of the second side 9614 can have a shape or slope that generally complements that of the one or more of the teeth the base 9610 is configured to be coupled to, such as a lingual face of the one or more of the patient's teeth. The base 9610 can include a boundary or perimeter 9616 within which the one or more coupling arms 9680 are generally within. In some embodiments, the securing member 9600 may be a commercially available 2D® Lingual bracket (Bernhard Foerster GmbH).

Each coupling arm 9680*a*, 9680*b* can include a base portion 9622*a*, 9622*b* (collectively "base portions 9622") fixed to the base 9610 (e.g., via an adhesive, weld, solder, etc.), and a coupling portion 9624*a*, 9624*b* (collectively "coupling portions 9624") extending from the base portion 9622. When disposed within a patient's mouth, the coupling portions 9624 may be farther from the patient's gingiva than the base portions 9622. Each of the coupling portion 9624 can include a curved surface that is spaced apart from the first side 9612 of the base 9610, or other configuration that generally resembles a hook or similar shape. In some embodiments, the coupling portions 9624 can be sufficiently flexible, plastic and/or deformable such that the coupling portion 9624*s* can be temporarily moved from a closed state to an open state in which an attachment portion (such as attachment portion 9540) can be moved into position under the coupling portions 9624.

As depicted in FIG. 97, securing member 9700 can have similar features to securing member 9700 shown in FIG. 96. For example, the securing member 9700 can comprise a base 9710 having a first side 9712, a second side 9714, and a perimeter 9716. A coupling arm 9780 comprising a base portion 9722 and a coupling portion 9724 can be disposed on the first side 9712 of the base 9710. As shown in FIGS. 96 and 97, the securing members 9600 and 9700 can include two coupling arms 9680 or a single coupling arm 9780. In some embodiments, the securing members of the present technology can include more than two coupling arms (e.g., three coupling arms, four coupling arms, etc.).

Figure 98A:
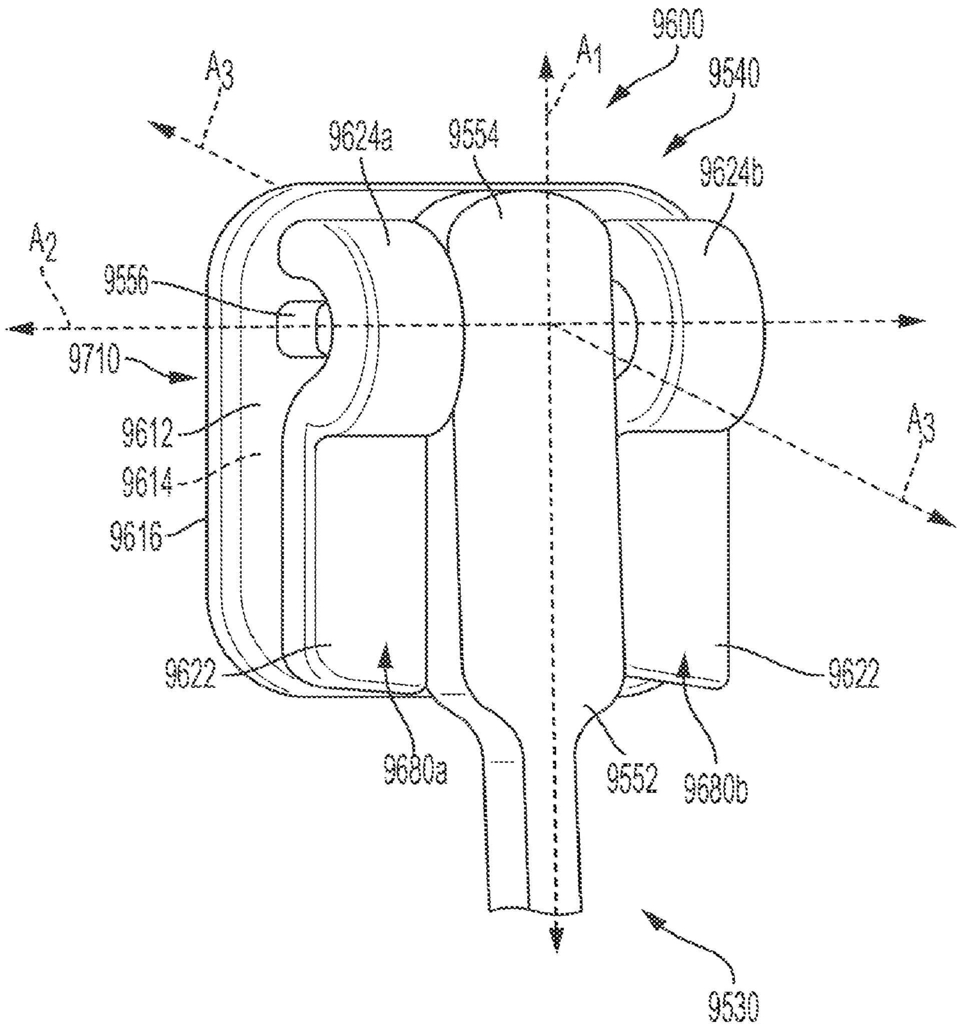
FIGS. 98A, 98B, 98C, and 98D are isometric, front, top, and side views, respectively, of the attachment portion shown in FIG. 95 and the securing member shown in FIG. 96, configured in accordance with embodiments of the present technology.

FIGS. 98A-D are isometric, front, top, and side views, respectively, of the attachment portion 9540 shown in FIG. 95 and the securing member 9600 shown in FIG. 96, configured in accordance with embodiments of the present technology. Referring first to FIG. 98A, the coupling portions 9624 the coupling arms 9680 are disposed over the second region 9556 of the attachment portion 9540, with one of the coupling arms 9680 disposed over the second region 9556 on a first side of the first region 9554 and the other of the coupling arms 9680 disposed over the arms 9556 on a second, opposing side of the distal region 9554. In some embodiments, when the appliance is disposed adjacent the patient's teeth and the attachment portion 9540 is secured to the securing member 9600, (i) the arms 9556 extend in a generally mesial-distal direction under the coupling arms 9680, and (ii) the distal region 9554 extends in a generally occlusal-gingival direction and abuts (e.g., is proximate to) a portion of the coupling arms 9680. In doing so, the securing member 9600 and the configuration of the attachment portion 9540 prevents or inhibits longitudinal and/or rotational movement of the attachment portion 9540 relative to the securing member 9600, e.g., in or about the occlusal-gingival direction (as indicated by axis $A_1$), the mesial-distal direction (as indicated by axis A2), and/or lingual-facial direction (as indicated by axis A3). As a result, when an appliance is attached to a patient's teeth via the securing member 9600, the particular magnitude and directional force provided via each of the arms 9530 may be substantially entirely translated to the respective tooth. Moreover, because the magnitude and directional force provided via each of the arms 9530 may be substantially entirely translated to the respective tooth, movement of the tooth from an original tooth arrangement to final tooth arrangement can be achieved with less magnitude than may otherwise be required.

Each of the coupling arms 9680 can comprise a side surface 9625*a*, 9625*b* (collectively "side surfaces 9625") configured to be positioned in apposition to of the distal region 9554 and/or proximal region 9552 of the attachment portion 9540 such that the coupling arms 9680 are spaced apart from one another by the distal region 9554 and/or proximal region 9552. As shown in FIGS. 98B and 98C, when the attachment portion 9540 is coupled to the securing member 9600, the side surfaces 9625 of the coupling arms 9680 may be in apposition with the attachment portion 9540. In some embodiments, the attachment portion 9540 may be in direct contact with one or both of the coupling arms 9680, or spaced apart from one or both of the coupling arms 9680 by no more than a predetermined distance, e.g., to ensure longitudinal movement and/or rotation of the securing member 9600 relative to the attachment portion 9640 is sufficiently inhibited. The predetermined distance may, for example, be less than about 0.01 millimeters (mm), about 0.1 mm, about 1 mm, about 2 mm, or about 3 mm, or any incremental value between about 0.01 to 3 mm. Apposition of the coupling arm 9680 with the attachment portion 9540 can help ensure the magnitude and directional force (e.g., provided at least partially along or about the mesial-distal axis and/or about the occlusal-gingival axis) provided via the arm 9530 is substantially translated to the respective tooth when the appliance is implanted adjacent a patient's teeth and coupled to the securing member 9600.

As shown in FIG. 98C, a thickness of each of the distal region 9554 and the arms 9556 of the attachment portion 9540 can be generally the same. In some embodiments, the thickness of the distal region 9554 and the arms 9556 may differ from one another, e.g., with the distal region 9554 having a greater thickness than that of the arms 9556, or vice versa. The thickness of the base 9610 of the securing member 9600 may be generally less than that of the attachment portion 9540 and/or coupling arm 9680. As also shown in FIG. 9C, the distal region 9554 and the arms 9556 are positioned in close proximity to the base 9610, which can inhibit movement of the attachment portion 9540 relative to the securing member 9600 in the lingual-facial direction and/or about the mesial-distal axis.

Figure 98D:
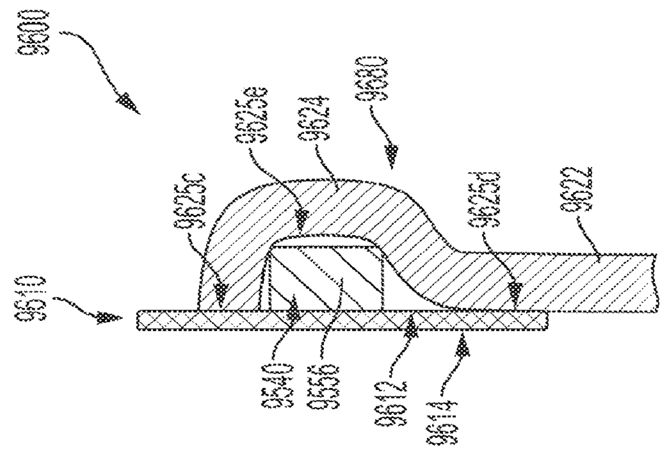
Figure 98C:
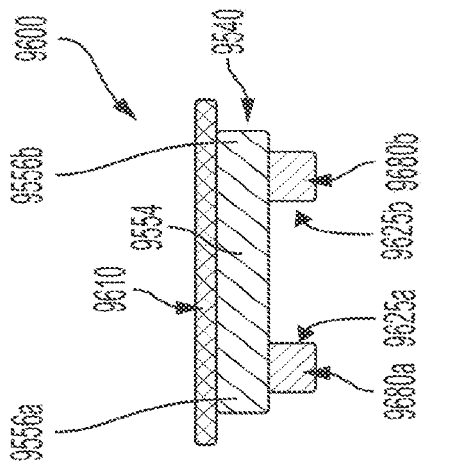
Figure 98B:
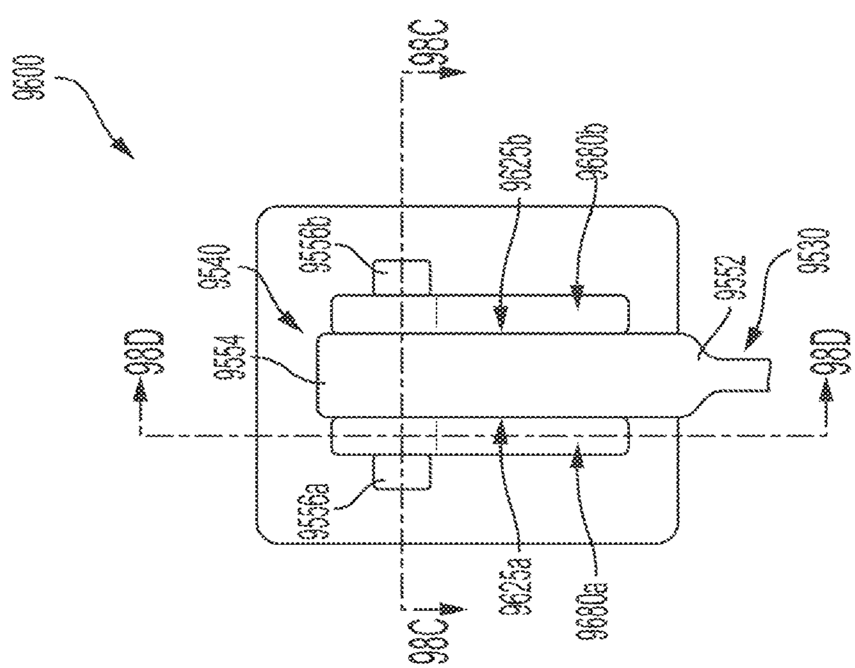

FIG. 98D is a side view of the attachment portion 9540 and securing member 9600 shown in FIGS. 98A-98C. As shown in FIG. 98D, the coupling arm 9680 may be configured to be positioned in apposition with the first side 9612 of the base 9610. A surface 9625*c* of the coupling arm 9680 at one end (e.g., an occlusal end) adjacent the base 9610, and/or a surface 9625*d* of the coupling arm 9680 at another end (e.g., a gingival end) adjacent the base 9610, may each abut the first surface 9612 of the base 9610. As also shown in FIG. 98D, the coupling arm 9680 can be configured to be positioned in apposition with portions of the arms 9556 of the attachment portion 9540. That is, an innermost surface 9625*e* of the coupling portion 9624 of the coupling arm 9680 may abut the arms 9556 of the attachment portion 9540. Positioning the coupling arms 9680 around the arms 9556 in such a manner may inhibit movement of the attachment portion 9540 relative to the securing member 9600, e.g., in the occlusal-gingival direction and/or about the mesial-distal axis.

Still referring to FIG. 98D, the second side 9614 of the base 9610 may be configured to be positioned against and/or fixed to one or more of the patient's teeth. For example, in some embodiments the second side 9614 may be fixed to a lingual or buccal face of the one or more of the patient's teeth. As such, the base 9610, and more generally the securing member 9600 and attachment portion 9540, can be at least partially disposed in the occlusal-gingival direction (e.g., with a vertical orientation) when the attachment portion 9540 is secured to the securing member 9600. For example, the securing member 9600 and attachment portion 9540, or portions thereof, may be disposed to be generally parallel to the lingual or buccal surface of the one or more of the patient's teeth.

FIGS. 99-104 are front views of various embodiments of an attachment portion and a securing member, configured in accordance with embodiments of the present technology. An attachment portion of the present invention can be configured to be coupled to a securing element such as securing member 9600 with multiple coupling arms 9680, securing member 9700 with a single coupling arm 9780, or another suitable coupling configuration. An attachment portion shown and described with reference to FIGS. 99-104 may be part of a respective arm (e.g., the arm 9530) of an appliance as described elsewhere herein. Additionally, each of the attachment portions described with reference to FIGS. 99-104 may be configured to inhibit or prevent longitudinal movement and/or rotation of the attachment portion relative to the corresponding securing member, such that the load and/or direction applied via the attachment portion is substantially translated to the patient's teeth via the corresponding securing member. The attachment portions shown and described with reference to FIGS. 99-104 accomplish this at least in part by abutting or placing in contact regions of the attachment portion with surfaces of the corresponding securing member 9600 or 9700.

Figure 99:
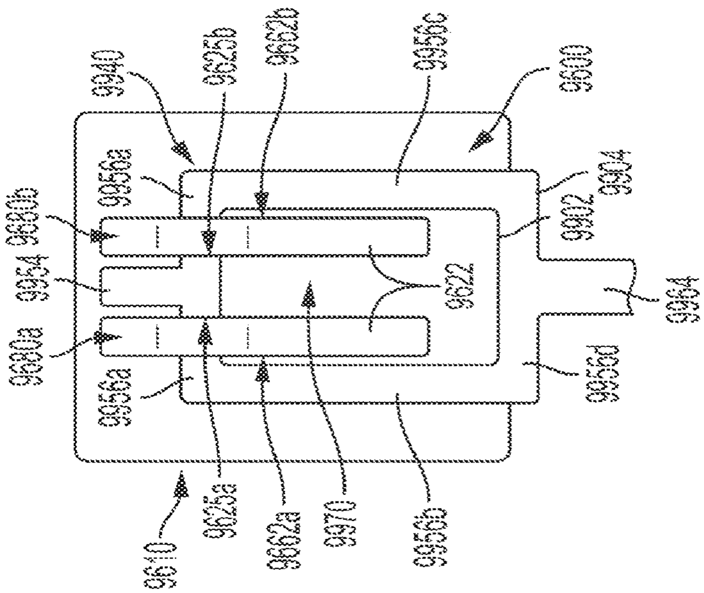

Attachment portion 9940 shown in FIG. 99 can be configured to minimize translation and/or rotation of the attachment portion 9940 relative to a corresponding securing member such as securing member 9600. The attachment portion 9940 can have a generally rectangular shape defined by an inner perimeter 9902 and an outer perimeter 9904 that together define a width of the rectangular shape. The attachment portion 9940 can comprise a distal region 9956*a*, lateral regions 9956*b*, 9956*c*, and/or a proximal region 9956*d* (collectively "regions 9956). In some embodiments, the attachment portion 9940 can have a framed portion 9970 between regions 9956*a*, 9956*b*, 9956*c*, and 9956*d*. A distal arm 9954 can extend distally from distal region 9956*a* and be configured to be positioned between coupling arms 9680. Accordingly, the distal arm 9954 can be configured to engage an inner surface 9625*a* and/or 9625*b* of at least one coupling arm 9680 to prevent excessive lateral translation of the attachment portion 9940 relative to securing member 9600. Similarly, lateral region 9956*b* and/or 9956*c* can be configured to engage an outer surface 9662 of a coupling arm 9680 to prevent excessive lateral translation of the attachment portion 9940. The lateral regions 9956*b* and/or 9956*c* meet the distal arm 9954 to form a shoulder region that may be configured to limit proximal and/or distal translation of the attachment portion 9940. In some embodiments, a proximal arm 9964 can extend proximally from proximal region 9956*d*.

According to some embodiments, coupling arms 9680 can be configured to be spaced apart from the attachment region 9940 as shown in FIG. 99. In some embodiments, one or more regions of the attachment portion 9940 can be configured to contact one or more regions of the securing member 9600. For example, a portion of the inner perimeter 9902 of the lateral regions 9956*b*, 9956*c* of the attachment portion 9940 can be configured to contact a corresponding outer surface 9962*a*, 9962*b* of the securing member 9600 when the attachment portion 9940 is coupled to the securing member 9600.

Figure 100:
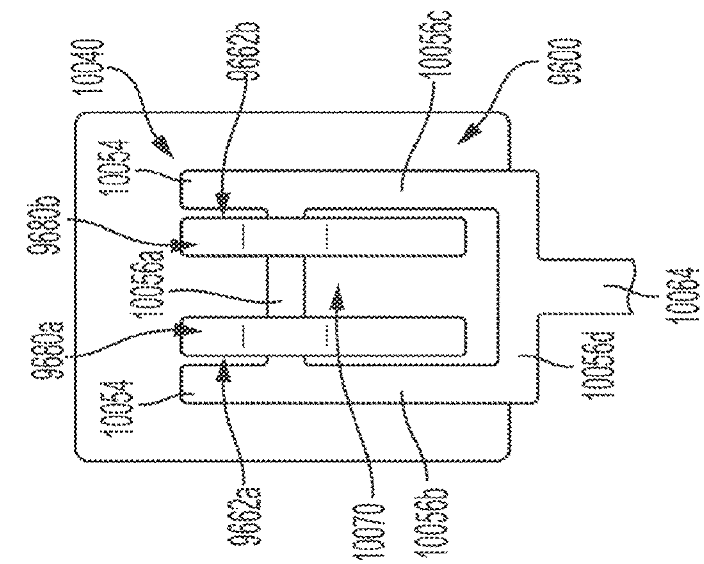

FIG. 100 depicts an embodiment of an attachment portion 10040 with multiple distal arms 10054 configured to further limit lateral translation of the attachment portion 10040 relative to the securing member 9600. As shown in FIG. 100, the attachment portion 10040 may include the distal, lateral, and proximal regions 10056*a*, 10056*b*, 10056*c*, 10064, such as the regions 9956 described with reference to FIG. 99. In some embodiments, the attachment portion 10040 can have two distal arms 10054 as shown in FIG. 100. In some embodiments, the attachment portion 10040 can include more than two distal arms 10054. According to some aspects of the present technology, for example as shown in FIG. 100, distal arms 10054 can be configured to be spaced apart from or positioned in close proximity to outer surfaces 9662 of the coupling arms 9680. Distal arms 10054, distal region 10056*a*, and/or lateral regions 10056*b*, 10056*c* can be configured to engage coupling arms 9680 of the securing member 9600 to limit translation and/or rotation of the attachment portion 10040 relative to the securing member 9600.

Figure 101:
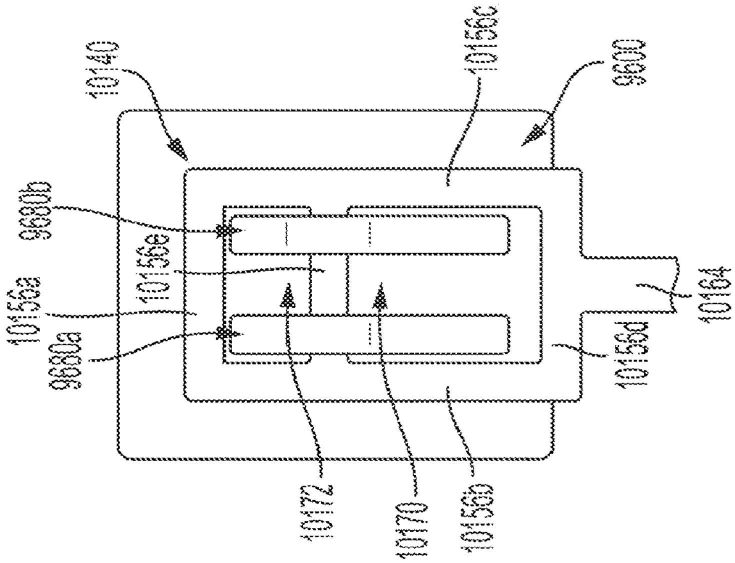
FIGS. 99-104 are front views of various embodiments of attachment portions and securing members, configured in accordance with embodiments of the present technology.

In some embodiments, for example as shown in FIG. 101, an attachment portion 10140 can include multiple framed portions 10170, 10172 configured to surround the coupling arms 9680 of the securing member 9600 in order to further limit proximal and/or distal translation of the attachment portion 10140 relative to the securing member 9600. The attachment portion 10140 shown in FIG. 101 includes a distal region 10156*a*, lateral regions 10156*b*, 10156*c*, and a proximal region 10156*d* (collectively "regions 10156"), as previously described. Additionally, the attachment region 10140 has an intermediate region 10156*e* extending between lateral regions 10156*b*, 10156*c* and positioned between the distal region 10156*a* and the proximal region 10156*d*. The intermediate region 10156*e* can be configured to be positioned adjacent the coupling regions 9624 of the coupling arms 9680 of the securing member 9600. As previously described in reference to FIGS. 99 and 100, regions 10156 can be configured to be in contact with or adjacent to the coupling arms 9680 based on a desired security of the coupling. By positioning regions 10156 adjacent to each surface of the coupling arms 9680, the attachment portion 10140 can be configured to inhibit translation and/or rotation of the attachment portion 10140 relative to the securing member 9600. Proximal arm 10164 can extend proximally from the proximal region 10156*d* and can couple to a connector of the present technology to form an arm as described elsewhere herein.

Figure 104:
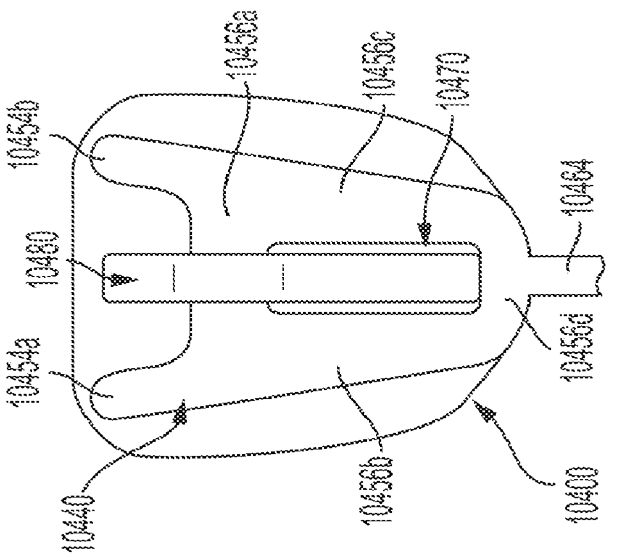
Figure 103:
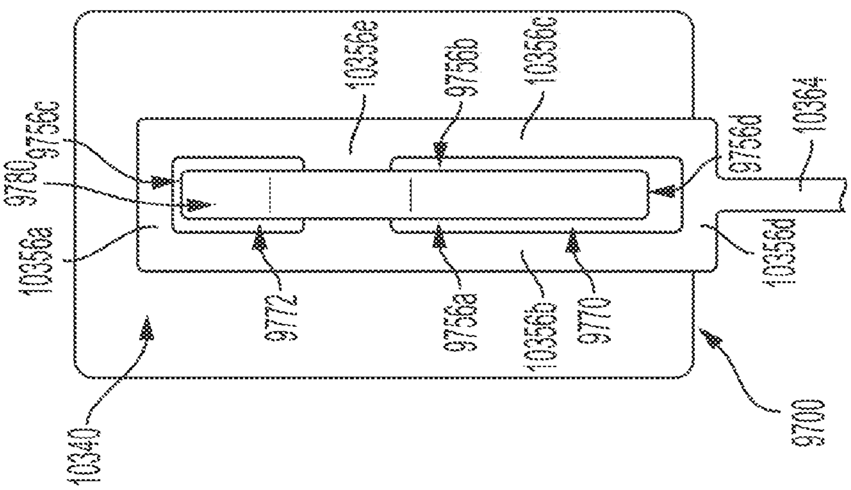
Figure 102:
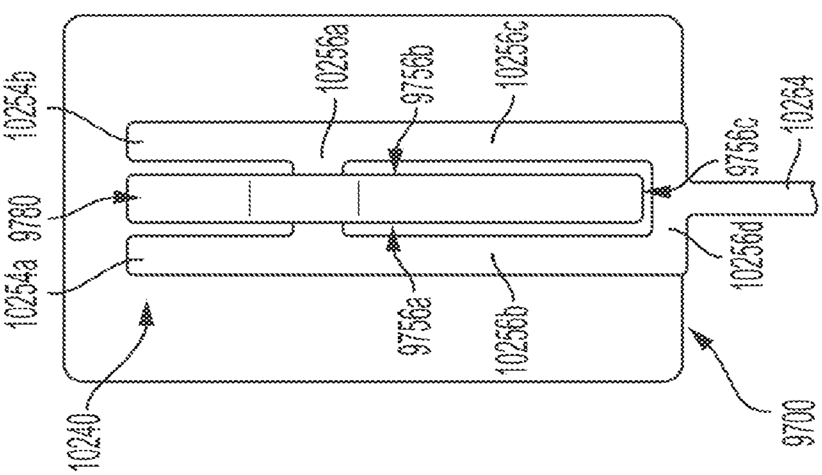

Embodiments of the present technology illustrated in FIGS. 102-104 include securing members 9700 having a single couple arm 9780. Referring first to FIG. 102, the attachment portion 10240 may include a distal region 10256*a*, lateral regions 10256*b*, 10256*c*, and a proximal region 10256*d* (collectively "regions 10256"). The attachment portion 10240 can be attached to a connector of the present technology to form an arm via a proximal protrusion 10264. The attachment portion 10240 can include distal arms 10254*a*, 10254*b* extending distally from distal portion 10256*a*. The distal arms 102 can be configured to engage surfaces 9756*a*, 9756*b* of the coupling arm 9780 to limit lateral translation of the attachment portion 10240 relative to the securing member 9700. Although the attachment portion 10240 is depicted with regions 10256 spaced apart from the coupling arm 9780, in some embodiments one or more regions 10256 can be configured to be in direct contact with the coupling arm 9780.

An attachment portion configured for use with a securing member with a single coupling arm 9700, for example attachment portion 10340 shown in FIG. 103, can comprise multiple framing regions 9770 such that when the attachment portion 10340 is coupled to the securing member 9700, each surface of the coupling arm 9780 of the securing member 9700 abuts a region of the attachment portion 10340 reduce translation of the attachment portion 10340. The attachment portion 10340 can include a distal region 10356*a*, a proximal region 10356*d*, and an intermediate region 10356*e* positioned between the distal region 10356*a* and the proximal region 10356*d* (collectively "regions 10356"). Each of the distal, proximal, and intermediate regions 10356*a*, 10356*d*, 10356*e* may extend between lateral regions 10256*b*, 10256*c*, as shown in FIG. 103. In some embodiments, each region of the attachment portion 10340 may be configured to abut a corresponding surface of the coupling arm 9780 to provide a limit to translation of the attachment region 10340. For example, the distal region 10356*a* and the proximal region 10356*d* can be configured to be positioned proximate a distal surface 9756*c* and a proximal surface 9756*d* of the coupling arm 9780, respectively to limit proximal and/or distal translation of the attachment portion 10340. Lateral regions 10356*b*, 10356*c* can abut lateral surfaces 9756*a*, 9756*b* of the coupling arm 9780 to limit medial and/or lateral translation of the attachment portion 10340. Intermediate portion 10356*e* can abut an inner surface 9756*e* of the coupling arm 9780, for example as depicted in FIG. 98D, to limit proximal and/or distal translation of the attachment portion 10340. In some embodiments, a size of the framing portions 9770, 9772 can be selected such that the regions 10356 are spaced apart from surfaces of the coupling arm 9780 when coupled to the securing member 9700. Spacing, or a lack thereof, between the regions 10356 and the surfaces of the coupling arm 9780 may be based on an intended security of the coupling between the attachment portion 10340 and the securing member 9700.

According to some embodiments, an attachment portion such as attachment portion 10440 shown in FIG. 104 can be configured to contact a greater area of a securing member (e.g., securing member 10400) for enhanced security of the connection. In some embodiments, the securing member 10400 can have a generally rounded shape and a single coupling arm 10480 as depicted in FIG. 104. The attachment portion 10440 may have generally similar features to the attachment portion 10240 shown in FIG. 102. For example, the attachment portion 10440 may comprise a distal region 10456*a*, lateral regions 10456*b*, 10456*c*, and proximal region 10456*d* (collectively "regions 10456"). Together, the regions 10456 can define a framing region 10470. The attachment portion 10440 can further comprise a proximal arm 10464 extending proximally from the proximal region 10456*d* and/or distal arms 10454*a*, 10454*b* extending distally from the distal region 10456*a*. As shown in FIG. 104, the distal arms 10454*a*, 10454*b* may be positioned at an angle relative to the distal region 10456*a*. In some embodiments the angle may be greater than 90 degrees (e.g., 95 degrees, 100 degrees, 105 degrees, 110 degrees, etc.). The angle can be increased in order to increase an area of the attachment portion 10440 such that when the attachment portion 10440 is coupled to the securing member 10400, the attachment portion 10440 engages a greater area of the securing member 10400, further inhibits translation of the attachment portion, and/or increases a security of the coupling.

Figure 105:
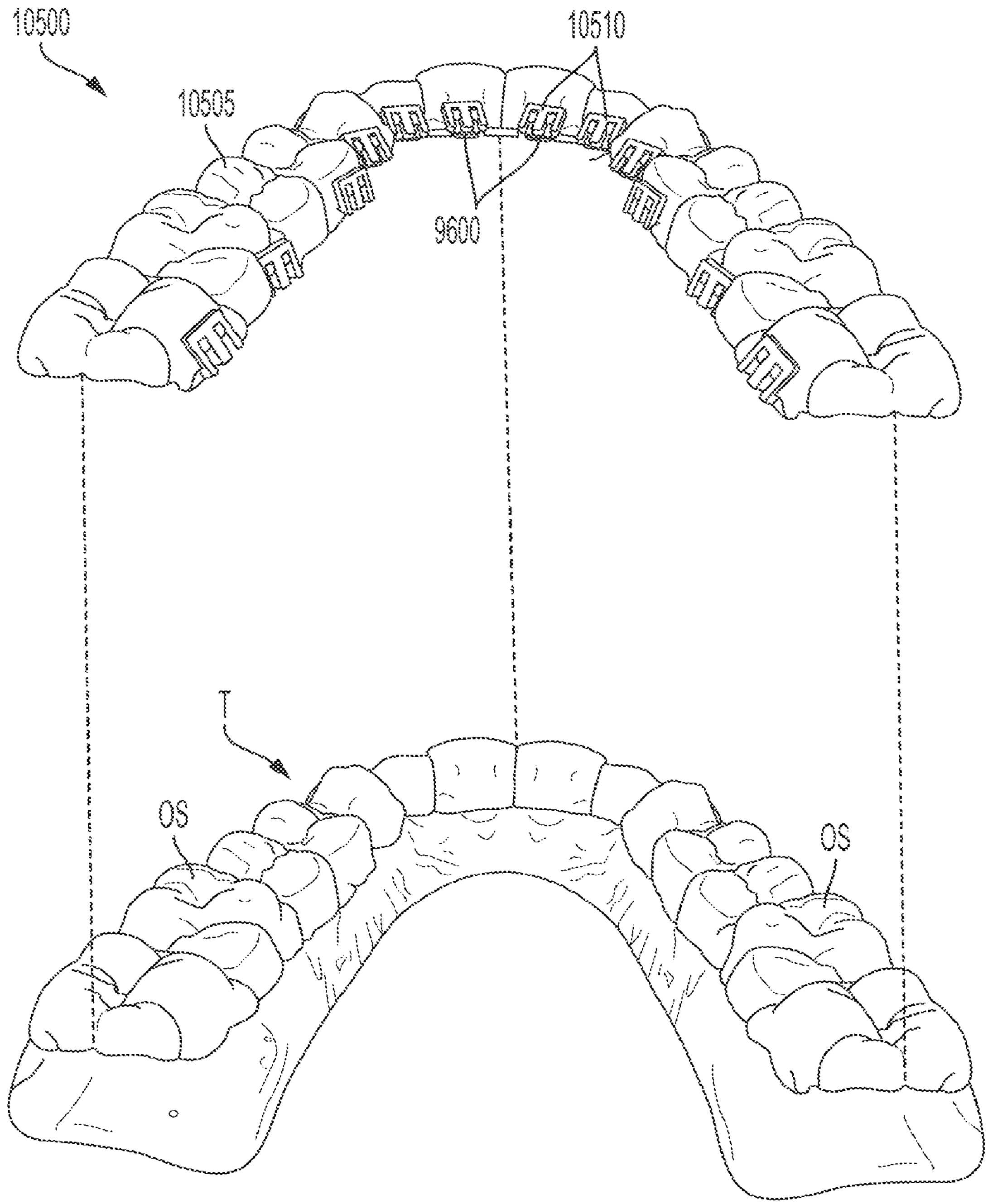
FIG. 105 is an isometric view of an orthodontic device to be disposed over a patient's teeth, configured in accordance with embodiments of the present technology.

FIG. 105 is an isometric view of a positioning device 10500 configured in accordance with embodiments of the present technology. The positioning device 10500 is configured to hold one or more securing members in a desired position relative to the patient's teeth to facilitate bonding of the securing members to the teeth in the desired position. In some embodiments, for example as shown in FIG. 105, the positioning device 10500 may comprise a first portion 10505 configured to be releasably secured to one or more of the patient's teeth, and one or more second portions 10510 coupled to the first portion 10505, each configured to hold a securing member. The positioning device 10500 may include a cover configured to be disposed over all or a portion of the patient's teeth. In some embodiments, the cover generally conforms to the patient's dental topography to provide a snug fit. In some embodiments, the device 10500 is configured to be disposed over the patient's teeth T such that a surface of the device 10500 closest to the gingiva and adjacent a lingual surface of the patient's teeth T is positioned at an intermediate portion of the patient's teeth T (e.g., not at or below the patient's gingiva).

As shown in FIG. 105, the securing member 9600 corresponds to that shown and described with reference to FIGS. 96 and 98A-98D. However, in some embodiments, the securing member 9600 can correspond to that shown in FIG. 97. Additionally, the securing member 9600 can correspond to any of the securing members described herein. In such embodiments, the second portion 10510 can have a shape configured to receive such a securing member.

The device 10500 can comprise a silicone, plastic, polymer, and/or other flexible, non-metal material. The first and second portions 10505, 10510 can comprise the same material or different materials. For example, the first portion 10505 may comprise a first material and the second portion 10510 may comprise a second material different than the first material. Additionally or alternatively, the first and second portions 10505, 10510 of the device 10500 may be formed of a single, unitarily-formed structure. As shown in FIG. 105, the second portions 10510 can protrude from and/or be disposed over the first portion 10505 such that the second portion 10510 faces in a general lingual direction when the device 10500 is disposed over the patient's teeth T. The first portion 10505 can include a plurality of regions, each of which corresponds to one or more of the patient's teeth T. In some embodiments, the device 10500 can be tailored to a particular patient's teeth T. For example, an occlusal-facing surface of each region of the first portion 10505 may correspond to a respective occlusal surface S of the tooth which the device 10500 is configured to be positioned over. In such embodiments, the device 10500 can fit securely over the patient's teeth T, e.g., to ensure the securing member 9600 received by the second portion 10510 are properly positioned, e.g., adjacent a lingual surface of patient's teeth T.

As explained elsewhere herein, once the device 10500 is positioned over the patient's teeth T, and/or the securing members 9600 are properly positioned, e.g., over a lingual surface of the patient's teeth T, the securing members 9600 may be adhered to respective ones of the patient's teeth T (e.g., by exposing the securing members 9600 to energy or ultraviolet (UV) light), after which the device 10500 may be removed from the patient's teeth T such that the securing members 9600 remain on the patient's teeth. Such a process used to position and/or adhere the securing members 9600 to a patient's teeth T is often referred to as "indirect bonding" or IDB. After adhering the securing members 9600 to the patient's teeth T, an orthodontic appliance (e.g., any of the appliances 100 described elsewhere herein) can be coupled to the securing members 9600 to reposition the patient's teeth to a desired arrangement (e.g., a final tooth arrangement). In such embodiments, the device 10500 itself is not used primarily to reshape or reposition the patient's teeth.

Figure 106A:
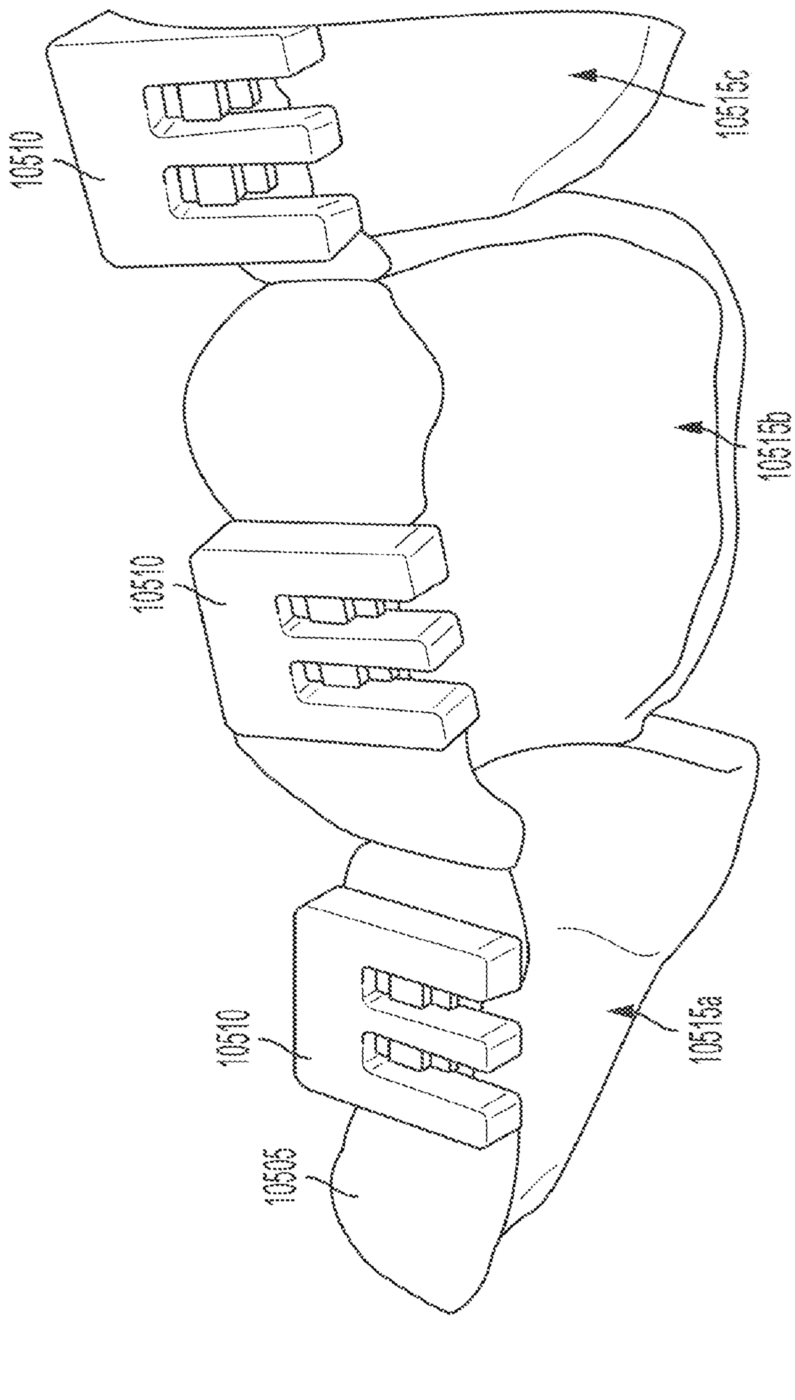
FIGS. 106A-106E are enlarged views of portions of the device shown in FIG. 105.

FIG. 106A is an enlarged view of a portion of the device 10500 shown in FIG. 105. For illustrative purposes, the securing members 9600 have been removed in FIG. 106A. As shown in FIG. 106A, the device 10500, or more particularly, the first portion 10505 of the device 10500, can include one or more cavities 10515*a*, 10515*b*, 10515*c*. As described elsewhere herein, each of the cavities 10515*a-c* can correspond to a respective tooth of the patient that the respective cavities 10515*a-c* are to be disposed over. The individual cavities 10515*a-c* together can form a single cavity that is configured to receive all of the patient's teeth along the upper or lower jaw.

Figure 106B:
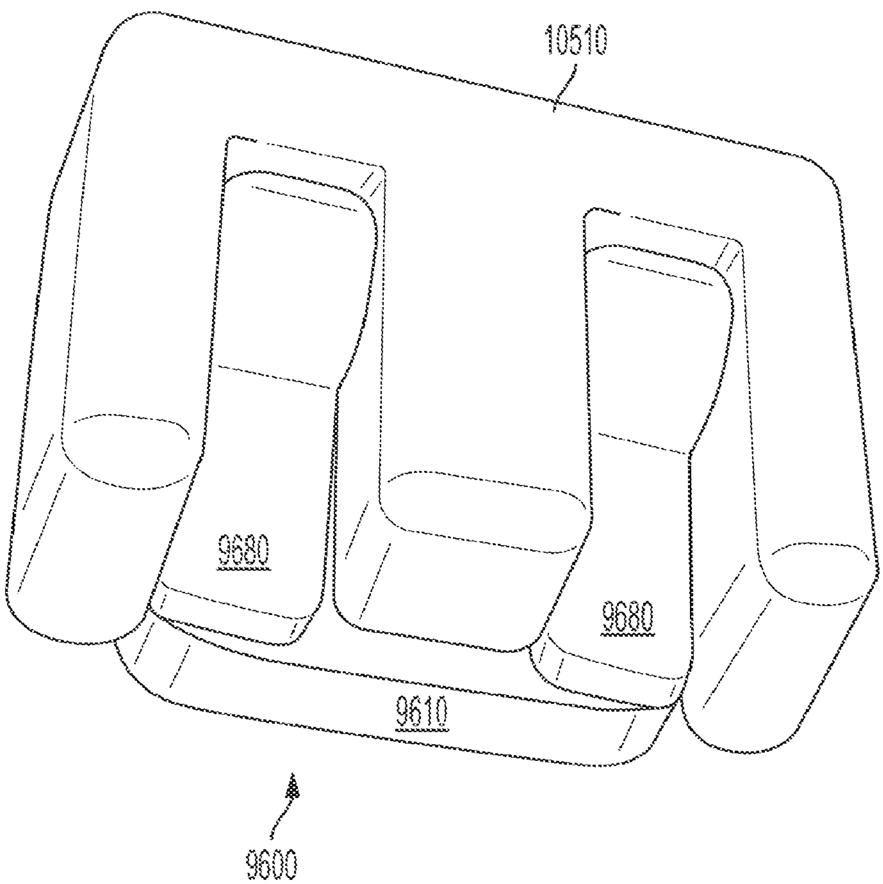

FIG. 106B is an enlarged isometric view of the second portion 10510 shown in FIG. 105. The first portion 10505 is not shown in FIG. 106B for illustrative purposes. As shown in FIG. 106B, the securing member 9600 is coupled to and received by the second portion 10510. As previously described, the securing member 9600 includes a base 9610, and one or more coupling arms 9680 fixed to the base 9610 and spaced apart from one another. As explained elsewhere herein (e.g., with reference to FIGS. 106C-106E), the base 9610 is received within a cavity on one side of the second portion 10510, and each of the coupling arms 9680 are disposed in respective channels of the second portion 10510 on an opposing side of the second portion 10510.

Figure 106C:
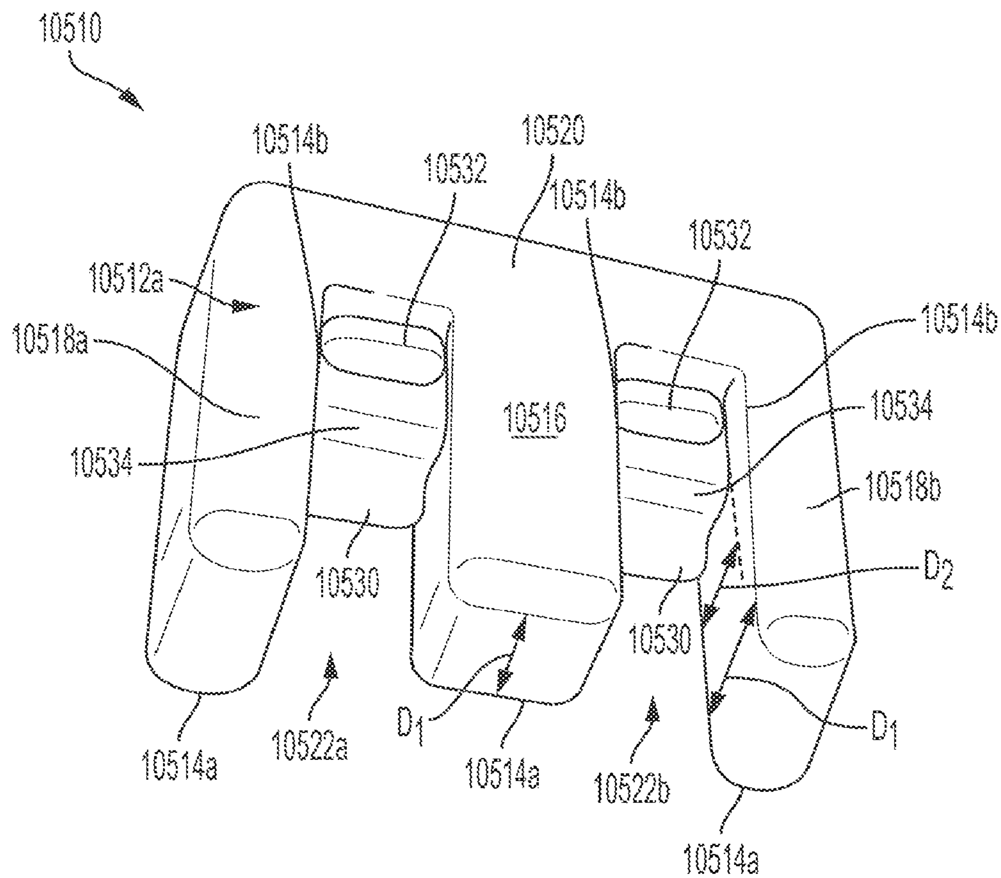
Figure 106D:
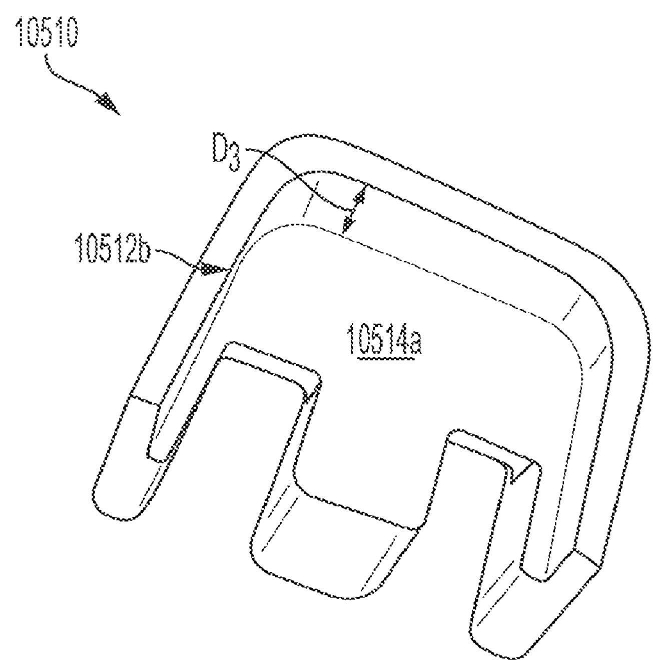

FIGS. 106C and 106D are isometric views of the second portion 10510 shown in FIG. 106B without the securing member 9600. FIG. 106C shows a first side 10512*a* of the device 10500 and FIG. 106D shows a second, opposing side 10512*b* of the device 10500. When the device 10500 is disposed over the patient's teeth, the first side 10512*a* of the device 10500 can generally face a lingual direction and the second side 10512*b* of the device 10500 can generally face a buccal (or facial) direction. Referring first to FIG. 106C, the second portion 10510 can include a first region 10516 (e.g., an intermediate region or member) extending in a first direction, and a second region 10520 (e.g., a lateral region or member) extending in a second direction at an angle relative to the first direction. In some embodiments, the first region 10516 can be generally orthogonal to the second region 10520 or at an angle between about 60-120 degrees. The second portion 10510 may further comprise one or more third regions 10518*a*, 10518*b* (e.g., peripheral regions or members) peripheral to the first region 10516 and generally extending in the first direction. In use, such as when the device 10500 is disposed over a patient's teeth, the first region 10516 and the third regions 10518*a-b* can generally extend in the occlusal-gingival direction and the second region 10520 can generally extend in the mesial-distal direction. The first region 10516 and the second region 10520, and in some embodiments the third regions 10518*a-b*, can generally define one or more channels 10522*a*, 10522*b*. As shown in FIG. 106C, the first region 10516, third region 10518*a*, and part of the second region 10520 can define the first channel 10522*a*, and the first region 10516, third region 10518*b*, and part of second region 10520 can define the second channel 10522*b*. The second channel 10522*b* is spaced apart from the first channel 10522*a*. Each of the first and second channels 10522*a-b* can be configured to receive a respective portion (e.g., a coupling arm 9680; FIG. 106B) of a securing member (e.g., the securing member 9600; FIG. 106B).

As further shown in FIG. 106C, the second portion 10510 can comprise a bracket receiving portion 10530 disposed within each one of the channels 10522*a-b*. The bracket receiving portion 10530 can include a recess 10532 configured to receive a portion of the securing member and/or secure the securing member to the second portion 10510 (and therein to the device 10500). In some embodiments, the bracket receiving portion 10530 may also include a curved surface 10534 adjacent the recess 10532 and closer to the entrance of the channel 10522*a-b*. An outermost surface of the bracket receiving portion 10530 may be spaced apart from a base surface 10514*a* of the second portion 10510 by a distance $D_2$, which may be less than a distance $D_1$ spanning between the base surface 10514*a* and an outermost surface of the first region 10516 or third regions 10518*a-b*.

In operation, the bracket receiving portion 10530 can slidably receive the securing member 9600 (FIG. 106B) such that each of the coupling arms 9680 (FIG. 106B) of the securing member 9600 is received by a respective channel 10522*a-b* and engages the respective bracket receiving portion 10530. As the coupling arms 9680 approach the respective recess 10532, the curved surface 10534 displaces the respective coupling arm 9680 away from the base 9610 (FIG. 106B) of the securing member 9600 until the respective coupling arm 9680 reaches the respective recess 10532, at which point the respective coupling arm 9680 snaps into the recess 10532 and/or becomes secured to the second portion 10510 (and therein to the device 10500) via the recess 10532. When the respective coupling arms 9680 are snapped into and/or coupled to the recess 10532, the coupling arms may be plasticly deformed relative to their default, at-rest position.

As previously described, FIG. 106D shows the second side 10512*b* of the second portion 10510 of the device 10500. The second side 10512*b* is configured to receive the securing member 9600 (FIG. 106B) such that the base 9610 (FIG. 106B) is disposed proximate the base surface 10514*a*. That is, the second portion 10510 is configured to receive the securing member 9600 such that the base 9610 is disposed on one side of a plane defined by the base surface 10514*a*, and the coupling arms 9680 are disposed on another, opposing side of the plane.

Figure 106E:
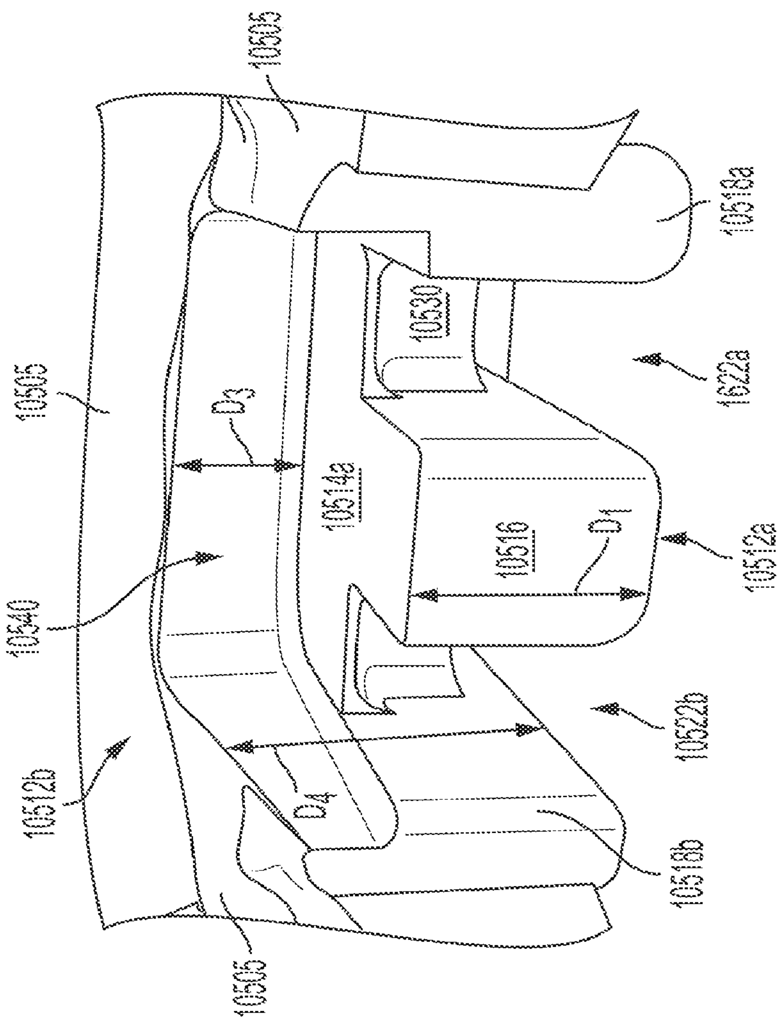

FIG. 106E is another view of the second side 10512*b* of the second portion 10510, and illustrates the second portion 10510 integral with the first portion 10505 of the device 10500. FIG. 106E also shows portions of the first side 10512*a* of the device 10500, which includes the first region 10516, third regions 10518*a-b*, channels 10522*a-b*, and bracket receiving portions 10530. The second side 10512*b* of the second portion 10510 includes a cavity 10540 extending from the base surface 10514*a* and that is configured to receive the securing member 9600. In some embodiments, the outermost surface of the cavity 10540 and/or second side 10512*b* may be spaced apart from the base surface 10514*a* by a distance $D_3$, which may taper in a direction toward the entrance of the channels 10522*a-b*. The distance $D_3$ may be equal to or less than a thickness of the securing member 9600, or in some embodiments less than a thickness of the base 9610 of the securing member 9600, such that a back surface of the securing member 9600 to be adhered to the patient's tooth can protrude from cavity 10540, e.g., beyond the outermost surface of the second side 10512*b*. The distance $D_3$ and/or the tapering of the outermost surface can thereby better ensure that when the securing member 9600 is received by the second portion 10510 and the device 10500 is positioned over the patient's teeth, the back surface of the securing member(s) can engage (e.g., directly engage) respective ones of the patient's teeth.

Figure 107A:
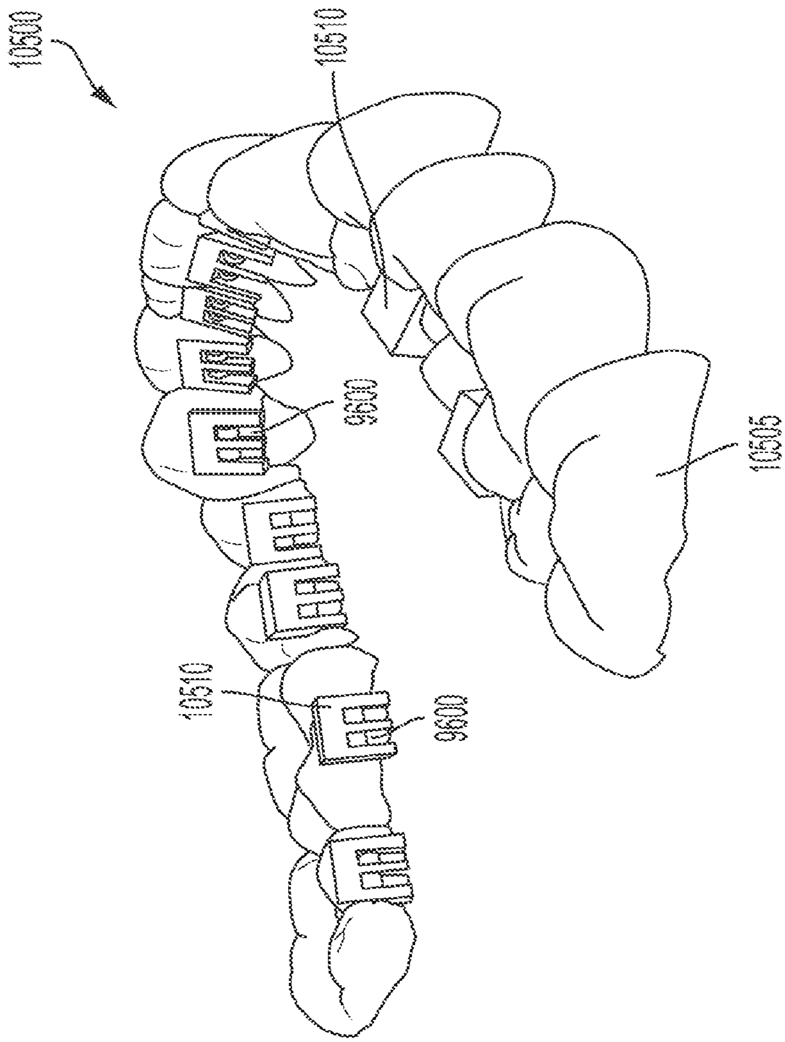
FIGS. 107A-107C illustrate a method for attaching a securing member to a patient's teeth.
Figure 107B:
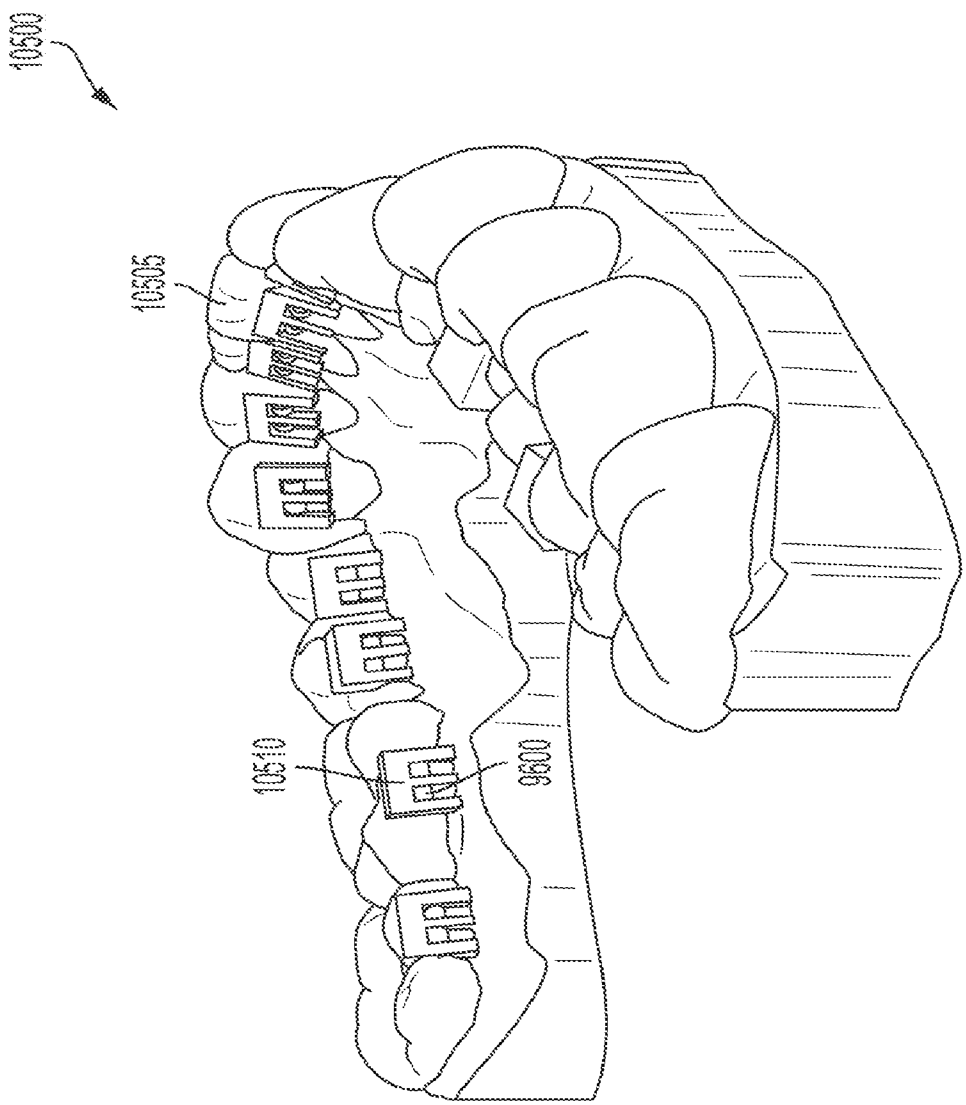
Figure 107C:
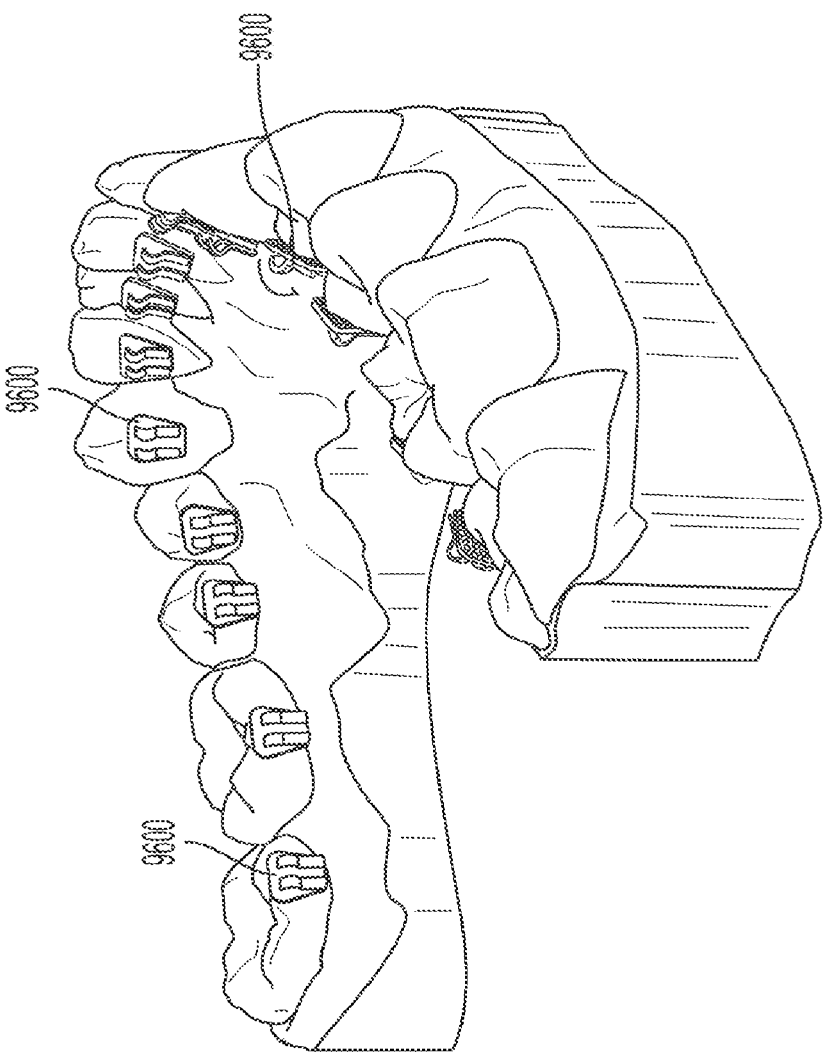

FIGS. 107A-107C illustrate a method for attaching a securing member 9600 to a patient's teeth. FIG. 107A is an isometric view of the device 10500, as described elsewhere herein. As shown in FIG. 107A, the device 10500 includes the first portion 10505 and the second portion 10510. Additionally, a plurality of securing members 9600 are positioned within and/or coupled to the second portion 10510. As previously described, each of the securing members 9600 can be slidably received by a respective second portion 10510 such that the coupling arms 9680 of the securing members 9600 are disposed on a first side (e.g., a lingual-facing side) of the second portion 10510 and the base 9610 of the securing members 9600 is disposed on a second side (e.g., a buccal or labial-facing side) of the second portion 10510. As described elsewhere herein, the securing members 9600 can include multiple coupling arms or portions (e.g., as shown in FIG. 107A) or a single coupling arm or portion (e.g., as shown in FIG. 97).

FIG. 107B is an isometric view of the device 10500 disposed over a patient's teeth or dentition T. For example, the first portion 10505 of the device 10500 is disposed over the patient's teeth T and the second portion 10510 of the device 10500 is generally disposed over or adjacent a lingual surface of the patient's teeth T. Moreover, the securing members 9600 disposed within the second portion 10510 are positioned or disposed over the lingual surface of the patient's teeth T such that a back surface of each of the securing members 9600 engages (e.g., directly engages) portions of respective ones of the patient's teeth T where the securing member is to be adhered. Accordingly, and as described elsewhere herein, when the device 10500 is disposed over the patient's teeth T, the second portion 10510 and/or the securing members 9600 are generally oriented in an occlusal-gingival direction. Once the device 10500 is disposed over the patient's teeth T, the securing members 9600 can be adhered (e.g., directly adhered) to the patient's teeth T, e.g., via an adhesive and/or a curable material disposed on the back surface of each of the securing members 9600. The curable material can include a composite resin, ceramic, and/or other synthetic material. In some embodiments, the curable material can include dimethacrylate monomers, a filler material (e.g., silica), and/or a photoinitiator that may be activated by UV light (e.g., for bonding). In some embodiments, adhering the securing members 9600 to the patient's teeth T can comprise exposing the securing members 9600, including the curable material disposed on the securing members 9600, to an energy source (e.g., UV light).

After adhering the securing members 9600 to the patient's teeth T, the device 10500 can be removed from the patient's teeth T such that the securing members 9600 remain adhered to the patient's teeth T. FIG. 107C is an isometric view of the patient's teeth T with adhered securing members after the device 10500 has been removed. In some embodiments, removing the device 10500 such that the securing members 9600 remain adhered to the patient's teeth T can comprise decoupling the device 10500 from the securing members 9600 by moving or sliding the device 10500 in a general occlusive direction away from the patient's gingiva and/or the securing members 9600 adhered to the patient's teeth T. In some embodiments, prior to moving the device 10500 away from the securing members 9600, individual securing members 9600 can be decoupled from respective second portions 10510 and/or the device 10500 by pushing down on an end portion (e.g., an end portion of the coupling arm closer to the patient's gingiva) of the coupling arm, thereby causing an opposing end of the coupling arm to uncouple from the second portion 10510 (e.g., to uncouple from the recess 10532 (FIG. 106C) of the second portion 10510). Once the device 10500 has been removed such that the securing members 9600 remain adhered to the patient's teeth T, an orthodontic appliance (as described elsewhere herein) can be coupled to the securing members 9600 to reposition the patient's teeth to a desirable position.

Figure 108:
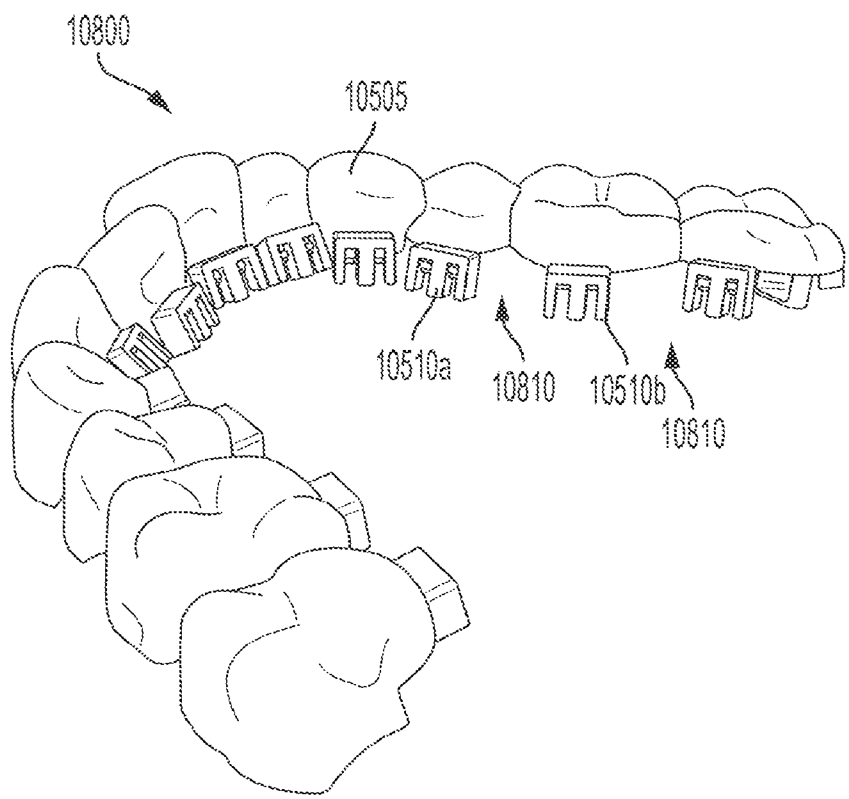
FIG. 108 is an isometric view of an example orthodontic device, configured in accordance with embodiments of the present technology.

FIG. 108 is an isometric view of an example orthodontic device 10800, configured in accordance with embodiments of the present technology. The device 10800 includes features generally similar to those of device 10500 described with reference to FIGS. 105-107C. For example, the device 10800 includes a shell, cap, or shell-type aligner configured to be disposed over a patient's teeth and that includes the second portion 10510 configured to receive one or more securing members. Additionally, the device 1800 includes a first portion 10805 generally similar to the first portion 10505 previously described. However, as shown in FIG. 108, areas 10810 of the first portion 10805 between adjacent second portions 10510*a*, 10510*b* are removed. Stated differently, the areas 10810 between adjacent second portions 10510*a*-*b* of the device 10800 are substantially void of material such that the corresponding tooth or teeth adjacent the second portions 10510 are more exposed relative to teeth covered by the device 10500 and/or the first portion 10505 (as previously described). In such embodiments, the securing members, or more particularly the back surface of the securing members, are more exposed for the device 1800, relative to the device 10500. As such, for the device 10800, when adhering the securing members to the respective teeth of the patient by exposing the securing members to UV light or an energy source, the practitioner can more easily access or expose the securing member to the UV light or energy and thereby ensure the securing member is properly adhered to the patient's tooth.

Figure 109A:
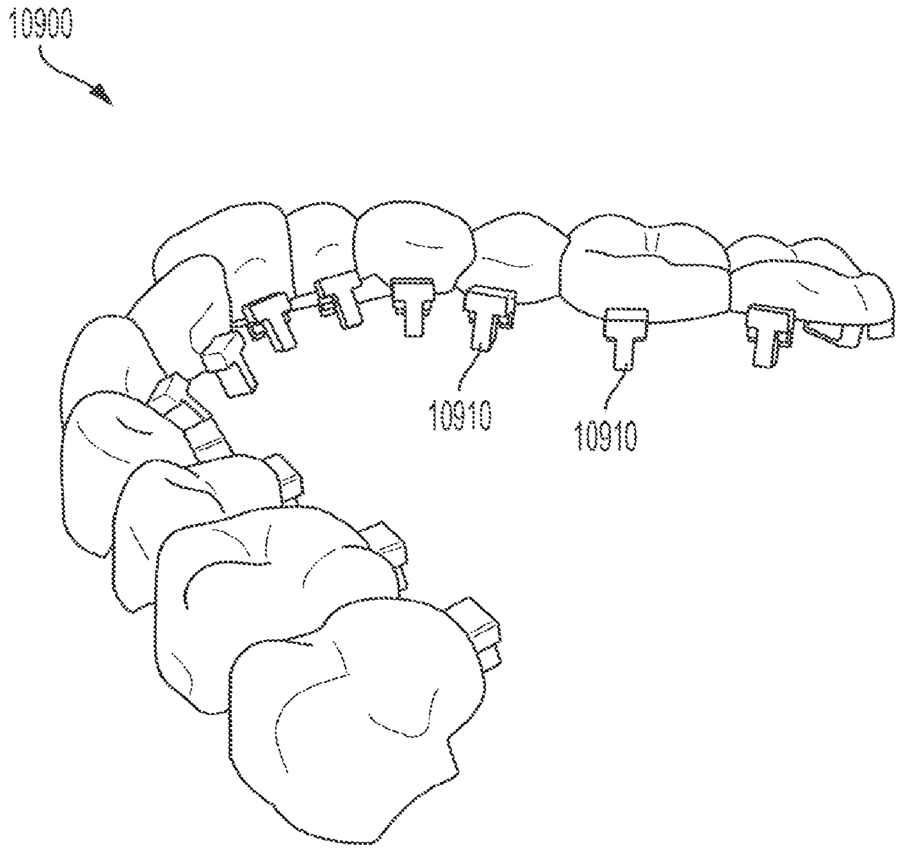
FIG. 109A is an isometric view of an example orthodontic device, configured in accordance with embodiments of the present technology.
Figure 109B:
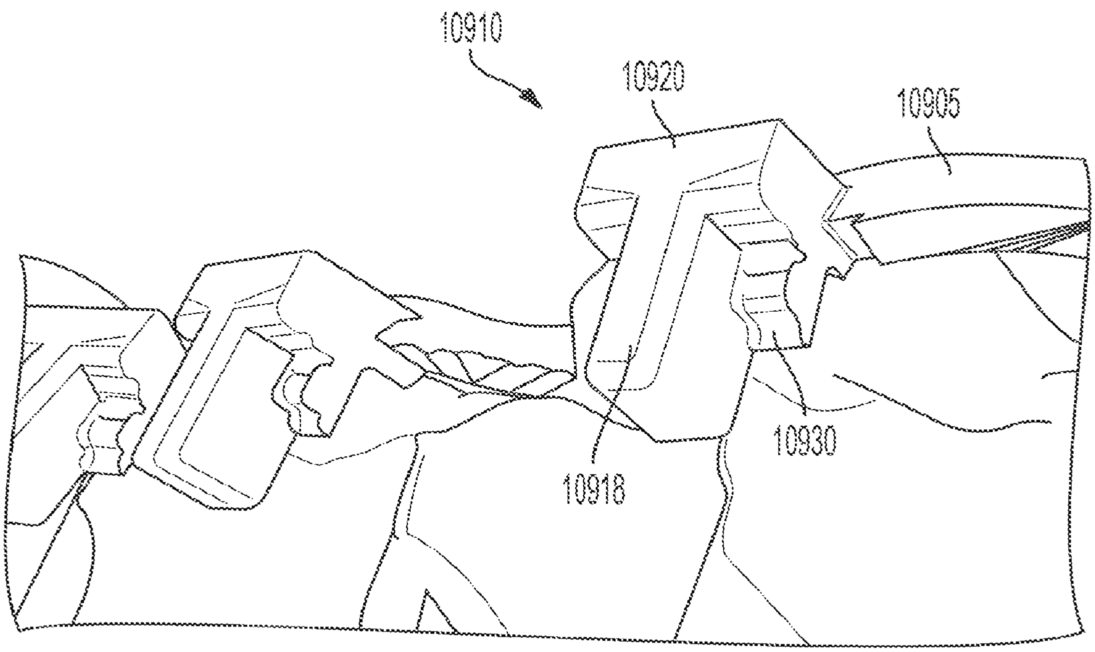
FIG. 109B is an enlarged view of a portion of the device shown in FIG. 109A.

FIG. 109A is an isometric view of an orthodontic device 10900, configured in accordance with embodiments of the present technology. The device 10900 includes features generally similar to those of device 10500 described with reference to FIGS. 105-107C. For example, the device 10900 includes a shell, cap, or shell-type aligner configured to be disposed over a patient's teeth and that includes the first portion 10505 (or first portion 10805) configured to receive a patient's teeth, as previously described. Additionally, the device 10900 includes a second portion 10910 generally similar to the second portion 10510 previously described. However, as shown in FIG. 109A, the second portion 10910 omits certain portions of the second portion 10510. As shown in FIG. 109B, which is an enlarged view of a portion of the device 10900 shown in FIG. 109A, the second portion 10910 of the device 10900 includes the first region 10516 (e.g., an intermediate region or member) extending in a first direction, and the second region 10520 (e.g., a lateral region or member) extending in a second direction at an angle (e.g., between 60-120 degrees) relative to the first direction. As previously described, in some embodiments the first region 10516 can be generally orthogonal to the second region 10520. Relative to the second portion 10510 described with reference to FIGS. 105-107C, the second portion 10910 of FIG. 109B omits the third regions 10518*a-b*. As shown in FIG. 109B, the second portion 10910 can also include the bracket receiving portion 10530 adjacent the first and second regions 10516, 10520, e.g., proximate the intersection of the first and second regions 10516, 10520. Advantageously, the second portion 10910 can enable more visibility of the securing member and/or the back surface of the securing member. As such, adhering the securing member to the patient's teeth, as described elsewhere herein, may be easier for the practitioner using the device 10900, relative to the device 10500.

Figure 110:
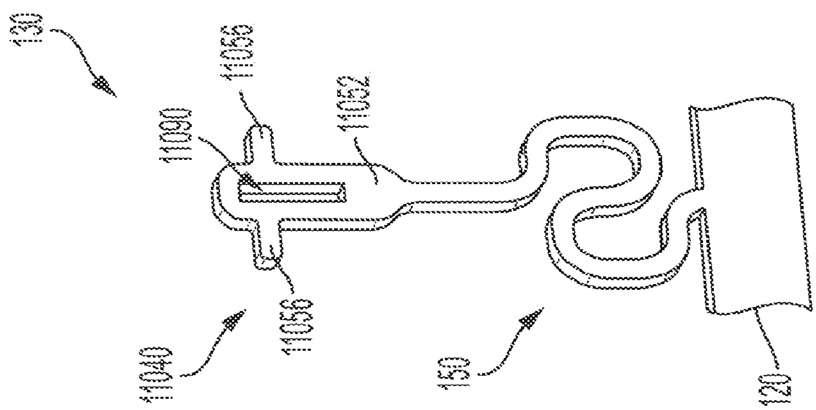

FIGS. 110-113 are isometric views of example arms 130 of an orthodontic appliance 100, configured in accordance with embodiments of the present technology. Referring first to FIG. 110, the arm 130 includes many features generally similar to those previously described with reference to FIG. 95 and elsewhere herein. For example, as shown in FIG. 110, the arm 130 is coupled to the anchor 120, and includes the biasing portion 150 extending from the anchor 120, and an attachment portion 11040 extending from the biasing portion 150. The arm 130, or more particularly the attachment portion 11040, can further include an opening or slot 11090. The opening 11090 can extend through the attachment portion 11040 and/or a base region 9652 of the attachment portion 11040. Additionally or alternatively, the opening 11090 can be positioned between second regions 11056 of the attachment portion 11040. In some embodiments, the opening 11090 can be an elongate opening such that, when the appliance 100 is installed within a patient's mouth, the opening 11090 generally extends in the occlusal-gingival direction. As described elsewhere herein, the opening 11090 can be configured to receive a portion (e.g., an end portion) of an orthodontic tool to aid an operator in positioning the appliance 100 and/or individual arm 130 relative to a patient's teeth.

Figure 111:
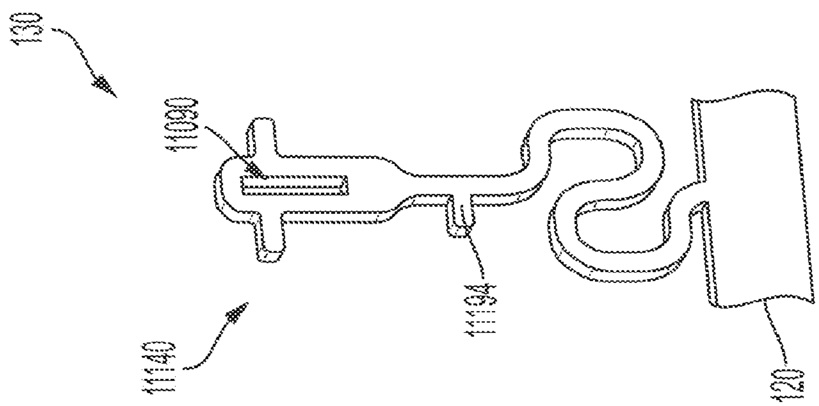
FIGS. 110-113 are isometric views of example arms of an orthodontic appliance, configured in accordance with embodiments of the present technology.

FIG. 111 is another example arm 130 similar to the arm 130 of FIG. 110, but further including a protrusion or member 11194. As shown in FIG. 111, the protrusion 11194 is positioned on the arm 130 between the anchor 120 and the attachment portion 11040. The protrusion 11194 can extend at an angle (e.g., about 90 degrees or between 60-120 degrees) from the portion of the arm 130 the protrusion is connected. As shown in FIG. 111, the protrusion 11194 can be an elongate, straight arm. In other embodiments, the protrusion 11194 can have a bend or curvature, and/or an "L" or "T" shape. When the appliance 100 is installed in a patient's mouth, the protrusion 11194 can generally extend in the mesial-direction direction. As described elsewhere herein, the protrusion 11194 can be utilized as a support such that an orthodontic tool (e.g., the same orthodontic tool configured to be received by the opening 11090) can position the appliance 100 and/or individual arm 130 via the protrusion 11194.

Figure 113:
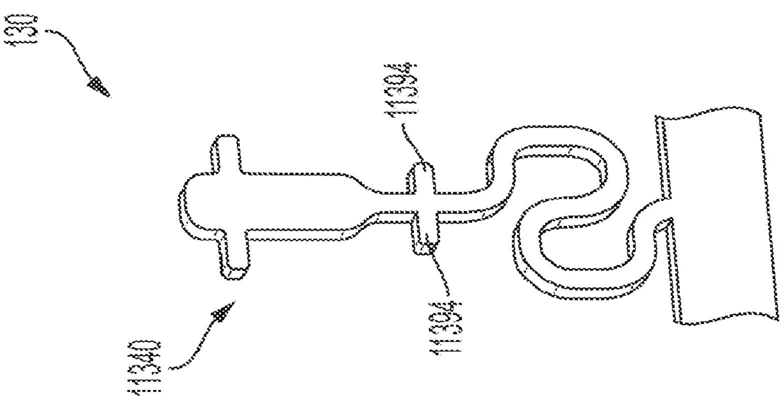
Figure 112:
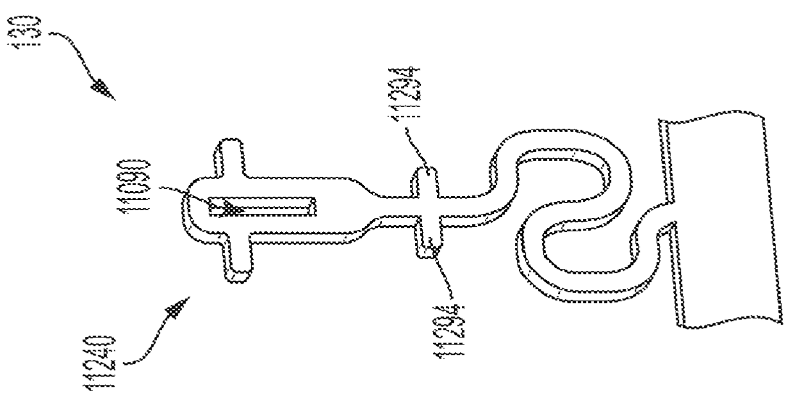

FIG. 112 is another example arm 130 similar to the arm 130 of FIG. 111, but further including another protrusion 11294. As shown in FIG. 112, each of the protrusions 11294 are positioned on opposing side of the arm 130 and are spaced apart from the attachment portion 11040 and/or biasing portion by the same distance. Each of (e.g., one or both of) the protrusions 11294 can extend at an angle (e.g., about 90 degrees or between 60-120 degrees) from the portion of the arm 130 the respective protrusions 11294 are connected. As shown in FIG. 1112, the protrusions 11294 can each be an elongate, straight arm. In other embodiments, each of the protrusions 11294 can have a bend or curvature, and/or an "L" or "T" shape. When the appliance 100 is installed in a patient's mouth, the protrusions 11294 can generally extend in the mesial-direction direction. As described elsewhere herein, the protrusions 11294 can be utilized as a support such that an orthodontic tool (e.g., the same orthodontic tool configured to be received by the opening 11090) can position the appliance 100 and/or individual arm 130 via the protrusions 11294. FIG. 113 is another example arm 130 similar to the arm 130 of FIG. 112, but without the opening 11090.

Figure 114:
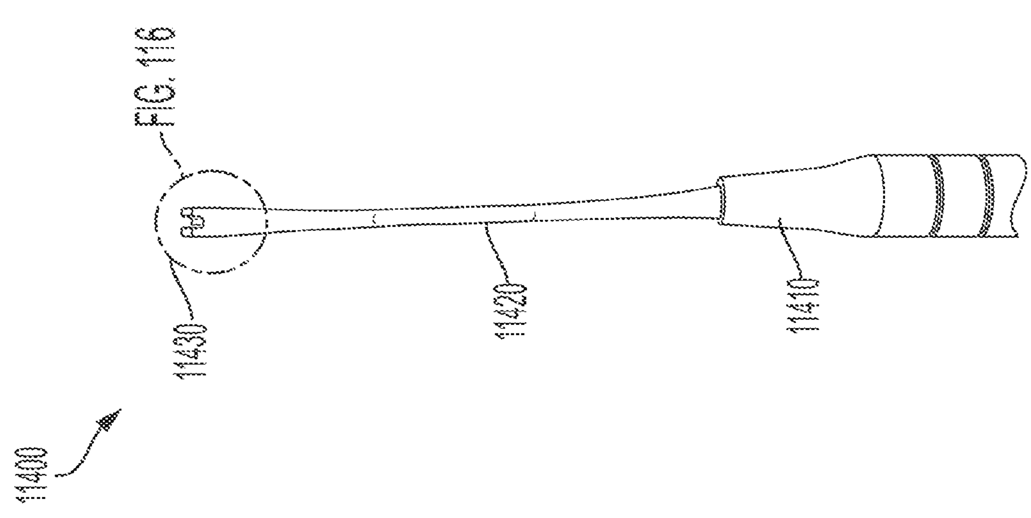
FIGS. 114 and 115 are front views of an orthodontic tool to be used with orthodontic appliances of the present technology.
Figure 115:
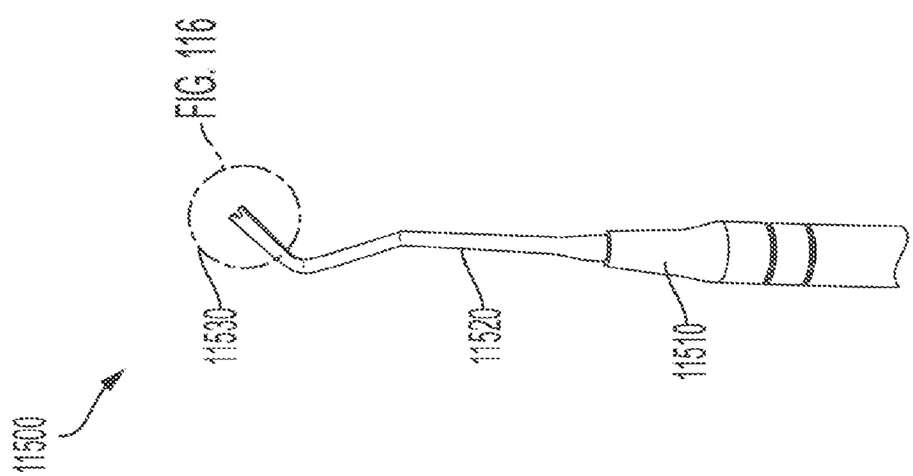

FIGS. 114 and 115 are front views of orthodontic tools 11400, 11500 to be used with orthodontic appliances of the present technology. As shown in FIG. 114, the tool 11400 includes a handle 11410 and a distal region 11420 extending from the handle 11410. The distal region 11420 can include an end portion 11430. As shown in FIG. 115, the tool 11500 includes the handle 11410 and a distal region 11520 extending from the handle 11410. The distal region 11520 can include a bend or swivel, e.g., that enables the practitioner to better manipulate, position, and/or control an orthodontic appliance. In some embodiments, the bend or swivel may be movable relative to another portion of the distal region 11520. The distal region 11520 can also include an end portion 11530.

Figure 116:
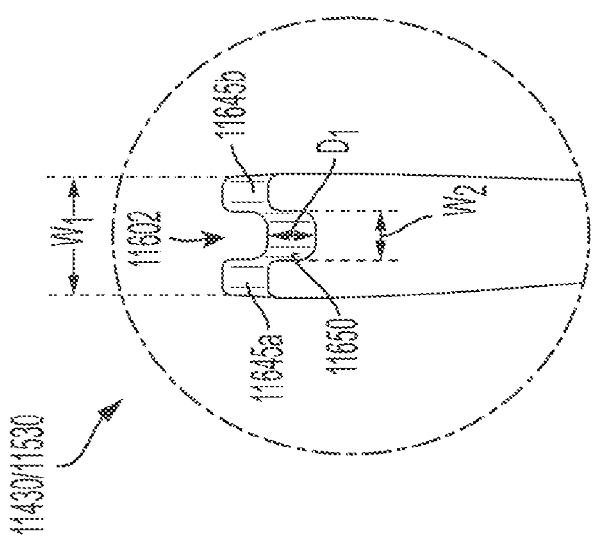
FIG. 116 is an enlarged view of the orthodontic tool shown in FIGS. 114 and 115.
Figure 117:
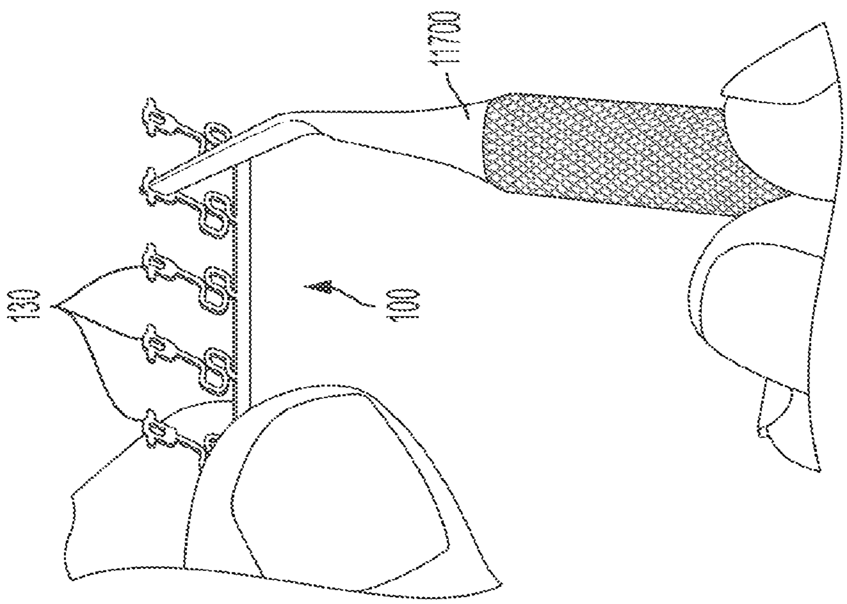

As shown in the enlarged view of the end portion 11430/11530 in FIG. 116, the end portion 11430/11530 can include a notch 11602 formed by a recessed end surface 11650 of the device. The notch 11602 can extend through all or a portion of the thickness (or depth) of the device, and have a width bound by sidewalls 11645*a*, 11645*b*. The end portion 11430/11530 can include an outermost width $W_1$ and a depth $D_1$, and the notch 11602 can include a width W2. In some embodiments, the width $W_1$ can be approximately equal to a dimension of the opening 11090 of the arm 130 (e.g., as shown in FIG. 117), thereby enabling the end portion 11430/11530 of the tool 11400 or 11500 to manipulate, position, and/or control the arm 130 of the appliance 100. Additionally or alternatively, in some embodiments, a width W2 can be approximately equal to the cross-sectional dimension of the portion of the arm 130 (such as arms 130 shown in FIGS. 110-113) distal or proximal of where the protrusion or protrusions are positioned. Such a configuration enables the end portion 11430/11530 of the corresponding device to manipulate, position, and/or control the arm 130 of the appliance 100.

Figure 118:
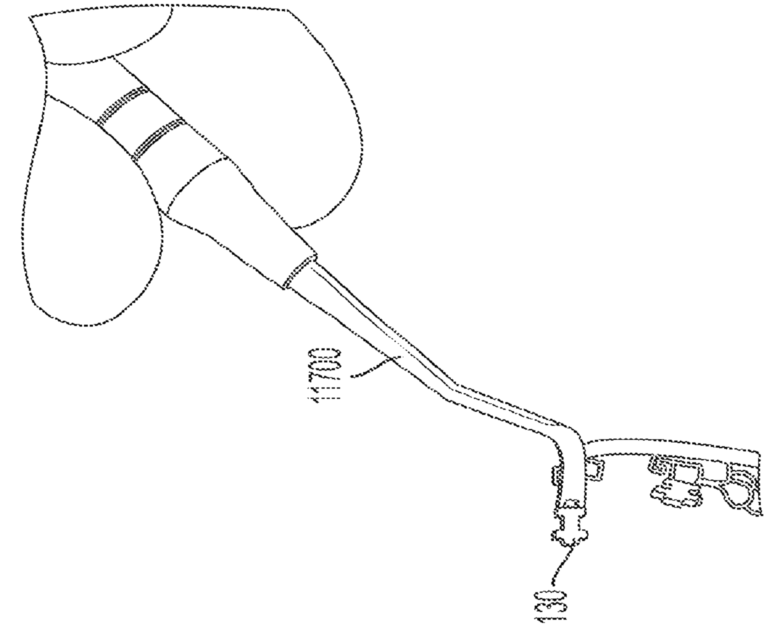
FIGS. 117 and 118 are views of an orthodontic tool in use with orthodontic appliances of the present technology.

FIGS. 117 and 118 are views of an orthodontic tool 11700 (e.g., the orthodontic tool 11400 or 11500) in use with orthodontic appliances of the present technology. As shown in FIG. 117, the end portion of the tool 11700 may be positioned at least partially within the opening of an arm 130 of an appliance 100. As shown in FIG. 118, the end portion of the tool 11700 may be positioned against the protrusions of the corresponding attachment portion and/or arm, thereby enabling the practitioner to urge the arm 130 in a desired direction via the tool 11700.

Figure 119C:
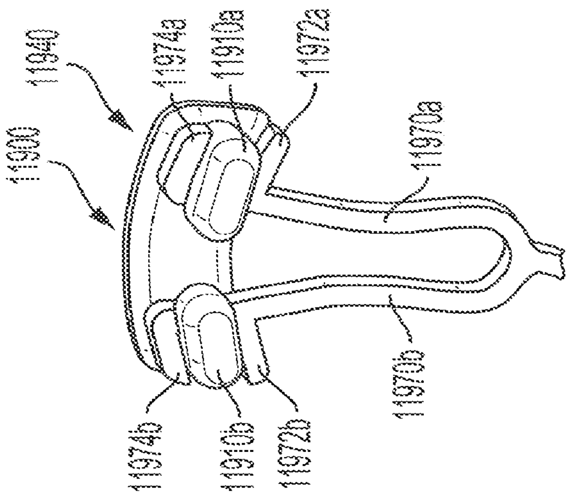
FIG. 119C is an isometric view of the securing member shown in FIG. 119A and the attachment portion shown in FIG. 119B.

According to some embodiments, an attachment portion of the present technology can be configured for use with a securing member particularly suited for moving a patient's tooth in a preferred direction. For example, FIG. 119A depicts a securing member 11900 intended to move a patient's tooth in a mesial-distal direction to a greater extent an occlusal-gingival direction and/or buccal-lingual direction. In some embodiments, the preferred direction can be an occlusal-gingival direction, a buccal-lingual direction, and/or a direction oblique to the mesial-distal axis, the occlusal-gingival axis, and/or the buccal-lingual axis. An attachment portion of the present technology, such as attachment portion 11940 shown in FIG. 119B, can be configured for use with securing member 11900, as depicted in FIG. 119C. Portions of the securing member 11900 and/or attachment portion 11940 may have a first stiffness that permits movement of the tooth in the mesial-distal direction, while other portions of the securing member 11900 and/or attachment portion 11940 have a second, greater stiffness that inhibits movement in the occlusal-gingival direction and/or buccal-lingual direction.

FIG. 119A is an isometric view of a securing member 11900, configured to move a tooth in a mesial-distal direction, as previously described. The securing member 11900 includes a base region 11905 having a first side 11907 and a second side 11909, and first and second protrusions 11910*a*, 11910*a* (collectively "protrusions 11910") disposed over and coupled to the first side 11907 of the base region 11905. In some embodiments, the base region 11905 and the protrusions 11910 can comprise a unitary structure (e.g., a single component) that has a continuous surface. The second side 11909 can be configured to be bonded to a patient's tooth, e.g., via an adhesive, as described herein. The first protrusion 11910*a* may a first portion 11912*a* extending away from the first side 11907 of the base region 11905 (e.g., in a labial-facial direction), and a second portion 11914*a* extending laterally from the first portion 11912*a* toward a central area of the base region 11905 (e.g., in a mesial-distal direction) and/or toward the second protrusion 11910*b*. The second protrusion 11910*b* includes a first portion 11912*b* extending away from the base region 11905 (e.g., in a labial-facial direction), and a second portion 11914*b* extending laterally from the first portion 11912*b* toward a central area of the base region 11905 (e.g., in a mesial-distal direction) and/or toward the first protrusion 11910*a*. The first portion 11912*a*, second portion 11914*a*, and first side 11907*a* define a first opening or void 11916*a*, and the first portion 11912*b*, second portion 11914*b*, and first side 11907 define a second opening or void 11916*b*. The first and second openings 11916*a*, 11916*b* (collectively "openings 11916"), are configured to receive and secure portions of an attachment portion of an orthodontic appliance, as explained herein.

Figure 119B:
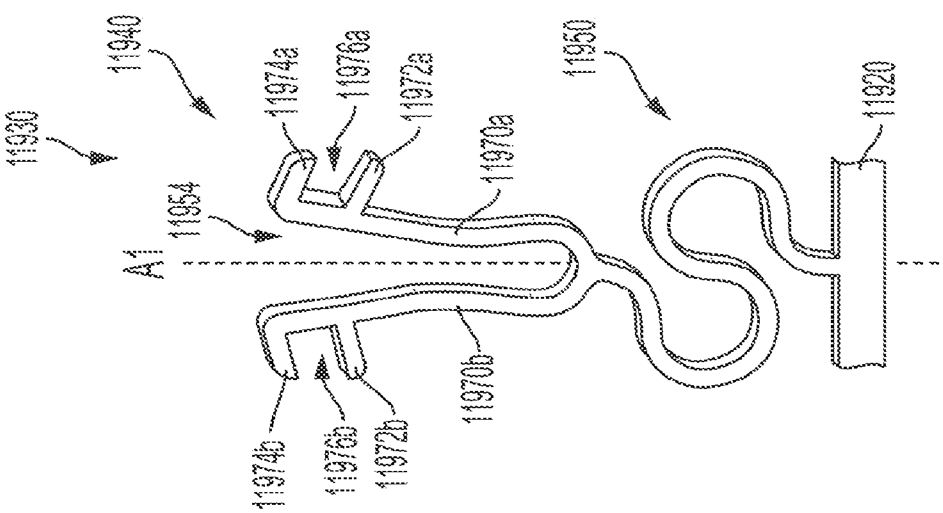
FIG. 119B is an isometric view of an orthodontic appliance, configured in accordance with embodiments of the present technology.
Figure 119A:
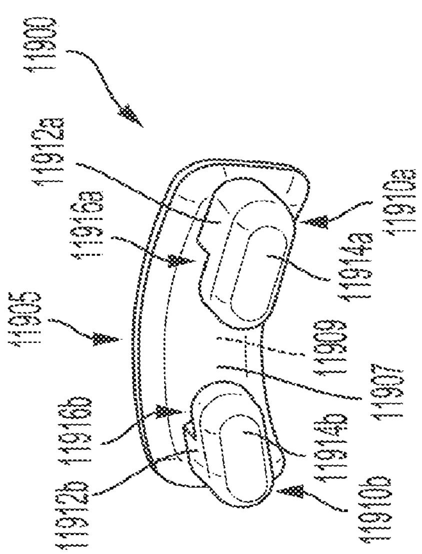
FIG. 119A is an isometric view of a securing member, configured in accordance with embodiments of the present technology.

FIG. 119B is an isometric view of an attachment portion 11940 configured to be coupled to a securing member such as securing member 11900 shown in FIG. 119A. In FIG. 119B, the attachment portion 11940 is depicted coupled to a serpentine biasing portion 11950 that, together with the attachment portion 11940, comprises an arm 11930 that extends from anchor 11920. It will be appreciated that the attachment portion 11940 may be used with any of the arm configurations described herein, and/or can be coupled to any of the biasing portions and/or connectors described herein.

As shown in FIG. 119B, the attachment portion 11940 can comprise first and second extensions 11970*a*, 11970*b* extending distally from a common point and generally away from the biasing portion 11950 and/or anchor 11920. In some embodiments, the anchor 11920, the biasing portion 11950, and the attachment portion 11940 can comprise a unitary structure that has a continuous surface. As shown in FIG. 119B, the first extension 11970*a* may comprise an elongate member extending along a first direction, a proximal arm 11972*a*, a distal arm 11974*a* spaced apart from the proximal arm 11972*a*, and an opening 11976*a* between the proximal and distal arms 11972*a*, 1974*a*. The proximal and distal arms 11972*a*, 11974*a* can extend along a second direction that is angled and/or orthogonal to the first direction. The second extension 11970*b* can comprise an elongate member extending in a third direction, as well as a proximal arm 11972*b*, a distal arm 11974*b* spaced apart from the proximal arm 11972*b*, and an opening 11976*b* between the proximal and distal arms 11972*b*, 11974*b*. The proximal and distal arms 11972*b*, 11974*b* can extend along a fourth direction that is angled and/or orthogonal to the third direction. In some embodiments, the second and fourth directions are generally mesial-distal directions. In some embodiments, the first extension 11970*a* may generally be a mirrored reflection of the second extension 11970*b* about an axis A1. In some embodiments, at least a portion of the first and third directions can be generally parallel to axis A1. As shown in FIG. 119B, a portion of the first and third direction that the first and second extensions 11970*a*, 11970*b* extend along can be disposed at an angle to axis A1 such that the first and second extensions 11970*a*, 11970*b* are biased in generally opposing directions from one another. For example, the first extension 11970*a* may be biased in the mesial direction and the second extension 11970*b* may be biased in the distal direction. Biasing of the first and/or second extensions 11970*a*, 11970*b* can facilitate coupling of the attachment portion 11940 to the securing member 11900, as described below.

FIG. 119C is an isometric view of the securing member 11900 and the attachment portion 11940 configured to move a tooth in a preferred mesial-distal direction. As shown in FIG. 119C, the attachment portion 11940 can be configured to be coupled to the securing member 11900. The opening 11976*a* (FIG. 119B) of the first extension 11970*a* of the attachment portion 11940 can be configured to be received by the opening 11916*a* (FIG. 119A) of the first protrusion 11910*a* of the securing member 11900, such that the proximal and distal arms 11972*a*, 11974*a* are configured to be positioned in apposition with and on opposing sides of the first protrusion 11910*a*. The opening 11976*b* (FIG. 10B) of the second extension 11970*b* of the attachment portion 11940 may be configured to be received by the opening 11916*b* (FIG. 119A) of the second protrusion 11910*b* of the securing member 11900, such that the proximal and distal arms 11972*b*, 11974*b* are configured to be positioned in apposition with and on opposing sides of the second protrusion 11910*b*.

In some embodiments, a lateral distance between first and second protrusions 11910*a*, 11910*b* of the securing member 11900 can be less than a lateral distance between openings 11976*a*, 11976*b* of the attachment portion 11940 such that first and second extensions 11970*a*, 11970*b* of the attachment portion 11940 are configured to be compressed when the attachment portion 11940 is coupled to the securing member 11900. First and second extensions 11970*a*, 11970*b* can thus apply mesial-distal directed forces to the first and second protrusions 11910*a*, 11910*b* for secure coupling of the attachment portion 11940 to the securing member 11900 and to prevent translation of the attachment portion 11940 relative to the securing member 11900 along or about the mesial distal, occlusal-gingival, and/or lingual-facial axes. Engagement of the first and second extensions 11970*a*, 11970*b* with the first and second protrusions 11910*a*, 11910*b* may also serve to transfer force from an appliance to a patient's tooth.

Figure 120B:
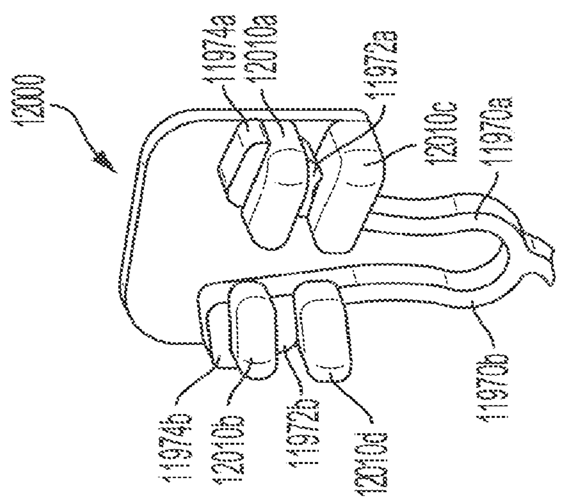
FIG. 120B is an isometric view of the securing member shown in FIG. 120A and the orthodontic appliance shown in FIG. 119B.
Figure 120A:
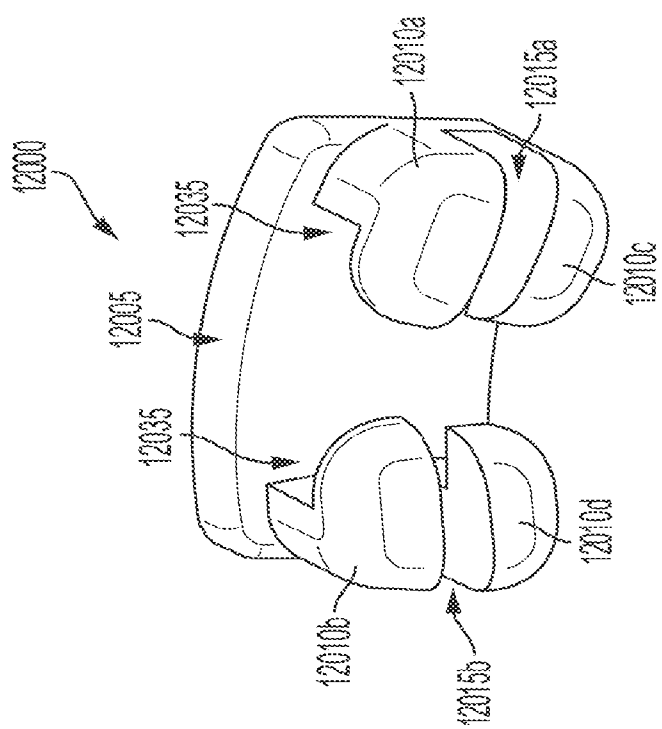
FIG. 120A is an isometric view of a securing member, configured in accordance with embodiments of the present technology.

FIG. 120A depicts another embodiment of a securing member 12000 configured to move a tooth in a preferred mesial-distal direction. The securing member 12000 can include features generally similar to those of the securing member 11900 previously described. For example, the securing member 12000 may include a base region 12005, a first protrusion 12010*a*, a second protrusion 12010*b*, a third protrusion 12010*c*, and/or a fourth protrusion 12010*d*

(collectively "protrusions 12010"). As shown in FIG. 120A, the third protrusion 12010*c* may be spaced apart from the first protrusion 12010*a* to define an opening 12015*a* and/or the fourth protrusion 12010*d* may be spaced apart from the second protrusion 12010*b* to define an opening 12015*b* (collectively "openings 12015"). In some embodiments, the openings 12015 can be configured to receive a portion of an attachment region. For example, the opening 12015*a* may be configured to receive the distal arm 11974*a* of attachment portion 11940. The protrusions 12010 may be generally similar to the first and second protrusions 11910*a*, 11910*b* previously described in reference to FIG. 119A.

In some embodiments, at least one of the protrusions 12010 can include a first portion extending away from the base region 12005 (e.g., in a labial-facial direction) and a second portion extending laterally from the first portion toward a central area of the base region 12005 (e.g., in a mesial-distal direction) to define an opening 12035 between the second portion and the base region 12005. The opening 12035 may be configured to receive a portion of an of attachment portion such as attachment region 11940.

According to some embodiments, for example as depicted in FIG. 120B, the attachment portion 11940 shown in FIG. 119B may be configured to be coupled to the securing member 12000. In some cases, securing member 12000 can be configured to inhibit translation of the attachment portion as compared to securing member 11900 to a greater extent than other securing members (e.g., securing member 11900). The proximal arm 11972*a* of the first extension 11970*a* of the attachment portion 11940 may be configured to be positioned within the opening 12035 (FIG. 120A) of the securing member 12000. The distal region 11974*a* of the first extension 11970*a* may be configured to be positioned distally to the first protrusion 12010*a* of the securing member 12000. Similarly, the proximal region 11972*b* of the second extension 11970*b* of the attachment portion 11940 may be configured to be disposed within the opening 12025 (FIG. 120A) securing member 12000 and/or the distal region 11974*b* of the second extension 11970*b* may be configured to be positioned distal to the second protrusion 12010*b*.

In some embodiments, the proximal regions 11972*a*, 11972*b* and/or the distal regions 11974*a*, 11974*b* may be configured to contact adjacent protrusions 12010 of the securing member 12000 when the attachment portion 11940 is coupled to the securing member 12000. According to some embodiments, a degree of coupling between the attachment portion 11940 and the securing member 12000 can be based, at least in part, on biasing of the first and second extensions 11970*a*, 11970*b* and/or forces imparted on the proximal regions 11972*a*, 11972*b* and/or distal regions 11974*a*, 11974*b* by the protrusions 12010. The attachment portion 11940 may be configured to be secured to the corresponding securing member 12000 by compressing the first and second extensions 11970*a*, 11970*b*, positioning the proximal regions 11972*a*, 11972*b* and/or distal regions 11974*a*, 11974*b* adjacent the protrusions 12010 as previously described, and removing the compressive force from the first and second extensions 11970*a*, 11970*b*. According to some embodiments, the third and fourth protrusions 12010*c*, 12010*d* of the securing member 12000 may limit translation of the attachment portion 11940 relative to the securing member 12000 along or about the mesial-distal, occlusal-gingival, and/or lingual-facial axes.

Figure 121A:
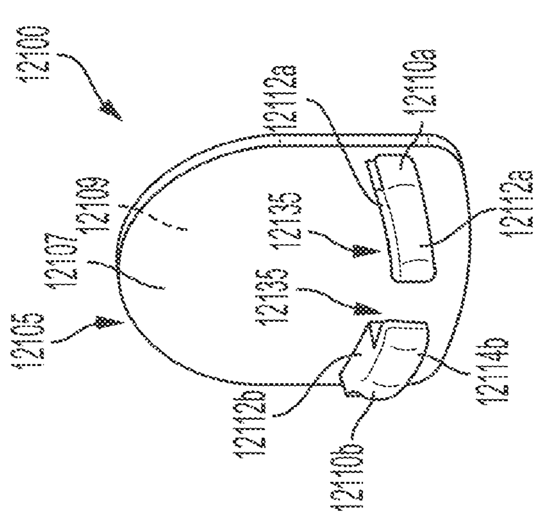
FIG. 121A is an isometric view of a securing member, configured in accordance with embodiments of the present technology.
Figure 121B:
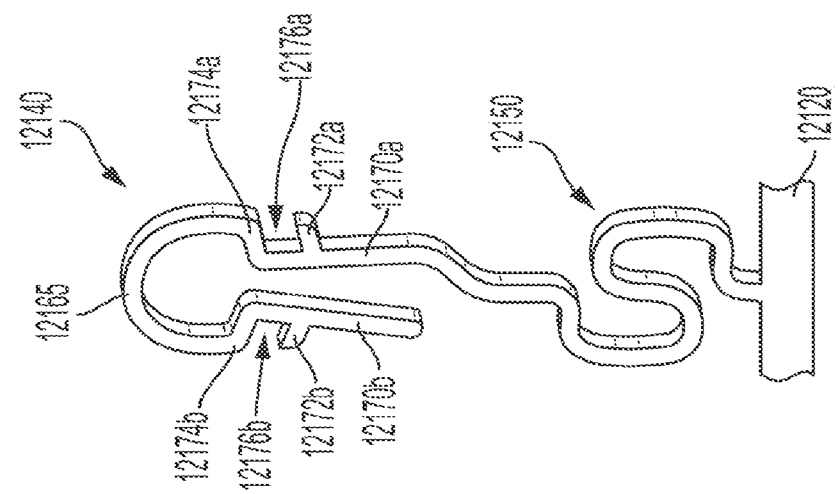
FIG. 121B is an isometric view of an orthodontic appliance, configured in accordance with embodiments of the present technology.
Figure 121C:
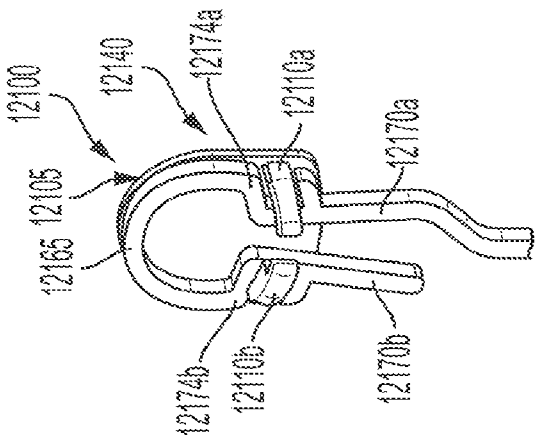
FIG. 121C is an isometric view of the securing member shown in FIG. 121A and the orthodontic appliance shown in FIG. 121B.

FIGS. 121A-C depict a securing member and an attachment portion in accordance with the present technology. As shown in FIG. 121A, a securing member 12100 can have a base region 12105 having a generally ovular shape, a first side 12107, and a second side 12109. Compared to the securing member 11900 described with reference to FIG. 119A, the ovular base region 12105 of the securing member 12100 can contact a greater area of the patient's tooth to facilitate force transfer from an appliance to the tooth. The securing member 12100 can include first and second protrusions 12110*a*, 12110*b* (collectively "protrusions 12110") extending from base region 12105. In some embodiments, the base region 12105, first protrusion 12110, and second protrusion 12120 can comprise a monolithic structure and/or separate components joined by adhesive, bonding, welding, or another suitable joining method. The second side 12109 of the base region 12105 may be configured to be bonded to a patient's tooth, as explained herein.

In some embodiments, the first protrusion 12110*a* can include a first portion 12112*a* extending away from the base region 12105 (e.g., in a labial-facial direction) and a second portion 12114*a* extending laterally from the first portion 12112*a* toward a central area of the base region 12105 (e.g., in a mesial-distal direction) to define an opening 12035 between the second portion 12114*a* and the base region 12005. Similarly, the second protrusion 12110*b* can include a first portion 12112*b* extending away from the base region 12105 (e.g., in a labial-facial direction) and a second portion 12114*b* extending laterally from the first portion 12112*b* toward a central area of the base region 12105 (e.g., in a mesial-distal direction) to define an opening 12035 between the second portion 12114*b* and the base region 12005. The openings 12035 may be configured to receive a portion of an attachment region (e.g., first extension 11970*a*, second extension 11970*b*).

FIG. 121B is an isometric view of an attachment portion 12140, configured in accordance with embodiments of the present technology. In FIG. 121B, the attachment portion 12140 is depicted coupled to a serpentine biasing portion 12150 that, together with the attachment portion 12140, comprises an arm 12130 that extends from an anchor 12120. It will be appreciated that the attachment portion 12140 may be used with any of the arm configurations described herein, and/or can be coupled to any of the biasing portions and/or connectors described herein.

In some embodiments, the attachment portion can be configured for increased coupling security and/or efficient force transfer to a tooth. As shown in FIG. 121B, the attachment portion 12140 can comprise a distal region 12165 connected to first and second proximal regions 12170*a*, 12170*b* by intermediate portions 12174*a*, 12174*b*. In some embodiments, for example as shown in FIG. 121B, a proximal end of the first proximal region 12170*a* can be attached to the biasing portion 12150. First and second arms 12172*a*, 12172*b* can extend laterally from corresponding first and second proximal regions 12170*a*, 12170*b*. In some embodiments, first and second arms 12172*a*, 12172*b* extend away from a midline of the attachment portion 12140. An opening (e.g., first opening 12176*a*, second opening 12176*b*) can be defined by a distance separating an arm and a corresponding intermediate portion. According to some embodiments, openings 12176*a*, 12176*b* can be configured to receive a protrusion of a securing member. As shown in FIG. 121B, the distal region 12165 may comprise a semi-circular shape that can generally correspond to a shape of a base region of a securing member (e.g., base region 12107 of securing member 12100). Based on this geometric relationship, the attachment portion 12140 can contact a greater area of securing member 12100 for enhanced coupling and to limit translation of the attachment portion 12140 relative to the securing member 12100. According to some embodiments, first and second proximal regions 12170*a*, 12170*b* of the attachment portion 12140 can be biased such that a distance between distal ends of the proximal regions 12170*a*, 12170*b* is less than a distance between proximal ends of the proximal regions 12170*a*, 12170*b*. Biasing of the first and second proximal regions 12170*a*, 12170*b* can facilitate coupling of the attachment portion 12140 to the securing member 12100, as described below.

As shown in FIG. 121C, the attachment portion 12140 can be configured to be coupled to the securing member 12100. Each opening 12176*a*, 12176*b* of the attachment portion 12140 can be configured to receive a corresponding protrusion 12110 of the securing member 12100. Biasing of the first and second proximal regions 12170*a*, 12170*b* can result the first and second proximal regions 12170*a*, 12170*b* being configured to apply a laterally-outward force to the protrusions 12110 to facilitate coupling of the attachment portion 12140 to the securing member 12100.

Figure 122:
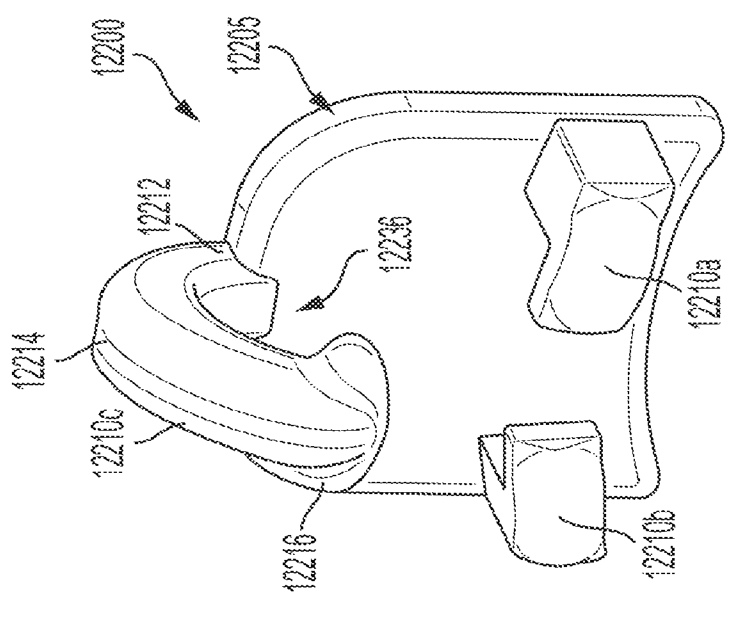

According to some aspects of the present technology, protrusions of a securing member can be configured to limit a specific directional translation and/or rotation of an attachment portion relative to the securing member. For example, FIG. 122 depicts a securing member 12200 comprising first and second protrusions 12210*a*, 12210*b*, as previously described. The securing member 12200 can further comprise a third protrusion 12210*c* positioned at a distal end of a base region 12205 of the securing member 12200. The third protrusion 12210*c* can extend from a first end 12212 in a direction generally distal and away from the base region 12205 (e.g., in a labial-facial direction) toward an apex region 12214. The third protrusion 12210*c* can extend from the apex region 12214 proximally and away from the base region toward a second end 12216. An opening 12236 can be defined between the second end 12216 of the third protrusion 12210*c* and the base region 12205 of the securing member. The opening 12236 can be configured to receive a region of an attachment portion, for example, the distal region 12165 of the attachment portion 12140 (see FIG. 121B), and thereby secure the attachment portion 12140 to the securing member 12200. Consequently, the third protrusion 12230, or more generally the securing member 12200, can be configured to prevent translation and/or rotation of the attachment portion relative to the securing member 12200. In particular, the third protrusion 12230 can be configured to limit translation of the attachment portion 12140 along the occlusal-gingival and/or lingual-facial axes and/or to limit rotation of the attachment portion about the mesial-distal and/or lingual-facial axes.

Figure 123:
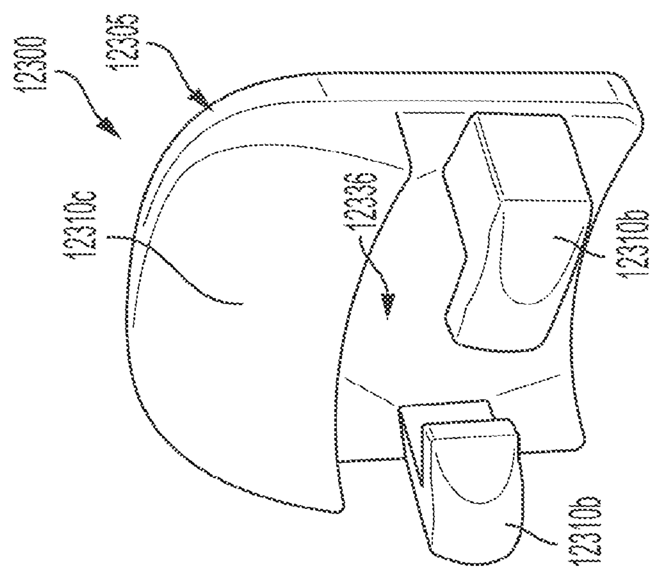
FIGS. 122 and 123 are isometric views of various embodiments of securing members, configured in accordance with embodiments of the present technology.

In some embodiments, for example as shown in FIG. 123, a securing member 12300 can comprise a protrusion with a larger area to enhance coupling of an attachment portion to the securing member 12300. The securing member 12300 can include features generally similar to those of the securing member 12100 previously described. As shown in FIG. 123, in addition to the first and second protrusions 12310*a*, 12310*b*, the securing member 12300 may include a third protrusion 12310*c* (e.g., a plate) disposed at an upper portion of the base region 12305. The third protrusion 12310*c* can generally extend away from the base region 12305 in a direction similar to the first and second protrusions 12310*a*, 12310*b*, such that the third protrusion 12310*c* extends in a lateral direction across all or a portion of the base region 12305. The third protrusion 12310*c* can define a surface facing toward the first and second protrusions 12310*a*, 12310*b*, with the first, second, and third projections 12310*a*, 12310*b*, 12310*c* defining an opening 12336 therebetween. The opening 12336 can be configured to receive a region (e.g., the distal regions 11974*a*, 11974*b* (FIG. 119B)) of an attachment portion (e.g., the attachment portion 11940), and thereby better secure that region to the securing member 12300. In doing so, the third protrusion 12310*c*, or more generally the securing member 12300, can further inhibit movement and/or rotation of an attachment portion relative to the securing member 12300.

Figure 124C:
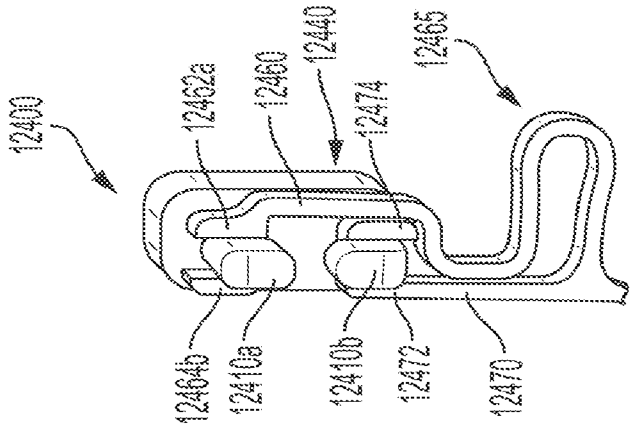
FIG. 124C is an isometric view of the securing member shown in FIG. 124A and the orthodontic appliance shown in FIG. 124B.

According to some embodiments, a securing member and/or an attachment portion can be configured to urge a patient's tooth in at least an occlusal-gingival direction. For example, the securing member 12400 depicted in FIG. 124A can have a length L to width W ratio greater than that of securing members of previously described embodiments. The securing member 12400 may comprise a base region 12405 and first and second protrusions 12410*a*, 12410*b* (collectively "protrusions 12410") attached to and extending along a lingual-facial axis away from the base region 12405. Each protrusion can define an opening 12435 configured to receive a region of an attachment portion as described herein. As shown in FIG. 124A, openings 12435 can extend along a mesial-distal axis through the protrusions 12410, in contrast to the openings that extend along an occlusal-gingival axis in FIGS. 119A, 120A, 121A, 122 and 123.

Figure 124B:
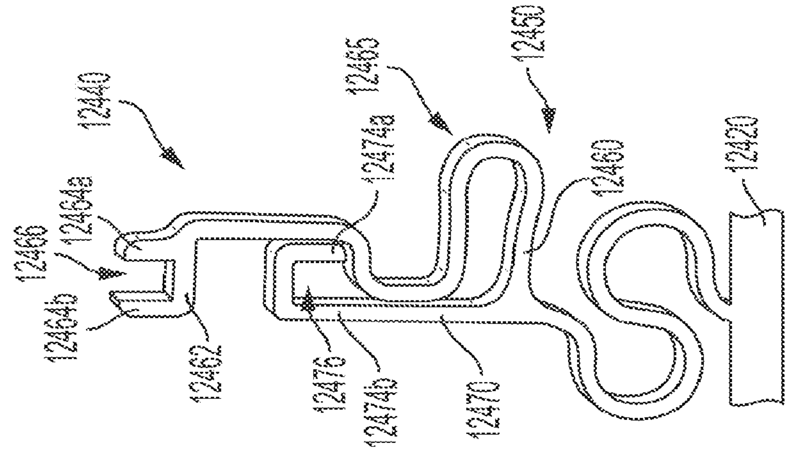
FIG. 124B is an isometric view of an orthodontic appliance, configured in accordance with embodiments of the present technology.
Figure 124A:
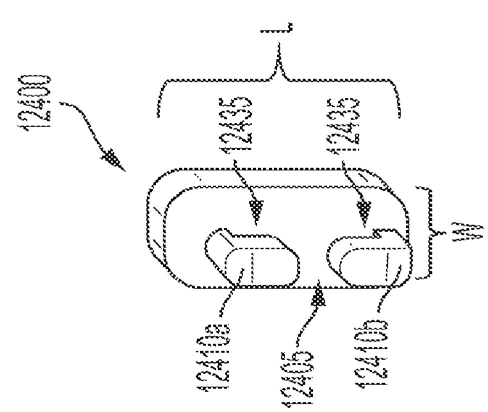
FIG. 124A is an isometric view of a securing member, configured in accordance with embodiments of the present technology.

FIG. 124B shows an example of an attachment portion 12440 configured for use with a securing member, such as the securing member 12400 shown in FIG. 124A. In FIG. 124B, the attachment portion 12440 is depicted coupled to a serpentine biasing portion 12450 that, together with the attachment portion 12440, comprises an arm 12430 that extends from anchor 12420. It will be appreciated that the attachment portion 12440 may be used with any of the arm configurations described herein, and/or can be coupled to or include any of the biasing portions and/or connectors described herein.

The attachment portion 12440 may comprise first and/or second extensions 12460, 12470 extending from a common proximal point along directions generally away from the biasing portion 12450 and/or anchor 12420. The first extension 12460 may be an elongate member comprising a distal region 12462, a first distal arm 12464*a* and a second distal arm 12464*b* (collectively "distal arms 12464"). The first and second distal arms 12464*a*, 12464*b* can extend distally from the distal region 12462 and/or can be spaced apart to define an opening 12466. The first extension 12460 can also include a distal biasing region 12465 configured to bias the distal arms 12464 in an occlusal and/or gingival direction and/or to urge the distal arms 12464 in the occlusal-gingival direction. The second extension can include a lateral regions 12474*a*, 12474*b*. In some embodiments the first and second extensions 12460, 12470 are moveable toward and/or away from one another, e.g., in the occlusal-gingival direction, and may be biased in generally opposing directions from one another. For example, the first extension 12460 may be biased in the gingival direction and the second extension 12470 may be biased in the occlusal direction As shown in FIG. 124C, the attachment portion 12440 can be configured to be detachably secured to the securing member 12400. The opening 12466 (FIG. 124B) of the first extension 12460 of the attachment portion 12440 may be configured to receive the opening 12435 (FIG. 124A) of the protrusion 12410*a* of the securing member 12400, such that the distal arms 12464 are configured to be positioned in apposition to and on opposing sides of the first protrusion 12410*a*. The opening 12476 (FIG. 124B) of the second extension 12470 of the attachment portion 12440 may be configured to receive the opening 12435 (FIG. 124A) of the second protrusion 12410*b* of the securing member 12400, such that the lateral regions 12474*a*, 12474*b* are configured to be positioned in apposition to and on opposing sides of the second protrusion 12410*b*.

In operation, the attachment portion 12440 may be configured to be secured to the securing member 12400, which may be bonded to one of the patient's teeth by moving the first extension 12460 toward the second extension 12470 (or vice versa), and then releasing the first extension 12460 (or the second extension 12470) such that it is secured within the opening 12435 (FIG. 124A) of the first protrusion 12410*a* (or within the opening 12435 of the second protrusion 12410*b*). In doing so, the engagement of the first and second extensions 12460, 12470 with the respective first and second protrusions 12410*a*, 12410*b* help ensure the desired force is applied to the patient's tooth via the securing member 12400. Additionally or alternatively, the engagement of the first and second extensions 12460, 12470 with the respective first and second protrusions 12410*a*, 12410*b* can prevent translation of the attachment portion 12440 relative to the securing member 12440 along or about the mesiodistal, occlusogingival, and/or lingual-facial axes.

Additionally, some embodiments of embodiments of the securing member 12400 and/or attachment portion 12440 may be particularly suited for moving the patient's teeth in a specific direction. For example, in some embodiments the securing member 12400 and/or attachment portion 12440 may be configured to more easily move a patient's teeth in the gingival direction relative to the occlusal direction, mesial-distal direction and/or buccal-lingual direction. That is, portions of the securing member 12400 and/or attachment portion 12440 may have a first stiffness that enable teeth movement in the gingival direction, while other portions of the securing member 12400 and/or attachment portion 12440 have a second, greater stiffness that inhibit movement in other directions, such as the occlusal direction, and/or buccal-lingual direction.

Figure 125C:
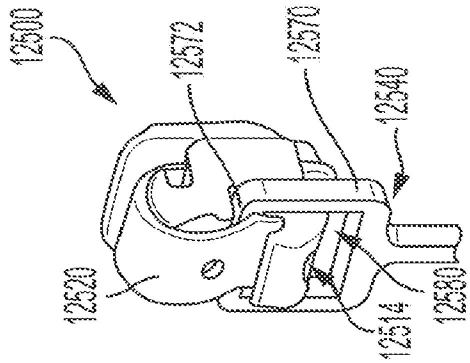
FIG. 125C is an isometric view of the securing member shown in FIG. 125A and the orthodontic appliance shown in FIG. 125B.
Figure 125B:
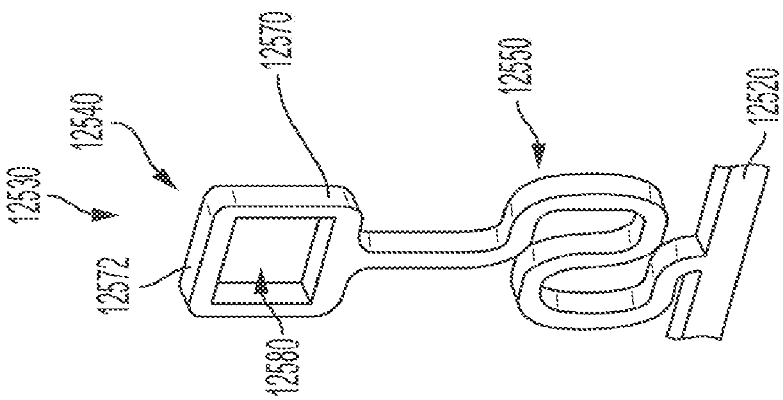
FIG. 125B is an isometric view of an orthodontic appliance, configured in accordance with embodiments of the present technology.
Figure 125A:
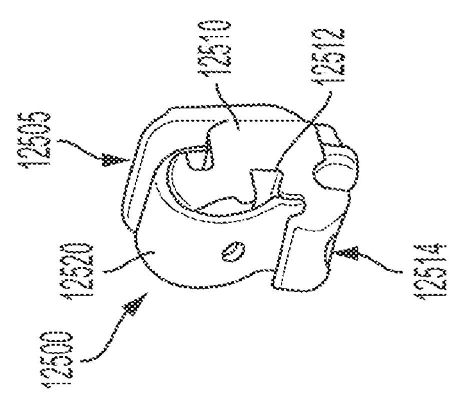
FIG. 125A is an isometric view of a securing member, configured in accordance with embodiments of the present technology.

FIG. 125A is an isometric view of a securing member 12500 configured in accordance with embodiments of the present technology. The securing member 12500, for example, may be a SPEED Appliance (SPEED System Orthodontics, Ontario, Canada). The securing member 12500 may include a body region 12505 having a back surface 12510 configured to be attached to a patient's tooth, a recess 12512 configured to receive a portion of an attachment portion, a lip portion 12514, and/or a clip portion 12520 movable relative to and extending outwardly from the body region 12505. The clip portion 12520 can include a clip and a biasing element (e.g., a spring). The biasing element can be configured to bias the clip to remain in the closed position (as shown in FIG. 125A). When force is applied (e.g., by an operator) the biasing element can be configured to enable the clip to move from the closed position away from the body region 12505, slot 12512, and/or lip portion 12514 toward an open position (e.g., in an occlusal-gingival direction). The clip portion 12520 in the open position can be configured to enable a portion of an attachment portion to be inserted into the slot 12512. That is, the slot 12512 becomes exposed when the clip portion 12520 is in the open position, thereby allowing a portion of the attachment portion to be inserted thereto. In the closed position, the lip portion 12514 can help ensure the clip portion 12520 remains in the closed position and/or prevent the attachment portion from being inadvertently removed from the slot 12512.

FIG. 125B is an isometric view of an attachment portion 12540, configured in accordance with embodiments of the present technology. In FIG. 125, the attachment portion 12540 is depicted coupled to a serpentine biasing portion 12550 that, together with the attachment portion 12540, comprises an arm 12530 that extends from anchor 9520. It will be appreciated that the attachment portion 12540 may be used with any of the arm configurations described herein, and/or can be coupled to any of the biasing portions and/or connectors described herein. The attachment portion 12540 can comprise a base region 12570 configured to be received by a securing member. According to some embodiments, for example as shown in FIG. 125B, the base region 12570 can have a generally rectangular shape with an opening 12580 therethrough. A rectangular shape may facilitate prevention of rotation of the attachment portion 12540 relative to a securing member. In some embodiments, the attachment portion 12540 may have another suitable shape (e.g., circular, polygonal, triangular, etc.).

FIG. 125C is an isometric view of the securing member 12500 shown in FIG. 125A and the attachment portion 12540 shown in FIG. 125B. As shown in FIG. 125C, the attachment portion 12540 may be secured to the securing member 12500. Specifically, the lip portion 12514 of the securing member 12500 can be configured to extend through the opening 12580 of the attachment portion 12540, and a first portion 12572 of the base region 12570 can be configured to be disposed within the slot 12512 of the securing member 12500. FIG. 125C depicts the clip portion 12520 in the closed position and disposed over the first portion 12572 of the base region 12570, thereby securing the first portion 12572 within the slot 12512 and more generally the attachment portion 12540 to the securing member 12500.

Figure 126A:
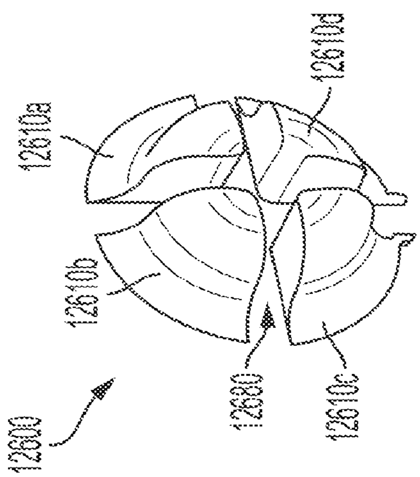
FIG. 126A is an isometric view of a securing member formed from a curable material, configured in accordance with embodiments of the present technology.

According to some embodiments, a securing member such as securing member 12600 shown in FIG. 126A may be formed from a curable material. The securing member 12600 can include one or more distinct portions 12610*a-d* that have been cured to form a cured structure. The distinct portions 12610*a-d* may be spaced apart from one another to define an indentation 12680. Although the securing member 12600 shown in FIG. 126A has four portions 12610*a-d*, in some embodiments, the securing member 12600 may have more than four portions or less than four portions. As shown in FIG. 126A, the indentation 12680 may form a generally cross or "+" shape. A shape of the indentation 12680 may be based at least in part on a shape of an attachment portion configured to be coupled to the securing member 12600. For example, the cross-shaped indentation 12680 depicted in FIG. 126A may be configured to receive a cross-shaped attachment portion.

The securing member 12600 may be formed of a curable material such that the securing member 12600 may be configured to be bonded directly to a patient's tooth, e.g., without the need for additional materials or bonding agents. The curable material can be generally moldable prior to being cured, and can include a composite resin, ceramic, and/or other synthetic material. In some embodiments, the curable material can include dimethacrylate monomers, a filler material (e.g., silica), and/or a photoinitiator that may be activated by UV light for bonding. The curable material can be bonded directly to the patient's tooth. In some embodiments, the curable material is the only component of the securing member 12600. As such, embodiments of the securing member 12600 can minimize the cost and difficulties associated with manufacturing multiple components together and/or coupling multiple components of a traditional securing member to a patient's tooth.

Figure 126B:
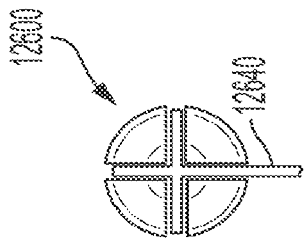
FIG. 126B is a front view of an orthodontic appliance and the securing member shown in FIG. 126A, configured in accordance with embodiments of the present technology.

FIG. 126B is a front view of an attachment portion 12640 of an orthodontic appliance and the securing member 12600, configured in accordance with embodiments of the present technology. The attachment portion 12640 can correspond to any one of the attachment portions described herein. As shown in FIG. 126B, the attachment portion 12640 may have a shape complementary to a shape of the indentation 12680 (FIG. 126A) formed by the portions 12610*a*-d. The complementary nature of the shape of the attachment portion 12640 to the indentation 12680 can help inhibit movement of the attachment portion 12640 relative to the indentation 12680 along and/or about the mesial-distal, occlusal-gingival, and/or lingual-facial axes.

According to some embodiments, the securing member 12600 may be manufactured and coupled to a patient's tooth simultaneously. In some embodiments, the securing member 12600 is manufactured and then coupled to a patient's tooth. Manufacturing the securing member 12600 can include providing a support (e.g., a tray) having indentations complementary to portions 12610*a-d* shown in FIG. 126A. The indentations of the support may be filled with the curable or moldable material, and the support may be subsequently positioned adjacent the patient's tooth. Energy (e.g., UV light) is applied to the support and curable material to form a cured structure. In some embodiments, the applied energy may also cause the curable material to bond to the patient's tooth. In some embodiments, an adhesive that does not require UV light to cure may be used. After curing, the support can be removed from the patient's mouth while the cured material (i.e., the securing member 12600) remains attached to the patient's tooth. Once the securing member 12600 is secured to the patient's tooth, an appliance or arm of an appliance can be coupled to the securing member 12600 by positioning an attachment portion of the arm within the indentation defined by the securing member. The attachment portion can be secured by disposing an adhesive, composite resin, or other synthetic material over the attachment portion within the indentation. The adhesive, composite resin, or synthetic material used to secure the attachment portion to the securing member 12600 may be cured via UV light. In some embodiments, the attachment portion is secured to the securing member 12600 without UV light.

Figure 127B:
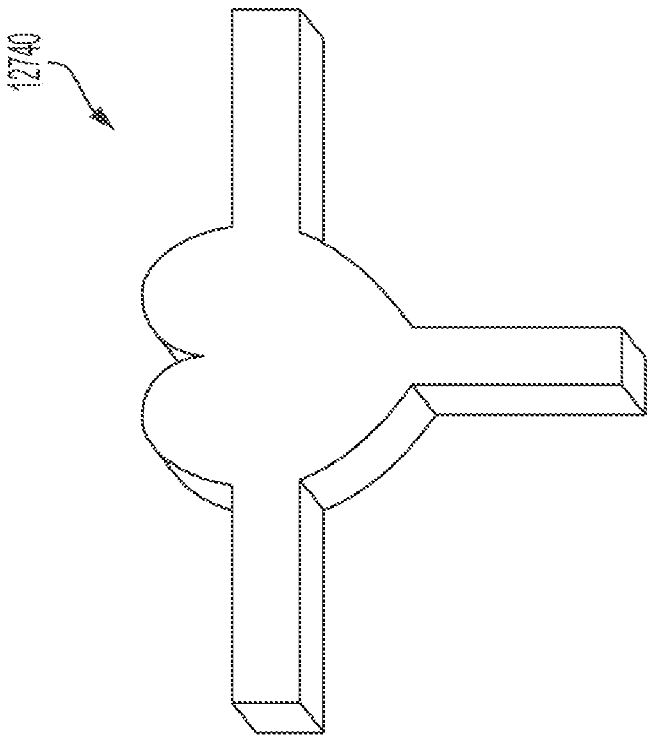
FIG. 127B is an isometric view of an orthodontic appliance, configured in accordance with embodiments of the present technology.
Figure 127A:
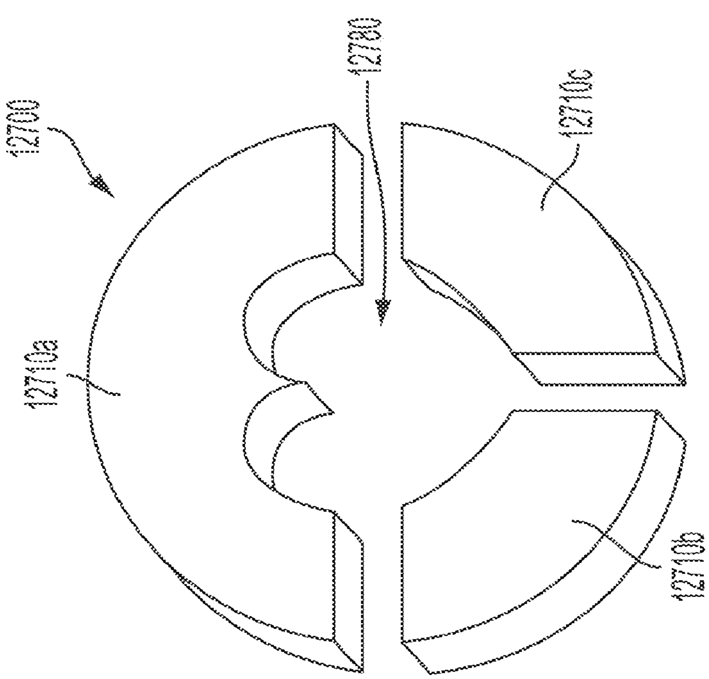
FIG. 127A is an isometric view of a securing member formed from a curable material, configured in accordance with embodiments of the present technology.

FIG. 127A is an isometric view of a securing member 12700 formed from a curable material, configured in accordance with embodiments of the present technology. The securing member 12700 and manufacturing methods thereof may be generally similar to those of the securing member 12600 previously described with reference to FIGS. 126A and 126B. As shown in FIG. 127A, the securing member 12700 may include distinct portions 12710*a-c* that have been cured to form a cured structure and are spaced apart from one another to define an indentation 12780. As shown in FIG. 127A, the indentation 12780 generally forms a heart shape with multiple extensions therefrom and is configured to receive an attachment portion of an orthodontic appliance or arm having that or a similar shape. In other embodiments, the indentation 12780 can define other shapes (e.g., a circle, triangle, polygon, cloud, apple, etc.) as needed for a particular application or desired by a patient.

Figure 128B:
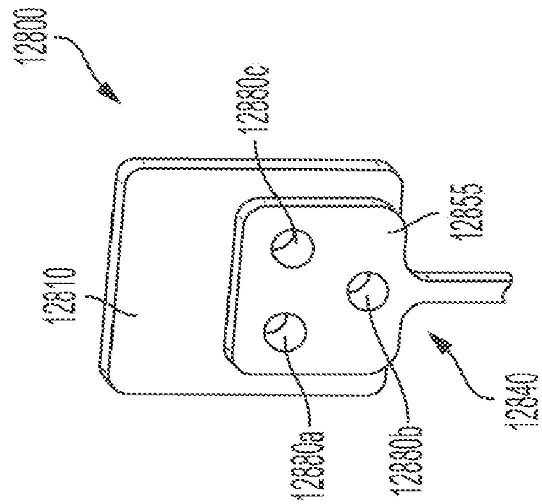
FIG. 128B is an isometric view of a pad and the appliance shown in FIG. 128A, configured in accordance with embodiments of the present technology.
Figure 128A:
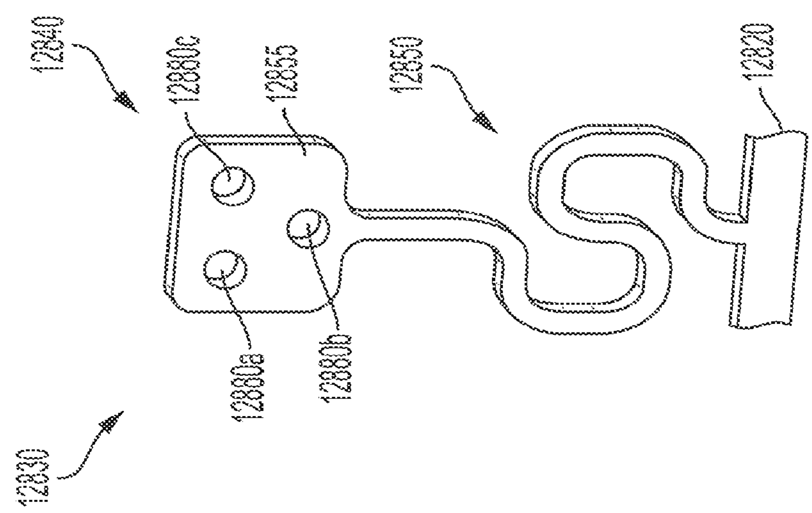
FIG. 128A is an isometric view of an orthodontic appliance, configured in accordance with embodiments of the present technology.

FIG. 127B is an isometric view of an attachment portion 12740 configured to mate with securing member 12700. The attachment portion 12740 may have a shape complementary to the shape of the indentation 12780 (FIG. 127A) formed by the portions 12710*a-c*. The complementary nature of the shape of the attachment portion 12740 to the indentation 12780 can help inhibit movement and/or rotation of the attachment portion 12740 relative to the indentation 12780 along or about the mesial-distal, occlusal-gingival, and/or lingual-facial axes In some cases, it may be beneficial to configure an attachment portion with openings configured to receive and/or retain a moldable and/or curable material to adhere the attachment portion to the patient's tooth. FIG. 128A depicts an attachment portion 12840 comprising a base region 12855 having a generally planar surface and including one or more openings 12880*a-c* (collectively "openings 12880") extending through the base region 12855. According to some embodiments, for example as shown in FIG. 128B, the attachment portion 12840 may be configured to be coupled to a pad 12180. The pad 12810 may be configured to be bonded to a patient's tooth. In some embodiments, the pad 12810 may be formed of a mesh material. The pad 12810 can be secured to the attachment portion 12840 via coupling elements (not shown) extending through the openings 12880 and at least partially through the pad 12810. As shown in FIG. 128B, the pad 12810 may have a surface area greater than a surface area of the base region 12855 of the attachment portion 12840. As such, when coupled to the attachment portion 12840, the pad 12810 can be configured to increase the bonding surface between the patient's tooth and the attachment portion 12840, thereby forming a stronger bond therebetween.

Figure 129:
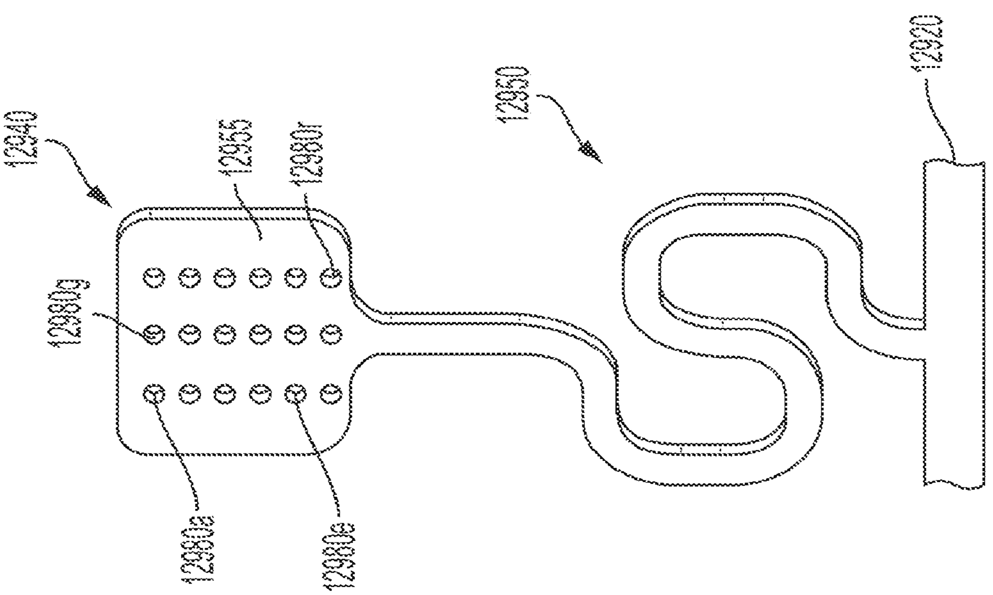
FIG. 129 is an isometric view of a securing member, configured in accordance with embodiments of the present technology.

Although FIGS. 128A and 128B depict three of the openings 12880 in the base region 12855 of the attachment portion 12840, in some embodiments, the attachment portion 12840 may include more than three or fewer than three openings 12880. For example, FIG. 129 depicts an attachment portion 12940 comprising a base region 12955 having eighteen openings 12980 extending through the base region 12955.

In some embodiments, the attachment portion 12940 can be bonded directly to a patient's tooth and, in such embodiments, the openings 12980 may be configured to receive and retain a moldable and/or curable material that adheres the attachment portion 12940 to the patient's tooth. The moldable and/or curable material may be any of the materials described herein (e.g., with reference to FIG. 126A). In some embodiments, the moldable and/or curable material may be cured (e.g., via UV light) once disposed within the openings 12980. Advantageously, embodiments of the attachment portion 12940 can be secured to a patient's tooth without the need for a separate securing member.

Figure 130B:
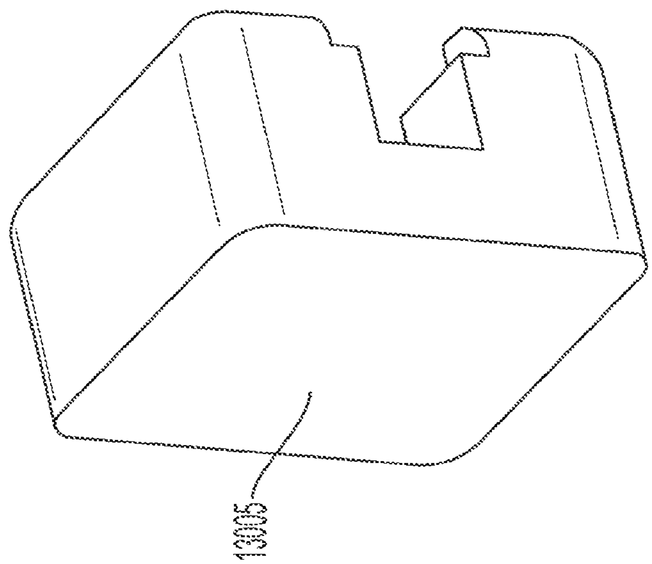
FIGS. 130A and 130B are front and back isometric views, respectively, of a securing member, configured in accordance with embodiments of the present technology.
Figure 130A:
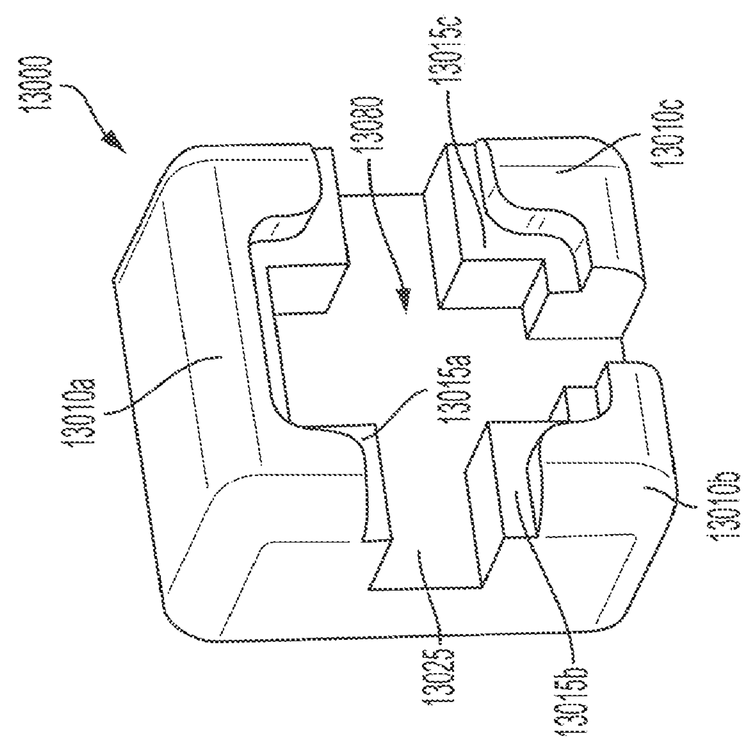

According to some aspects of the present technology, a securing member can be configured to have a recess of varying depth throughout the recess, for example as shown in FIGS. 130A and 130B. FIGS. 130A and 130B are front and back isometric views, respectively, of a securing member 13000, configured in accordance with embodiments of the present technology. Referring first to FIG. 130A, the securing member 13000 can include one or more distinct portions 13010*a-c* spaced apart from one another. The distinct portions 13010*a-c* may together define a recess 13080. The recess 13080 can have a first area including a base surface 13025 of the securing member 13000 configured to receive an attachment portion. Second distinct portions 13015*a-c* can have a second area spaced apart along a lingual-facial axis from the base surface 13025. The first area can have a shape that generally resembles or compliments that of the attachment portion to be disposed therein. The second area can include a curable material (as previously described) or be configured to receive a curable material after the attachment portion has been disposed within the first area. Such a curable material can secure, or further secure, the attachment portion to the securing member 13000. In some embodiments, the second area may be roughened to increase its surface area and therein improve the bonding strength between the second area and curable material disposed thereon.

Referring to FIG. 130B, the securing member 13000 can have a back side 13005 configured to be bonded to a patient's tooth. The back side 13005 can include a curable material or be configured to receive a curable material, as previously described, for coupling the securing member 13000 to a patient's tooth. In some embodiments, the back side 13005 may be roughened to increase its surface area and therein improve the bonding strength between the back side 13005 and curable material disposed thereon.

Figure 130C:
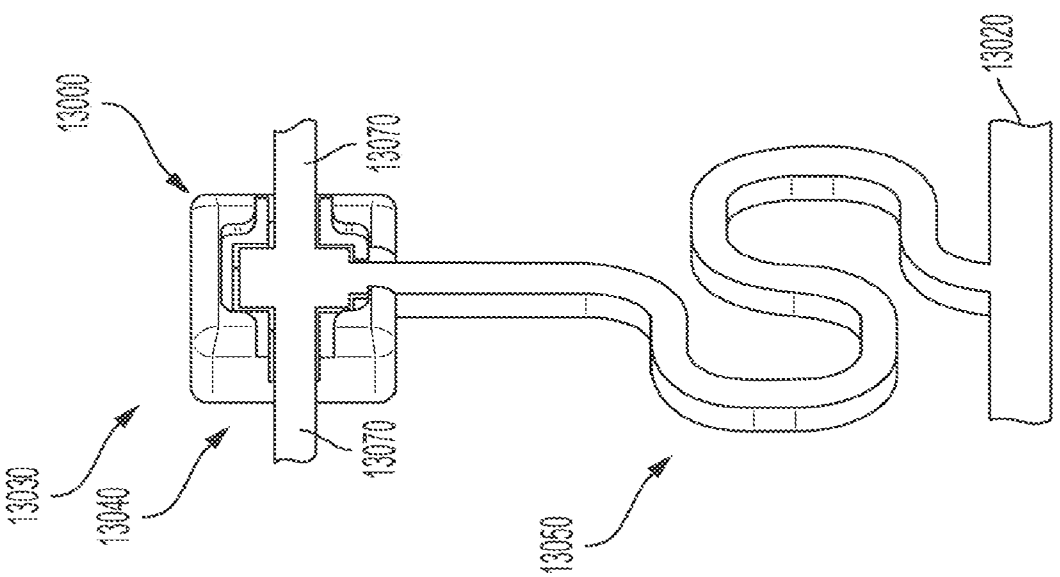
FIG. 130C is an isometric view of an orthodontic appliance and the securing member shown in FIGS. 130A and 130B, configured in accordance with embodiments of the present technology.

FIG. 130C is an isometric view of an attachment portion 13040 and the securing member 13000 shown in FIGS. 130A and 130B, configured in accordance with embodiments of the present technology. In FIG. 130C, the attachment portion 13040 is depicted coupled to a serpentine biasing portion 13050 that, together with the attachment portion 13040, comprises an arm 13030 that extends from anchor 13020. It will be appreciated that the attachment portion 13040 may be used with any of the arm configurations described herein, and/or can be coupled to any of the biasing portions and/or connectors described herein.

As shown in FIG. 130C, the attachment portion 13040 may have a shape generally similar to the shape of the first area of the recess 13080 (FIG. 130A). As shown in FIG. 130C, the attachment portion 13040 may include portions 13070 extending laterally away from the securing member 13000. When the appliance 100 is disposed or installed within a patient's mouth and the secured to the securing member 13000, the portions 13070 can extend generally in a mesial-distal direction. In some embodiments, the portion 13070 may be configured to be coupled to adjacent ones of the patient's teeth and/or to adjacent arms 13030 of the appliance. The complementary nature of the attachment portion 13040 and the securing member 13000 can help further inhibit movement and/or rotation of the attachment portion 13040 relative to the securing member 13000.

Figure 131:
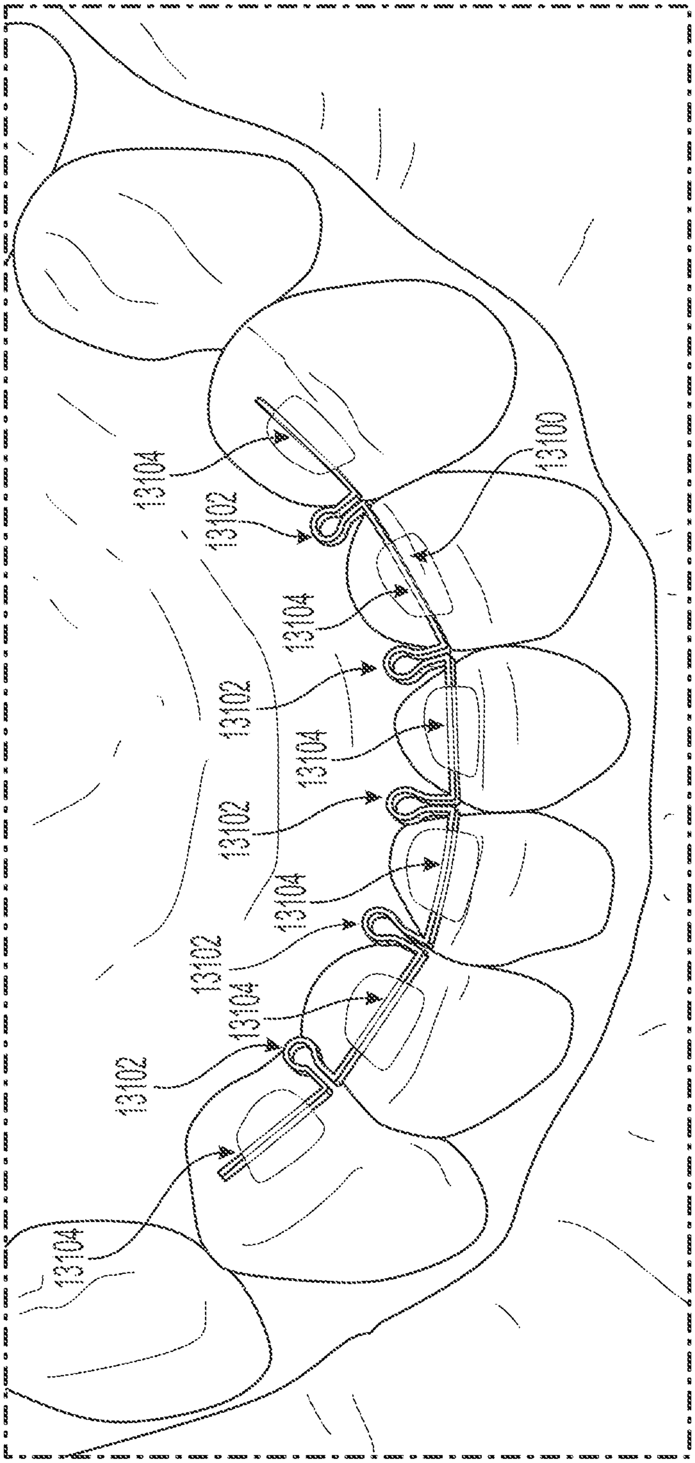
FIG. 131 shows an orthodontic appliance of the present technology positioned in a patient's mouth.

FIG. 131 shows a retainer 13100 configured in accordance with embodiments of the present technology. In some embodiments, for example as shown in FIG. 131, the retainer 13100 may comprise an elongated member having a series of alternating curved segments 13102 and straight (or mesiodistal) segments 13104. The retainer 13100 may be configured to be bonded directly to the patient's teeth (i.e., without the use of a bracket) in such a way that the patient cannot remove the retainer. The retainer may be configured to be positioned such that the curved, U-shaped portions are aligned with the mesial and distal surfaces of adjacent teeth, and the more linear segments extend in a generally mesiodistal direction along the surface of the tooth between curved segments 1302. Positioning the curved segments between the teeth provides the advantage of allowing the patients to floss. In some embodiments, the curved segments are flexible while the more linear segments are rigid. Other configurations are possible.

Figure 132:
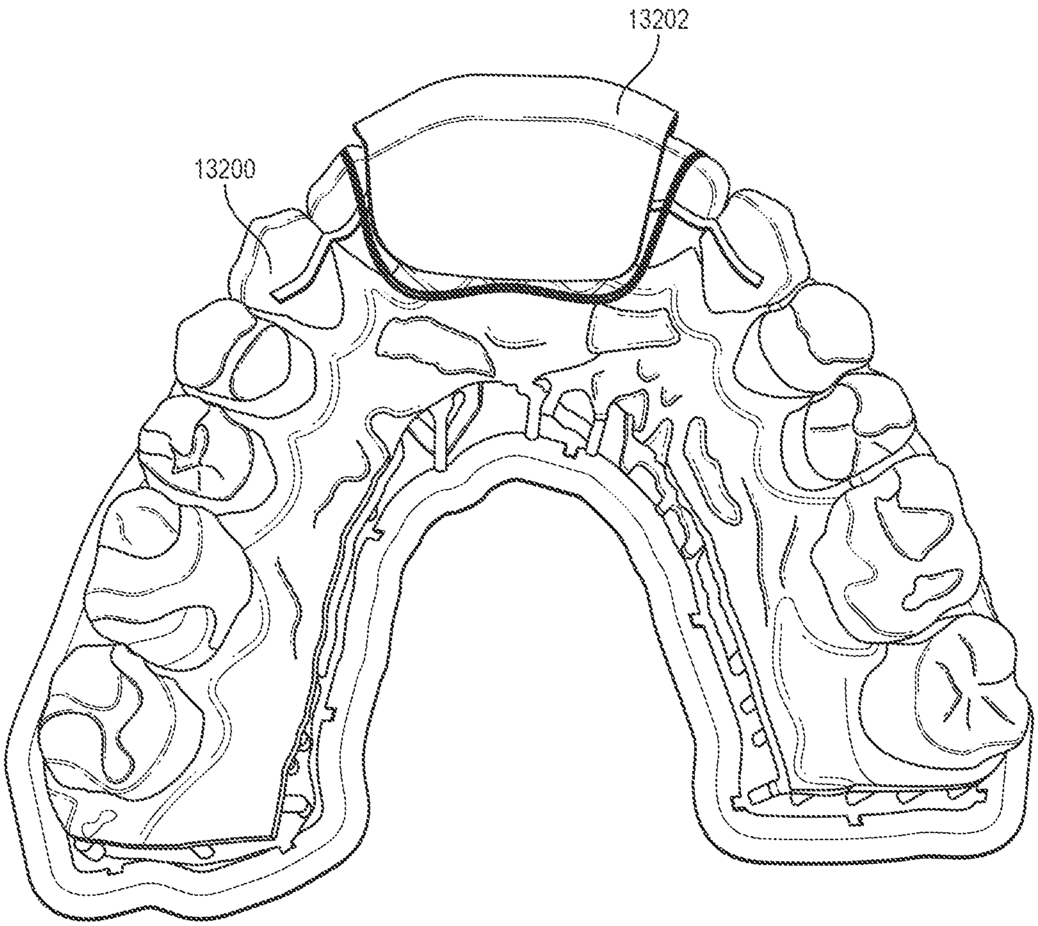
FIGS. 132-134 show several devices configured in accordance with embodiments of the present technology.
Figure 133:
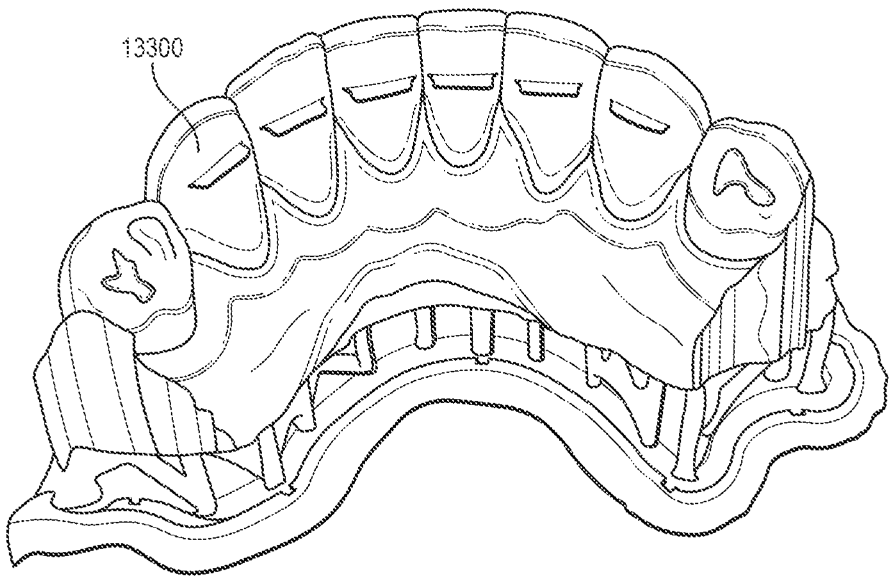
Figure 134:
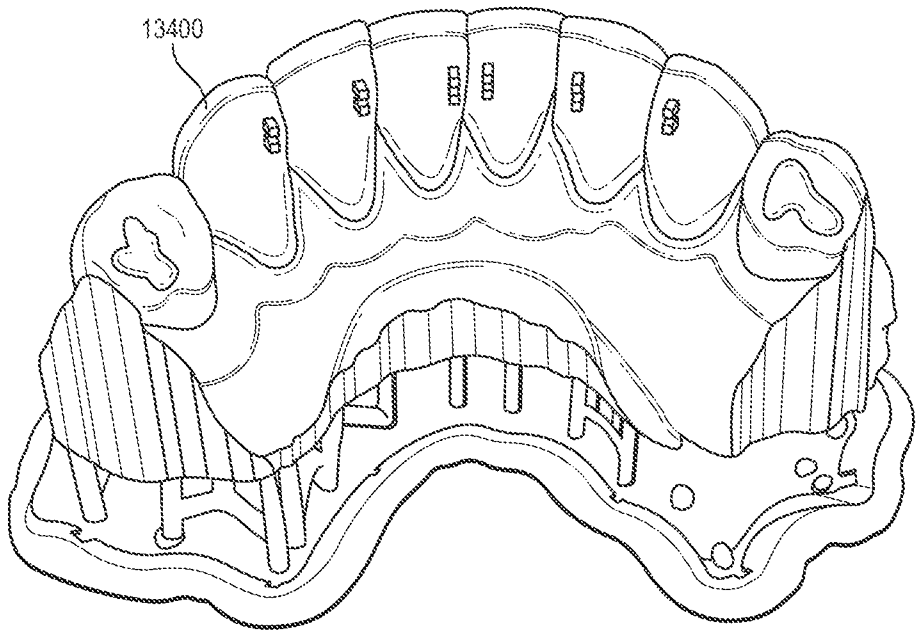

Any of the appliance and connector configurations disclosed herein may be permanently attached to the patient's teeth (i.e., such that the patient cannot remove the appliance). FIG. 132 depicts a jig that may be utilized to hold the retainer at the correct position at the surface of the teeth while the retainer is bonded to the teeth. FIGS. 132-134 show different IDBs that may be used for making and positioning the retainer.

Systems and processes according to any of the examples described herein or other examples may include a comfort cover or retainer device that is configured to be worn by a patient, while the patient has the appliance in the mouth.

The cover or retainer may be a comfort cover that covers the brackets and the appliance during treatment, and has a smooth outer surface to provide additional comfort to the user. In some examples, the comfort cover or retainer is configured to fit over and cover an appliance and brackets as described herein. In other examples, the comfort cover or retainer may be configured to cover other types of dental appliances, traditional braces, or the like.

In particular examples, the comfort cover or retainer may include a retainer body having a shape to fit over and cover some or all of the teeth in a patient's jaw (upper jaw or lower jaw). In particular examples, the retainer body is shaped to fit over at least some of the patient's teeth and provide a sufficiently tight or snug fit on the patient's teeth, so as to retain the retainer body on the patient's teeth, yet allow the patient to selectively remove (slide off) the retainer from the teeth.

In some examples, the comfort cover or retainer may be configured similar to (and of similar materials as) the aligner body described above, but is configured to cover the appliance and bracket during treatment, while the appliance is secured to the brackets. In other examples, the comfort cover or retainer may be made of other suitable materials or shapes. The retainer body may be formed by any suitable process as described herein and may be formed from an impression taken of the patient's teeth. In particular examples, the retainer body is shaped to provide a sufficiently tight fit to be retained on a patient's teeth (over an appliance and brackets), yet also provide space for one or more teeth to move, without obstruction, between an OTA and an FTA, or between an OTA and an ITA, or between two ITAs, or between an ITA and an FTA.

In that regard, the retainer body may be configured to have a shape and dimension that corresponds to and fits over the patient's current teeth arrangement (with an appliance and brackets), with sufficiently tight fitting portions on at least some of the teeth covered by the retainer body to hold the retainer onto the teeth, yet also include sufficient spacing adjacent one or more of the teeth to allow the teeth to move (due to the action of an appliance) without obstruction or friction from retainer body. For example, a clearance or spacing may be provided adjacent one or more of the teeth, to allow teeth movement, where the spacing may be uniform along some or all of the retainer body, or may vary along the retainer body so as to be different for different teeth locations. A clearance or spacing of, for example, 0.2 mm may be provided adjacent one or more teeth that are being moved by an underlying appliance. In other examples, the clearance or spacing may range from about 0.1 mm to about 0.3 mm. In other examples, other suitable clearance or spacing may be used.

The retainer body may have a relatively smooth outer surface that avoids or minimizes contact between the patient's tongue or cheek and sharp or protruding portions of the appliance or brackets. In further examples, comfort covers may have sufficient rigidity to provide splints for treating certain conditions, such as, but not limited to temporomandibular joint (TMJ) conditions. In further examples, comfort covers may be configured to provide additional protection of the patient's teeth or appliances secured to the teeth, for example, in sports or other activities, similar to a sports mouth guard.

The retainer body may be formed of any suitable material, such as, but not limited to a flexible, plastic or thermoplastic material, a rubber, a metal, a composite material, or the like, or combinations thereof. The retainer body may be made by any suitable manufacturing process including, but not limited to molding, transforming or suck down machine, 3D printing, machining, or the like.

CONCLUSION

Although many of the embodiments are described above primarily with respect to systems, devices, and methods for orthodontic appliances positioned on a lingual side of a patient's teeth, the technology is applicable to other applications and/or other approaches, such as orthodontic appliances positioned on a facial side of the patient's teeth. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1A-134.

The descriptions of embodiments of the technology are not intended to be exhaustive or to limit the technology to the precise form disclosed above. Where the context permits, singular or plural terms may also include the plural or singular term, respectively. For example, embodiments described herein as using multiple coupling arms may just as well be modified to include fewer (e.g., one) or more (e.g., three) coupling arms. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method of manufacturing an orthodontic appliance, the method comprising:

forming an appliance in an intermediate configuration by an additive manufacturing process;

securing the appliance to a shape forming fixture such that the appliance assumes a desired configuration, the shape forming fixture comprising a gingiva portion comprising a surface having a shape corresponding at least in part to a gingiva of a patient and a securing portion carried by the gingiva portion and configured to releasably secure to a portion of the appliance; and setting a shape of the appliance while the appliance is secured to the shape forming fixture.

2. The method of claim 1, wherein the appliance is formed in the intermediate configuration without support structures positioned between the appliance and a build surface.

3. The method of claim 1, wherein the additive manufacturing process comprises at least one of selective laser melting, selective laser sintering, electron beam melting, powder direct energy deposition, wire direct energy deposition, binder jetting, or bound powder extrusion.

4. The method of claim 1, wherein the appliance comprises a metal and/or a metal alloy.

5. The method of claim 1, wherein the intermediate configuration is a two-dimensional (2D) representation of the appliance.

* * * * *